US012699251B2

(12) United States Patent
Yeh et al.

(10) Patent No.: US 12,699,251 B2
(45) Date of Patent: Aug. 4, 2026

(54) IMAGING OPTICAL LENS SYSTEM, IMAGE CAPTURING UNIT AND ELECTRONIC DEVICE

(71) Applicant: LARGAN PRECISION CO., LTD., Taichung City (TW)

(72) Inventors: Kuan-Ting Yeh, Taichung City (TW); Cheng-Yu Tsai, Taichung City (TW)

(73) Assignee: LARGAN PRECISION CO., LTD., Taichung City (TW)

( * ) Notice: Subject to any disclaimer, the term of this patent is extended or adjusted under 35 U.S.C. 154(b) by 295 days.

(21) Appl. No.: 18/651,427

(22) Filed: Apr. 30, 2024

(65) Prior Publication Data

US 2025/0231379 A1     Jul. 17, 2025

Related U.S. Application Data

(60) Provisional application No. 63/620,296, filed on Jan. 12, 2024.

(51) Int. Cl.
| | |
|---|---|
| *G02B 9/34* | (2006.01) |
| *G02B 9/60* | (2006.01) |
| *G02B 13/00* | (2006.01) |

(52) U.S. Cl.
CPC ................. *G02B 9/34* (2013.01); *G02B 9/60* (2013.01); *G02B 13/0065* (2013.01); *G02B 13/0045* (2013.01)

(58) Field of Classification Search
CPC .............. G02B 15/142; G02B 13/0045; G02B 13/0065; G02B 13/004; G02B 13/34;
(Continued)

(56) References Cited

U.S. PATENT DOCUMENTS

| | | | |
|---|---|---|---|
| 2,430,587 | A | 11/1947 | Schade |
| 2,433,438 | A | 12/1947 | Cox |

(Continued)

FOREIGN PATENT DOCUMENTS

| | | |
|---|---|---|
| CN | 110554494 A | 12/2019 |
| CN | 112068289 A | 12/2020 |

(Continued)

OTHER PUBLICATIONS

TW Office Action dated Oct. 3, 2025 in application No. 113110269.
(Continued)

*Primary Examiner* — Stephone B Allen
*Assistant Examiner* — Tamara Y. Washington
(74) *Attorney, Agent, or Firm* — Maschoff Brennan

(57)     ABSTRACT

An imaging optical lens system includes five lens elements which are, in order from an object side to an image side along an optical path: a first lens element, a second lens element, a third lens element, a fourth lens element and a fifth lens element. The first lens element has positive refractive power. The second lens element has an image-side surface being concave in a paraxial region thereof. The third lens element has an object-side surface being convex in a paraxial region thereof and an image-side surface being concave in a paraxial region thereof. The fourth lens element has an object-side surface being convex in a paraxial region thereof and an image-side surface being concave in a paraxial region thereof.

36 Claims, 69 Drawing Sheets

(58) Field of Classification Search
CPC ...... G02B 13/00; G02B 13/009; G02B 13/02;
G02B 13/06; G02B 9/60; G02B 9/64;
G02B 9/62
USPC ....... 359/676, 686–692, 715, 726, 747, 753,
359/755–760, 765–769, 771–775
See application file for complete search history.

(56) References Cited

U.S. PATENT DOCUMENTS

| | | | |
|---|---|---|---|
| 3,030,863 A | 4/1962 | Schwartz et al. | |
| 3,994,576 A | 11/1976 | Glatzel et al. | |
| 4,353,617 A | 10/1982 | Tokumitsu et al. | |
| 4,832,465 A | 5/1989 | Arai et al. | |
| 4,958,919 A | 9/1990 | Sigler | |
| 4,974,948 A | 12/1990 | Arai et al. | |
| 5,267,086 A | 11/1993 | Hirano | |
| 5,345,338 A | 9/1994 | Ueda et al. | |
| 6,512,633 B2 | 1/2003 | Konno et al. | |
| 11,391,928 B2 | 7/2022 | Tang et al. | |
| 11,785,324 B1 | 10/2023 | Seo | |
| 2022/0091373 A1 | 3/2022 | Saiga et al. | |
| 2022/0155563 A1 | 5/2022 | Jo et al. | |
| 2022/0163789 A1 | 5/2022 | Fuse et al. | |
| 2022/0171168 A1 | 6/2022 | Jung et al. | |
| 2022/0276473 A1 | 9/2022 | Chen et al. | |
| 2022/0365313 A1 | 11/2022 | Chen | |
| 2023/0375807 A1 | 11/2023 | Jeong et al. | |
| 2023/0375808 A1 | 11/2023 | Huang et al. | |
| 2023/0408795 A1* | 12/2023 | Chu | G02B 13/0045 |

FOREIGN PATENT DOCUMENTS

| | | | |
|---|---|---|---|
| CN | 212515195 U | 2/2021 | |
| CN | 112433421 A | 3/2021 | |
| CN | 112637467 A | 4/2021 | |
| CN | 112799211 A | 5/2021 | |
| CN | 113296234 A | 8/2021 | |
| CN | 215340513 U | 12/2021 | |
| CN | 215340518 U | 12/2021 | |
| CN | 113946029 A | 1/2022 | |
| CN | 114167572 A | 3/2022 | |
| CN | 114296210 A | 4/2022 | |
| CN | 115202015 A | 10/2022 | |
| CN | 116500755 A | 7/2023 | |
| JP | S58-62609 A | 4/1983 | |
| JP | S62-39811 A | 2/1987 | |
| JP | S62-200315 A | 9/1987 | |
| JP | H0961709 A | 3/1997 | |
| JP | H10301039 A | 11/1998 | |
| JP | H11-2760 A | 1/1999 | |
| TW | 1812226 B | 8/2023 | |
| WO | 2022/151157 A1 | 7/2022 | |
| WO | 2022/241614 A1 | 11/2022 | |
| WO | 2023/044730 A1 | 3/2023 | |
| WO | 2023/087146 A1 | 5/2023 | |
| WO | 2025076778 A1 | 4/2025 | |

OTHER PUBLICATIONS

Gross, H., Handbook of Optical Systems, vol. 3: Aberration Theory and Correction of optical Systems, Chapter 31: Correction of Aberrations, pp. 215-221, 225 (2007).
Gross, H., Handbook of Optical Systems, vol. 3: Aberration Theory and Correction of optical Systems, pp. 377-379, (2007).
Smith, W.J., "Modern Lens Design," pp. 25-27 (1992).
Extended European Search Report dated Aug. 5, 2025 as received in Application No. 24214570.4.
U.S. Appl. No. 18/208,723 filed on dated Jun. 12, 2023.

* cited by examiner

IMAGING OPTICAL LENS SYSTEM, IMAGE CAPTURING UNIT AND ELECTRONIC DEVICE

RELATED APPLICATIONS

This application claims priority to U.S. Provisional Application 63/620,296, filed on Jan. 12, 2024, which is incorporated by reference herein in its entirety.

BACKGROUND

Technical Field

The present disclosure relates to an imaging optical lens system, an image capturing unit and an electronic device, more particularly to an imaging optical lens system and an image capturing unit applicable to an electronic device.

Description of Related Art

With the development of semiconductor manufacturing technology, the performance of image sensors has improved, and the pixel size thereof has been scaled down. Therefore, featuring high image quality becomes one of the indispensable features of an optical system nowadays.

Furthermore, due to the rapid changes in technology, electronic devices equipped with optical systems are trending towards multi-functionality for various applications, and therefore the functionality requirements for the optical systems have been increasing. However, it is difficult for a conventional optical system to obtain a balance among the requirements such as high image quality, low sensitivity, a proper aperture size, miniaturization and a desirable field of view.

SUMMARY

According to one aspect of the present disclosure, an imaging optical lens system includes five lens elements. The five lens elements are, in order from an object side to an image side along an optical path, a first lens element, a second lens element, a third lens element, a fourth lens element and a fifth lens element. Each of the five lens elements has an object-side surface facing toward the object side and an image-side surface facing toward the image side.

Preferably, the first lens element has positive refractive power. Preferably, the image-side surface of the second lens element is concave in a paraxial region thereof. Preferably, the object-side surface of the third lens element is convex in a paraxial region thereof. Preferably, the image-side surface of the third lens element is concave in a paraxial region thereof. Preferably, the object-side surface of the fourth lens element is convex in a paraxial region thereof. Preferably, the image-side surface of the fourth lens element is concave in a paraxial region thereof. Preferably, the imaging optical lens system is in a first state when an imaged object is at an infinite object distance and an entrance pupil diameter of the imaging optical lens system is at its maximum.

When an axial distance between the object-side surface of one lens element nearest to the object side and the image-side surface of another lens element nearest to the image side within the imaging optical lens system as the imaging optical lens system is in the first state is TDL, an axial distance between the image-side surface of the another lens element nearest to the image side and an image surface within the imaging optical lens system as the imaging optical lens system is in the first state is BLL, a focal length of the imaging optical lens system in the first state is fL, a curvature radius of the image-side surface of the first lens element is R2, a curvature radius of the object-side surface of the fourth lens element is R7, a curvature radius of the image-side surface of the fourth lens element is R8, an axial distance between the third lens element and the fourth lens element as the imaging optical lens system is in the first state is T34L, and a central thickness of the fourth lens element is CT4, the following conditions are preferably satisfied:

$$0.10 < TDL/BLL < 0.60;$$

$$5.00 < fL/R7 + fL/R8 < 20.00;$$

$$0.55 < (R2 + R7)/(R2 - R7) < 1.60; \text{ and}$$

$$0.10 < 10 \times T34L/CT4 < 5.00.$$

According to another aspect of the present disclosure, an imaging optical lens system includes five lens elements. The five lens elements are, in order from an object side to an image side along an optical path, a first lens element, a second lens element, a third lens element, a fourth lens element and a fifth lens element. Each of the five lens elements has an object-side surface facing toward the object side and an image-side surface facing toward the image side.

Preferably, the first lens element has positive refractive power. Preferably, the image-side surface of the second lens element is concave in a paraxial region thereof. Preferably, the object-side surface of the third lens element is convex in a paraxial region thereof. Preferably, the object-side surface of the fourth lens element is convex in a paraxial region thereof. Preferably, the image-side surface of the fourth lens element is concave in a paraxial region thereof. Preferably, the imaging optical lens system is in a first state when an imaged object is at an infinite object distance and an entrance pupil diameter of the imaging optical lens system is at its maximum.

When an axial distance between the object-side surface of one lens element nearest to the object side and the image-side surface of another lens element nearest to the image side within the imaging optical lens system as the imaging optical lens system is in the first state is TDL, an axial distance between the image-side surface of the another lens element nearest to the image side and an image surface within the imaging optical lens system as the imaging optical lens system is in the first state is BLL, a focal length of the imaging optical lens system in the first state is fL, a focal length of the first lens element is f1, a focal length of the second lens element is f2, a curvature radius of the object-side surface of the second lens element is R3, a curvature radius of the image-side surface of the third lens element is R6, a curvature radius of the object-side surface of the fourth lens element is R7, and a curvature radius of the image-side surface of the fourth lens element is R8, the following conditions are preferably satisfied:

$$0.10 < TDL/BLL < 0.60;$$

$$5.00 < fL/R7 + fL/R8 < 20.00;$$

$$-1.50 < (R3 - R6)/(R3 + R6) < 1.40; \text{ and}$$

$$|f1/f2| < 0.82.$$

3

According to another aspect of the present disclosure, an imaging optical lens system includes, in order from an object side to an image side along a travelling direction of an optical path, a movable lens group and a last lens group. The total number of lens elements in the imaging optical lens system is at least four. The movable lens group includes at least one lens element, and the last lens group includes at least one lens element. Each lens element in the imaging optical lens system has an object-side surface facing toward the object side and an image-side surface facing toward the image side.

Preferably, the imaging optical lens system is in a first state when an imaged object is at an infinite object distance and an entrance pupil diameter of the imaging optical lens system is at its maximum. Preferably, the imaging optical lens system is in a second state when an imaged object is at a finite object distance. Preferably, the imaging optical lens system undergoes a focus adjustment process to transition from the first state to the second state when an imaged object moves from an infinite object distance to a finite object distance. Preferably, the movable lens group is moved toward the object side along an optical axis relative to the last lens group when the imaging optical lens system transitions from the first state to the second state in the focus adjustment process. Preferably, one lens element nearest to the object side within the movable lens group has positive refractive power, and the object-side surface of the one lens element nearest to the object side is convex in a paraxial region thereof. Preferably, the imaging optical lens system further includes a reflective element, and the reflective element is located between an imaged object and an image surface along the optical axis.

When an axial distance between the object-side surface of one lens element nearest to the object side and the image-side surface of another lens element nearest to the image side within the imaging optical lens system as the imaging optical lens system is in the first state is TDL, an axial distance between the object-side surface of the one lens element nearest to the object side and the image-side surface of the another lens element nearest to the image side within the imaging optical lens system as the imaging optical lens system is in the second state is TDS, an axial distance between the image-side surface of the another lens element nearest to the image side and the image surface within the imaging optical lens system as the imaging optical lens system is in the first state is BLL, and an axial distance between the image-side surface of the another lens element nearest to the image side and the image surface within the imaging optical lens system as the imaging optical lens system is in the second state is BLS, the following conditions are preferably satisfied:

$$0.10 < TDL/BLL < 0.60;$$

$$1.00 < 10 \times |TDS - TDL|/TDL < 10.00;$$

and $$0.80 < BLS/BLL < 1.30.$$

According to another aspect of the present disclosure, an imaging optical lens system includes, in order from an object side to an image side along a travelling direction of an optical path, a movable lens group, a last lens group and a prism. The movable lens group includes at least one lens element. The last lens group includes at least one lens element. Each lens element in the imaging optical lens system has an object-side surface facing toward the object side and an image-side surface facing toward the image side.

Preferably, the imaging optical lens system is in a first state when an imaged object is at an infinite object distance and an entrance pupil diameter of the imaging optical lens system is at its maximum. Preferably, the imaging optical lens system is in a second state when an imaged object is at a finite object distance. Preferably, the imaging optical lens system undergoes a focus adjustment process to transition from the first state to the second state when an imaged object moves from an infinite object distance to a finite object distance. Preferably, the movable lens group is moved along an optical axis relative to the last lens group when the imaging optical lens system transitions from the first state to the second state in the focus adjustment process.

Preferably, the object-side surface of one lens element nearest to the object side within the imaging optical lens system is convex in a paraxial region thereof. Preferably, no lens element is located between the last lens group and the prism along the optical axis. Preferably, the prism has at least three reflective surfaces.

According to another aspect of the present disclosure, an image capturing unit includes one of the aforementioned imaging optical lens systems and an image sensor, wherein the image sensor is disposed on the image surface of the imaging optical lens system.

According to another aspect of the present disclosure, an electronic device includes the aforementioned image capturing unit.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
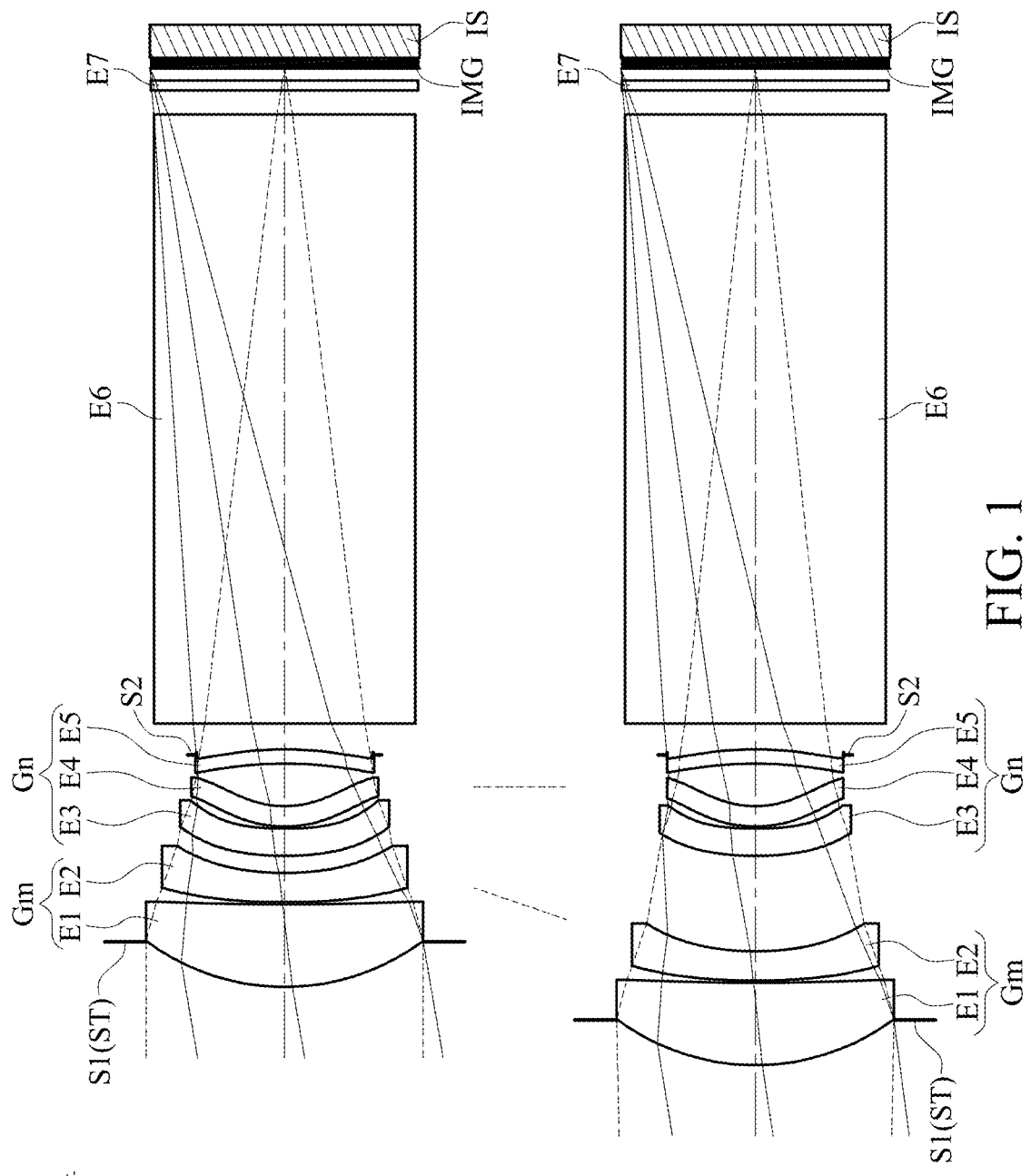
FIG. 1 shows schematic views of an image capturing unit respectively in a first state and a second state according to the 1st embodiment of the present disclosure.

An imaging optical lens system includes, in order from an object side to an image side along a travelling direction of an optical path, a movable lens group and a last lens group. The movable lens group includes at least one lens element, the last lens group includes at least one lens element, and each lens element in the imaging optical lens system has an object-side surface facing toward the object side and an image-side surface facing toward the image side. Therefore, through the configuration of at least two lens groups, a balance between size, object distance range, focus adjustment, image quality, and assembly difficulty can be achieved. Moreover, the imaging optical lens system can further include a prism, and the prism is located on the image side of the last lens group in the travelling direction of the optical path (i.e., the imaging optical lens system can include, in order from the object side to the image side along the travelling direction of the optical path, the movable lens group, the last lens group and the prism). Moreover, the total number of lens elements in the imaging optical lens system is at least four. In one exemplary configuration, the imaging optical lens system can include four lens elements, and the four lens elements are, in order from the object side to the image side along the optical path, a first lens element, a second lens element, a third lens element and a fourth lens element. In a configuration where the imaging optical lens system includes four lens elements, the movable lens group can include the first lens element, and the last lens group can include the second lens element, the third lens element and the fourth lens element. In one exemplary configuration, the imaging optical lens system can include five lens elements, and the five lens elements are in order from the object side to the image side along the optical path, a first lens element, a second lens element, a third lens element, a fourth lens element and a fifth lens element. In a configuration where the imaging optical lens system includes five lens elements, the movable lens group can include the first lens element and the second lens element, and the last lens group can include the third lens element, the fourth lens element and the fifth lens element. When the total number of lens elements in the imaging optical lens system is four, the first lens element can be referred to as one lens element nearest to the object side within the imaging optical lens system, and the fourth lens element can be referred to as another lens element nearest to the image side within the imaging optical lens system. When the total number of lens elements in the imaging optical lens system is five, the first lens element can be referred to as one lens element nearest to the object side within the imaging optical lens system, and the fifth lens element can be referred to as another lens element nearest to the image side within the imaging optical lens system.

The imaging optical lens system is in a first state when an imaged object is at an infinite object distance and an entrance pupil diameter of the imaging optical lens system is at its maximum. The imaging optical lens system is in a second state when an imaged object is at a finite object distance. The imaging optical lens system undergoes a focus adjustment process to transition from the first state to the second state when an imaged object moves from an infinite object distance to a finite object distance. On the other hand, the imaging optical lens system also undergoes the focus adjustment process to transition from the second state to the first state when an imaged object moves from a finite object distance to an infinite object distance. Moreover, said object distance refers to an axial distance from an imaged object to the object-side surface of the one lens element nearest to the object side within the imaging optical lens system.

The movable lens group is moved along an optical axis relative to the last lens group when the imaging optical lens system transitions from the first state to the second state in the focus adjustment process. Therefore, it is favorable for achieving close-up effects while simplifying the complexity of optical design and mechanisms. Moreover, the movable lens group can be moved toward the object side along the optical axis relative to the last lens group when the imaging optical lens system transitions from the first state to the second state in the focus adjustment process. Please refer to FIG. 1, which shows schematic views of the imaging optical lens system of the image capturing unit respectively in the first state (e.g., at an infinite object distance) and the second state (e.g., at a finite object distance) according to the 1st embodiment of the present disclosure, where the upper part of FIG. 1 shows a schematic view of the imaging optical lens system in the first state, and the lower part of FIG. 1 shows a schematic view of the imaging optical lens system in the second state.

All lens elements in the movable lens group can be immovable relative to one another during the focus adjustment process, and all lens elements in the last lens group can be immovable relative to one another during the focus adjustment process. Therefore, it is favorable for simplifying the complexity of mechanisms.

There can be no lens element located between the last lens group and the prism along the optical axis. In addition, the prism can be immovable relative to the last lens group during the focus adjustment process. Therefore, it is favorable for simplifying the complexity of mechanism design so as to improve lens assembly yield rates.

Figure 65:
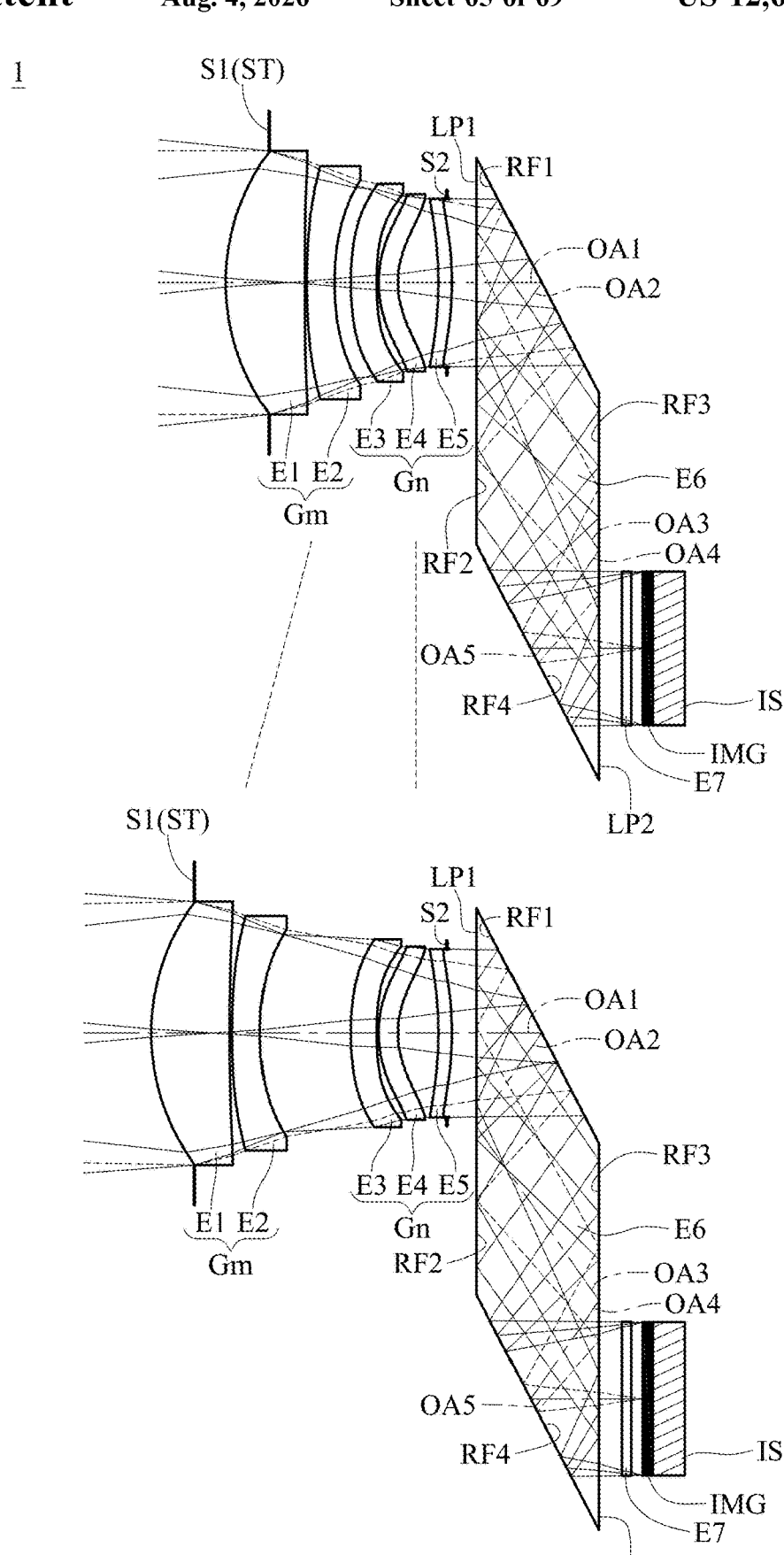
FIG. 65 shows schematic views of a configuration of one reflective element and its associated light path deflection in the image capturing unit respectively in the first state and the second state according to the 1st embodiment.

The prism can have at least three reflective surfaces. Therefore, by having light rays undergo multiple reflections within the prism and form an image, it is favorable for reducing the overall size of the image capturing unit. Moreover, the prism can further have a first light permeable surface, the at least three reflective surfaces of the prism include, in order from the object side to the image side along the travelling direction of the optical path, a first reflective surface, a second reflective surface and a third reflective surface, and the first light permeable surface and the second reflective surface can be coplanar. Therefore, it is favorable for simplifying the structure of the prism and reducing the space required for the prism. Please refer to FIG. 65, which shows schematic views of a configuration of one reflective element and its associated light path deflection in the image capturing unit respectively in the first state and the second state according to the 1st embodiment. As shown in FIG. 65, the reflective element E6 has, in order along the travelling direction of the optical path, a first light permeable surface LP1, a first reflective surface RF1, a second reflective surface RF2, a third reflective surface RF3, a fourth reflective surface RF4 and a second light permeable surface LP2, where the first light permeable surface LP1 and the second reflective surface RF2 are coplanar.

One lens element nearest to the object side within movable lens group can have positive refractive power. Therefore, it is favorable for reducing the size of imaging optical lens system while controlling the shooting angle and increasing the amount of incident light.

The object-side surface of the one lens element nearest to the object side within the movable lens group can be convex in a paraxial region thereof (i.e., the object-side surface of the one lens element nearest to the object side within the imaging optical lens system can be convex in a paraxial region thereof). Therefore, it is favorable for adjusting the surface shape of the lens element nearest to the object side so as to reduce the outer diameter of the object-side end of the imaging optical lens system.

According to the present disclosure, the imaging optical lens system can further include a reflective element, and the reflective element is located between an imaged object and an image surface along the travelling direction of the optical path. Therefore, it is favorable for providing different optical path directions for the imaging optical lens system, making the lens space configuration more flexible so as to reduce mechanical constraints and facilitate the miniaturization of the lens. Moreover, the reflective element can be located between another lens element nearest to the image side within the imaging optical lens system and the image surface along the travelling direction of the optical path. Moreover, the reflective element can have at least two reflective surfaces. Therefore, by having light rays undergo multiple reflections within the reflective element and form images, it is favorable for reducing the overall size of the image capturing unit.

When an axial distance between the object-side surface of the one lens element nearest to the object side and the image-side surface of the another lens element nearest to the image side within the imaging optical lens system in the first state is TDL, and an axial distance between the object-side surface of the one lens element nearest to the object side and the image-side surface of the another lens element nearest to the image side within the imaging optical lens system in the second state is TDS, the following condition can be satisfied: 1.00<10×|TDS−TDL|/TDL<10.00. Therefore, by maintaining the movement amount of the movable lens group during the focus adjustment process, it is favorable for achieving the photography of objects at closer distances and meeting the specification requirements of large-sized image sensors, thereby enhancing imaging quality. Moreover, the following condition can also be satisfied: 1.20<10×|TDS−TDL|/TDL<8.00. Moreover, the following condition can also be satisfied: 1.50<10×|TDS−TDL|/TDL<6.00. Moreover, the following condition can also be satisfied: 1.80<10×|TDS−TDL|/TDL<5.00. Moreover, the following condition can also be satisfied:

$$1.97 \le 10 \times |TDS - TDL| / TDL \le 4.02.$$

When an axial distance between the image-side surface of the another lens element nearest to the image side and the image surface within the imaging optical lens system in the first state is BLL, and an axial distance between the image-side surface of the another lens element nearest to the image side and the image surface within the imaging optical lens system in the second state is BLS, the following condition can be satisfied: 0.80<BLS/BLL<1.30. Therefore, maintaining a considerable back focal length during the focus adjustment process is not only favorable for simplifying the complexity of the mechanism design so as to improve lens assembly yield rates, but also favorable for reducing the space required for the lens groups, achieving space savings while providing the telephoto effect of a long focal length. Moreover, the following condition can also be satisfied: 0.85<BLS/BLL<1.20. Moreover, the following condition can also be satisfied: 0.90<BLS/BLL<1.10. Moreover, the following condition can also be satisfied: 0.94<BLS/BLL<1.06. Moreover, the following condition can also be satisfied: 0.98<BLS/BLL<1.02. Moreover, the following condition can also be satisfied: 1.00≤BLS/BLL≤1.05.

When an axial distance between the object-side surface of the one lens element nearest to the object side and the image surface within the imaging optical lens system in the first state is TLL, and an axial distance between the object-side surface of the one lens element nearest to the object side and the image surface within the imaging optical lens system in the second state is TLS, the following condition can be satisfied: 1.03<TLS/TLL<1.20. Therefore, by controlling the total length of lens elements during the focus adjustment process, it is favorable for improving the image quality of objects at closer distances under the constraints of electronic device sizes. Moreover, the following condition can also be satisfied: 1.04<TLS/TLL<1.15. Moreover, the following condition can also be satisfied: 1.05<TLS/TLL<1.10.

When an f-number of the imaging optical lens system in the first state is FnoL, and an f-number of the imaging optical lens system in the second state is FnoS, the following condition can be satisfied: 0.80<FnoL/FnoS<0.90. Therefore, it is favorable for balancing the depth of field and illumination between shooting distant and close-up scenes, and increasing the amount of incident light to improve image quality. Moreover, the following condition can also be satisfied: 0.85<FnoL/FnoS<0.90.

Figure 25:
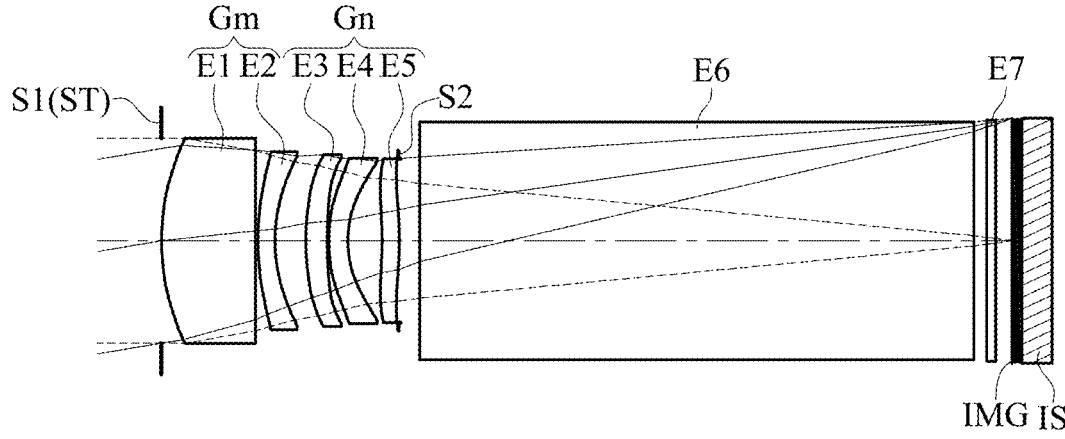
FIG. 25 shows schematic views of an image capturing unit respectively in a first state, a second state and a third state according to the 9th embodiment of the present disclosure.

In an exemplary configuration, the imaging optical lens system is in a third state when an imaged object is at an infinite object distance and the entrance pupil diameter of the imaging optical lens system is at its minimum. When the f-number of the imaging optical lens system in the first state is FnoL, and an f-number of the imaging optical lens system in the third state is FnoV, the following condition can be satisfied: 0.50<FnoV−FnoL<1.20. Therefore, it is favorable for adjusting the amount of light entering the imaging optical lens system for different application states so as to provide a variety of depths of field to achieve different imaging effects. Moreover, the following condition can also be satisfied: 0.70<FnoV−FnoL<1.00. Please refer to FIG. 25, which shows schematic views of an image capturing unit respectively in a first state, a second state and a third state according to the 9th embodiment of the present disclosure, where the upper part of FIG. 25 shows a schematic view of the imaging optical lens system in the first state, the middle part of FIG. 25 shows a schematic view of the imaging optical lens system in the second state, and the lower part of FIG. 25 shows a schematic view of the imaging optical lens system in the third state.

The first lens element can have positive refractive power. Therefore, it is favorable for reducing the size of the imaging optical lens system while controlling the shooting angle and increasing the amount of incident light.

The second lens element can have negative refractive power. Therefore, it is favorable for balancing the strength of the refractive power of the first lens element so as to prevent excessive aberrations caused by an overly large refraction angle of light. The image-side surface of the second lens element can be concave in a paraxial region thereof. Therefore, it is favorable for adjusting the refractive power of the second lens element so as to correct spherical aberration generated in the imaging optical lens system.

The object-side surface of the third lens element can be convex in a paraxial region thereof. Therefore, it is favorable for the object-side surface of the third lens element to have the ability to converge light rays so as to achieve the goal of miniaturization. The image-side surface of the third lens element can be concave in a paraxial region thereof. Therefore, it is favorable for assisting in balancing the back focal length of the imaging optical lens system while correcting off-axis aberrations.

The object-side surface of the fourth lens element can be convex in a paraxial region thereof. Therefore, it is favorable for adjusting the refraction directions of light rays exiting the fourth lens element so as to enlarge the image surface. The image-side surface of the fourth lens element can be concave in a paraxial region thereof. Therefore, it is favorable for balancing the travelling direction of the optical path and correcting spherical aberration generated in the imaging optical lens system so as to maintain an appropriate back focal length.

The object-side surface of the fifth lens element can be concave in a paraxial region thereof. Therefore, it is favorable for controlling the incident angle of light rays on the object-side surface of the fifth lens element so as to prevent an overly large incident angle, and thus prevent light dispersion and poor relative illumination at the periphery. The image-side surface of the fifth lens element can be convex in a paraxial region thereof. Therefore, it is favorable for assisting in balancing the back focal length of the imaging optical lens system while correcting off-axis aberrations.

Figure 42:
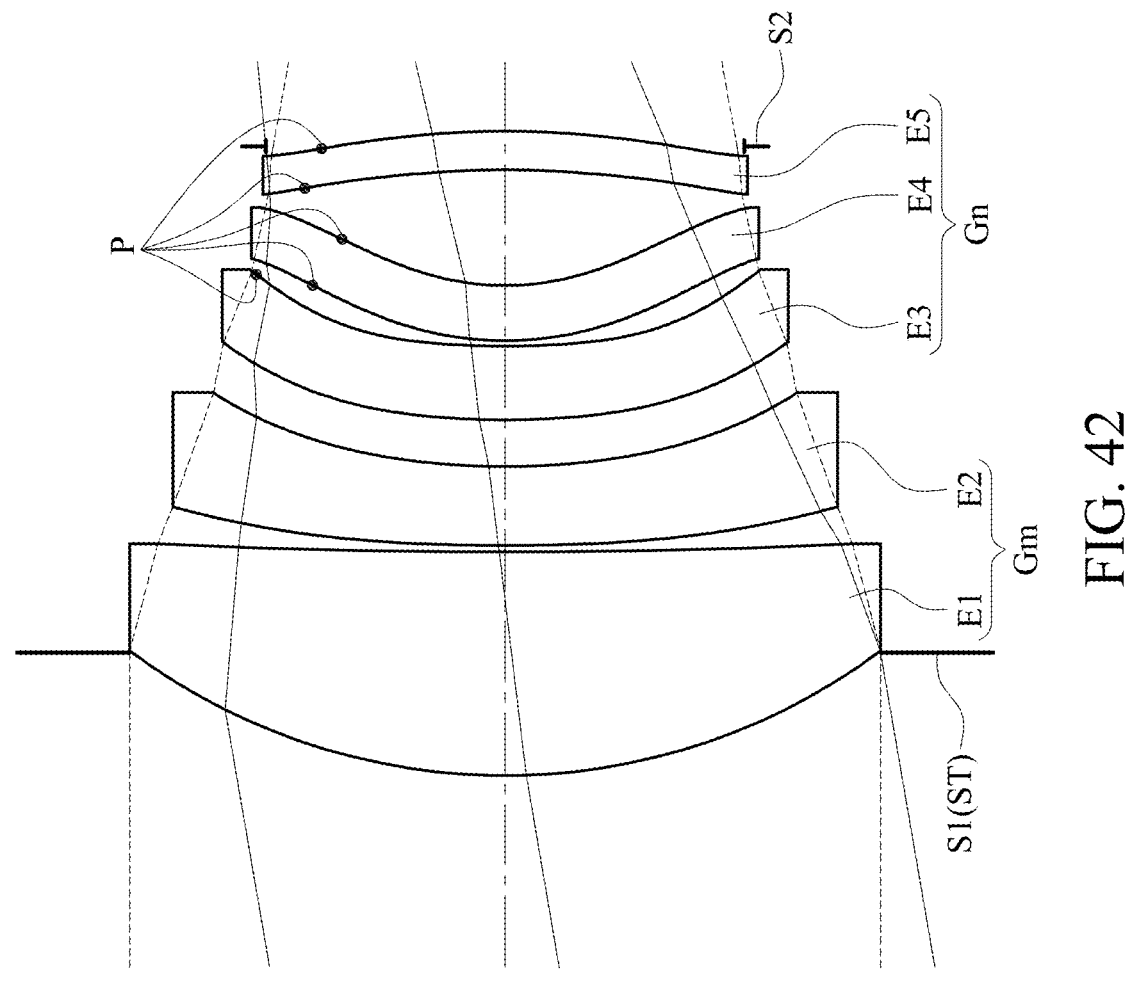
FIG. 42 shows a schematic view of inflection points on lens surfaces according to the 1st embodiment of the present disclosure.

At least one surface of at least one lens element in the imaging optical lens system can have at least one inflection point. In detail, in the imaging optical lens system, one or more lens elements each have at least one inflection point, and the said lens element having at least one inflection point refers to a lens element in which at least one of the object-side surface and the image-side surface has at least one inflection point. Therefore, it is favorable for increasing the optical design flexibility for astigmatism corrections. Moreover, at least one surface of the third lens element can have at least one inflection point. Therefore, it is favorable for controlling the angle of light rays at the periphery of the object side of the third lens element so as to prevent vignetting around the image periphery and reduce distortion. Please refer to FIG. 42, which shows a schematic view of the inflection points P on the lens surfaces according to the 1st embodiment of the present disclosure. In FIG. 42, the image-side surface of the third lens element E3, the object-side surface of the fourth lens element E4, the image-side surface of the fourth lens element E4, and the object-side surface and the image-side surface of the fifth lens element E5 each has one inflection point P. The inflection points of lens elements of 1st embodiment of the present disclosure shown in FIG. 42 are only exemplary. Each of the lens elements in various embodiments of the present disclosure can have one or more inflection points.

When the axial distance between the object-side surface of the one lens element nearest to the object side and the image-side surface of the another lens element nearest to the image side within the imaging optical lens system in the first state is TDL, and the axial distance between the image-side surface of the another lens element nearest to the image side and the image surface within the imaging optical lens system in the first state is BLL, the following condition can be satisfied: 0.10<TDL/BLL<0.60. Therefore, it is favorable for adjusting an appropriate back focal length so as to facilitate the folding of the optical path. Moreover, the following condition can also be satisfied: 0.20<TDL/BLL<0.45. Moreover, the following condition can also be satisfied: 0.23<TDL/BLL<0.42. Moreover, the following condition can also be satisfied: 0.26≤TDL/BLL≤0.39.

When a focal length of the imaging optical lens system in the first state is fL, a curvature radius of the object-side surface of the fourth lens element is R7, and a curvature radius of the image-side surface of the fourth lens element is R8, the following condition can be satisfied: 5.00<fL/R7+fL/R8<20.00. Therefore, it is favorable for adjusting the total focal length and the configuration of the curvature radius of both the object-side surface and the image-side surface of the fourth lens element, allowing the imaging optical lens system to correct off-axis aberrations while still maintaining a smaller outer diameter and an appropriate back focal length. Moreover, the following condition can also be satisfied: 6.00<fL/R7+fL/R8<18.00. Moreover, the following condition can also be satisfied: 7.00<fL/R7+fL/R8<16.00. Moreover, the following condition can also be satisfied: 7.55≤fL/R7+fL/R8≤14.04.

When a curvature radius of the image-side surface of the first lens element is R2, and the curvature radius of the object-side surface of the fourth lens element is R7, the following condition can be satisfied: 0.55<(R2+R7)/(R2−R7)<1.60. Therefore, it is favorable for balancing the curvature radius of the image-side surface of the first lens element and the curvature radius of the object-side surface of the fourth lens element so as to adjust the direction of the peripheral light rays, which facilitates aberration corrections and reduction of stray light within the imaging optical lens system. Moreover, the following condition can also be satisfied: 0.60<(R2+R7)/(R2-R7)<1.40. Moreover, the following condition can also be satisfied:

$$0.64 \le (R2 + R7)/(R2 - R7) \le 1.12.$$

When an axial distance between the third lens element and the fourth lens element as the imaging optical lens system is in the first state is T34L, and a central thickness of the fourth lens element is CT4, the following condition can be satisfied: 0.10<10×T34L/CT4<5.00. Therefore, it is favorable for balancing the axial distance between the third lens element and the fourth lens element and the central thickness of the fourth lens element so as to reduce the size and correct spherical aberration. Moreover, the following condition can also be satisfied: 0.30<10×T34L/CT4<3.00. Moreover, the following condition can also be satisfied: 0.50<10×T34L/CT4<2.00. Moreover, the following condition can also be satisfied: 0.60<10×T34L/CT4<1.60. Moreover, the following condition can also be satisfied: 0.70≤10× T34L/CT4≤1.29.

When a curvature radius of the object-side surface of the second lens element is R3, and a curvature radius of the image-side surface of the third lens element is R6, the following condition can be satisfied: −1.50<(R3−R6)/(R3+ R6)<1.40. Therefore, it is favorable for balancing the curvature radius of the object-side surface of the second lens element and the curvature radius of the image-side surface of the third lens element so as to enhance the converging quality of the imaging light rays, improve field curvature and reduce spherical aberration. Moreover, the following condition can also be satisfied: −1.00<(R3−R6)/(R3+R6)<1.20. Moreover, the following condition can also be satisfied: −0.50<(R3−R6)/(R3+R6)<0.80. Moreover, the following condition can also be satisfied: −0.38≤(R3−R6)/(R3+R6) ≤1.06.

When a focal length of the first lens element is f1, and a focal length of the second lens element is f2, the following condition can be satisfied: |f1/f2|<0.82. Therefore, it is favorable for balancing the refractive power between the first lens element and the second lens element so as to balance the convergence or divergence of light rays and improve the converging quality across the entire field of view. Moreover, the following condition can also be satisfied: 0.05<|f1/f2|<0.75. Moreover, the following condition can also be satisfied: 0.10<|f1/f2|<0.60. Moreover, the following condition can also be satisfied: 0.13≤|f1/f2|≤0.72.

When the focal length of the imaging optical lens system in the first state is fL, and a composite focal length of the first lens element and the second lens element is f12, the following condition can be satisfied: 0.50<fL/f12<2.00. Therefore, it is favorable for controlling the composite focal length of the movable lens group so as to balance the amount of movement and maintain the back focal length within a limited space configuration during the focus adjustment process. Moreover, the following condition can also be satisfied: 0.80<fL/f12<1.60.

When a focal length of the third lens element is f3, and a focal length of the fourth lens element is f4, the following condition can be satisfied: −2.00<f4/f3<0.10. Therefore, it is favorable for balancing the refractive power between the third lens element and the fourth lens element so as to enhance the symmetry of the imaging optical lens system and reduce the size of unwanted light spot in the central field of view. Moreover, the following condition can also be satisfied: −1.50<f4/f3<0.00.

When a central thickness of the first lens element is CT1, and a central thickness of the second lens element is CT2, the following condition can be satisfied: 1.80<CT1/ CT2<8.00. Therefore, it is favorable for controlling the ratio of the central thickness of the first lens element to that of the second lens element so as to take into account the manufacturing limitations of the first lens element and reduce the size of the imaging optical lens system by adjusting the central thickness of the second lens element. Moreover, the following condition can also be satisfied: 2.00<CT1/ CT2<6.50.

When the axial distance between the object-side surface of the one lens element nearest to the object side and the image surface as the imaging optical lens system is in the first state is TLL, and a maximum image height of the imaging optical lens system (which can be half of a diagonal length of an effective photosensitive area of an image sensor) is ImgH, the following condition can be satisfied: 5.50<TLL/ImgH<10.00. Therefore, it is favorable for balancing the total length and imaging height of the imaging optical lens system so as to reduce the size of the lens elements and form a telephoto configuration. Moreover, the following condition can also be satisfied: 6.00<TLL/ ImgH<9.00.

When an Abbe number of the second lens element is V2, an Abbe number of the fourth lens element is V4, and an Abbe number of the fifth lens element is V5, the following condition can be satisfied: 30.0<V2+V4+V5<93.0. Therefore, it is favorable for adjusting the material configuration of the second lens element, the fourth lens element and the fifth lens element so as to correct chromatic aberration during multi-range object distance photography, thereby improving image quality. Moreover, the following condition can also be satisfied: 50.0<V2+V4+V5<88.0.

When the focal length of the imaging optical lens system in the first state is fL, and the focal length of the first lens element is f1, the following condition can be satisfied: 0.65<fL/f1<2.00. Therefore, it is favorable for adjusting the refractive power of the first lens element; furthermore, through the material selection for the first lens element, it is favorable for reducing the impact of temperature effects on imaging while reducing the size of the imaging optical lens system. Moreover, the following condition can also be satisfied: 1.00<fL/f1<1.70.

Figure 43:
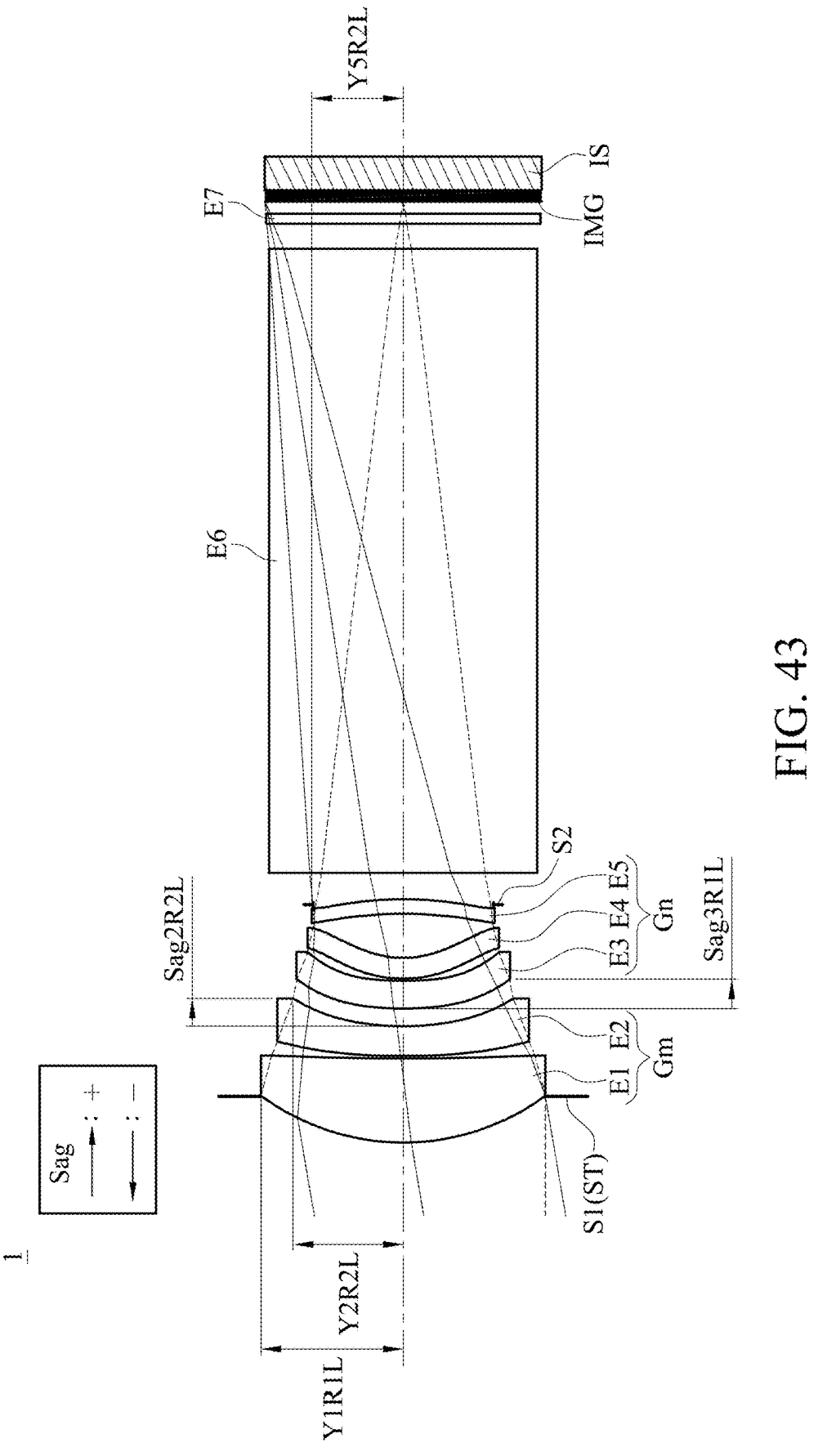
FIG. 43 shows a schematic view of Y1R1L, Y2R2L, Y5R2L, Sag2R2L and Sag3R1L and the image capturing unit in the first state according to the 1st embodiment of the present disclosure.

When a displacement in parallel with the optical axis from an axial vertex of the object-side surface of the third lens element to a maximum effective radius position of the object-side surface of the third lens element as the imaging optical lens system is in the first state is Sag3R1L, and a central thickness of the third lens element is CT3, the following condition can be satisfied: 0.80<Sag3R1L/ CT3<2.00. Therefore, it is favorable for the third lens element to control the direction of light rays at the periphery thereof so as to control the incident angle of light rays entering the image surface and prevent stray light after the light rays pass through the reflective element. Moreover, the following condition can also be satisfied: 1.00<Sag3R1L/ CT3<1.80. Please refer to FIG. 43, which shows a schematic view of Sag3R1L according to the 1st embodiment of the present disclosure. When the direction from the axial vertex of one surface to the maximum effective radius position of the same surface is facing towards the image side of the imaging optical lens system, the value of displacement is positive; when the direction from the axial vertex of the surface to the maximum effective radius position of the same surface is facing towards the object side of the imaging optical lens system, the value of displacement is negative.

When a maximum effective radius of the object-side surface of the first lens element as the imaging optical lens system is in the first state is Y1R1L, and a maximum effective radius of the image-side surface of the fifth lens element as the imaging optical lens system is in the first state is Y5R2L, the following condition can be satisfied: 1.00<Y1R1L/Y5R2L<2.00. Therefore, it is favorable for controlling the size of the light beam, and ensuring the effective diameter of the lens elements is not too large, which facilitates the passage of light rays through the reflective element and maintains the quality of imaging in the imaging optical lens system. Moreover, the following condition can also be satisfied: 1.30<Y1R1L/Y5R2L<1.80. Please refer to FIG. 43, which shows a schematic view of Y1R1L and Y5R2L according to the 1st embodiment of the present disclosure.

When an axial distance between the second lens element and the third lens element as the imaging optical lens system is in the first state is T23L, a displacement in parallel with the optical axis from an axial vertex of the image-side surface of the second lens element to a maximum effective radius position of the image-side surface of the second lens element as the imaging optical lens system is in the first state is Sag2R2L, the displacement in parallel with the optical axis from the axial vertex of the object-side surface of the third lens element to the maximum effective radius position of the object-side surface of the third lens element as the imaging optical lens system is in the first state is Sag3R1L, and a maximum effective radius of the image-side surface of the second lens element as the imaging optical lens system is in the first state is Y2R2L, the following condition can be satisfied: 0.05<(T23L+Sag3R1L−Sag2R2L)/Y2R2L<0.50. Therefore, it is favorable for balancing the ratio of the shortest peripheral distance to the effective diameter between the two lens groups so as to reduce the size and simplify the complexity of mechanism design during the focus adjustment process. Moreover, the following condition can also be satisfied: 0.12<(T23L+Sag3R1L−Sag2R2L)/Y2R2L<0.35. Please refer to FIG. 43, which shows a schematic view of Sag2R2L, Sag3R1L and Y2R2L according to the 1st embodiment of the present disclosure. When the direction from the axial vertex of one surface to the maximum effective radius position of the same surface is facing towards the image side of the imaging optical lens system, the value of displacement is positive; when the direction from the axial vertex of the surface to the maximum effective radius position of the same surface is facing towards the object side of the imaging optical lens system, the value of displacement is negative.

When an axial distance between the fourth lens element and the fifth lens element as the imaging optical lens system is in the first state is T45L, and a central thickness of the fifth lens element is CT5, the following condition can be satisfied: 1.00<T45L/CT5<6.00. Therefore, it is favorable for maintaining a larger distance between the fourth lens element and the fifth lens element so as to balance the incident angle of light on the image surface during the focus adjustment process, and prevent the generation of stray light. Moreover, the following condition can also be satisfied: 1.20<T45L/CT5<4.50.

When the central thickness of the first lens element is CT1, and an axial distance between the object-side surface of the third lens element and the image-side surface of the fourth lens element as the imaging optical lens system is in the first state is Dr5r8L, the following condition can be satisfied: 0.80<CT1/Dr5r8L<3.50. Therefore, it is favorable for balancing the central thickness of the first lens element and the axial distance from the object-side surface of the third lens element to the image-side surface of the fourth lens element so as to balance the spatial configuration of the lens groups on the object and image sides, maintaining high convergence quality across multiple object distance ranges. Moreover, the following condition can also be satisfied: 1.00<CT1/Dr5r8L<3.00.

When the axial distance between the third lens element and the fourth lens element as the imaging optical lens system is in the first state is T34L, and the axial distance between the fourth lens element and the fifth lens element as the imaging optical lens system is in the first state is T45L, the following condition can be satisfied: 0.01<10×T34L/T45L<3.00. Therefore, it is favorable for controlling the ratio of the distances between the third lens element and fourth lens element and between the fourth lens element and the fifth lens element so as to increase design flexibility and reduce manufacturing tolerances. Moreover, the following condition can also be satisfied: 0.10<10×T34L/T45L<2.00. Moreover, the following condition can also be satisfied: 0.15<10×T34L/T45L<0.60.

When the axial distance between the image-side surface of the another lens element nearest to the image side and the image surface within the imaging optical lens system as the imaging optical lens system is in the first state is BLL, and the maximum image height of the imaging optical lens system is ImgH, the following condition can be satisfied: 4.20<BLL/ImgH<7.20. Therefore, it is favorable for the imaging optical lens system to have a sufficient back focal length to accommodate other optical components, while controlling the angle of incident light on the image surface to ensure the brightness at the periphery of the images. Moreover, the following condition can also be satisfied: 4.50<BLL/ImgH<7.00.

When the focal length of the imaging optical lens system in the first state is fL, and the focal length of the third lens element is f3, the following condition can be satisfied: |fL/f3|<1.80. Therefore, it is favorable for adjusting the refractive power of the third lens element so as to balance the refractive power distribution between the lens groups on the object side and the image side, thereby reducing systematic sensitivity during the focus adjustment process. Moreover, the following condition can also be satisfied: 0.20<|fL/f3|<1.50.

When the axial distance between the fourth lens element and the fifth lens element as the imaging optical lens system is in the first state is T45L, and the central thickness of the fourth lens element is CT4, the following condition can be satisfied: 0.50<T45L/CT4<6.00. Therefore, it is favorable for balancing the central thickness of the fourth lens element and the axial distance between the fourth lens element and the fifth lens element so as to increase spatial utilization efficiency. Moreover, the following condition can also be satisfied: 0.75<T45L/CT4<4.50.

Figure 44:
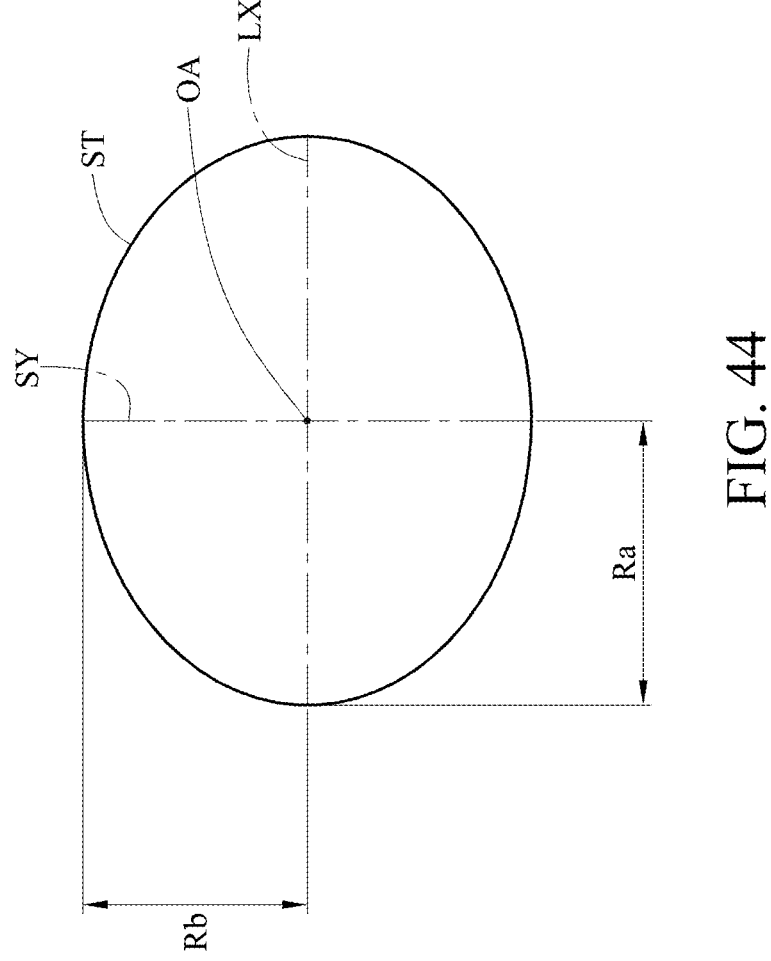
FIG. 44 shows a schematic view of a shape of an aperture stop according to the present disclosure.
Figure 45:
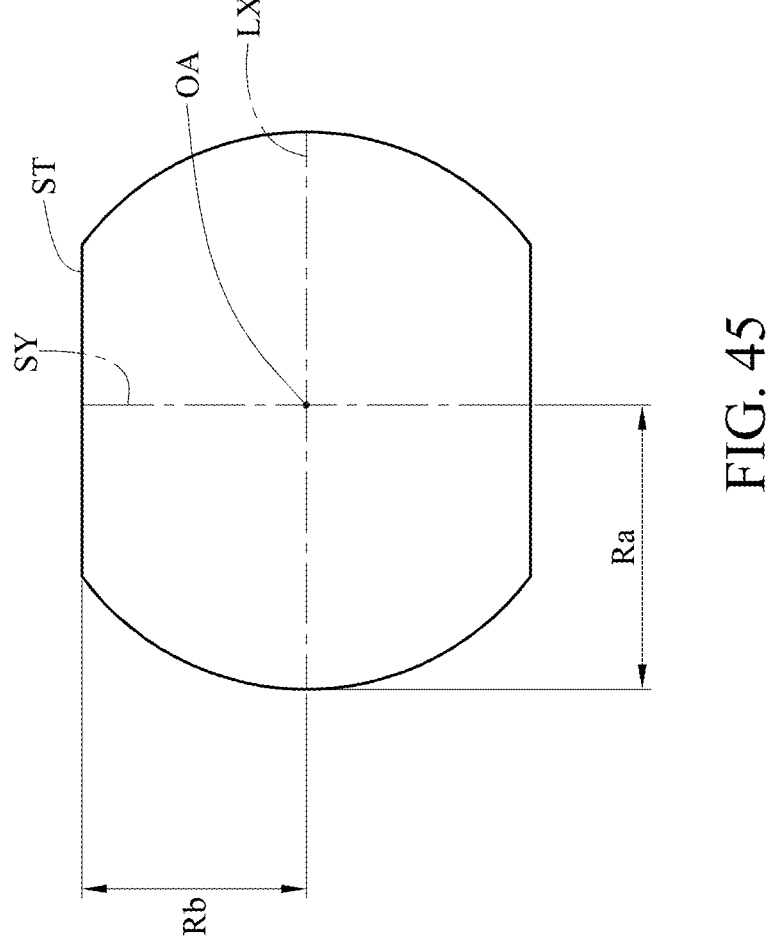
FIG. 45 shows a schematic view of another shape of an aperture stop according to the present disclosure.

According to the present disclosure, the imaging optical lens system can further include an aperture stop. Therefore, it is favorable for ensuring the imaging optical lens system having a proper entrance pupil and controlling the field of view so as to achieve a telephoto photography effect. Moreover, the aperture stop can have a major axis direction and a minor axis direction which are perpendicular to the optical axis and different from each other, and an effective radius of the aperture stop in the major axis direction is different from an effective radius of the aperture stop in the minor axis direction. Therefore, it is favorable for adjusting the shape of the aperture stop so as to reduce stray light. For example, please refer to FIG. 44 and FIG. 45, which show schematic views of non-circular aperture stops according to the present disclosure, where FIG. 44 shows a schematic view of a shape of an aperture stop according to the present disclosure, and FIG. 45 shows a schematic view of another shape of an aperture stop according to the present disclosure. As shown in FIG. 44, in some configurations of the present disclosure, a shape of an aperture stop ST is elliptical, and the aperture stop ST has a major axis direction LX and a minor axis direction SY perpendicular to an optical axis OA. The major axis direction LX and the minor axis direction SY are two different directions, and an effective radius Ra of the aperture stop ST in the major axis direction LX is larger than an effective radius Rb of the aperture stop ST in the minor axis direction SY. As shown in FIG. 45, in some configurations of the present disclosure, an aperture stop ST is shaped to have trimmed edges at an outer periphery thereof, and the aperture stop ST has a major axis direction LX and a minor axis direction SY perpendicular to an optical axis OA. The major axis direction LX and the minor axis direction SY are two different directions, and an effective radius Ra of the aperture stop ST in the major axis direction LX is larger than an effective radius Rb of the aperture stop ST in the minor axis direction SY.

According to the present disclosure, the aforementioned features and conditions can be utilized in numerous combinations so as to achieve corresponding effects.

According to the present disclosure, the lens elements of the imaging optical lens system can be made of either glass or plastic material. When the lens elements are made of glass material, the refractive power distribution of the imaging optical lens system may be more flexible, and the influence on imaging caused by external environment temperature change may be reduced. The glass lens element can either be made by grinding or molding. When the lens elements are made of plastic material, the manufacturing costs can be effectively reduced. Furthermore, surfaces of each lens element can be arranged to be spherical or aspheric. Spherical lens elements are simple in manufacture. Aspheric lens element design allows more control variables for eliminating aberrations thereof and reducing the required number of lens elements, and the total track length of the imaging optical lens system can therefore be effectively shortened. Additionally, the aspheric surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, one or more of the lens elements' material may optionally include an additive which generates light absorption and interference effects and alters the lens elements' transmittance in a specific range of wavelength for a reduction in unwanted stray light or color deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding. Moreover, the additive may be coated on the lens surfaces to provide the abovementioned effects.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an inflection point is a point on the surface of the lens element at which the surface changes from concave to convex, or vice versa. A critical point is a non-axial point of the lens surface where its tangent is perpendicular to the optical axis.

According to the present disclosure, the image surface of the imaging optical lens system, based on the corresponding image sensor, can be flat or curved, especially a curved surface being concave facing towards the object side of the imaging optical lens system.

According to the present disclosure, an image correction unit, such as a field flattener, can be optionally disposed between the lens element closest to the image side of the optical imaging lens assembly along the optical path and the image surface for correction of aberrations such as field curvature. The optical characteristics of the image correction unit, such as curvature, thickness, index of refraction, position and surface shape (convex or concave surface with spherical, aspheric, diffractive or Fresnel types), can be adjusted according to the design of the image capturing unit. In general, a preferable image correction unit is, for example, a thin transparent element having a concave object-side surface and a planar image-side surface, and the thin transparent element is disposed near the image surface.

According to the present disclosure, at least one reflective element, such as a prism or a reflective mirror, can be optionally provided, and the surface of the prism or reflective mirror can be planar, spherical, aspheric or have a freeform shape, such that the imaging optical lens system can be more flexible in space arrangement. The reflective element can be disposed between the imaged object and the image surface so as to reduce the size of the imaging optical lens system. The optical path can be deflected at least one time by the reflective element. An angle between the optical axis and a normal direction of a reflective surface of the reflective element is not limited to 45 degrees, but can be other angles depending on the space arrangement. The optical path along an optical axis at the object side can be redirected to an optical axis at the image side by the reflective element. An angle between a vector of the optical axis at the object side and that at the image side can be any angle, not limited to 0, 90 or 180 degrees. In addition, in order to reduce the size of the imaging optical lens system, the length and the width of the reflective mirror may be different from each other, and the length, the width and the height of the prism may be different from one another. The surface of the reflective element (e.g., the surface of the prism or the reflective mirror) can be planar, spherical, aspheric or have a freeform shape according to the optical design requirements, but the present disclosure is not limited thereto. The reflective element can consist of more than one prism depending on the design requirements. The prism can be made of glass material or plastic material depending on the design requirements. In addition, the prism with optical path folding function is not one of the lens elements; that is, the prism with optical path folding function is not included in the five lens elements of the imaging optical lens system.

Figure 46:
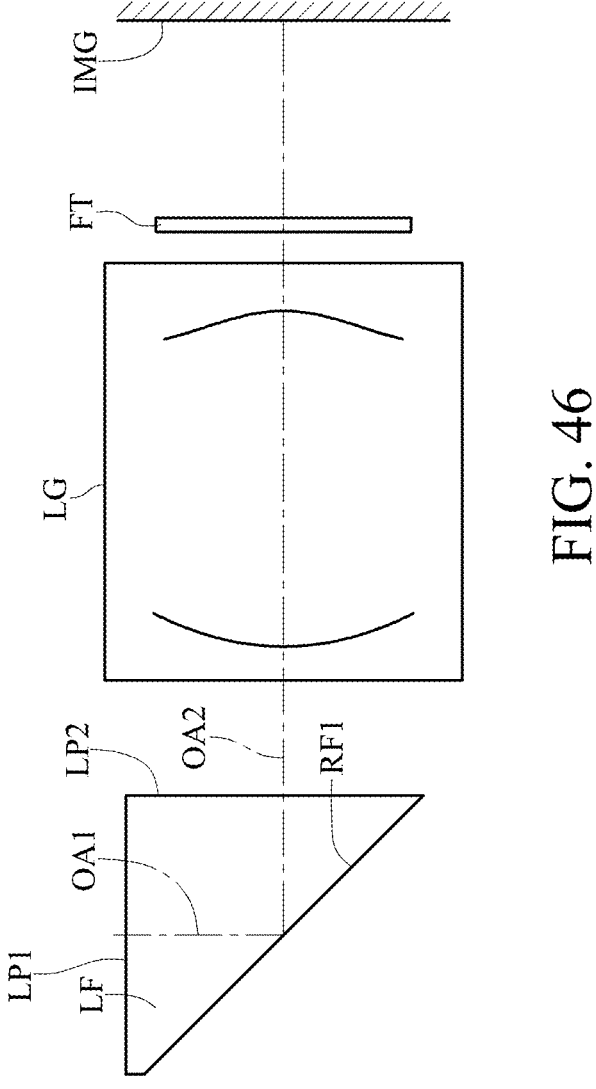
FIG. 46 to FIG. 48 each shows a schematic view of a configuration of one reflective element in an imaging optical lens system according to one embodiment of the present disclosure.
Figure 47:
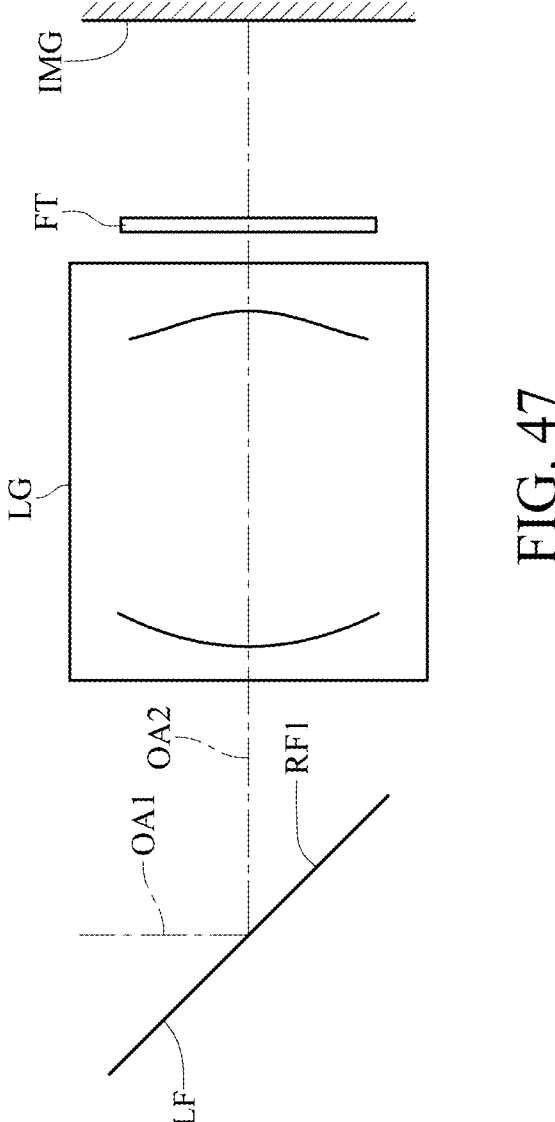
Figure 48:
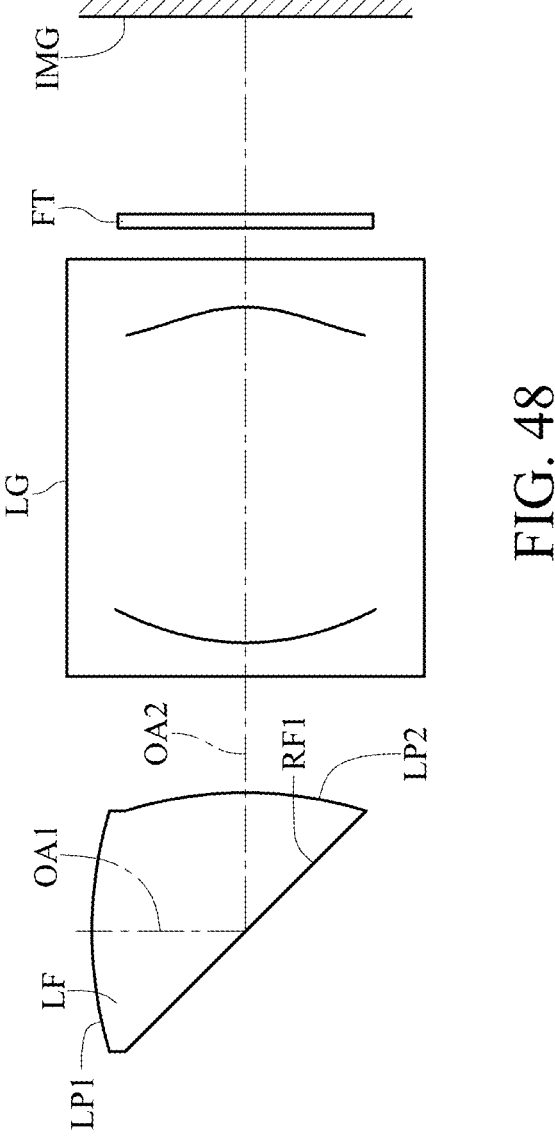

Furthermore, please refer to FIG. 46 through FIG. 48, each of which shows a schematic view of a configuration of one reflective element in an imaging optical lens system according to one embodiment of the present disclosure. As shown in FIG. 46 to FIG. 48, the imaging optical lens system can include, in order from an imaged object (not shown in the figures) to an image surface IMG along a travelling direction of an optical path, a reflective element LF, a lens group LG, a filter FT and the image surface IMG.

In FIG. 46, the reflective element LF is a prism and has, in sequence along a travelling direction of light on the optical path, a first light permeable surface LP1, a reflective surface RF1, and a second light permeable surface LP2. The optical path enters the reflective element LF through the first light permeable surface LP1 and reaches the reflective surface RF1 along a first optical axis OA1. The reflective surface RF1 deflects the optical path from the first optical axis OA1 to a second optical axis OA2, and the optical path then passes through the second light permeable surface LP2, travels through the lens group LG and the filter FT, and ultimately arrives at the image surface IMG along the second optical axis OA2. As shown in FIG. 46, both of the first light permeable surface LP1 and the first light permeable surface LP2 of the reflective element LF can be planar.

In FIG. 47, the reflective element LF is a flat reflective mirror having a reflective surface RF1. The optical path reaches the reflective surface RF1 along a first optical axis OA1. The reflective surface RF1 deflects the optical path from the first optical axis OA1 to a second optical axis OA2. Subsequently, the optical path travels through the lens group LG and the filter FT, and ultimately arrives at the image surface IMG along the second optical axis OA2.

In FIG. 48, the reflective element LF is a prism and has, in sequence along a travelling direction of light on the optical path, a first light permeable surface LP1, a reflective surface RF1, and a second light permeable surface LP2. The optical path enters the reflective element LF through the first light permeable surface LP1 and reaches the reflective surface RF1 along a first optical axis OA1. The reflective surface RF1 deflects the optical path from the first optical axis OA1 to a second optical axis OA2, and the optical path then passes through the second light permeable surface LP2, travels through the lens group LG and the filter FT, and ultimately arrives at the image surface IMG along the second optical axis OA2. As shown in FIG. 48, both of the first light permeable surface LP1 and the first light permeable surface LP2 of the reflective element LF can be curved.

Figure 49:
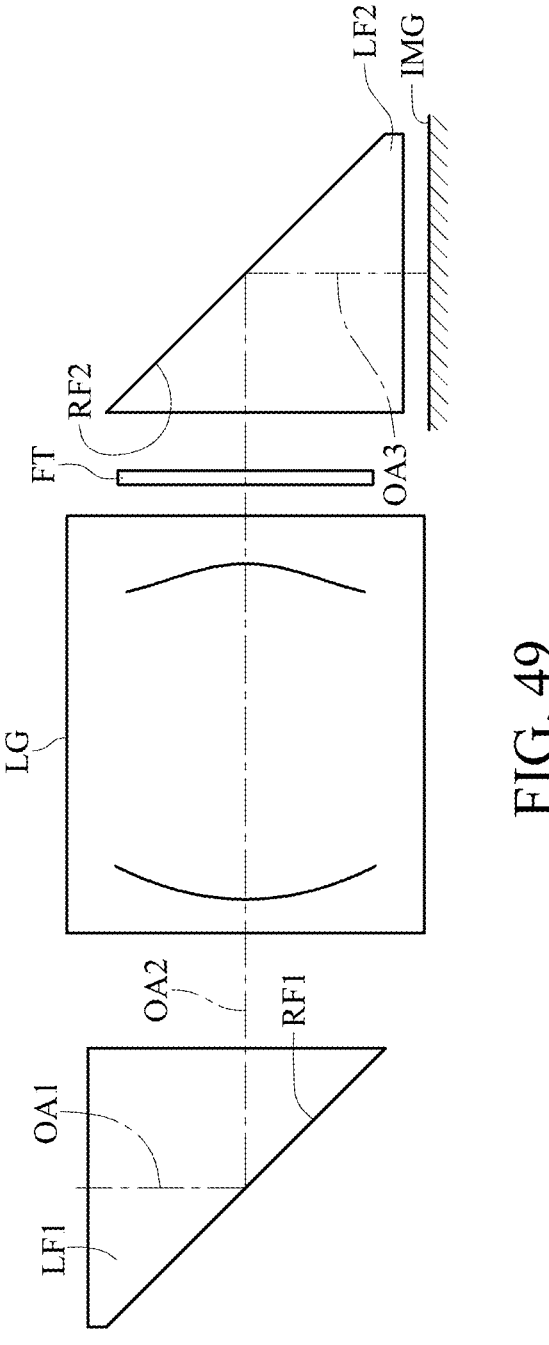
FIG. 49 and FIG. 50 each shows a schematic view of a configuration of two reflective elements in an imaging optical lens system according to one embodiment of the present disclosure.
Figure 50:
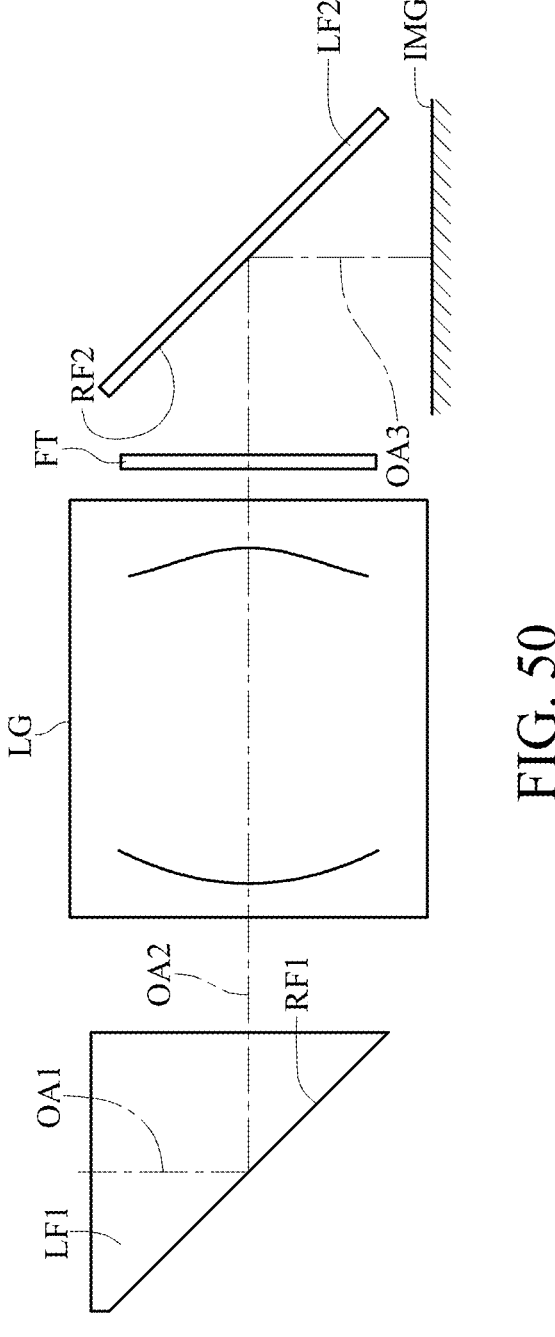

Moreover, please refer to FIG. 49 and FIG. 50, each of which shows a schematic view of a configuration of two reflective elements in an imaging optical lens system according to one embodiment of the present disclosure. As shown in FIG. 49 and FIG. 50, the imaging optical lens system can include, in order from an imaged object (not shown in the figures) to an image surface IMG along a travelling direction of an optical path, a first reflective element LF1, a lens group LG, a filter FT, a second reflective element LF2 and the image surface IMG. The optical path enters the first reflective element LF1 and reaches the first reflective surface RF1 along a first optical axis OA1, and the first reflective surface RF1 deflects the optical path from the first optical axis OA1 to a second optical axis OA2. The optical path travels through the lens group LG and the filter FT along the second optical axis OA2. Subsequently, the optical path enters the second reflective element LF2 and reaches the second reflective surface RF2 along the second optical axis OA2, and the second reflective surface RF2 deflects the optical path from the second optical axis OA2 to a third optical axis OA3. The optical path ultimately arrives at the image surface IMG along the third optical axis OA3. In FIG. 49, each of the first reflective element LF1 and the second reflective element LF2 can be a prism. In FIG. 50, the first reflective element LF1 and the second reflective element LF2 can be a prism and a flat reflective mirror, respectively.

Figure 51:
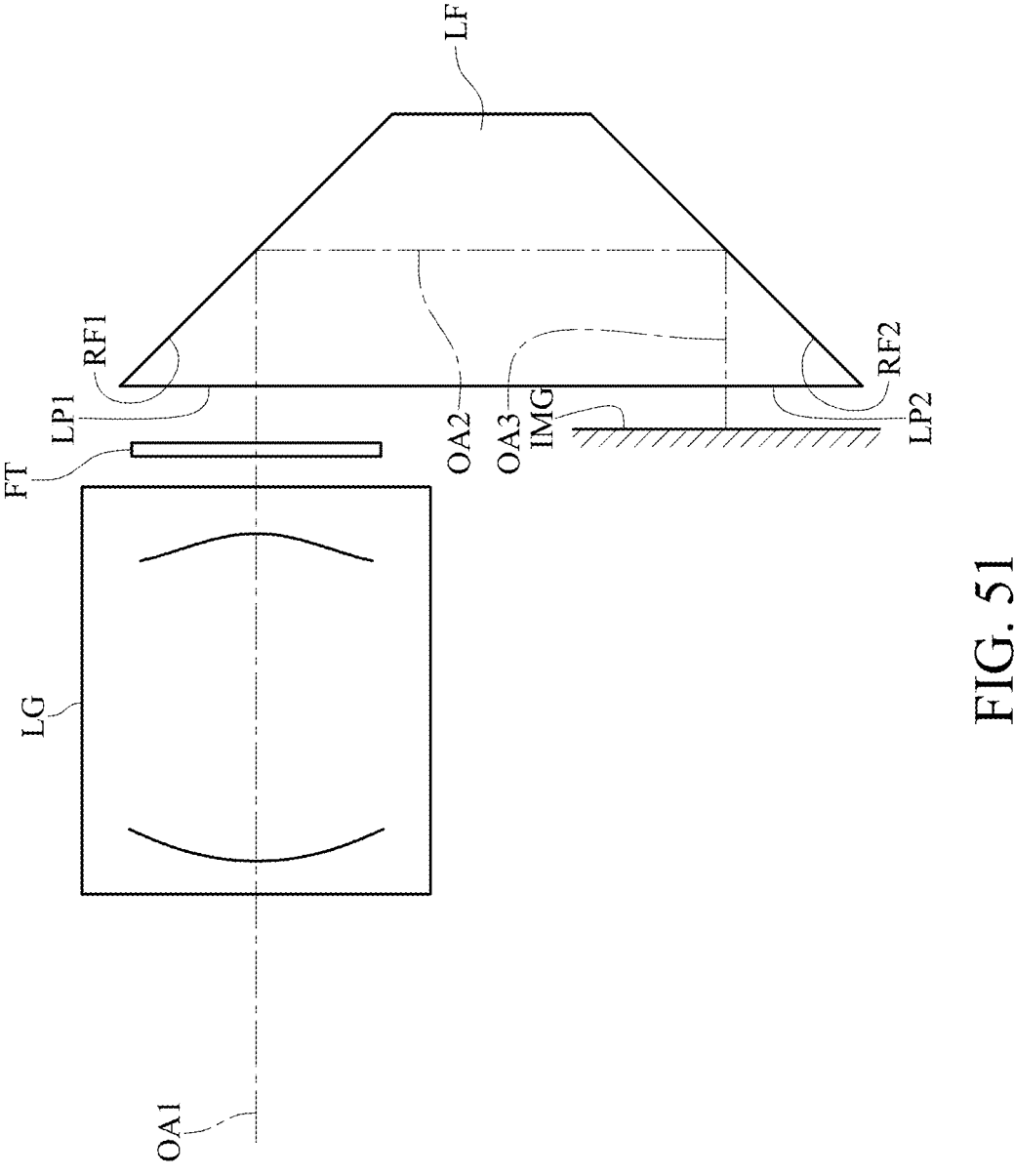
FIG. 51 shows a schematic view of a configuration of a double-reflection reflective element in an imaging optical lens system according to one embodiment of the present disclosure.
Figure 52:
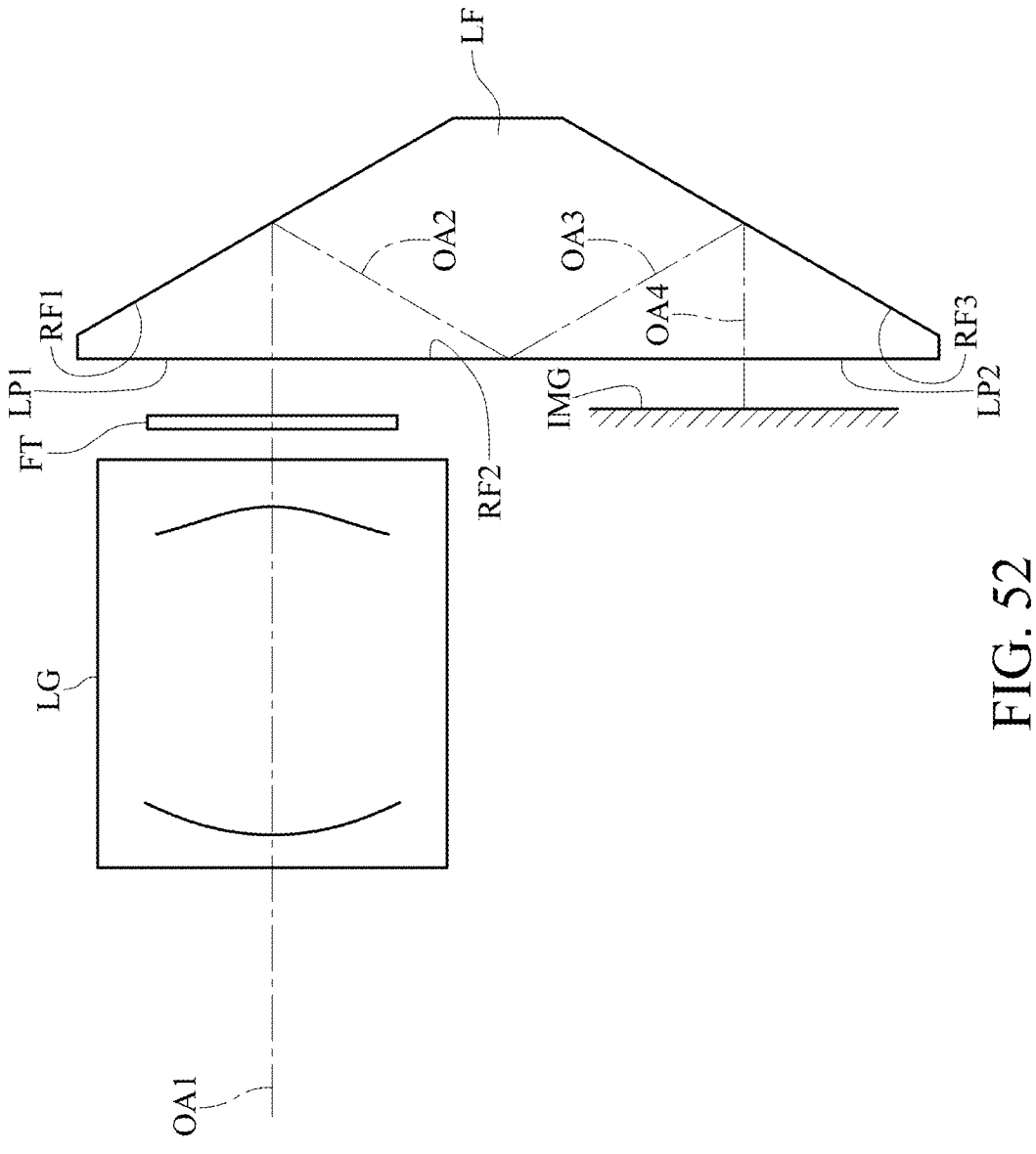
FIG. 52 shows a schematic view of a configuration of a triple-reflection reflective element in an imaging optical lens system according to one embodiment of the present disclosure.
Figure 53:
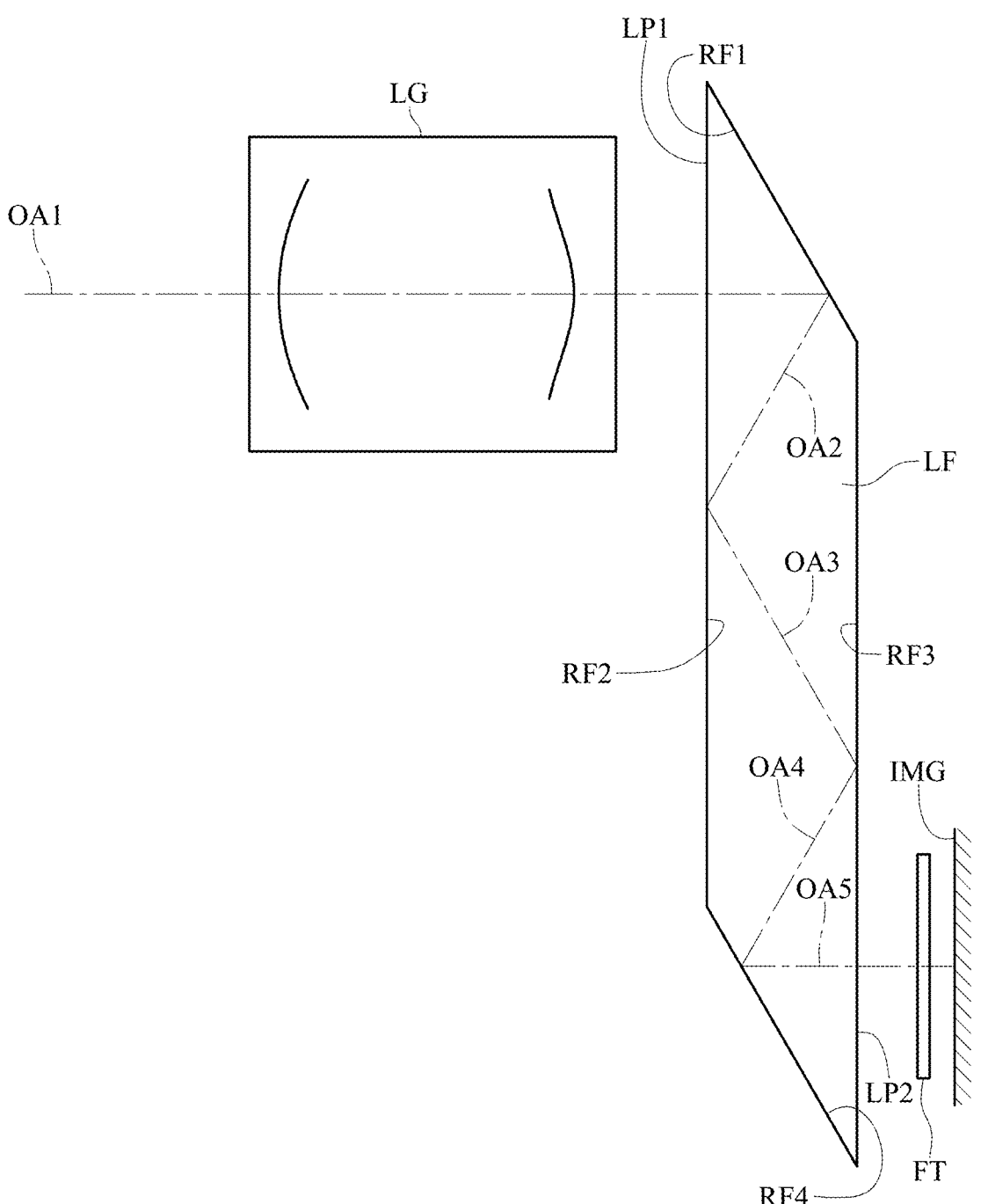
FIG. 53 shows a schematic view of a configuration of a quadruple-reflection reflective element in an imaging optical lens system according to one embodiment of the present disclosure.
Figure 54:
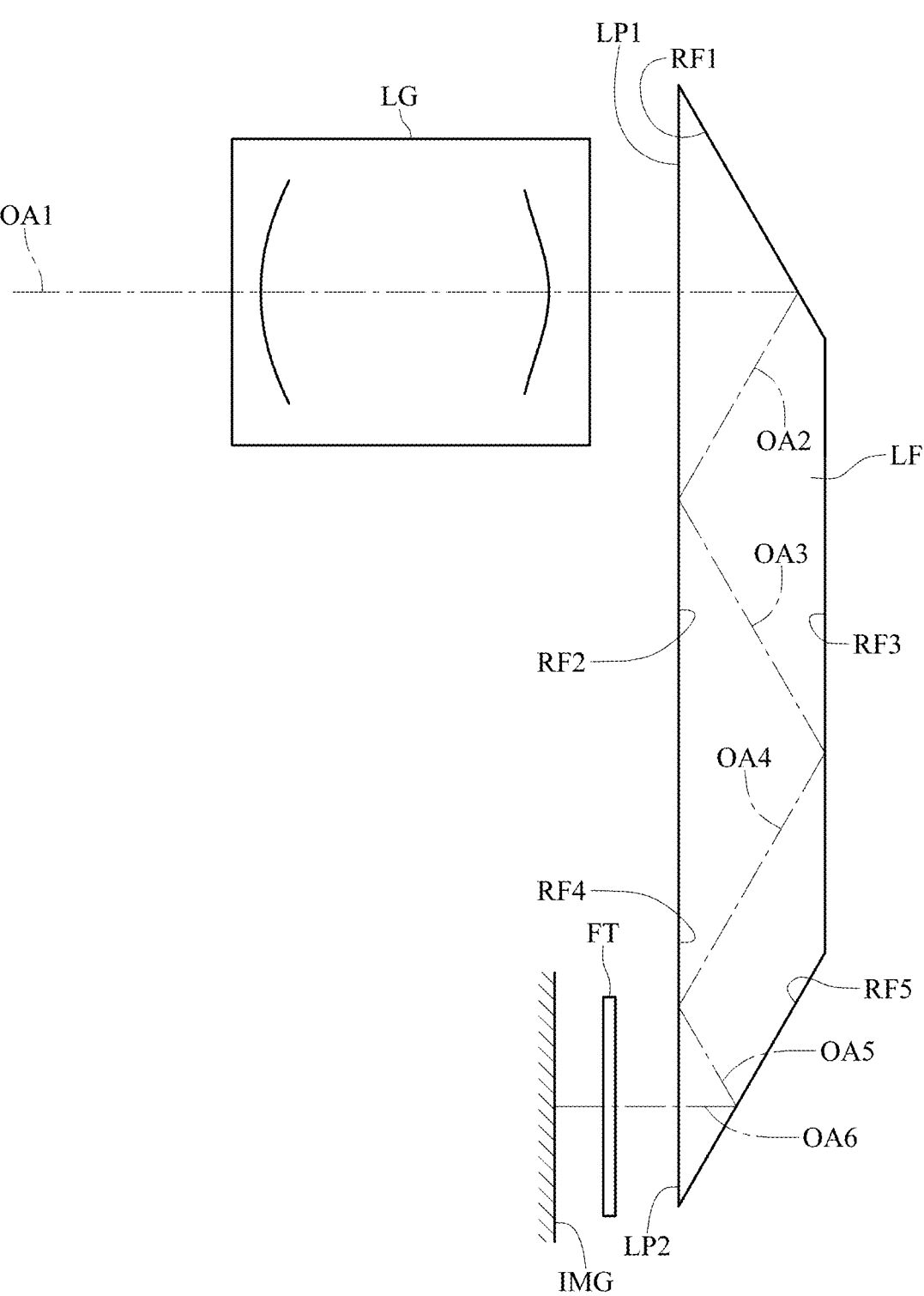
FIG. 54 shows a schematic view of a configuration of a quintuple-reflection reflective element in an imaging optical lens system according to one embodiment of the present disclosure.

In addition, please refer to FIG. 51 to FIG. 54. FIG. 51 shows a schematic view of a configuration of a double-reflection reflective element in an imaging optical lens system according to one embodiment of the present disclosure, FIG. 52 shows a schematic view of a configuration of a triple-reflection reflective element in an imaging optical lens system according to one embodiment of the present disclosure, FIG. 53 shows a schematic view of a configuration of a quadruple-reflection reflective element in an imaging optical lens system according to one embodiment of the present disclosure, and FIG. 54 shows a schematic view of a configuration of a quintuple-reflection reflective element in an imaging optical lens system according to one embodiment of the present disclosure.

As shown in FIG. 51, the imaging optical lens system can include, in order from an imaged object (not shown in the figures) to an image surface IMG along a travelling direction of an optical path, a lens group LG, a filter FT, a reflective element LF and the image surface IMG. The reflective element LF can be a prism and has, in sequence along a travelling direction of light on the optical path, a first light permeable surface LP1, a first reflective surface RF1, a second reflective surface RF2 and a second light permeable surface LP2. The optical path travels through the lens group LG and the filter FT, enters the reflective element LF through the first light permeable surface LP1, and reaches the first reflective surface RF1 along a first optical axis OA1. The first reflective surface RF1 deflects the optical path from the first optical axis OA1 to a second optical axis OA2, the second reflective surface RF2 deflects the optical path from the second optical axis OA2 to a third optical axis OA3, and then the optical path passes through the second light permeable surface LP2 and ultimately arrives at the image surface IMG along the third optical axis OA3.

As shown in FIG. 52, the imaging optical lens system can include, in order from an imaged object (not shown in the figures) to an image surface IMG along a travelling direction of an optical path, a lens group LG, a filter FT, a reflective element LF and the image surface IMG. The reflective element LF can be a prism and has, in sequence along a travelling direction of light on the optical path, a first light permeable surface LP1, a first reflective surface RF1, a second reflective surface RF2, a third reflective surface RF3 and a second light permeable surface LP2. The optical path travels through the lens group LG and the filter FT, enters the reflective element LF through the first light permeable surface LP1 and reaches the first reflective surface RF1 along a first optical axis OA1. The first reflective surface RF1 deflects the optical path from the first optical axis OA1 to a second optical axis OA2, the second reflective surface RF2 deflects the optical path from the second optical axis OA2 to a third optical axis OA3, the third reflective surface RF3 deflects the optical path from the third optical axis OA3 to a fourth optical axis OA4, and then the optical path passes through the second light permeable surface LP2 and ultimately arrives at the image surface IMG along the fourth optical axis OA4. Moreover, the first light permeable surface LP1 and the second reflective surface RF2 can be coplanar.

As shown in FIG. 53, the imaging optical lens system can include, in order from an imaged object (not shown in the figures) to an image surface IMG along a travelling direction of an optical path, a lens group LG, a reflective element LF, a filter FT and the image surface IMG. The reflective element LF can be a prism and has, in sequence along a travelling direction of light on the optical path, a first light permeable surface LP1, a first reflective surface RF1, a second reflective surface RF2, a third reflective surface RF3, a fourth reflective surface RF4 and a second light permeable surface LP2. The optical path travels through the lens group LG, enters the reflective element LF through the first light permeable surface LP1 and reaches the first reflective surface RF1 along a first optical axis OA1. The first reflective surface RF1 deflects the optical path from the first optical axis OA1 to a second optical axis OA2, the second reflective surface RF2 deflects the optical path from the second optical axis OA2 to a third optical axis OA3, the third reflective surface RF3 deflects the optical path from the third optical axis OA3 to a fourth optical axis OA4, the fourth reflective surface RF4 deflects the optical path from the fourth optical axis OA4 to a fifth optical axis OA5. Subsequently, the optical path passes through the second light permeable surface LP2, travels through the filter FT, and ultimately arrives at the image surface IMG along the fifth optical axis OA5. Moreover, the first light permeable surface LP1 and the second reflective surface RF2 can be coplanar.

As shown in FIG. 54, the imaging optical lens system can include, in order from an imaged object (not shown in the figures) to an image surface IMG along a travelling direction of an optical path, a lens group LG, a reflective element LF, a filter FT and an image surface IMG. The reflective element LF can be a prism and has, in sequence along a travelling direction of light on the optical path, a first light permeable surface LP1, a first reflective surface RF1, a second reflective surface RF2, a third reflective surface RF3, a fourth reflective surface RF4, a fifth reflective surface RF5 and a second light permeable surface LP2. The optical path travels through the lens group LG, enters the reflective element LF through the first light permeable surface LP1 and reaches the first reflective surface RF1 along a first optical axis OA1. The first reflective surface RF1 deflects the optical path from the first optical axis OA1 to a second optical axis OA2, the second reflective surface RF2 deflects the optical path from the second optical axis OA2 to a third optical axis OA3, the third reflective surface RF3 deflects the optical path from the third optical axis OA3 to a fourth optical axis OA4, the fourth reflective surface RF4 deflects the optical path from the fourth optical axis OA4 to a fifth optical axis OA5, and the fifth reflective surface RF5 deflects the optical path from the fifth optical axis OA5 to a sixth optical axis OA6. Subsequently, the optical path passes through the second light permeable surface LP2, travels through the filter FT, and ultimately arrives at the image surface IMG along the sixth optical axis OA6. Moreover, the first light permeable surface LP1 and the second reflective surface RF2 can be coplanar.

Figure 55:
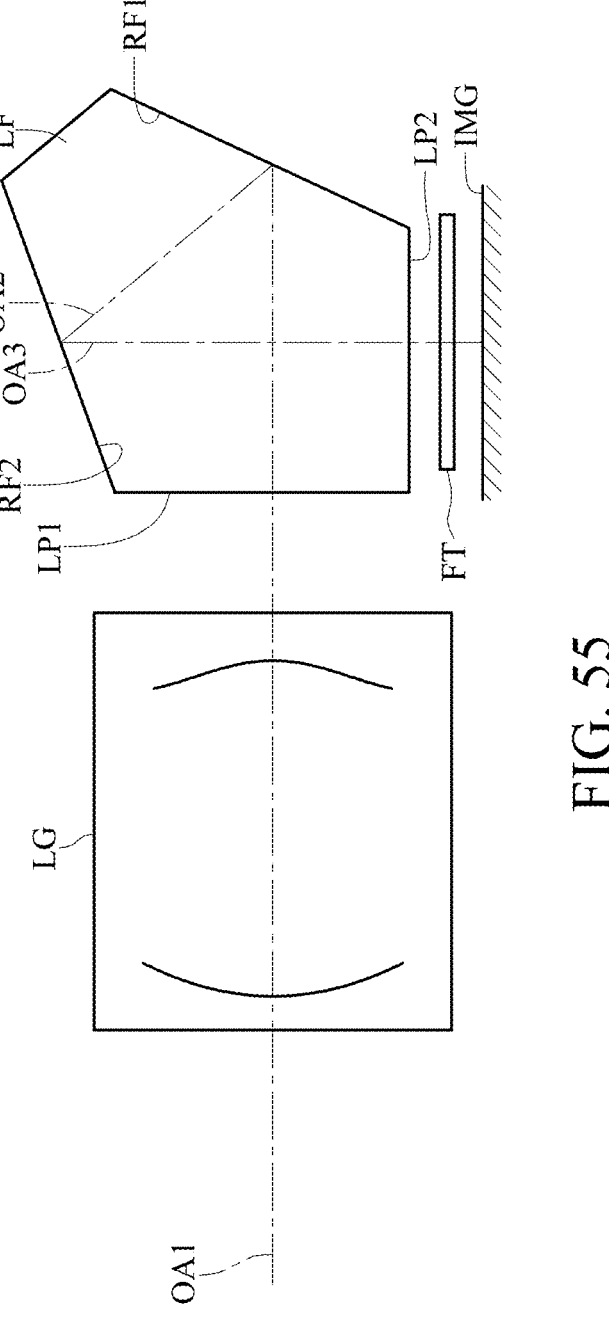
FIG. 55 shows a schematic view of a configuration of one reflective element in an imaging optical lens system according to one embodiment of the present disclosure.
Figure 56:
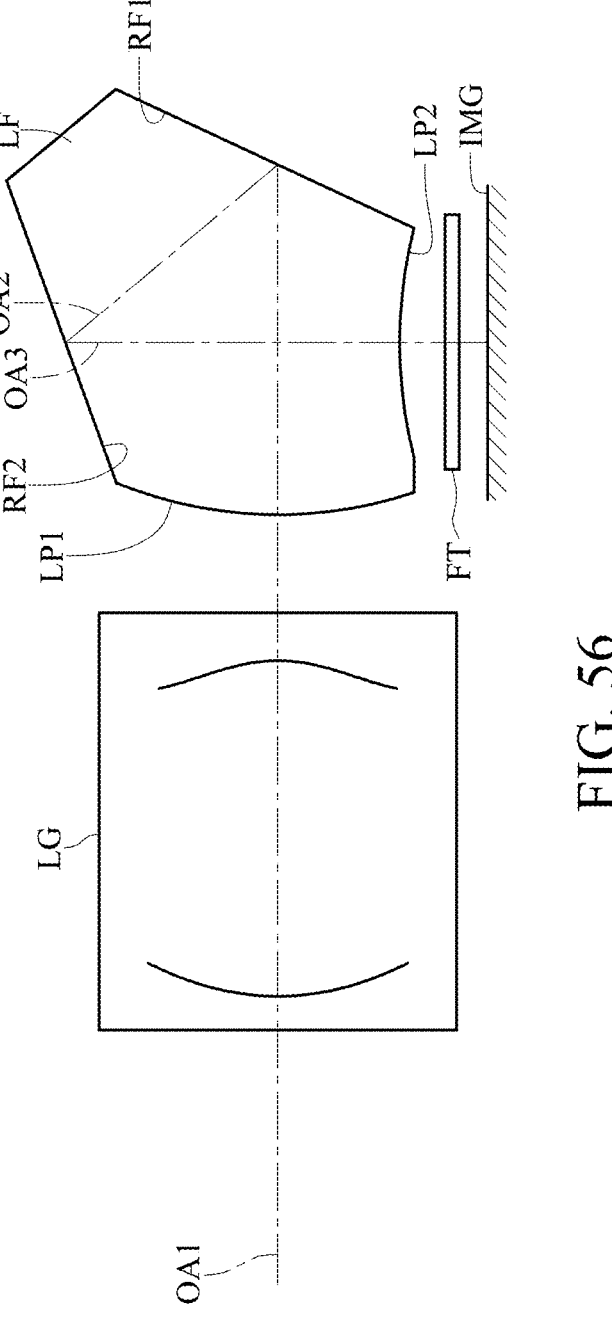
FIG. 56 shows a schematic view of a configuration of another reflective element in an imaging optical lens system according to one embodiment of the present disclosure.

Moreover, please refer to FIG. 55 and FIG. 56. FIG. 55 shows a schematic view of a configuration of one reflective element in an imaging optical lens system according to one embodiment of the present disclosure, and FIG. 56 shows a schematic view of a configuration of another reflective element in an imaging optical lens system according to one embodiment of the present disclosure. As shown in FIG. 55 and FIG. 56, the imaging optical lens system can include, in order from an imaged object (not shown in the figures) to an image surface IMG along a travelling direction of an optical path, a lens group LG, a reflective element LF, a filter FT and the image surface IMG. The reflective element LF can be a pentaprism and has, in sequence along a travelling direction of light on the optical path, a first light permeable surface LP1, a first reflective surface RF1, a second reflective surface RF2 and a second light permeable surface LP2. The optical path enters the reflective element LF through the first light permeable surface LP1 and reaches the first reflective surface RF1 along a first optical axis OA1. The first reflective surface RF1 deflects the optical path from the first optical axis OA1 to a second optical axis OA2, and the second reflective surface RF2 deflects the optical path from the second optical axis OA2 to a third optical axis OA3. Subsequently, the optical path passes through the second light permeable surface LP2, then travels through the filter FT, and ultimately arrives at the image surface IMG along the third optical axis OA3. In FIG. 55, both of the first light permeable surface LP1 and the second light permeable surface LP2 can be planar. In FIG. 56, both of the first light permeable surface LP1 and the second light permeable surface LP2 can be curved. Furthermore, as shown in FIG. 55 and FIG. 56, the first optical axis OA1 and third optical axis OA3 can intersect and be perpendicular to each other.

Figure 67:
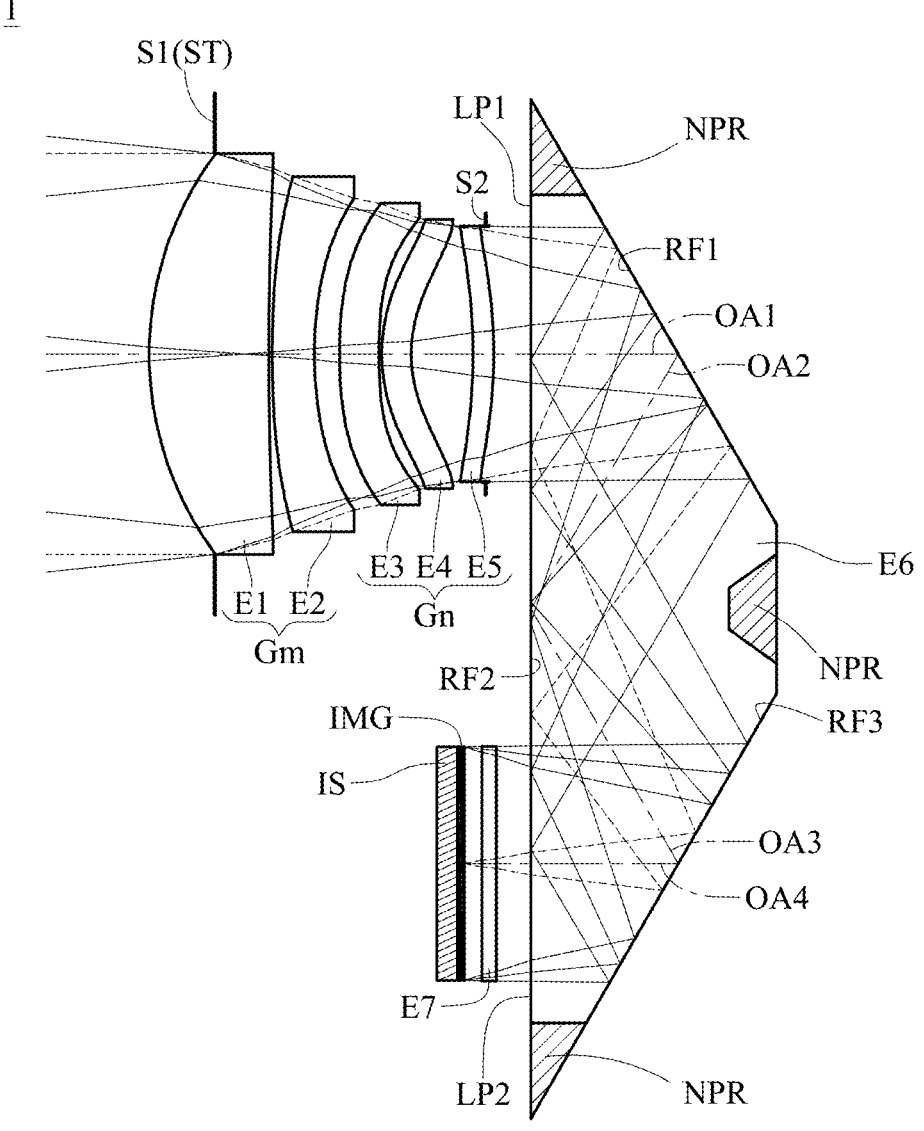
FIG. 67 shows a schematic view of a configuration of a reflective element in the imaging optical lens system of the image capturing unit according to the 1st embodiment.
Figure 68:
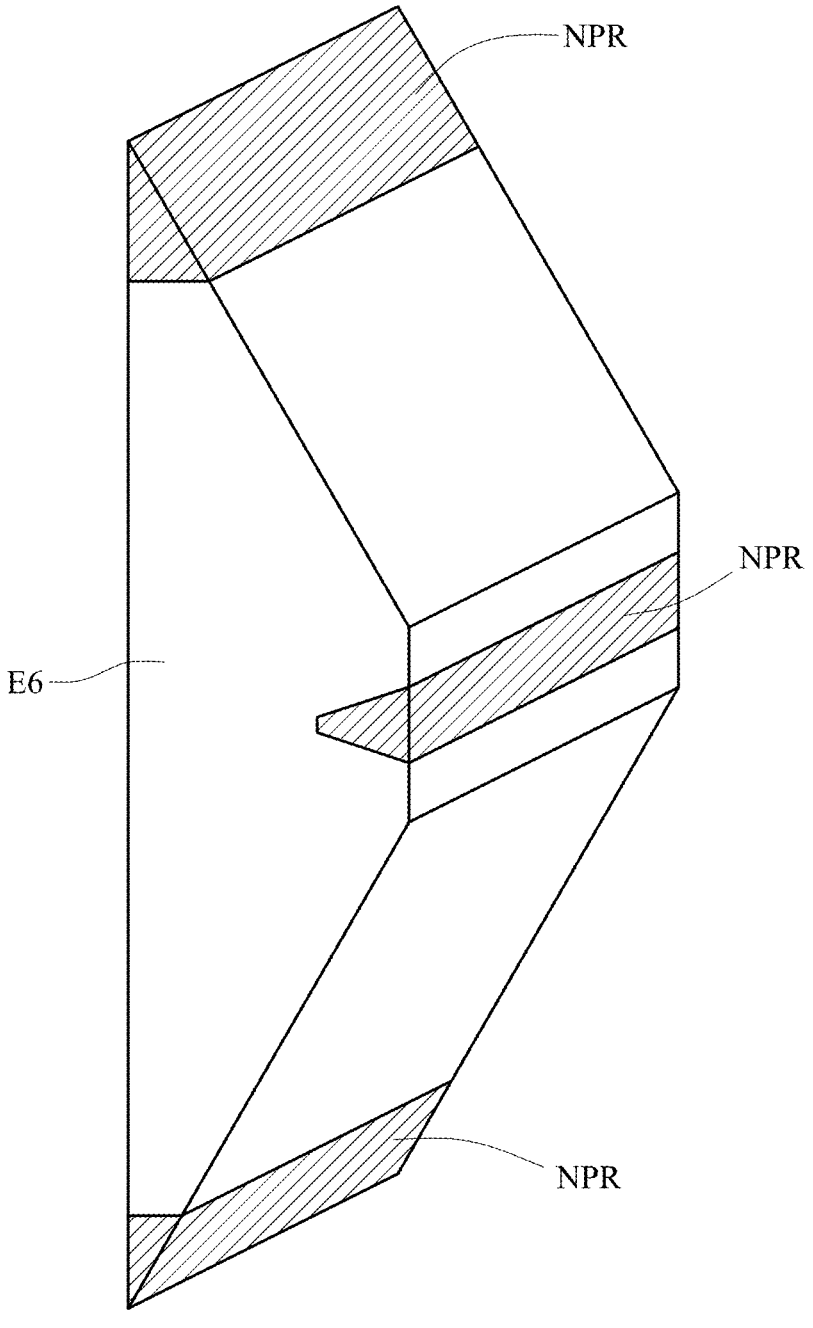
FIG. 68 shows a perspective view of the reflective element from FIG. 67 before forming trimmed edges and a recess.
Figure 69:
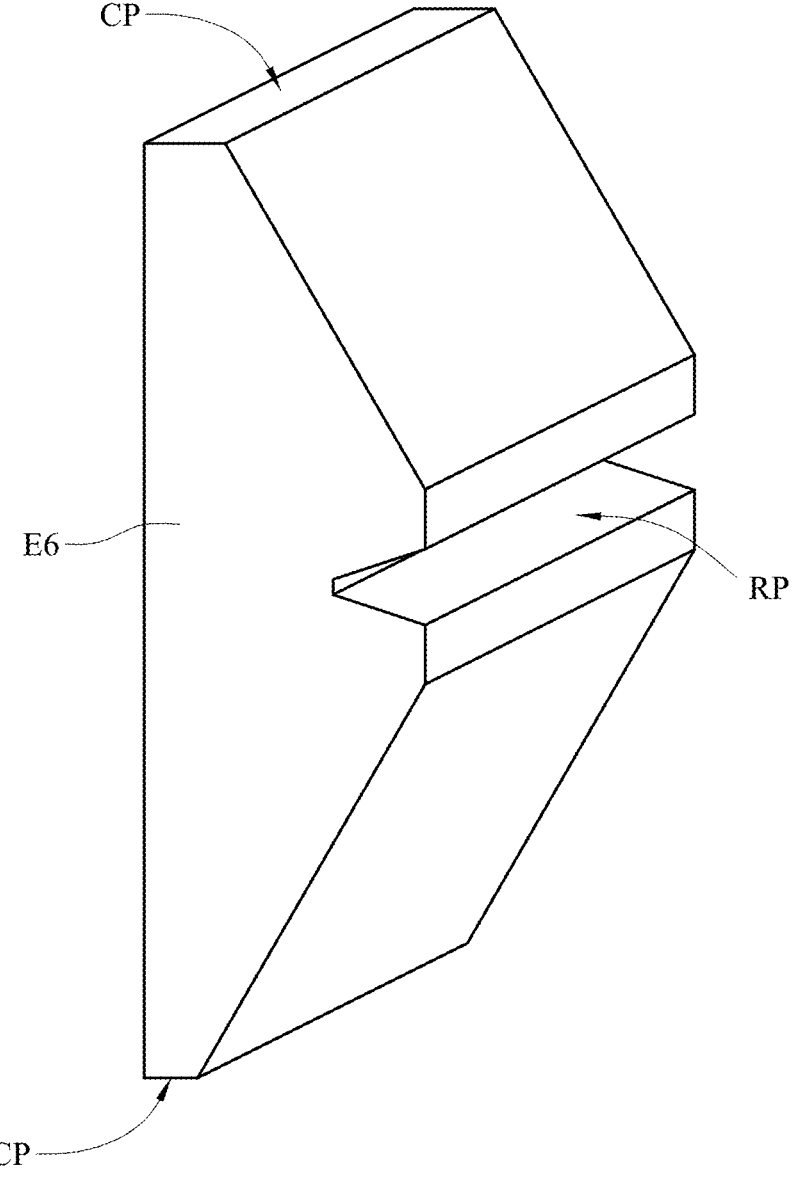
FIG. 69 shows a perspective view of the reflective element from FIG. 67 after forming trimmed edges and a recess.

Furthermore, in order to reduce the size of the imaging optical lens system, the length and the width of the reflective mirror may be different from each other, the length, the width and the height of the prism may also be different from one another, and the prism can have at least one trimmed edge or at least one recess at its optically non-effective area so as to reduce the weight and size thereof and to be configured in accordance with other components in the electronic device. Moreover, a light absorbing layer can be coated on the surface in the recess so as to prevent light reflection and block stray light. Please refer to FIG. 67 through FIG. 69, where FIG. 67 shows a schematic view of a configuration of a reflective element in the imaging optical lens system of the image capturing unit according to the 1st embodiment, FIG. 68 shows a perspective view of the reflective element from FIG. 67 before forming trimmed edges and a recess, and FIG. 69 shows a perspective view of the reflective element from FIG. 67 after forming trimmed edges and recess. As shown in FIG. 67 and FIG. 68, the reflective element E6 has optically non-effective areas NPR; that is, imaging light does not pass through the optically non-effective areas NPR in the reflective element E6. Therefore, in design, the parts of the reflective element E6 that correspond to the optically non-effective areas NPR as shown in FIG. 67 and FIG. 68 can be removed, and thus, the reflective element E6 can be formed with trimmed edges CP and a recess RP (as shown in FIG. 69).

The imaging optical lens system can be optionally provided with three or more reflective elements, and the present disclosure is not limited to the type, number and position of the reflective elements of the embodiments as disclosed in the aforementioned figures.

According to the present disclosure, the imaging optical lens system can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the imaging optical lens system and the image surface to produce a telecentric effect, and thereby improves the image-sensing efficiency of an image sensor (for example, CCD or CMOS). A middle stop disposed between the first lens element and the image surface is favorable for enlarging the viewing angle of the imaging optical lens system and thereby provides a wider field of view for the same.

According to the present disclosure, the imaging optical lens system can include an aperture control unit. The aperture control unit may be a mechanical component or a light modulator, which can control the size and shape of the aperture through electricity or electrical signals. The mechanical component can include a movable member, such as a blade assembly or a light shielding sheet. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed.

According to the present disclosure, the imaging optical lens system can include one or more optical elements for limiting the form of light passing through the imaging optical lens system. Each optical element can be, but not limited to, a filter, a polarizer, etc., and each optical element can be, but not limited to, a single-piece element, a composite component, a thin film, etc. The optical element can be located at the object side or the image side of the imaging optical lens system or between any two adjacent lens elements so as to allow light in a specific form to pass through, thereby meeting application requirements.

According to the present disclosure, the imaging optical lens system can include at least one optical lens element, an optical element, or a carrier, which has at least one surface with a low reflection layer. The low reflection layer can effectively reduce stray light generated due to light reflection at the interface. The low reflection layer can be disposed in an optical non-effective area of an object-side surface or an image-side surface of the said optical lens element, or a connection surface between the object-side surface and the image-side surface. The said optical element can be a light-blocking element, an annular spacer, a barrel element, a cover glass, a blue glass, a filter, a color filter, an optical path folding element (e.g., a reflective element), a prism, a mirror, etc. The said carrier can be a base for supporting a lens assembly, a micro lens disposed on an image sensor, a substrate surrounding the image sensor, a glass plate for protecting the image sensor, etc.

According to the present disclosure, the object side and image side are defined in accordance with the direction of the optical axis, and the axial optical data are calculated along the optical axis. Furthermore, if the optical axis is deflected by a light-folding element (e.g., a reflective element), the axial optical data are also calculated along the deflected optical axis.

According to the above description of the present disclosure, the following specific embodiments are provided for further explanation.

1st Embodiment

Figure 2:
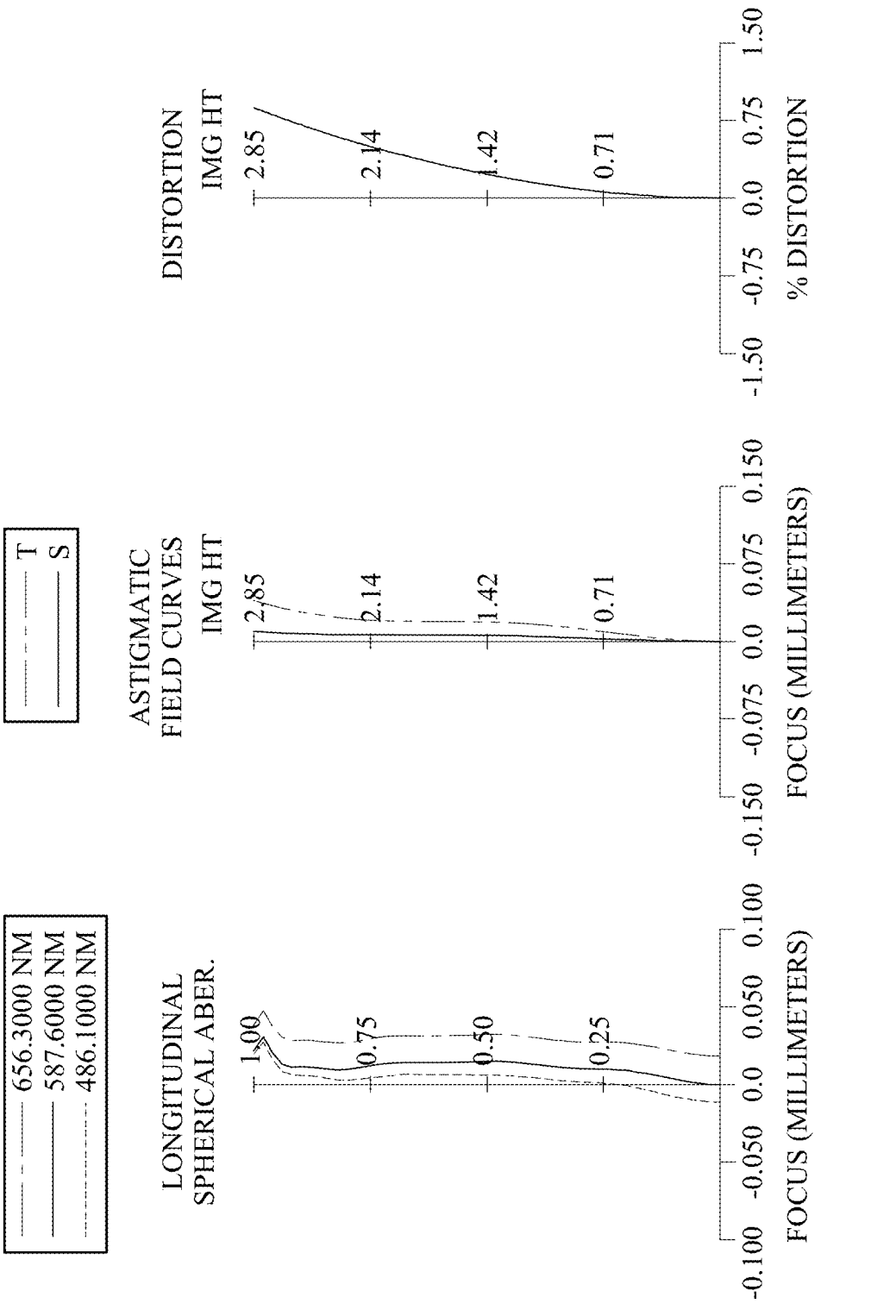
FIG. 2 shows spherical aberration curves, astigmatic field curves and a distortion curve of the image capturing unit in the first state according to the 1st embodiment.
Figure 3:
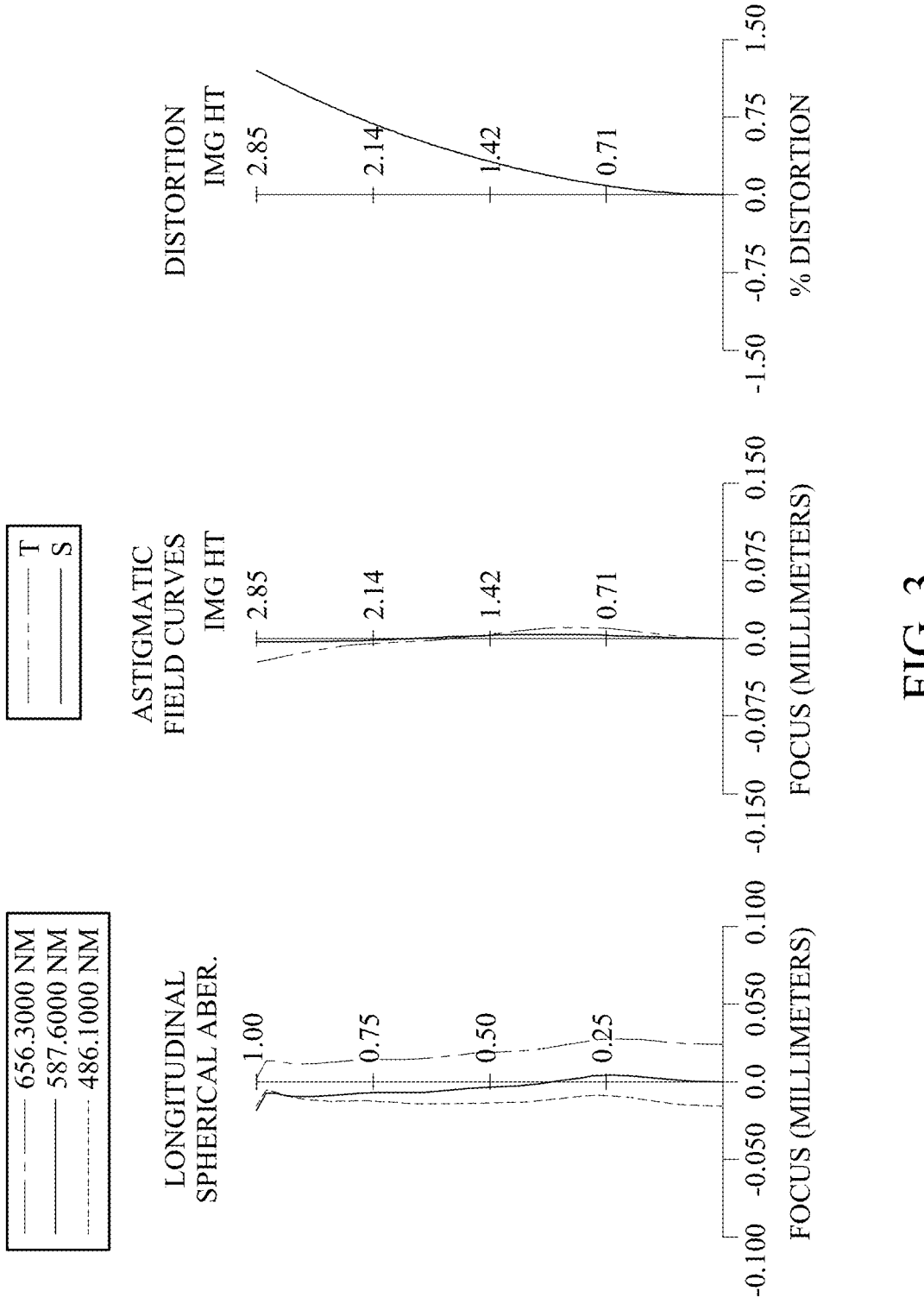
FIG. 3 shows spherical aberration curves, astigmatic field curves and a distortion curve of the image capturing unit in the second state according to the 1st embodiment.

FIG. 1 shows schematic views of an image capturing unit respectively in a first state and a second state according to the 1st embodiment of the present disclosure. FIG. 2 shows, in order from left to right, spherical aberration curves, astigmatic field curves and a distortion curve of the image capturing unit in the first state according to the 1st embodiment. FIG. 3 shows, in order from left to right, spherical aberration curves, astigmatic field curves and a distortion curve of the image capturing unit in the second state according to the 1st embodiment. Moreover, the upper part of FIG. 1 shows the schematic view of the imaging optical lens system in the first state, and the lower part of FIG. 1 shows the schematic view of the imaging optical lens system in the second state. In FIG. 1, the image capturing unit 1 includes the imaging optical lens system (its reference numeral is omitted) of the present disclosure and an image sensor IS. The imaging optical lens system includes, in order from an object side to an image side along an optical axis, a stop S1, a first lens element E1, a second lens element E2, a third lens element E3, a fourth lens element E4, a fifth lens element E5, a stop S2, a reflective element E6, a filter E7 and an image surface IMG. Furthermore, the imaging optical lens system includes, in order from the object side to the image side along a travelling direction of an optical path, a movable lens group Gm and a last lens group Gn, where the movable lens group Gm includes the first lens element E1 and the second lens element E2, and the last lens group Gn includes the third lens element E3, the fourth lens element E4 and the fifth lens element E5. The imaging optical lens system includes five lens elements (E1, E2, E3, E4 and E5) with no additional lens element disposed between each of the adjacent five lens elements. In addition, there is no additional lens element located between the last lens group Gn and the reflective element E6 along the optical axis.

A focal length of the imaging optical lens system is variable by change of an axial distance between the two lens groups (Gm and Gn) in a focus adjustment process. In FIG. 1, the movable lens group Gm is moved along the optical axis relative to the last lens group Gn in the focus adjustment process. Furthermore, the imaging optical lens system can undergo the focus adjustment process to transition to the first state, as shown in the upper part of FIG. 1 or to the second state, as shown in the lower part of FIG. 1. The imaging optical lens system being in the first state refers to a state where an imaged object is at an infinite object distance and an entrance pupil diameter of the imaging optical lens system is at its maximum; the imaging optical lens system being in the second state refers to a state where an imaged object is at a finite object distance. Moreover, the movable lens group Gm is moved toward the object side along the optical axis relative to the last lens group Gn when the imaging optical lens system transitions from the first state to the second state in the focus adjustment process. It is noted that all lens elements in the movable lens group Gm are immovable relative to one another during the focus adjustment process, and all lens elements in the last lens group Gn are immovable relative to one another during the focus adjustment process. In addition, during the focus adjustment process, the reflective element E6 is immovable relative to the last lens group Gn.

The first lens element E1 with positive refractive power has an object-side surface being convex in a paraxial region thereof and an image-side surface being concave in a paraxial region thereof. The first lens element E1 is made of glass material and has the object-side surface and the image-side surface being both spherical.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric.

The third lens element E3 with positive refractive power has an object-side surface being convex in a paraxial region thereof and an image-side surface being concave in a paraxial region thereof. The third lens element E3 is made of plastic material and has the object-side surface and the image-side surface being both aspheric. The image-side surface of the third lens element E3 has one inflection point.

The fourth lens element E4 with negative refractive power has an object-side surface being convex in a paraxial region thereof and an image-side surface being concave in a paraxial region thereof. The fourth lens element E4 is made of plastic material and has the object-side surface and the image-side surface being both aspheric. The object-side surface of the fourth lens element E4 has one inflection point. The image-side surface of the fourth lens element E4 has one inflection point.

The fifth lens element E5 with positive refractive power has an object-side surface being concave in a paraxial region thereof and an image-side surface being convex in a paraxial region thereof. The fifth lens element E5 is made of plastic material and has the object-side surface and the image-side surface being both aspheric. The object-side surface of the fifth lens element E5 has one inflection point. The image-side surface of the fifth lens element E5 has one inflection point.

The reflective element E6 is made of glass material and located between the fifth lens element E5 and the image surface IMG along the optical axis, and will not affect the focal length of the imaging optical lens system. The reflective element E6 is a prism configured with a function to fold the optical path. For simplicity in illustration, FIG. 1 does not show the deflection effect caused by the reflective element E6 on the optical path. However, the reflective element E6 can have various configurations depending on actual design requirements, thereby causing different deflection effects on the optical path. For example, please refer to FIG. 57 through FIG. 63, each of which shows a schematic view of a configuration of a reflective element and its associated light path deflection in the image capturing unit according to the 1st embodiment.

Figure 57:
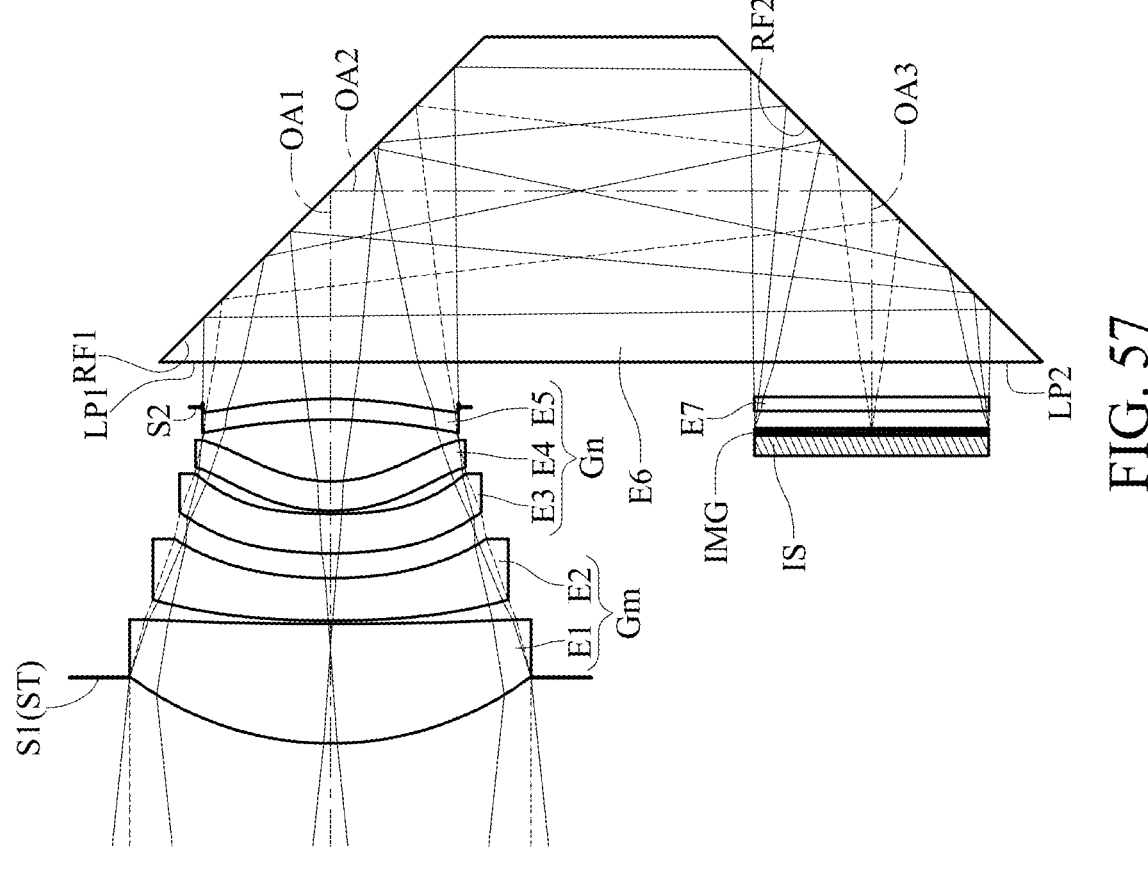
FIG. 57 shows a schematic view of a configuration of a reflective element and its associated light path deflection in the image capturing unit according to the 1st embodiment.
Figure 58:
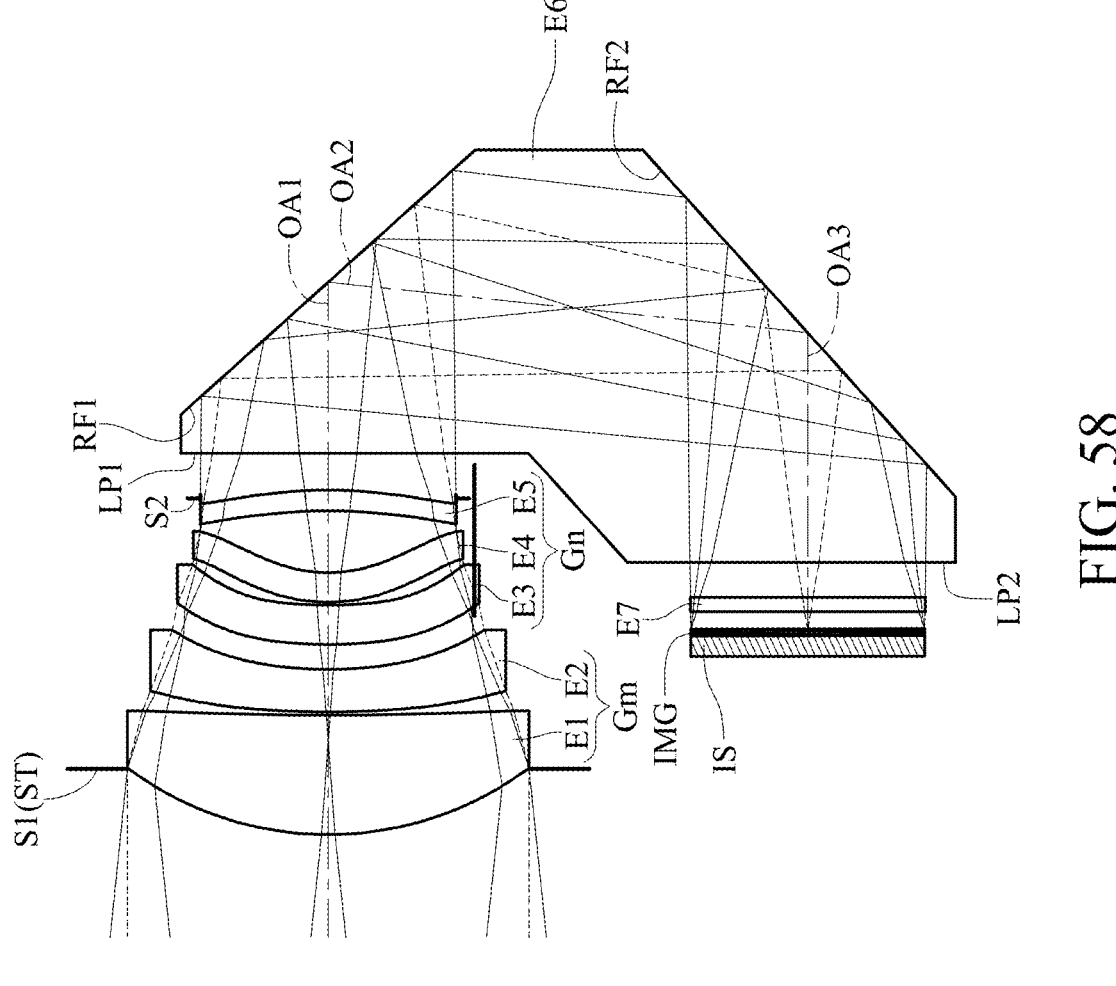
FIG. 58 shows a schematic view of a configuration of another reflective element and its associated light path deflection in the image capturing unit according to the 1st embodiment.
Figure 59:
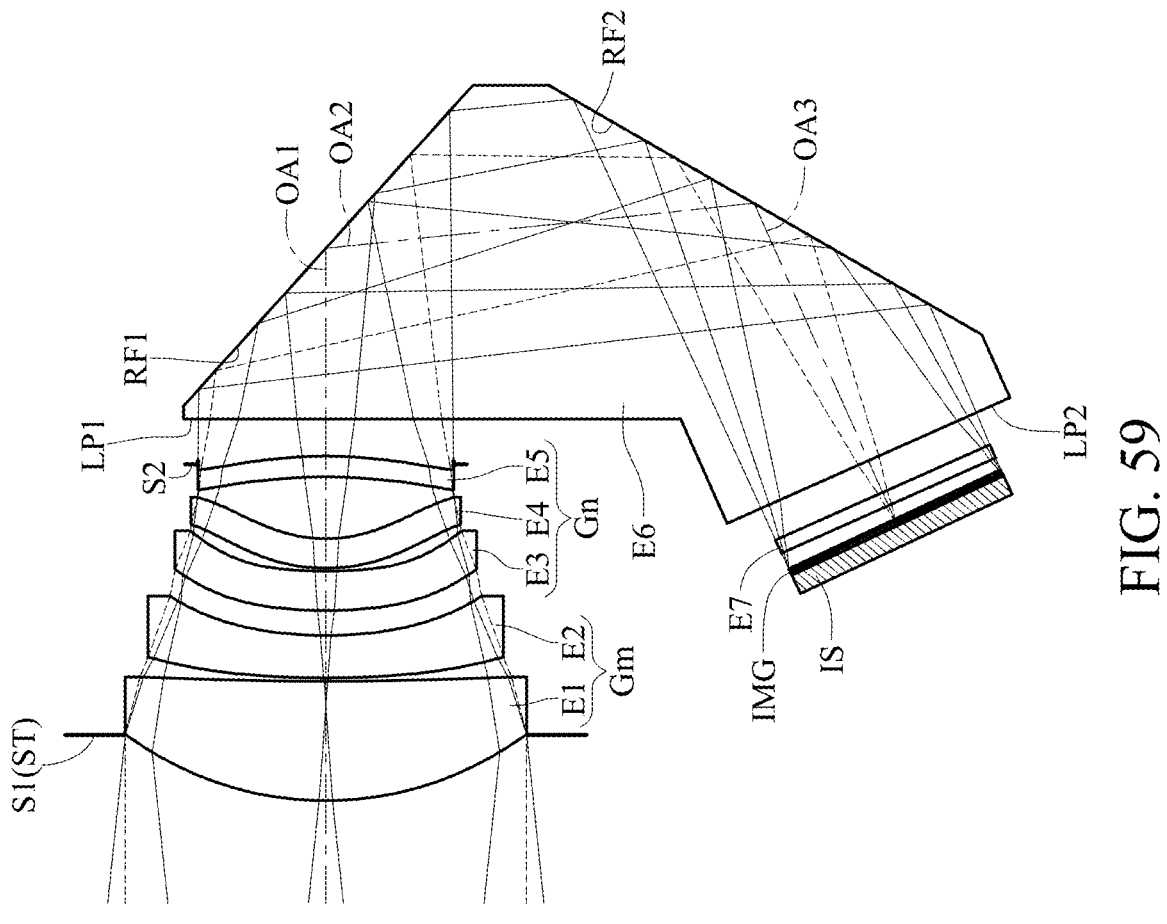
FIG. 59 shows a schematic view of a configuration of another reflective element and its associated light path deflection in the image capturing unit according to the 1st embodiment.

In FIG. 57 to FIG. 59, the reflective element E6 has, in sequence along a travelling direction of light on the optical path, a first light permeable surface LP1, a first reflective surface RF1, a second reflective surface RF2 and a second light permeable surface LP2. The first reflective surface RF1 deflects the optical path from a first optical axis OA1 to a second optical axis OA2, the second reflective surface RF2 deflects the optical path from the second optical axis OA2 to a third optical axis OA3, and then the optical path arrives at the image surface IMG along the third optical axis OA3. In FIG. 57 to FIG. 59, the reflective element E6 deflects the optical path two times. Moreover, FIG. 57 shows a configuration where the first light permeable surface LP1 and the second light permeable surface LP2 are coplanar, a normal direction of the first reflective surface RF1 can be at an angle of 45.0 degrees to both the first optical axis OA1 and the second optical axis OA2, and a normal direction of the second reflective surface RF2 can be at an angle of 45.0 degrees to both the second optical axis OA2 and the third optical axis OA3, such that an angle between a vector of the optical axis at the object side (e.g., the first optical axis OA1) and a vector of the optical axis at the image side (e.g., the third optical axis OA3) can be 180 degrees. FIG. 58 shows a configuration where the first light permeable surface LP1 and the second light permeable surface LP2 are parallel to each other and non-coplanar, a normal direction of the first reflective surface RF1 can be at an angle of 42.0 degrees to both the first optical axis OA1 and the second optical axis OA2, and a normal direction of the second reflective surface RF2 can be at an angle of 48.0 degrees to both the second optical axis OA2 and the third optical axis OA3, such that an angle between a vector of the optical axis at the object side (e.g., the first optical axis OA1) and a vector of the optical axis at the image side (e.g., the third optical axis OA3) can be 180 degrees. FIG. 59 shows a configuration where the first light permeable surface LP1 and the second light permeable surface LP2 are non-parallel to each other and non-coplanar, a normal direction of the first reflective surface RF1 can be at an angle of 47.0 degrees to both the first optical axis OA1 and the second optical axis OA2, and a normal direction of the second reflective surface RF2 can be at an angle of 55.6 degrees to both the second optical axis OA2 and the third optical axis OA3, such that an angle between a vector of the optical axis at the object side (e.g., the first optical axis OA1) and a vector of the optical axis at the image side (e.g., the third optical axis OA3) can be an obtuse angle.

Figure 60:
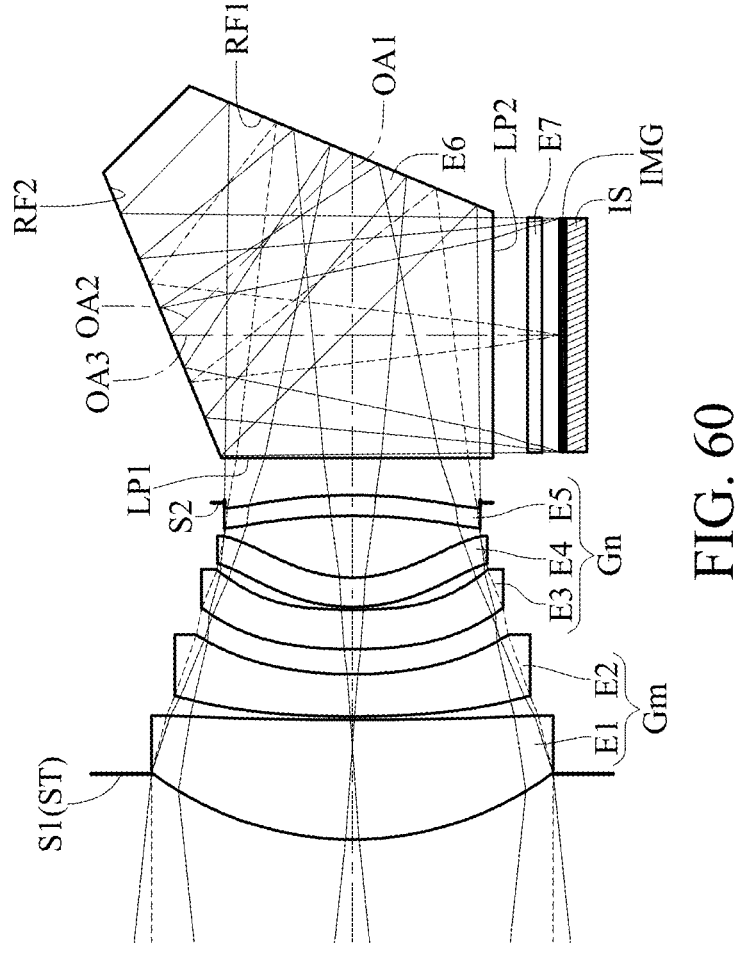
FIG. 60 shows a schematic view of a configuration of another reflective element and its associated light path deflection in the image capturing unit according to the 1st embodiment.

In FIG. 60, the reflective element E6 is a pentaprism and has, in sequence along a travelling direction of light on the optical path, a first light permeable surface LP1, a first reflective surface RF1, a second reflective surface RF2 and a second light permeable surface LP2. The first reflective surface RF1 deflects the optical path from a first optical axis OA1 to a second optical axis OA2, the second reflective surface RF2 deflects the optical path from the second optical axis OA2 to a third optical axis OA3, and then the optical path arrives at the image surface IMG along the third optical axis OA3. In FIG. 60, the reflective element E6 deflects the optical path two times, a normal direction of the first reflective surface RF1 can be at an angle of 23.5 degrees to both the first optical axis OA1 and the second optical axis OA2, and a normal direction of the second reflective surface RF2 can be at an angle of 21.5 degrees to both the second optical axis OA2 and the third optical axis OA3, such that an angle between a vector of the optical axis at the object side (e.g., the first optical axis OA1) and a vector of the optical axis at the image side (e.g., the third optical axis OA3) can be 90 degrees.

Figure 61:
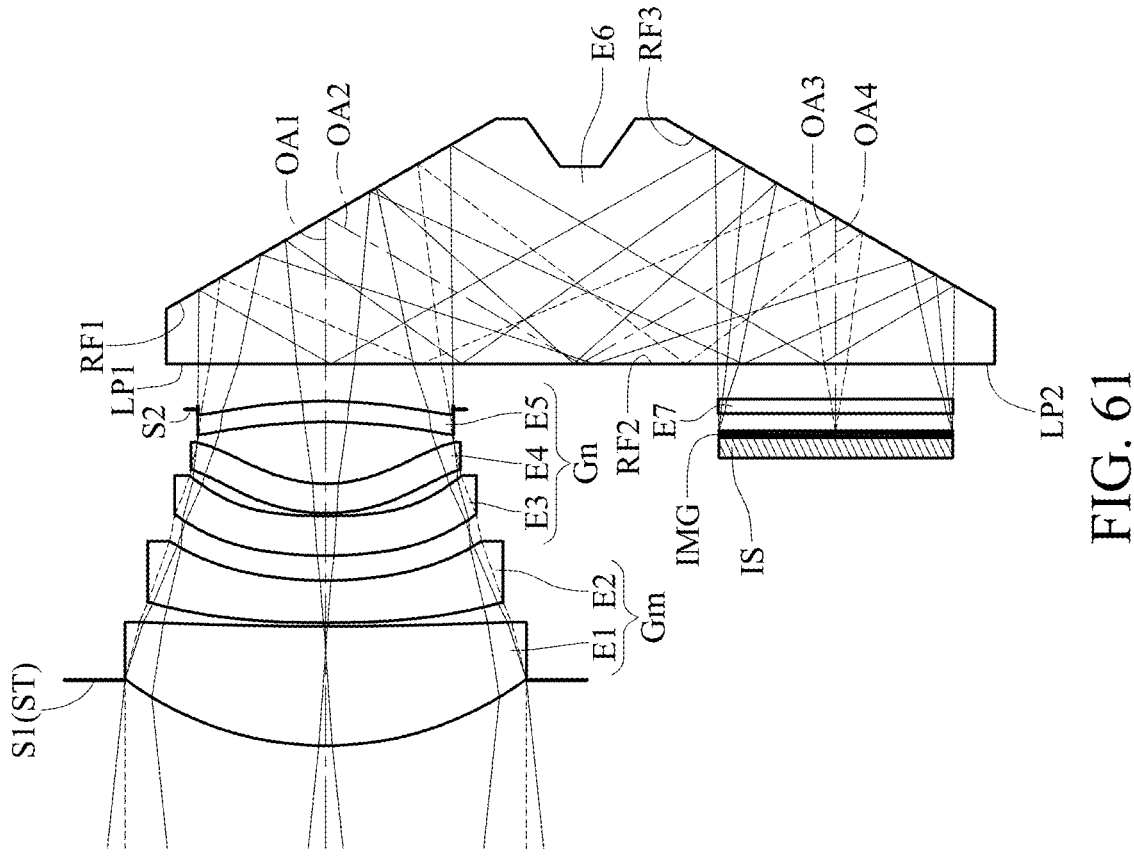
FIG. 61 shows a schematic view of a configuration of another reflective element and its associated light path deflection in the image capturing unit according to the 1st embodiment.
Figure 62:
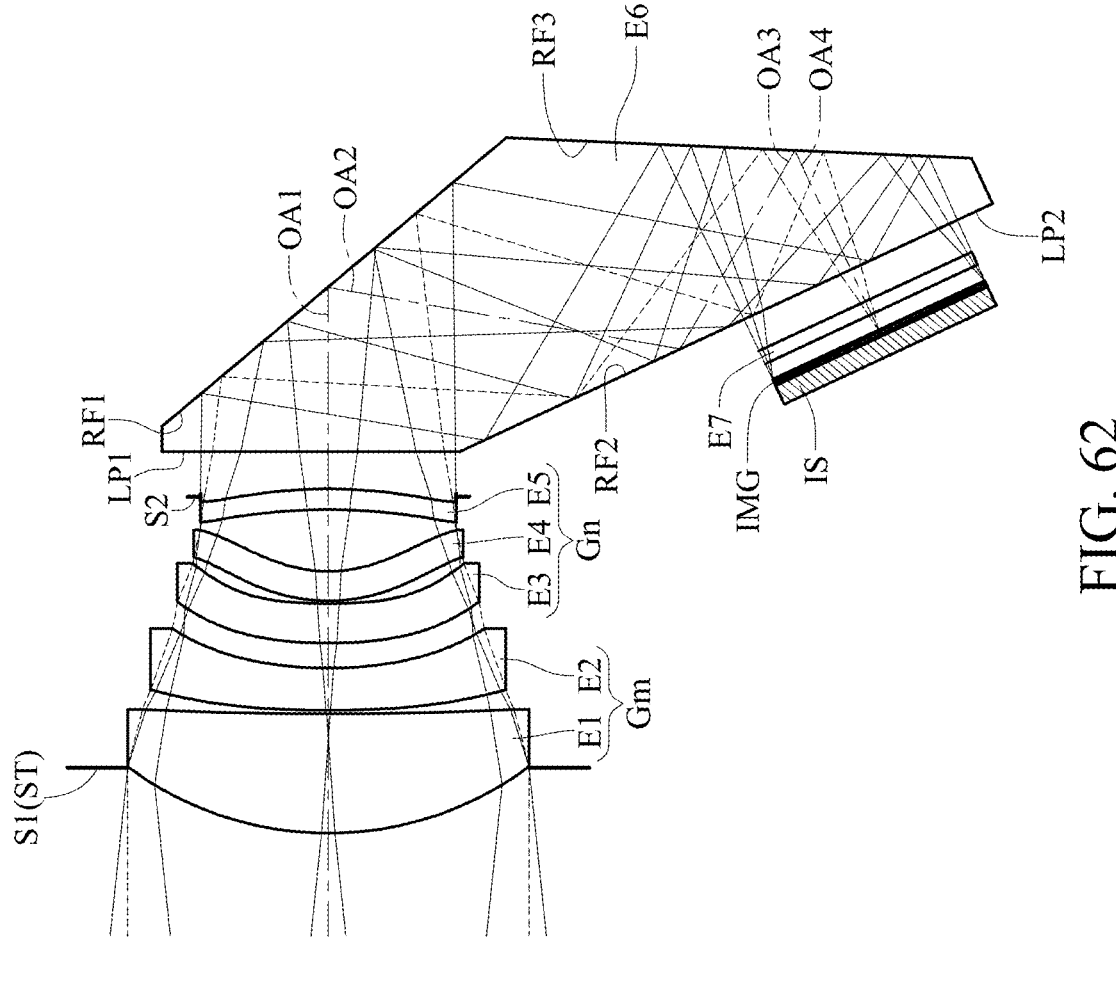
FIG. 62 shows a schematic view of a configuration of another reflective element and its associated light path deflection in the image capturing unit according to the 1st embodiment.

In FIG. 61 and FIG. 62, the reflective element E6 has, in sequence along a travelling direction of light on the optical path, a first light permeable surface LP1, a first reflective surface RF1, a second reflective surface RF2, a third reflective surface RF3 and a second light permeable surface LP2. The first reflective surface RF1 deflects the optical path from a first optical axis OA1 to a second optical axis OA2, the second reflective surface RF2 deflects the optical path from the second optical axis OA2 to a third optical axis OA3, the third reflective surface RF3 deflects the optical path from the third optical axis OA3 to a fourth optical axis OA4, and then the optical path arrives at the image surface IMG along the fourth optical axis OA4. In FIG. 61 and FIG. 62, the reflective element E6 deflects the optical path three times. Moreover, FIG. 61 shows a configuration where the first light permeable surface LP1, the second reflective surface RF2 and the second light permeable surface LP2 are coplanar, a normal direction of the first reflective surface RF1 can be at an angle of 30.0 degrees to both the first optical axis OA1 and the second optical axis OA2, a normal direction of the second reflective surface RF2 can be at an angle of 60.0 degrees to both the second optical axis OA2 and the third optical axis OA3, and a normal direction of the third reflective surface RF3 can be at an angle of 30.0 degrees to both the third optical axis OA3 and the fourth optical axis OA4, such that an angle between a vector of the optical axis at the object side (e.g., the first optical axis OA1) and a vector of the optical axis at the image side (e.g., the fourth optical axis OA4) can be 180 degrees. FIG. 62 shows a configuration where the first light permeable surface LP1 and the second light permeable surface LP2 are non-parallel to each other and non-coplanar, a normal direction of the first reflective surface RF1 can be at an angle of 40.0 degrees to both the first optical axis OA1 and the second optical axis OA2, a normal direction of the second reflective surface RF2 can be at an angle of 55.0 degrees to both the second optical axis OA2 and the third optical axis OA3, and a normal direction of the third reflective surface RF3 can be at an angle of 27.5 degrees to both the third optical axis OA3 and the fourth optical axis OA4, such that an angle between a vector of the optical axis at the object side (e.g., the first optical axis OA1) and a vector of the optical axis at the image side (e.g., the fourth optical axis OA4) can be an obtuse angle.

Figure 63:
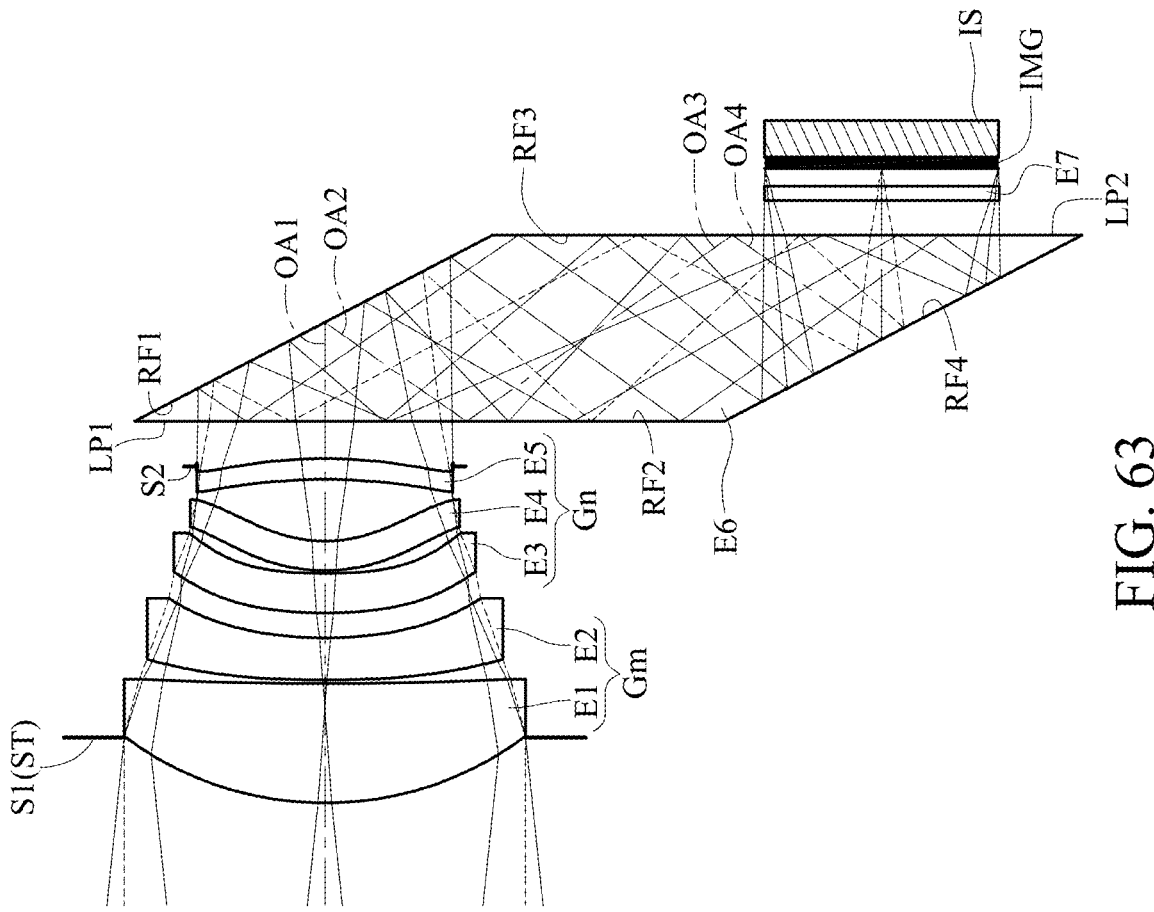
FIG. 63 shows a schematic view of a configuration of another reflective element and its associated light path deflection in the image capturing unit according to the 1st embodiment.

In FIG. 63, the reflective element E6 has, in sequence along a travelling direction of light on the optical path, a first light permeable surface LP1, a first reflective surface RF1, a second reflective surface RF2, a third reflective surface RF3, a fourth reflective surface RF4 and a second light permeable surface LP2. The first reflective surface RF1 deflects the optical path from a first optical axis OA1 to a second optical axis OA2, the second reflective surface RF2 deflects the optical path from the second optical axis OA2 to a third optical axis OA3, the third reflective surface RF3 deflects the optical path from the third optical axis OA3 to a fourth optical axis OA4, the fourth reflective surface RF4 deflects the optical path from the fourth optical axis OA4 to a fifth optical axis OA5, and the optical path arrives at the image surface IMG along the fifth optical axis OA5. In FIG. 63, the reflective element E6 deflects the optical path four times. A normal direction of the first reflective surface RF1 can be at an angle of 28.0 degrees to both the first optical axis OA1 and the second optical axis OA2, a normal direction of the second reflective surface RF2 can be at an angle of 56.0 degrees to both the second optical axis OA2 and the third optical axis OA3, a normal direction of the third reflective surface RF3 can be at an angle of 56.0 degrees to both the third optical axis OA3 and the fourth optical axis OA4, and a normal direction of the fourth reflective surface RF4 can be at an angle of 28.0 degrees to both the fourth optical axis OA4 and the fifth optical axis OA5, such that an angle between a vector of the optical axis at the object side (e.g., the first optical axis OA1) and a vector of the optical axis at the image side (e.g., the fifth optical axis OA5) can be 0 degree. Furthermore, the reflective element E6 in the 1st embodiment can have a configuration similar to that shown in FIG. 54, which deflects the optical path five times. Further details on this can be found in the descriptions corresponding to FIG. 54 and will not be repeated here.

The filter E7 is made of glass material and located between the reflective element E6 and the image surface IMG, and will not affect the focal length of the imaging optical lens system. The image sensor IS is disposed on or near the image surface IMG of the imaging optical lens system.

The equation of the aspheric surface profiles of the aforementioned lens elements of the 1st embodiment is expressed as follows:

$$X(Y) = \left(Y^2 / R\right) / \left(1 + sqrt\left(1 - (1+k) \times (Y/R)^2\right)\right) + \sum_i (Ai) \times \left(Y^i\right)$$

where,

X is the displacement in parallel with the optical axis from an axial vertex on the aspheric surface to a point at a distance of Y from the optical axis on the aspheric surface;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14, 16, 18, 20, 22, and 24.

In the imaging optical lens system of the image capturing unit 1 according to the 1st embodiment, the first lens element E1 is referred to as one lens element nearest to the object side within the imaging optical lens system, and the fifth lens element E5 is referred to as another lens element nearest to the image side within the imaging optical lens system.

When a focal length of the imaging optical lens system in the first state is fL, an f-number of the imaging optical lens system in the first state is FnoL, and half of a maximum field of view of the imaging optical lens system in the first state is HFOVL, these parameters have the following values: fL=16.43 millimeters (mm), FnoL=2.80, and HFOVL=9.7 degrees (deg.).

When a focal length of the imaging optical lens system in the second state is fS, an f-number of the imaging optical lens system in the second state is FnoS, and half of a maximum field of view of the imaging optical lens system in the second state is HFOVS, these parameters have the following values: fS=15.95 mm, FnoS=3.17, and HFOVS=8.6 degrees.

An axial distance between an imaged object and the object-side surface of the one lens element nearest to the object side is referred to as an object distance, an axial distance between the imaged object and the stop S1 is D0, and an axial distance between a surface of the movable lens group Gm nearest to the image side and a surface of the last lens group Gn nearest to the object side is D1. In this embodiment, the object distance is referred to as an axial distance between the imaged object and the object-side surface of the first lens element E1, and D1 is referred to as an axial distance between the image-side surface of the second lens element E2 and the object-side surface of the third lens element E3. Values of the object distance, DO and D1 may change as the imaging optical lens system undergoes the focus adjustment process to transition between first state and the second state. As the imaging optical lens system is in the first state, the following conditions are satisfied: object distance=∞ (infinity); D0=∞ (infinity); and D1=0.364 mm. As the imaging optical lens system is in the second state, the following conditions are satisfied: object distance=149.556 mm; D0=150.517 mm; and D1=2.023 mm.

When the maximum field of view of the imaging optical lens system in the first state is FOVL, the following condition is satisfied: FOVL=19.4 degrees.

When the maximum field of view of the imaging optical lens system in the second state is FOVS, the following condition is satisfied: FOVS=17.2 degrees.

When the f-number of the imaging optical lens system in the first state is FnoL, and the f-number of the imaging optical lens system in the second state is FnoS, the following condition is satisfied: FnoL/FnoS=0.88.

When an axial distance between the object-side surface of the one lens element nearest to the object side and the image surface IMG within the imaging optical lens system in the first state is TLL, and an axial distance between the object-side surface of the one lens element nearest to the object side and the image surface IMG within the imaging optical lens system in the second state is TLS, the following condition is satisfied: TLS/TLL=1.09. In this embodiment, TLL is referred to as an axial distance between the object-side surface of the first lens element E1 and the image surface IMG as the imaging optical lens system is in the first state, and TLS is referred to as an axial distance between the object-side surface of the first lens element E1 and the image surface IMG as the imaging optical lens system is in the second state.

When an axial distance between the image-side surface of the another lens element nearest to the image side and the image surface IMG within the imaging optical lens system in the first state is BLL, and an axial distance between the image-side surface of the another lens element nearest to the image side and the image surface IMG within the imaging optical lens system in the second state is BLS, the following condition is satisfied: BLS/BLL=1.00. In this embodiment, BLL is referred to as an axial distance between the image-side surface of the fifth lens element E5 and the image surface IMG as the imaging optical lens system is in the first state, and BLS is referred to as an axial distance between the image-side surface of the fifth lens element E5 and the image surface IMG as the imaging optical lens system is in the second state.

When an axial distance between the object-side surface of the one lens element nearest to the object side and the image-side surface of the another lens element nearest to the image side within the imaging optical lens system in the first state is TDL, and an axial distance between the object-side surface of the one lens element nearest to the object side and the image-side surface of the another lens element nearest to the image side within the imaging optical lens system in the second state is TDS, the following condition is satisfied: $10 \times |TDS-TDL|/TDL=3.29$. In this embodiment, TDL is referred to as an axial distance between the object-side surface of the first lens element E1 and the image-side surface of the fifth lens element E5 as the imaging optical lens system is in the first state, and TDS is referred to as an axial distance between the object-side surface of the first lens element E1 and the image-side surface of the fifth lens element E5 as the imaging optical lens system is in the second state.

When the axial distance between the object-side surface of the one lens element nearest to the object side and the image surface IMG as the imaging optical lens system is in the first state is TLL, and a maximum image height of the imaging optical lens system is ImgH, the following condition is satisfied: TLL/ImgH=6.83.

When the axial distance between the image-side surface of the another lens element nearest to the image side and the image surface IMG within the imaging optical lens system as the imaging optical lens system is in the first state is BLL, and the maximum image height of the imaging optical lens system is ImgH, the following condition is satisfied: BLL/ImgH=5.06.

When the axial distance between the object-side surface of the one lens element nearest to the object side and the image-side surface of the another lens element nearest to the image side within the imaging optical lens system in the first state is TDL, and the axial distance between the image-side surface of the another lens element nearest to the image side and the image surface IMG within the imaging optical lens system in the first state is BLL, the following condition is satisfied: TDL/BLL=0.35.

When the focal length of the imaging optical lens system in the first state is fL, and a focal length of the first lens element E1 is f1, the following condition is satisfied: fL/f1=1.84.

When the focal length of the imaging optical lens system in the first state is fL, and a focal length of the third lens element E3 is f3, the following condition is satisfied: |fL/f3|=0.31.

When the focal length of the imaging optical lens system in the first state is fL, and a composite focal length of the first lens element E1 and the second lens element E2 is f12, the following condition is satisfied: fL/f12=1.10.

When the focal length of the first lens element E1 is f1, and a focal length of the second lens element E2 is f2, the following condition is satisfied: |f1/f2|=0.51.

When the focal length of the third lens element E3 is f3, and a focal length of the fourth lens element E4 is f4, the following condition is satisfied: f4/f3=−0.42.

When the focal length of the imaging optical lens system in the first state is fL, a curvature radius of the object-side surface of the fourth lens element E4 is R7, and a curvature radius of the image-side surface of the fourth lens element E4 is R8, the following condition is satisfied: fL/R7+fL/R8=14.04.

When a curvature radius of the image-side surface of the first lens element E1 is R2, and the curvature radius of the object-side surface of the fourth lens element E4 is R7, the following condition is satisfied: (R2+R7)/(R2−R7)=1.09.

When a curvature radius of the object-side surface of the second lens element E2 is R3, and a curvature radius of the image-side surface of the third lens element E3 is R6, the following condition is satisfied: (R3−R6)/(R3+R6)=0.36.

When a central thickness of the first lens element E1 is CT1, and a central thickness of the second lens element E2 is CT2, the following condition is satisfied:

$$CT1/CT2 = 2.82.$$

When the central thickness of the first lens element E1 is CT1, and an axial distance between the object-side surface of the third lens element E3 and the image-side surface of the fourth lens element E4 as the imaging optical lens system is in the first state is Dr5r8L, the following condition is satisfied: CT1/Dr5r8L=1.66.

When an axial distance between the third lens element E3 and the fourth lens element E4 as the imaging optical lens system is in the first state is T34L, and a central thickness of the fourth lens element E4 is CT4, the following condition is satisfied: $10 \times T34L/CT4=0.97$. In this embodiment, an axial distance between two adjacent lens elements is a distance in a paraxial region between two adjacent lens surfaces of the two adjacent lens elements.

When the axial distance between the third lens element E3 and the fourth lens element E4 as the imaging optical lens system is in the first state is T34L, and an axial distance between the fourth lens element E4 and the fifth lens element E5 as the imaging optical lens system is in the first state is T45L, the following condition is satisfied: $10 \times T34L/T45L=0.46$.

When the axial distance between the fourth lens element E4 and the fifth lens element E5 as the imaging optical lens system is in the first state is T45L, and the central thickness of the fourth lens element E4 is CT4, the following condition is satisfied: T45L/CT4=2.10.

When the axial distance between the fourth lens element E4 and the fifth lens element E5 as the imaging optical lens system is in the first state is T45L, and a central thickness of the fifth lens element E5 is CT5, the following condition is satisfied: T45L/CT5=2.98.

When an Abbe number of the second lens element E2 is V2, an Abbe number of the fourth lens element E4 is V4, and an Abbe number of the fifth lens element E5 is V5, the following condition is satisfied: V2+V4+V5=72.1.

When a displacement in parallel with the optical axis from an axial vertex of the object-side surface of the third lens element E3 to a maximum effective radius position of the object-side surface of the third lens element E3 as the imaging optical lens system is in the first state is Sag3R1L, and a central thickness of the third lens element E3 is CT3, third lens element E3 as the imaging optical lens system is in the first state is Sag3R1L, and a maximum effective radius of the image-side surface of the second lens element E2 as the imaging optical lens system is in the first state is Y2R2L, the following condition is satisfied: (T23L+Sag3R1L−Sag2R2L)/Y2R2L=0.17. In this embodiment, the direction of Sag3R1L points toward the image side of the imaging optical lens system, and the value of Sag3R1L is positive; the direction of Sag2R2L points toward the image side of the imaging optical lens system, and the value of Sag2R2L is positive.

The detailed optical data of the 1st embodiment are shown in Table 1A and Table 1B, and the aspheric surface data are shown in Table 1C below.

TABLE 1A

| 1st Embodiment | | | | | | | |
|---|---|---|---|---|---|---|---|
| Surface # | | Curvature Radius | Thickness | Material | Index | Abbe # | Focal Length |
| 0 | Object | Plano | D0 | | | | |
| 1 | Stop | Plano | −0.961 | | | | |
| 2 | Lens 1 | 4.9011 (SPH) | 1.748 | Glass | 1.593 | 68.3 | 8.91 |
| 3 | | 58.8235 (SPH) | 0.051 | | | | |
| 4 | Lens 2 | 16.5793 (ASP) | 0.619 | Plastic | 1.587 | 28.3 | −17.47 |
| 5 | | 6.2496 (ASP) | D1 | | | | |
| 6 | Lens 3 | 6.4953 (ASP) | 0.578 | Plastic | 1.650 | 21.8 | 52.17 |
| 7 | | 7.7537 (ASP) | 0.042 | | | | |
| 8 | Lens 4 | 2.6469 (ASP) | 0.431 | Plastic | 1.680 | 18.2 | −21.77 |
| 9 | | 2.0974 (ASP) | 0.904 | | | | |
| 10 | Lens 5 | −6.6420 (ASP) | 0.303 | Plastic | 1.614 | 25.6 | 137.94 |
| 11 | | −6.2657 (ASP) | −0.118 | | | | |
| 12 | Stop | Plano | 0.660 | | | | |
| 13 | Prism | Plano | 12.912 | Glass | 1.516 | 64.1 | — |
| 14 | | Plano | 0.510 | | | | |
| 15 | Filter | Plano | 0.210 | Glass | 1.516 | 64.1 | — |
| 16 | | Plano | 0.255 | | | | |
| 17 | Image | Plano | — | | | | |

Note:
Reference wavelength is 587.6 nm (d-line).
An effective radius of the stop S1 (Surface 1) is 2.934 mm.
An effective radius of the stop S2 (Surface 12) is 1.870 mm.
The imaging optical lens system can further include an aperture stop ST, and the position of the aperture stop ST can be adjusted depending on the object distance.
In this embodiment, the position of the aperture stop ST is at Surface 1 as the imaging optical lens system is in the first state (corresponding to infinite object distance).
In this embodiment, the position of the aperture stop ST is at Surface 1 as the imaging optical lens system is in the second state (corresponding to finite object distance).

the following condition is satisfied: Sag3R1L/CT3=1.08. In this embodiment, the direction of Sag3R1L points toward the image side of the imaging optical lens system, and the value of Sag3R1L is positive.

When a maximum effective radius of the object-side surface of the first lens element E1 as the imaging optical lens system is in the first state is Y1R1L, and a maximum effective radius of the image-side surface of the fifth lens element E5 as the imaging optical lens system is in the first state is Y5R2L, the following condition is satisfied: Y1R1L/Y5R2L=1.56.

When an axial distance between the second lens element E2 and the third lens element E3 as the imaging optical lens system is in the first state is T23L, a displacement in parallel with the optical axis from an axial vertex of the image-side surface of the second lens element E2 to a maximum effective radius position of the image-side surface of the second lens element E2 as the imaging optical lens system is in the first state is Sag2R2L, the displacement in parallel with the optical axis from the axial vertex of the object-side surface of the third lens element E3 to the maximum effective radius position of the object-side surface of the In Table 1A, the curvature radius, the thickness and the focal length are shown in millimeters (mm). Surface numbers 0-17 represent the surfaces sequentially arranged from the object side to the image side along the optical axis.

TABLE 1B

| Values of Optical And Physical Parameters/Definitions | | | |
|---|---|---|---|
| First State (Infinite Object Distance) | | Second State (Finite Object Distance) | |
| fL [mm] | 16.43 | fS [mm] | 15.95 |
| FnoL | 2.80 | FnoS | 3.17 |
| HFOVL [deg.] | 9.7 | HFOVS [deg.] | 8.6 |
| Object Distance [mm] | ∞ | Object Distance [mm] | 149.556 |
| D0 [mm] | ∞ | D0 [mm] | 150.517 |
| D1 [mm] | 0.364 | D1 [mm] | 2.023 |

Table 1B shows optical and physical parameters/definitions of the imaging optical lens system for the first state and the second state under different focusing conditions. It should be understood that, in this embodiment, only two moving focus states (i.e., the first state and the second state)

are disclosed, but the present disclosure is not limited thereto. Besides the first state and the second state, the imaging optical lens system in this embodiment can also have other moving focus states with different focal lengths between the first state and the second state to accommodate focusing conditions for other object distances.

Figure 4:
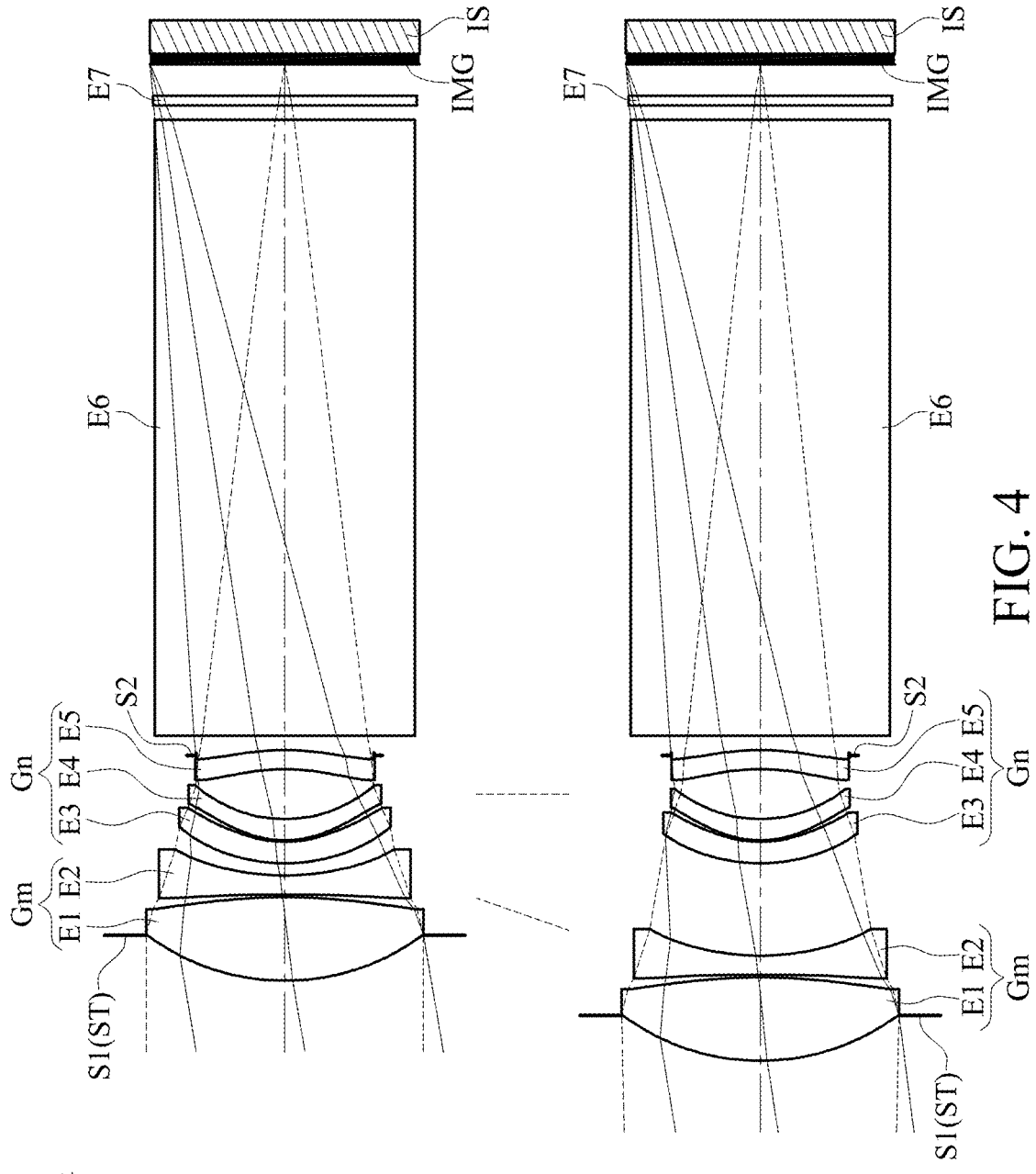
FIG. 4 shows schematic views of an image capturing unit respectively in a first state and a second state according to the 2nd embodiment of the present disclosure.
Figure 6:
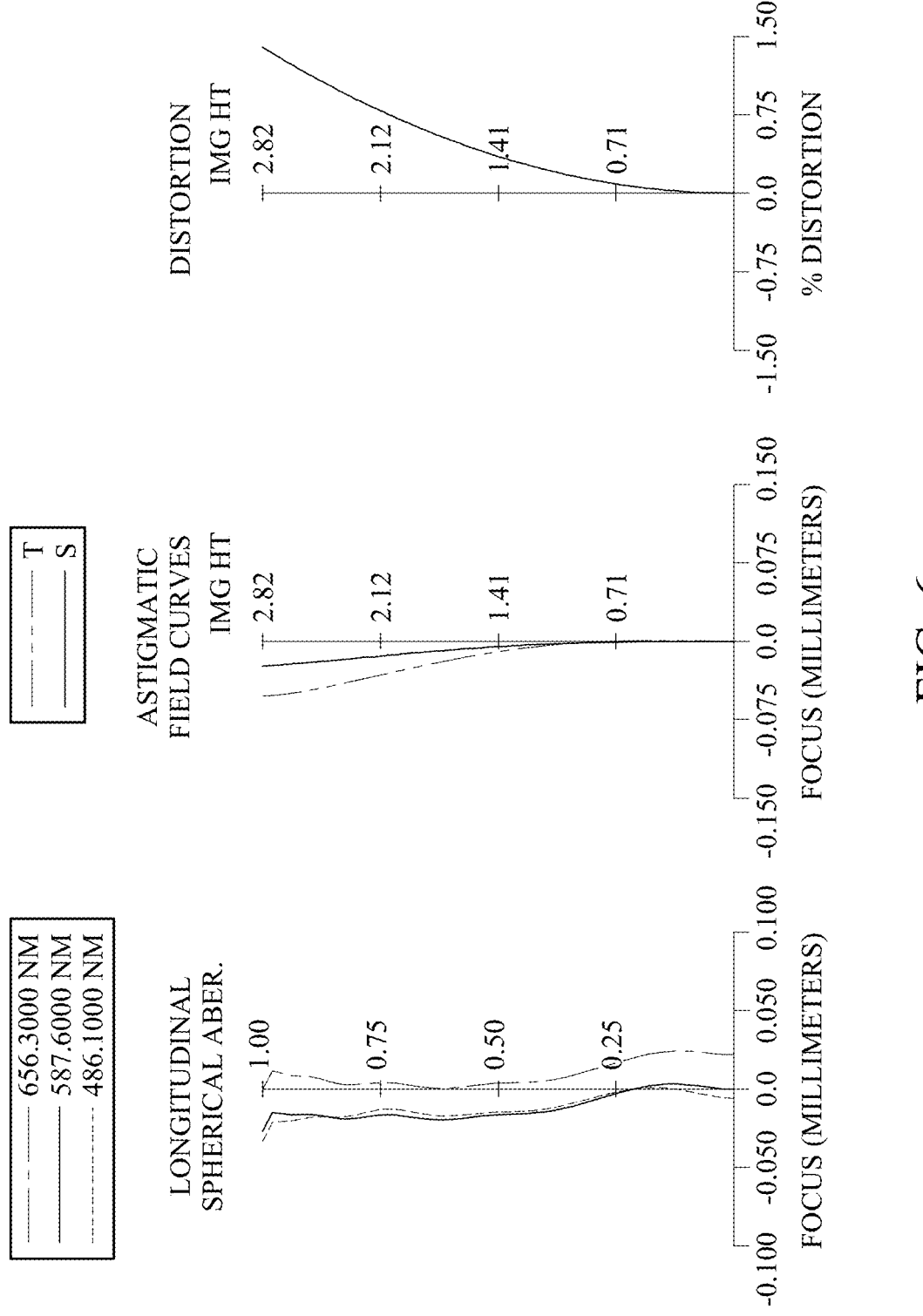
FIG. 6 shows spherical aberration curves, astigmatic field curves and a distortion curve of the image capturing unit in the second state according to the 2nd embodiment.

In Table 1B, the imaging optical lens system undergoes the focus adjustment process according to the change of object distance, and the movable lens group Gm is moved toward the object side along the optical axis relative to the last lens group Gn when the imaging optical lens system transitions from the first state to the second state in the focus adjustment process. Specifically, when the object distance changes from infinite to 149.556 mm, the imaging optical lens system transitions from the first state to the second state, the axial distance D1 between the movable lens group Gm and the last lens group Gn increases from 0.364 mm in the first state to 2.023 mm in the second state, and the reflective element E6 is immovable relative to the last lens group Gn during the focus adjustment process. In other words, when the object distance decreases, the movable lens group Gm is moved toward the object side along the optical axis relative to the last lens group Gn during the focus adjustment process.

in order from left to right, spherical aberration curves, astigmatic field curves and a distortion curve of the image capturing unit in the first state according to the 2nd embodiment. FIG. 6 shows, in order from left to right, spherical aberration curves, astigmatic field curves and a distortion curve of the image capturing unit in the second state according to the 2nd embodiment. Moreover, the upper part of FIG. 4 shows the schematic view of the imaging optical lens system in the first state, and the lower part of FIG. 4 shows the schematic view of the imaging optical lens system in the second state. In FIG. 4, the image capturing unit 2 includes the imaging optical lens system (its reference numeral is omitted) of the present disclosure and an image sensor IS. The imaging optical lens system includes, in order from an object side to an image side along an optical axis, a stop S1, a first lens element E1, a second lens element E2, a third lens element E3, a fourth lens element E4, a fifth lens element E5, a stop S2, a reflective element E6, a filter E7 and an image surface IMG. Furthermore, the imaging optical lens system includes, in order from the object side to the image side along a travelling direction of an optical path, a movable lens group Gm and a last lens group Gn, where the movable lens group Gm includes the first lens element E1 and the second lens element E2, and the last lens group Gn

TABLE 1C

| | | Aspheric Coefficients | | |
|---|---|---|---|---|
| Surface # | 4 | 5 | 6 | 7 |
| k= | 1.3456700E+01 | 2.5887400E+00 | 3.5239200E+00 | 9.4556400E+00 |
| A4= | 3.4133373E−03 | 4.6106224E−03 | −1.8485762E−03 | 7.1285311E−03 |
| A6= | −2.3021971E−04 | 2.1303132E−04 | 1.1536493E−02 | 1.5667775E−02 |
| A8= | −2.4429600E−04 | −9.6084267E−04 | −7.8083824E−03 | 9.3359363E−03 |
| A10= | 1.9090374E−04 | 8.3493686E−04 | 4.7707971E−03 | −3.0295151E−02 |
| A12= | −7.9003585E−05 | −4.3289144E−04 | −2.6208551E−03 | 2.9845545E−02 |
| A14= | 2.0988420E−05 | 1.4700775E−04 | 1.0738441E−03 | −1.7831502E−02 |
| A16= | −3.6571641E−06 | −3.2769889E−05 | −2.9849995E−04 | 7.1698200E−03 |
| A18= | 4.0303861E−07 | 4.6023080E−06 | 5.3542269E−05 | −1.9500331E−03 |
| A20= | −2.5407941E−08 | −3.6819550E−07 | −5.8105055E−06 | 3.4267053E−04 |
| A22= | 6.9639324E−10 | 1.2764254E−08 | 3.3452736E−07 | −3.4930563E−05 |
| A24= | — | — | −7.2117831E−09 | 1.5609966E−06 |
| Surface # | 8 | 9 | 10 | 11 |
| k= | −4.4345100E+00 | −2.6864400E+00 | 3.6004600E+00 | 2.2070200E+00 |
| A4= | 3.8431272E−02 | 3.9798274E−02 | 2.9685407E−02 | 2.0518294E−02 |
| A6= | −2.9819087E−02 | −5.0811251E−02 | −2.4499322E−02 | −1.8231661E−02 |
| A8= | 4.9517110E−02 | 5.6036947E−02 | 2.4668118E−02 | 2.2154776E−02 |
| A10= | −6.1393177E−02 | −4.9482868E−02 | −2.4963431E−02 | −2.5806005E−02 |
| A12= | 4.7457494E−02 | 2.6945672E−02 | 1.7114603E−02 | 2.0589623E−02 |
| A14= | −2.5018133E−02 | −8.1589047E−03 | −7.2168717E−03 | −1.0490058E−02 |
| A16= | 9.4019636E−03 | 1.0015360E−03 | 1.8162579E−03 | 3.3972880E−03 |
| A18= | −2.4954874E−03 | 1.0557520E−04 | −2.5027254E−04 | −6.7651770E−04 |
| A20= | 4.4111868E−04 | −4.4235173E−05 | 1.4419542E−05 | 7.5393291E−05 |
| A22= | −4.6034512E−05 | 3.6265076E−06 | 1.9870068E−08 | −3.5938456E−06 |
| A24= | 2.1237135E−06 | — | — | — |

In Table 1C, k represents the conic coefficient of the equation of the aspheric surface profiles. A4-A24 represent the aspheric coefficients ranging from the 4th order to the 24th order. The tables presented below for each embodiment are the corresponding schematic parameter and aberration curves, and the definitions of the tables are the same as Table 1A to Table 1C of the 1st embodiment. Therefore, an explanation in this regard will not be provided again.

2nd Embodiment

Figure 5:
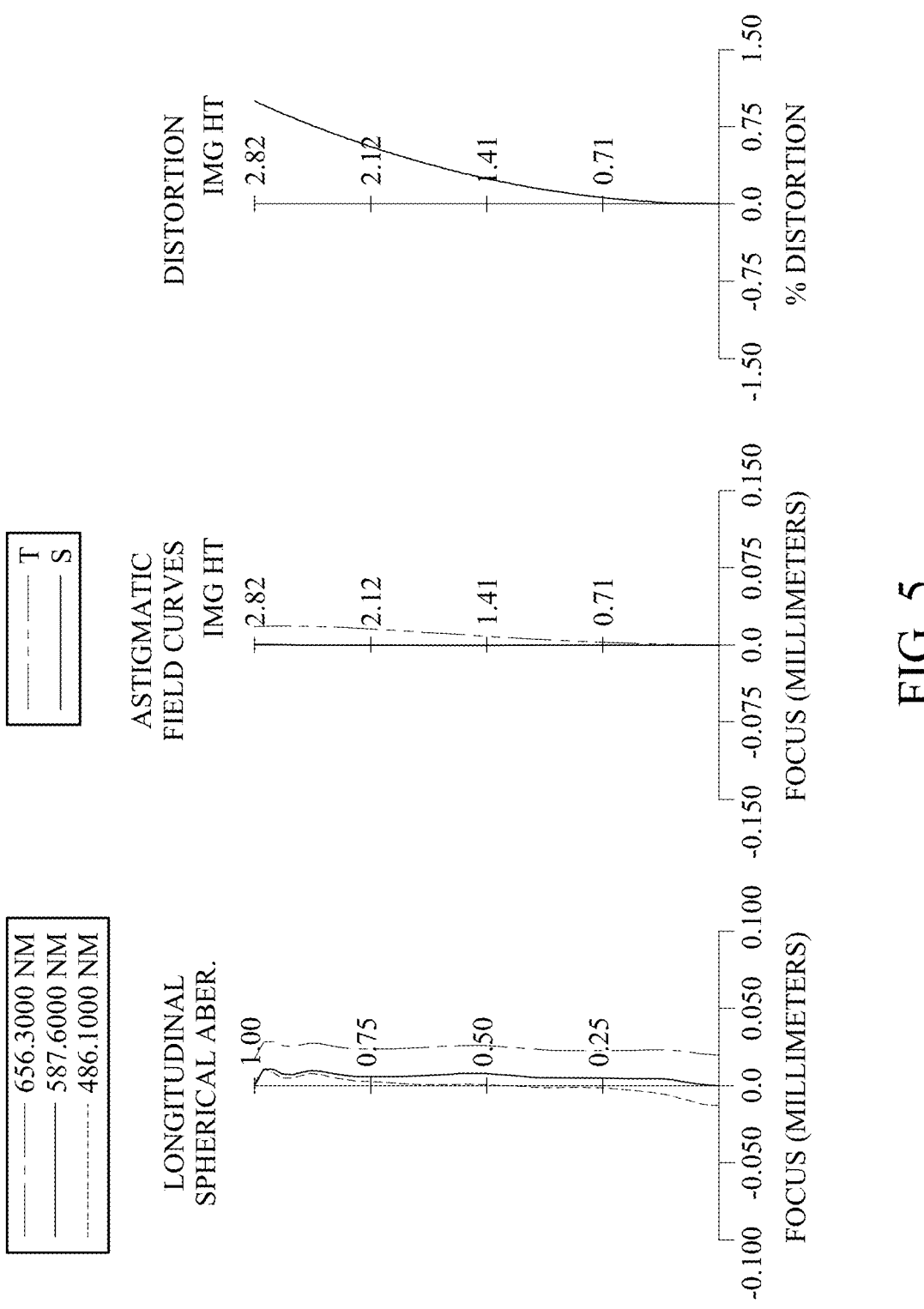
FIG. 5 shows spherical aberration curves, astigmatic field curves and a distortion curve of the image capturing unit in the first state according to the 2nd embodiment.

FIG. 4 shows schematic views of an image capturing unit respectively in a first state and a second state according to the 2nd embodiment of the present disclosure. FIG. 5 shows, includes the third lens element E3, the fourth lens element E4 and the fifth lens element E5. The imaging optical lens system includes five lens elements (E1, E2, E3, E4 and E5) with no additional lens element disposed between each of the adjacent five lens elements. In addition, there is no additional lens element located between the last lens group Gn and the reflective element E6 along the optical axis.

A focal length of the imaging optical lens system is variable by change of an axial distance between the two lens groups (Gm and Gn) in a focus adjustment process. In FIG. 4, the movable lens group Gm is moved along the optical axis relative to the last lens group Gn in the focus adjustment process. Furthermore, the imaging optical lens system can undergo the focus adjustment process to transition to the first state, as shown in the upper part of FIG. 4 or to the second state, as shown in the lower part of FIG. 4. The imaging optical lens system being in the first state refers to a state where an imaged object is at an infinite object distance and an entrance pupil diameter of the imaging optical lens system is at its maximum; the imaging optical lens system being in the second state refers to a state where an imaged object is at a finite object distance. Moreover, the movable lens group Gm is moved toward the object side along the optical axis relative to the last lens group Gn when the imaging optical lens system transitions from the first state to the second state in the focus adjustment process. It is noted that all lens elements in the movable lens group Gm are immovable relative to one another during the focus adjustment process, and all lens elements in the last lens group Gn are immovable relative to one another during the focus adjustment process. In addition, during the focus adjustment process, the reflective element E6 is immovable relative to the last lens group Gn.

The first lens element E1 with positive refractive power has an object-side surface being convex in a paraxial region thereof and an image-side surface being convex in a paraxial region thereof. The first lens element E1 is made of glass material and has the object-side surface and the image-side surface being both aspheric.

The second lens element E2 with negative refractive power has an object-side surface being concave in a paraxial region thereof and an image-side surface being concave in a paraxial region thereof. The second lens element E2 is made of plastic material and has the object-side surface and the image-side surface being both aspheric. The object-side surface of the second lens element E2 has one inflection point. The object-side surface of the second lens element E2 has one convex critical point in an off-axis region thereof.

The third lens element E3 with negative refractive power has an object-side surface being convex in a paraxial region thereof and an image-side surface being concave in a paraxial region thereof. The third lens element E3 is made of plastic material and has the object-side surface and the image-side surface being both aspheric. The image-side surface of the third lens element E3 has two inflection points.

The fourth lens element E4 with positive refractive power has an object-side surface being convex in a paraxial region thereof and an image-side surface being concave in a paraxial region thereof. The fourth lens element E4 is made of plastic material and has the object-side surface and the image-side surface being both aspheric. The object-side surface of the fourth lens element E4 has two inflection points.

The fifth lens element E5 with negative refractive power has an object-side surface being concave in a paraxial region thereof and an image-side surface being convex in a paraxial region thereof. The fifth lens element E5 is made of plastic material and has the object-side surface and the image-side surface being both aspheric. The object-side surface of the fifth lens element E5 has one inflection point. The image-side surface of the fifth lens element E5 has one inflection point. The object-side surface of the fifth lens element E5 has one convex critical point in an off-axis region thereof.

The reflective element E6 is made of glass material and located between the fifth lens element E5 and the image surface IMG along the optical axis, and will not affect the focal length of the imaging optical lens system. The reflective element E6 is a prism with an optical path folding function. For simplicity in illustration, FIG. 4 does not show the deflection effect caused by the reflective element E6 on the optical path. However, the reflective element E6 can have various configurations depending on actual design requirements, thereby causing different deflection effects on the optical path. Moreover, the reflective element E6 of this embodiment can have a configuration similar to, for example, one of the configurations shown in FIG. 57 to FIG. 63, which can be referred to foregoing descriptions corresponding to FIG. 57 to FIG. 63, and the details in this regard will not be provided again. Furthermore, the reflective element E6 of this embodiment can have a configuration similar to, for example, the configuration shown in FIG. 54, deflecting the optical path five times, which can be referred to foregoing descriptions corresponding to FIG. 54, and the details in this regard will not be provided again.

The filter E7 is made of glass material and located between the reflective element E6 and the image surface IMG, and will not affect the focal length of the imaging optical lens system. The image sensor IS is disposed on or near the image surface IMG of the imaging optical lens system.

The detailed optical data of the 2nd embodiment are shown in Table 2A and Table 2B, and the aspheric surface data are shown in Table 2C below.

TABLE 2A

| 2nd Embodiment | | | | | | | |
|---|---|---|---|---|---|---|---|
| Surface # | | Curvature Radius | Thickness | Material | Index | Abbe # | Focal Length |
| 0 | Object | Plano | D0 | | | | |
| 1 | Stop | Plano | −0.952 | | | | |
| 2 | Lens 1 | 4.9587 (ASP) | 1.750 | Glass | 1.593 | 68.3 | 6.14 |
| 3 | | −11.8549 (ASP) | 0.055 | | | | |
| 4 | Lens 2 | −90.9091 (ASP) | 0.400 | Plastic | 1.566 | 37.4 | −8.50 |
| 5 | | 5.0887 (ASP) | D1 | | | | |
| 6 | Lens 3 | 3.6369 (ASP) | 0.450 | Plastic | 1.669 | 19.5 | −19.98 |
| 7 | | 2.7172 (ASP) | 0.035 | | | | |
| 8 | Lens 4 | 2.6343 (ASP) | 0.444 | Plastic | 1.660 | 20.4 | 16.37 |
| 9 | | 3.2505 (ASP) | 1.045 | | | | |
| 10 | Lens 5 | −4.0747 (ASP) | 0.400 | Plastic | 1.642 | 22.5 | −43.53 |
| 11 | | −4.9537 (ASP) | −0.114 | | | | |
| 12 | Stop | Plano | 0.414 | | | | |
| 13 | Prism | Plano | 12.912 | Glass | 1.516 | 64.1 | — |
| 14 | | Plano | 0.300 | | | | |

TABLE 2A-continued

| | | | 2nd Embodiment | | | | |
|---|---|---|---|---|---|---|---|
| Surface # | | Curvature Radius | Thickness | Material | Index | Abbe # | Focal Length |
| 15 | Filter | Plano | 0.210 | Glass | 1.516 | 64.1 | — |
| 16 | | Plano | 0.653 | | | | |
| 17 | Image | Plano | — | | | | |

Note:
Reference wavelength is 587.6 nm (d-line).
An effective radius of the stop S1 (Surface 1) is 2.904 mm.
An effective radius of the stop S2 (Surface 12) is 1.865 mm.
The imaging optical lens system can further include an aperture stop ST, and the position of the aperture stop ST can be adjusted depending on the object distance.
In this embodiment, the position of the aperture stop ST is at Surface 1 as the imaging optical lens system is in the first state (corresponding to infinite object distance).
In this embodiment, the position of the aperture stop ST is at Surface 1 as the imaging optical lens system is in the second state (corresponding to finite object distance).

The definitions of these parameters shown in Table 2B are the same as those stated in the 1st embodiment with corresponding values for the 2nd embodiment, so an explanation in this regard will not be provided again.

TABLE 2B

| Values of Optical And Physical Parameters/Definitions | | | |
|---|---|---|---|
| First State (Infinite Object Distance) | | Second State (Finite Object Distance) | |
| fL [mm] | 16.26 | fS [mm] | 15.82 |
| FnoL | 2.80 | FnoS | 3.17 |
| HFOVL [deg.] | 9.7 | HFOVS [deg.] | 8.6 |
| Object Distance [mm] | ∞ | Object Distance [mm] | 149.565 |
| D0 [mm] | ∞ | D0 [mm] | 150.517 |
| D1 [mm] | 0.257 | D1 [mm] | 1.937 |

It should be understood that, in this embodiment, only two moving focus states (i.e., the first state and the second state) are disclosed, but the present disclosure is not limited thereto. Besides the first state and the second state, the imaging optical lens system in this embodiment can also have other moving focus states with different focal lengths between the first state and the second state to accommodate focusing conditions for other object distances.

In Table 2B, the imaging optical lens system undergoes the focus adjustment process according to the change of object distance, and the movable lens group Gm is moved toward the object side along the optical axis relative to the last lens group Gn when the imaging optical lens system transitions from the first state to the second state in the focus adjustment process. Specifically, when the object distance changes from infinite to 149.565 mm, the imaging optical lens system transitions from the first state to the second state, the axial distance D1 between the movable lens group Gm and the last lens group Gn increases from 0.257 mm in the first state to 1.937 mm in the second state, and the reflective element E6 is immovable relative to the last lens group Gn during the focus adjustment process. In other words, when the object distance decreases, the movable lens group Gm is moved toward the object side along the optical axis relative to the last lens group Gn during the focus adjustment process.

TABLE 2C

| | | Aspheric Coefficients | | |
|---|---|---|---|---|
| Surface # | 2 | 3 | 4 | 5 |
| k= | 7.0392600E−02 | −2.8768900E+01 | −9.9000000E+01 | 8.3339200E−01 |
| A4= | 4.7340647E−04 | −1.1292391E−03 | −6.4652227E−03 | −6.3158962E−03 |
| A6= | 7.2619544E−05 | 3.2598115E−04 | 5.7952865E−04 | 2.3700994E−04 |
| A8= | −5.2382177E−05 | 1.6215650E−04 | 1.5658269E−03 | 1.6101150E−03 |
| A10= | 1.7526500E−05 | −2.0541589E−04 | −1.1834621E−03 | −9.0143548E−04 |
| A12= | −3.2305165E−06 | 8.3775182E−05 | 4.2714062E−04 | 1.4645116E−04 |
| A14= | 2.9801093E−07 | −1.7510997E−05 | −8.7297647E−05 | 5.0579359E−05 |
| A16= | −1.1049934E−08 | 2.0270167E−06 | 1.0286600E−05 | −2.8587871E−05 |
| A18= | — | −1.2408032E−07 | −6.5061032E−07 | 5.6650920E−06 |
| A20= | — | 3.1433402E−09 | 1.6792970E−08 | −5.3228268E−07 |
| A22= | — | — | 3.2011148E−11 | 1.9836720E−08 |
| Surface # | 6 | 7 | 8 | 9 |
| k= | −8.7952400E−02 | −2.3064100E+00 | −1.7936800E+00 | 2.2347200E−02 |
| A4= | −6.1940862E−03 | 1.0971945E−01 | 1.4503909E−01 | 3.9570883E−02 |
| A6= | −1.3482696E−03 | −2.1017338E−01 | −2.2865713E−01 | −2.8413194E−02 |
| A8= | 6.7140635E−03 | 2.2679843E−01 | 2.4149244E−01 | 3.4591673E−02 |
| A10= | −6.6782109E−03 | −1.8039820E−01 | −1.9998949E−01 | −4.8630974E−02 |
| A12= | 4.3187713E−03 | 1.1299314E−01 | 1.2737958E−01 | 4.1875550E−02 |
| A14= | −1.9495963E−03 | −5.3789376E−02 | −5.9207962E−02 | −2.1722520E−02 |
| A16= | 6.0796013E−04 | 1.8445155E−02 | 1.9249543E−02 | 6.9624900E−03 |
| A18= | −1.2763930E−04 | −4.3360766E−03 | −4.2065993E−03 | −1.3524801E−03 |
| A20= | 1.7203571E−05 | 6.5780247E−04 | 5.8346292E−04 | 1.4594833E−04 |
| A22= | −1.3454629E−06 | −5.7833238E−05 | −4.6081438E−05 | −6.7126462E−06 |
| A24= | 4.6508788E−08 | 2.2380065E−06 | 1.5696564E−06 | — |

TABLE 2C-continued

| | | Aspheric Coefficients | | |
|---|---|---|---|---|
| Surface # | 10 | 11 | — | — |
| k= | 2.9509200E−01 | 5.0789300E−01 | — | — |
| A4= | 2.1224280E−02 | 1.6060187E−02 | — | — |
| A6= | −2.4404779E−03 | −1.0413547E−03 | — | — |
| A8= | 2.0507936E−04 | 7.2507105E−04 | — | — |
| A10= | −1.9261908E−03 | −3.0593692E−03 | — | — |
| A12= | 3.3236003E−03 | 4.2827548E−03 | — | — |
| A14= | −2.2570501E−03 | −2.9107328E−03 | — | — |
| A16= | 8.0053776E−04 | 1.1157394E−03 | — | — |
| A18= | −1.5308889E−04 | −2.4645206E−04 | — | — |
| A20= | 1.4535415E−05 | 2.9282375E−05 | — | — |
| A22= | −5.0864351E−07 | −1.4516850E−06 | — | — |

In the 2nd embodiment, the equation of the aspheric surface profiles of the aforementioned lens elements is the same as the equation of the 1st embodiment. Also, the definitions of these parameters shown in Table 2D below are the same as those stated in the 1st embodiment with corresponding values for the 2nd embodiment, so an explanation in this regard will not be provided again.

Moreover, these parameters can be calculated from Table 2A and Table 2C as the following values and satisfy the following conditions:

TABLE 2D

| Values of Optical And Physical Parameters/Definitions | | | |
|---|---|---|---|
| fL [mm] | 16.26 | fL/f12 | 1.08 |
| FnoL | 2.80 | |f1/f2| | 0.72 |
| HFOVL [deg.] | 9.7 | f4/f3 | −0.82 |
| FOVL [deg.] | 19.4 | fL/R7 + fL/R8 | 11.18 |
| fS [mm] | 15.82 | (R2 + R7)/(R2 − R7) | 0.64 |
| FnoS | 3.17 | (R3 − R6)/(R3 + R6) | 1.06 |
| HFOVS [deg.] | 8.6 | CT1/CT2 | 4.38 |
| FOVS [deg.] | 17.2 | CT1/Dr5r8L | 1.88 |
| FnoL/FnoS | 0.88 | 10 × T34L/CT4 | 0.79 |
| TLS/TLL | 1.09 | 10 × T34L/T45L | 0.33 |
| BLS/BLL | 1.00 | T45L/CT4 | 2.35 |
| 10 × |TDS − TDL|/TDL | 3.47 | T45L/CT5 | 2.61 |
| TLL/ImgH | 6.81 | V2 + V4 + V5 | 80.3 |
| BLL/ImgH | 5.09 | Sag3R1L/CT3 | 1.74 |
| TDL/BLL | 0.34 | Y1R1L/Y5R2L | 1.55 |
| fL/f1 | 2.65 | (T23L + Sag3R1L − Sag2R2L)/Y2R2L | 0.21 |
| |fL/f3| | 0.81 | — | — |

3rd Embodiment

Figure 7:
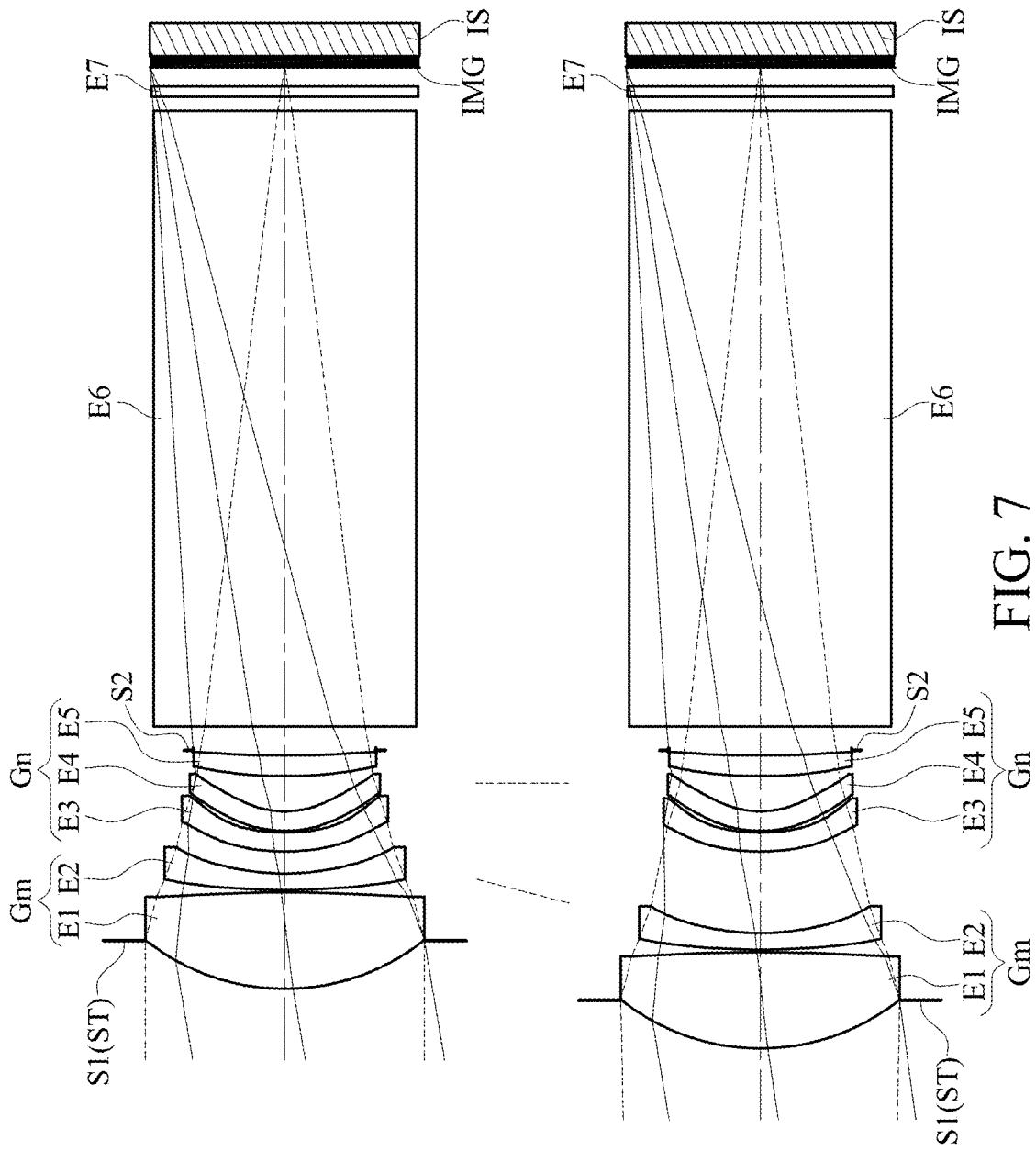
FIG. 7 shows schematic views of an image capturing unit respectively in a first state and a second state according to the 3rd embodiment of the present disclosure.
Figure 8:
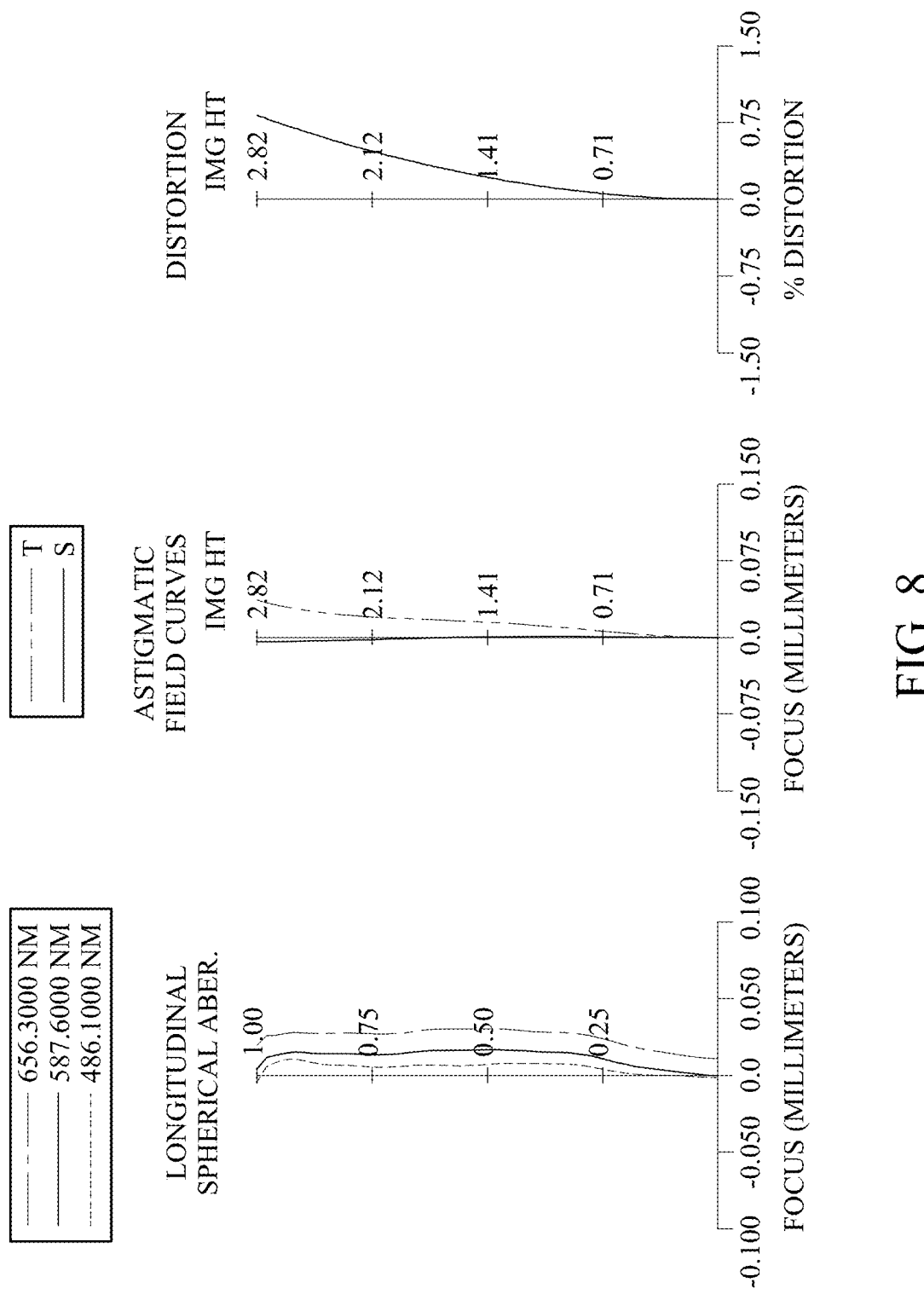
FIG. 8 shows spherical aberration curves, astigmatic field curves and a distortion curve of the image capturing unit in the first state according to the 3rd embodiment.
Figure 9:
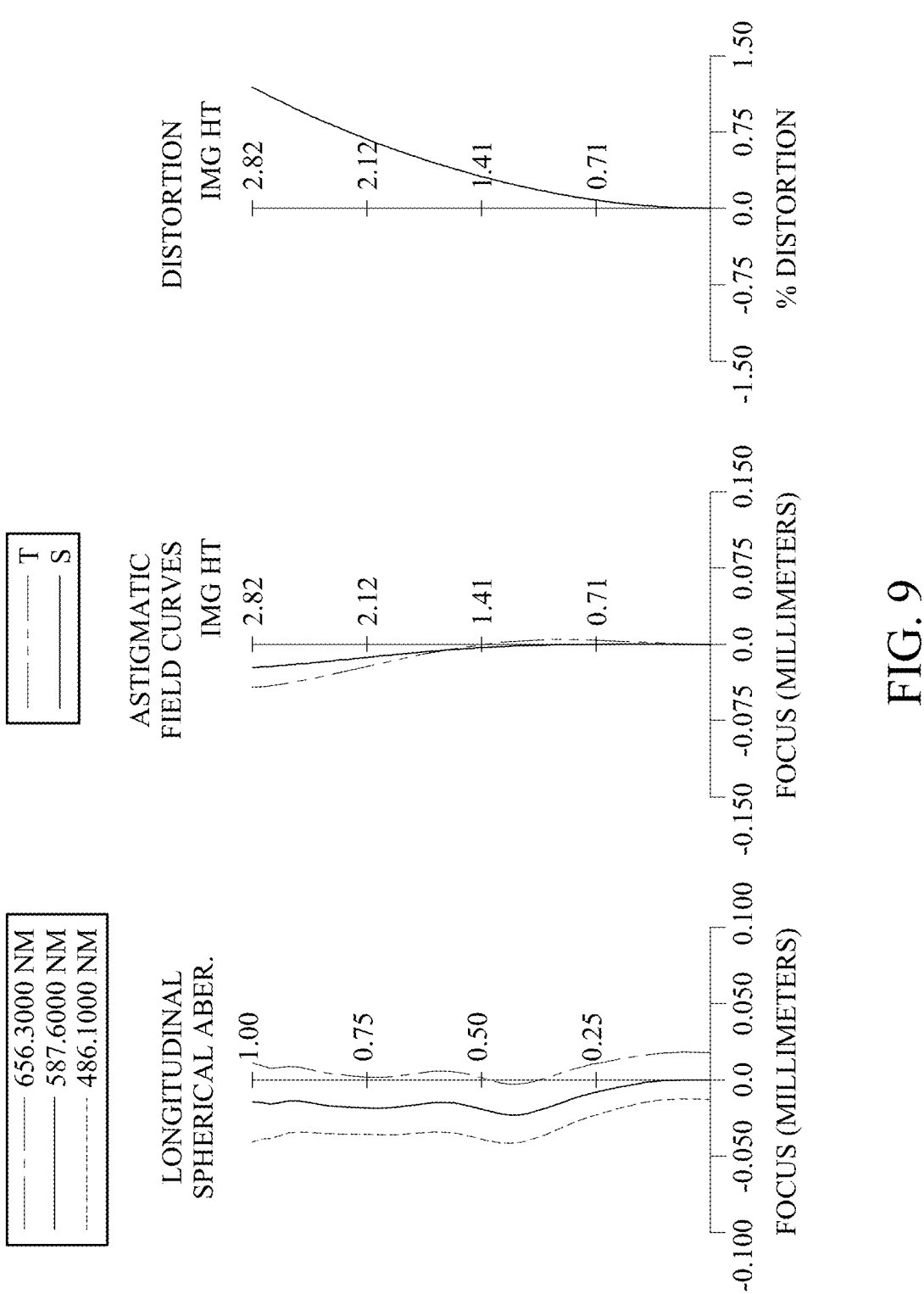
FIG. 9 shows spherical aberration curves, astigmatic field curves and a distortion curve of the image capturing unit in the second state according to the 3rd embodiment.

FIG. 7 shows schematic views of an image capturing unit respectively in a first state and a second state according to the 3rd embodiment of the present disclosure. FIG. 8 shows, in order from left to right, spherical aberration curves, astigmatic field curves and a distortion curve of the image capturing unit in the first state according to the 3rd embodiment. FIG. 9 shows, in order from left to right, spherical aberration curves, astigmatic field curves and a distortion curve of the image capturing unit in the second state according to the 3rd embodiment. Moreover, the upper part of FIG. 7 shows the schematic view of the imaging optical lens system in the first state, and the lower part of FIG. 7 shows the schematic view of the imaging optical lens system in the second state. In FIG. 7, the image capturing unit 3 includes the imaging optical lens system (its reference numeral is omitted) of the present disclosure and an image sensor IS. The imaging optical lens system includes, in order from an object side to an image side along an optical axis, a stop S1, a first lens element E1, a second lens element E2, a third lens element E3, a fourth lens element E4, a fifth lens element E5, a stop S2, a reflective element E6, a filter E7 and an image surface IMG. Furthermore, the imaging optical lens system includes, in order from the object side to the image side along a travelling direction of an optical path, a movable lens group Gm and a last lens group Gn, where the movable lens group Gm includes the first lens element E1 and the second lens element E2, and the last lens group Gn includes the third lens element E3, the fourth lens element E4 and the fifth lens element E5. The imaging optical lens system includes five lens elements (E1, E2, E3, E4 and E5) with no additional lens element disposed between each of the adjacent five lens elements. In addition, there is no additional lens element located between the last lens group Gn and the reflective element E6 along the optical axis.

A focal length of the imaging optical lens system is variable by change of an axial distance between the two lens groups (Gm and Gn) in a focus adjustment process. In FIG. 7, the movable lens group Gm is moved along the optical axis relative to the last lens group Gn in the focus adjustment process. Furthermore, the imaging optical lens system can undergo the focus adjustment process to transition to the first state, as shown in the upper part of FIG. 7 or to the second state, as shown in the lower part of FIG. 7. The imaging optical lens system being in the first state refers to a state where an imaged object is at an infinite object distance and an entrance pupil diameter of the imaging optical lens system is at its maximum; the imaging optical lens system being in the second state refers to a state where an imaged object is at a finite object distance. Moreover, the movable lens group Gm is moved toward the object side along the optical axis relative to the last lens group Gn when the imaging optical lens system transitions from the first state to the second state in the focus adjustment process. It is noted that all lens elements in the movable lens group Gm are immovable relative to one another during the focus adjustment process, and all lens elements in the last lens group Gn are immovable relative to one another during the focus adjustment process. In addition, during the focus adjustment process, the reflective element E6 is immovable relative to the last lens group Gn.

The first lens element E1 with positive refractive power has an object-side surface being convex in a paraxial region thereof and an image-side surface being convex in a paraxial region thereof. The first lens element E1 is made of plastic material and has the object-side surface and the image-side surface being both aspheric. The image-side surface of the first lens element E1 has one inflection point.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric.

The third lens element E3 with positive refractive power has an object-side surface being convex in a paraxial region thereof and an image-side surface being concave in a paraxial region thereof. The third lens element E3 is made of plastic material and has the object-side surface and the image-side surface being both aspheric. The object-side surface of the third lens element E3 has two inflection points. The image-side surface of the third lens element E3 has one inflection point.

The fourth lens element E4 with negative refractive power has an object-side surface being convex in a paraxial region thereof and an image-side surface being concave in a paraxial region thereof. The fourth lens element E4 is made of plastic material and has the object-side surface and the image-side surface being both aspheric. The object-side surface of the fourth lens element E4 has one inflection point.

The fifth lens element E5 with positive refractive power has an object-side surface being convex in a paraxial region thereof and an image-side surface being concave in a paraxial region thereof. The fifth lens element E5 is made of plastic material and has the object-side surface and the image-side surface being both aspheric. The object-side surface of the fifth lens element E5 has one inflection point. The image-side surface of the fifth lens element E5 has one inflection point. The image-side surface of the fifth lens element E5 has one convex critical point in an off-axis region thereof.

The reflective element E6 is made of glass material and located between the fifth lens element E5 and the image surface IMG along the optical axis, and will not affect the focal length of the imaging optical lens system. The reflective element E6 is a prism with an optical path folding function. For simplicity in illustration, FIG. 7 does not show the deflection effect caused by the reflective element E6 on the optical path. However, the reflective element E6 can have various configurations depending on actual design requirements, thereby causing different deflection effects on the optical path. Moreover, the reflective element E6 of this embodiment can have a configuration similar to, for example, one of the configurations shown in FIG. 57 to FIG. 63, which can be referred to foregoing descriptions corresponding to FIG. 57 to FIG. 63, and the details in this regard will not be provided again. Furthermore, the reflective element E6 of this embodiment can have a configuration similar to, for example, the configuration shown in FIG. 54, deflecting the optical path five times, which can be referred to foregoing descriptions corresponding to FIG. 54, and the details in this regard will not be provided again.

The filter E7 is made of glass material and located between the reflective element E6 and the image surface IMG, and will not affect the focal length of the imaging optical lens system. The image sensor IS is disposed on or near the image surface IMG of the imaging optical lens system.

The detailed optical data of the 3rd embodiment are shown in Table 3A and Table 3B, and the aspheric surface data are shown in Table 3C below.

TABLE 3A

| Surface # | | Curvature Radius | Thickness | Material | Index | Abbe # | Focal Length |
|---|---|---|---|---|---|---|---|
| 0 | Object | Plano | D0 | | | | |
| 1 | Stop | Plano | −1.006 | | | | |
| 2 | Lens 1 | 4.7958 | (ASP) | 2.018 | Plastic | 1.545 | 56.1 | 7.71 |
| 3 | | −28.8860 | (ASP) | 0.050 | | | | |
| 4 | Lens 2 | 12.0245 | (ASP) | 0.350 | Plastic | 1.614 | 25.6 | −14.87 |
| 5 | | 5.1312 | (ASP) | D1 | | | | |
| 6 | Lens 3 | 3.9110 | (ASP) | 0.400 | Plastic | 1.642 | 22.5 | 1788.09 |
| 7 | | 3.7675 | (ASP) | 0.035 | | | | |
| 8 | Lens 4 | 2.7841 | (ASP) | 0.410 | Plastic | 1.669 | 19.5 | −17.41 |
| 9 | | 2.1144 | (ASP) | 0.744 | | | | |
| 10 | Lens 5 | 18.1818 | (ASP) | 0.428 | Plastic | 1.669 | 19.5 | 38.24 |
| 11 | | 62.2310 | (ASP) | 0.105 | | | | |
| 12 | Stop | Plano | 0.500 | | | | |
| 13 | Prism | Plano | 12.912 | Glass | 1.516 | 64.1 | — |
| 14 | | Plano | 0.300 | | | | |
| 15 | Filter | Plano | 0.210 | Glass | 1.516 | 64.1 | — |
| 16 | | Plano | 0.404 | | | | |
| 17 | Image | Plano | | | | | |

Note:

Reference wavelength is 587.6 nm (d-line).

An effective radius of the stop S1 (Surface 1) is 2.922 mm.

An effective radius of the stop S2 (Surface 12) is 1.915 mm.

The imaging optical lens system can further include an aperture stop ST, and the position of the aperture stop ST can be adjusted depending on the object distance.

In this embodiment, the position of the aperture stop ST is at Surface 1 as the imaging optical lens system is in the first state (corresponding to infinite object distance).

In this embodiment, the position of the aperture stop ST is at Surface 1 as the imaging optical lens system is in the second state (corresponding to finite object distance).

The definitions of these parameters shown in Table 3B are the same as those stated in the 1st embodiment with corresponding values for the 3rd embodiment, so an explanation in this regard will not be provided again.

TABLE 3B

| Values of Optical And Physical Parameters/Definitions | | | |
|---|---|---|---|
| First State (Infinite Object Distance) | | Second State (Finite Object Distance) | |
| fL [mm] | 16.36 | fS [mm] | 15.63 |
| FnoL | 2.80 | FnoS | 3.12 |
| HFOVL [deg.] | 9.7 | HFOVS [deg.] | 8.7 |
| Object Distance [mm] | ∞ | Object Distance [mm] | 149.511 |
| D0 [mm] | ∞ | D0 [mm] | 150.517 |
| D1 [mm] | 0.458 | D1 [mm] | 1.708 |

It should be understood that, in this embodiment, only two moving focus states (i.e., the first state and the second state) are disclosed, but the present disclosure is not limited thereto. Besides the first state and the second state, the imaging optical lens system in this embodiment can also have other moving focus states with different focal lengths between the first state and the second state to accommodate focusing conditions for other object distances.

In Table 3B, the imaging optical lens system undergoes the focus adjustment process according to the change of object distance, and the movable lens group Gm is moved toward the object side along the optical axis relative to the last lens group Gn when the imaging optical lens system transitions from the first state to the second state in the focus adjustment process. Specifically, when the object distance changes from infinite to 149.511 mm, the imaging optical lens system transitions from the first state to the second state, the axial distance D1 between the movable lens group Gm and the last lens group Gn increases from 0.458 mm in the first state to 1.708 mm in the second state, and the reflective element E6 is immovable relative to the last lens group Gn during the focus adjustment process. In other words, when the object distance decreases, the movable lens group Gm is moved toward the object side along the optical axis relative to the last lens group Gn during the focus adjustment process.

TABLE 3C

| Aspheric Coefficients | | | | |
|---|---|---|---|---|
| Surface # | 2 | 3 | 4 | 5 |
| k= | 1.5874100E−01 | −7.1529600E+01 | 7.7745700E+00 | 1.0971700E+00 |
| A4= | 4.4473023E−04 | −6.2237679E−03 | −1.2570840E−02 | −6.2611697E−03 |
| A6= | −1.1581017E−04 | 8.4291836E−03 | 9.3660330E−03 | 2.0135645E−03 |
| A8= | 7.8442340E−05 | −4.9762499E−03 | −5.2161368E−03 | −1.4324310E−03 |
| A10= | −3.6807522E−05 | 1.7359401E−03 | 2.0122078E−03 | 1.3528113E−03 |
| A12= | 1.0024655E−05 | −3.8506266E−04 | −5.3862058E−04 | −7.3786324E−04 |
| A14= | −1.6545919E−06 | 5.5204224E−05 | 1.0131392E−04 | 2.3885871E−04 |
| A16= | 1.6296764E−07 | −4.9812963E−06 | −1.3132993E−05 | −4.6985466E−05 |
| A18= | −8.8648183E−09 | 2.5825478E−07 | 1.1027362E−06 | 5.4781677E−06 |
| A20= | 2.0539680E−10 | −5.8791551E−09 | −5.2846357E−08 | −3.4390934E−07 |
| A22= | — | — | 1.0662103E−09 | 8.7762450E−09 |
| Surface # | 6 | 7 | 8 | 9 |
| k= | −2.3889700E−01 | 4.5227800E−01 | −1.3382600E+00 | −1.0120300E+00 |
| A4= | −3.5954884E−02 | −2.2410684E−02 | 7.9554309E−02 | 9.4440819E−02 |
| A6= | 3.9773027E−02 | 3.2998537E−02 | −9.5271477E−02 | −1.2000340E−01 |
| A8= | −2.3042351E−02 | −1.6147579E−02 | 7.5562337E−02 | 7.6424776E−02 |
| A10= | 1.5135935E−02 | 3.2118616E−02 | −3.4702311E−02 | −3.9047324E−02 |
| A12= | −1.0574039E−02 | −4.3744708E−02 | 1.0124879E−03 | 2.0463506E−02 |
| A14= | 5.2921867E−03 | 3.0765062E−02 | 9.4581803E−03 | −9.9088227E−03 |
| A16= | −1.7005188E−03 | −1.2747313E−02 | −6.2794985E−03 | 3.4564996E−03 |
| A18= | 3.4379420E−04 | 3.2883812E−03 | 2.1171588E−03 | −7.5215334E−04 |
| A20= | −4.2273536E−05 | −5.2498796E−04 | −4.1360395E−04 | 9.1147894E−05 |
| A22= | 2.8807419E−06 | 4.7871211E−05 | 4.4426438E−05 | −4.7305039E−06 |
| A24= | −8.3008593E−08 | −1.9154751E−06 | −2.0315511E−06 | — |
| Surface # | 10 | 11 | — | — |
| k= | −9.9000000E+01 | −9.9000000E+01 | — | — |
| A4= | 3.8294074E−02 | 1.9416084E−02 | — | — |
| A6= | −3.1988269E−02 | −1.8108425E−02 | — | — |
| A8= | 3.0745731E−02 | 1.9139113E−02 | — | — |
| A10= | −3.1154786E−02 | −1.9918566E−02 | — | — |
| A12= | 2.3991391E−02 | 1.5660381E−02 | — | — |
| A14= | −1.2054109E−02 | −8.1241303E−03 | — | — |
| A16= | 3.7655835E−03 | 2.6445673E−03 | — | — |
| A18= | −7.0271323E−04 | −5.1756579E−04 | — | — |
| A20= | 7.1753382E−05 | 5.5537033E−05 | — | — |
| A22= | −3.0974725E−06 | −2.5100258E−06 | — | — |

In the 3rd embodiment, the equation of the aspheric surface profiles of the aforementioned lens elements is the same as the equation of the 1st embodiment. Also, the definitions of these parameters shown in Table 3D below are the same as those stated in the 1st embodiment with corresponding values for the 3rd embodiment, so an explanation in this regard will not be provided again.

Moreover, these parameters can be calculated from Table 3A and Table 3C as the following values and satisfy the following conditions:

TABLE 3D

| Values of Optical And Physical Parameters/Definitions | | | |
|---|---|---|---|
| fL [mm] | 16.36 | fL/f12 | 1.25 |
| FnoL | 2.80 | \|f1/f2\| | 0.52 |
| HFOVL [deg.] | 9.7 | f4/f3 | −0.01 |
| FOVL [deg.] | 19.4 | fL/R7 + fL/R8 | 13.62 |
| fS [mm] | 15.63 | (R2 + R7)/(R2 − R7) | 0.82 |
| FnoS | 3.12 | (R3 − R6)/(R3 + R6) | 0.52 |
| HFOVS [deg.] | 8.7 | CT1/CT2 | 5.77 |
| FOVS [deg.] | 17.4 | CT1/Dr5r8L | 2.39 |
| FnoL/FnoS | 0.90 | 10 × T34L/CT4 | 0.85 |
| TLS/TLL | 1.06 | 10 × T34L/T45L | 0.47 |
| BLS/BLL | 1.00 | T45L/CT4 | 1.81 |
| 10 × \|TDS − TDL\|/TDL | 2.55 | T45L/CT5 | 1.74 |
| TLL/ImgH | 6.85 | V2 + V4 + V5 | 64.6 |
| BLL/ImgH | 5.11 | Sag3R1L/CT3 | 1.66 |
| TDL/BLL | 0.34 | Y1R1L/Y5R2L | 1.52 |
| fL/f1 | 2.12 | (T23L + Sag3R1L − Sag2R2L)/Y2R2L | 0.23 |
| \|fL/f3\| | 0.01 | — | — |

4th Embodiment

Figure 10:
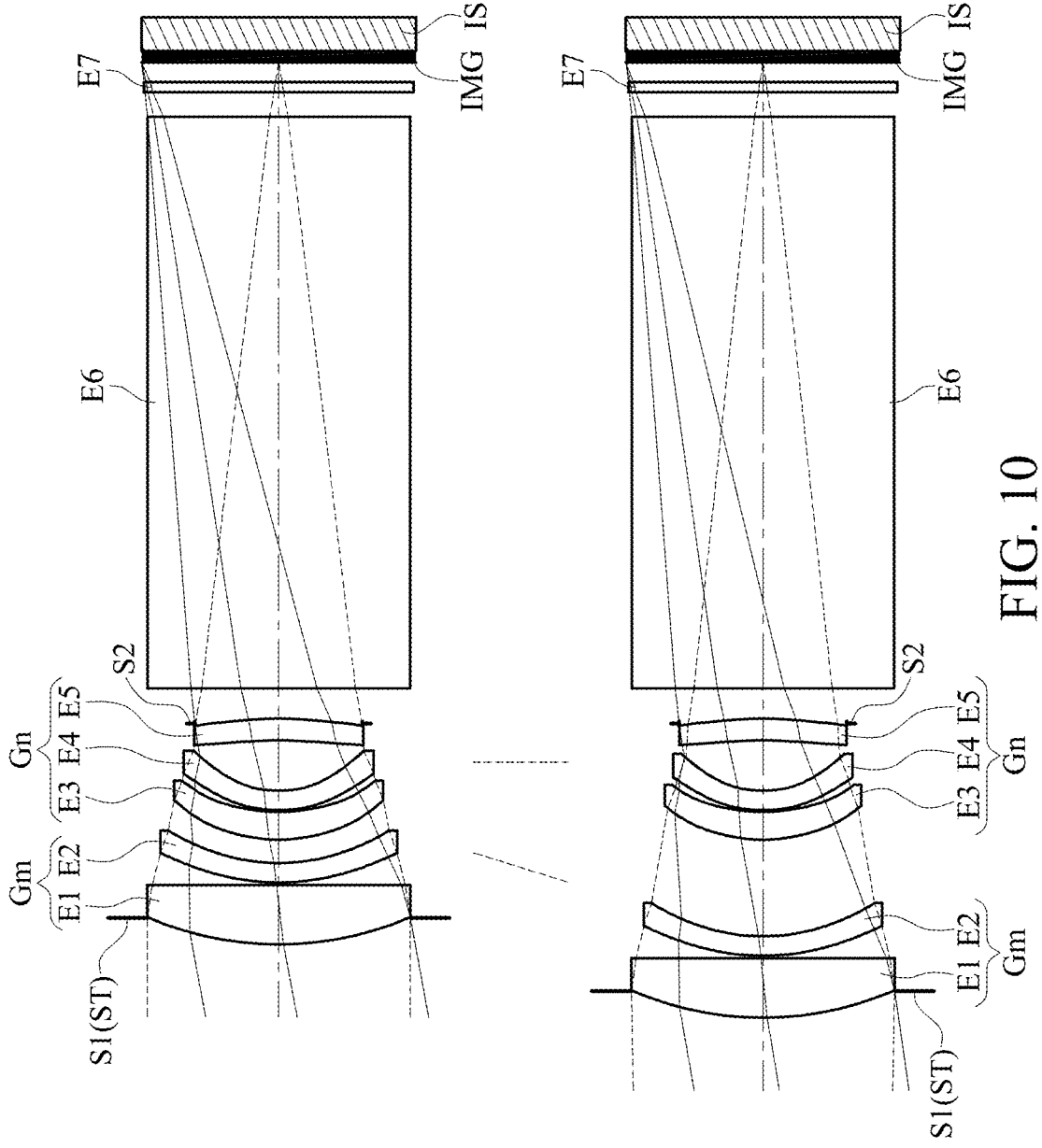
FIG. 10 shows schematic views of an image capturing unit respectively in a first state and a second state according to the 4th embodiment of the present disclosure.
Figure 11:
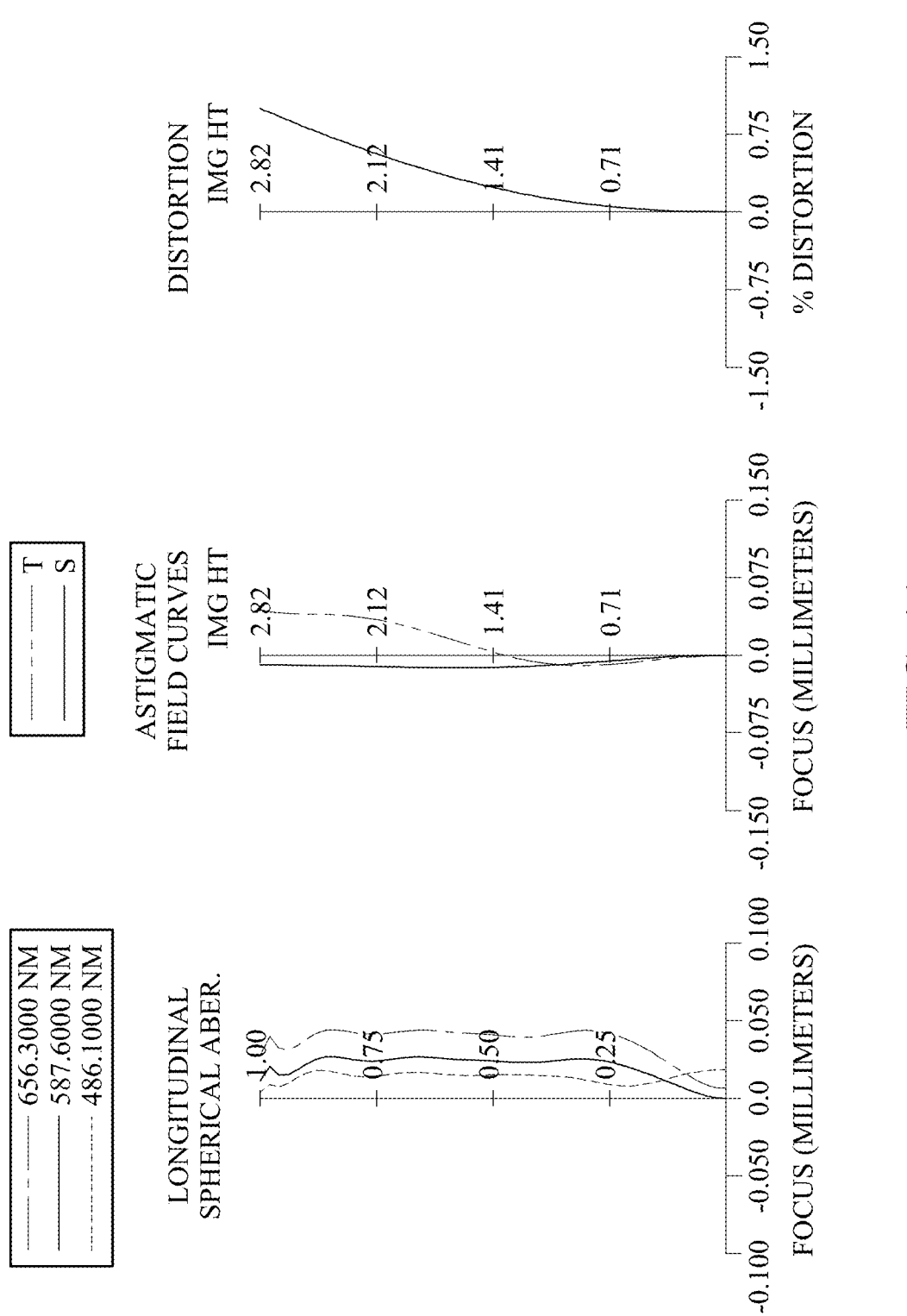
FIG. 11 shows spherical aberration curves, astigmatic field curves and a distortion curve of the image capturing unit in the first state according to the 4th embodiment.
Figure 12:
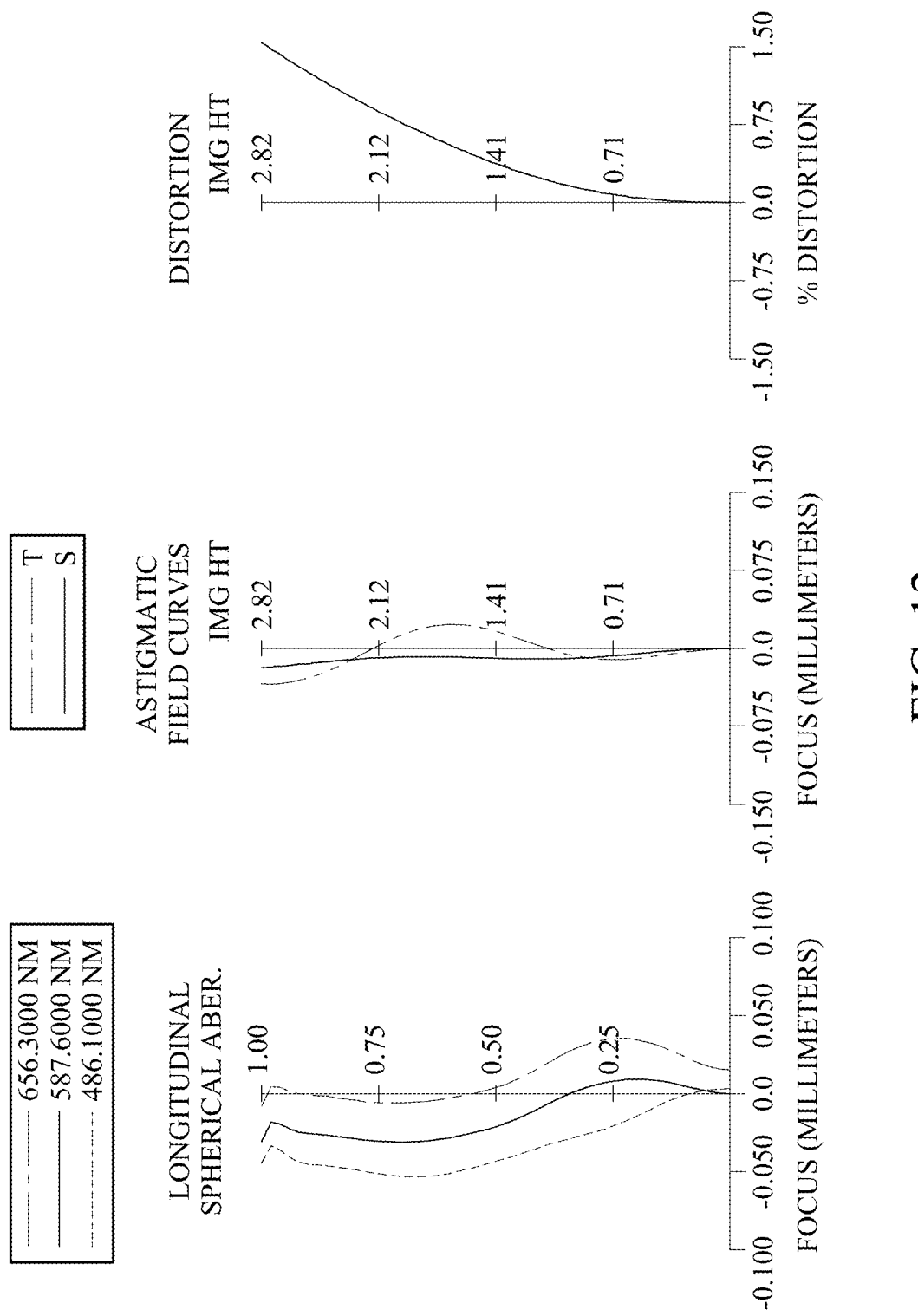
FIG. 12 shows spherical aberration curves, astigmatic field curves and a distortion curve of the image capturing unit in the second state according to the 4th embodiment.

FIG. 10 shows schematic views of an image capturing unit respectively in a first state and a second state according to the 4th embodiment of the present disclosure. FIG. 11 shows, in order from left to right, spherical aberration curves, astigmatic field curves and a distortion curve of the image capturing unit in the first state according to the 4th embodiment. FIG. 12 shows, in order from left to right, spherical aberration curves, astigmatic field curves and a distortion curve of the image capturing unit in the second state according to the 4th embodiment. Moreover, the upper part of FIG. 10 shows the schematic view of the imaging optical lens system in the first state, and the lower part of FIG. 10 shows the schematic view of the imaging optical lens system in the second state. In FIG. 10, the image capturing unit 4 includes the imaging optical lens system (its reference numeral is omitted) of the present disclosure and an image sensor IS. The imaging optical lens system includes, in order from an object side to an image side along an optical axis, a stop S1, a first lens element E1, a second lens element E2, a third lens element E3, a fourth lens element E4, a fifth lens element E5, a stop S2, a reflective element E6, a filter E7 and an image surface IMG. Furthermore, the imaging optical lens system includes, in order from the object side to the image side along a travelling direction of an optical path, a movable lens group Gm and a last lens group Gn, where the movable lens group Gm includes the first lens element E1 and the second lens element E2, and the last lens group Gn includes the third lens element E3, the fourth lens element E4 and the fifth lens element E5. The imaging optical lens system includes five lens elements (E1, E2, E3, E4 and E5) with no additional lens element disposed between each of the adjacent five lens elements. In addition, there is no additional lens element located between the last lens group Gn and the reflective element E6 along the optical axis.

A focal length of the imaging optical lens system is variable by change of an axial distance between the two lens groups (Gm and Gn) in a focus adjustment process. In FIG. 10, the movable lens group Gm is moved along the optical axis relative to the last lens group Gn in the focus adjustment process. Furthermore, the imaging optical lens system can undergo the focus adjustment process to transition to the first state, as shown in the upper part of FIG. 10 or to the second state, as shown in the lower part of FIG. 10. The imaging optical lens system being in the first state refers to a state where an imaged object is at an infinite object distance and an entrance pupil diameter of the imaging optical lens system is at its maximum; the imaging optical lens system being in the second state refers to a state where an imaged object is at a finite object distance. Moreover, the movable lens group Gm is moved toward the object side along the optical axis relative to the last lens group Gn when the imaging optical lens system transitions from the first state to the second state in the focus adjustment process. It is noted that all lens elements in the movable lens group Gm are immovable relative to one another during the focus adjustment process, and all lens elements in the last lens group Gn are immovable relative to one another during the focus adjustment process. In addition, during the focus adjustment process, the reflective element E6 is immovable relative to the last lens group Gn.

The first lens element E1 with positive refractive power has an object-side surface being convex in a paraxial region thereof and an image-side surface being convex in a paraxial region thereof. The first lens element E1 is made of glass material and has the object-side surface and the image-side surface being both spherical.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric.

The third lens element E3 with positive refractive power has an object-side surface being convex in a paraxial region thereof and an image-side surface being concave in a paraxial region thereof. The third lens element E3 is made of plastic material and has the object-side surface and the image-side surface being both aspheric. The object-side surface of the third lens element E3 has one inflection point. The image-side surface of the third lens element E3 has one inflection point.

The fourth lens element E4 with negative refractive power has an object-side surface being convex in a paraxial region thereof and an image-side surface being concave in a paraxial region thereof. The fourth lens element E4 is made of plastic material and has the object-side surface and the image-side surface being both aspheric. The object-side surface of the fourth lens element E4 has one inflection point.

The fifth lens element E5 with negative refractive power has an object-side surface being concave in a paraxial region thereof and an image-side surface being convex in a paraxial region thereof. The fifth lens element E5 is made of plastic material and has the object-side surface and the image-side surface being both aspheric. The object-side surface of the fifth lens element E5 has two inflection points.

The reflective element E6 is made of glass material and located between the fifth lens element E5 and the image surface IMG along the optical axis, and will not affect the focal length of the imaging optical lens system. The reflective element E6 is a prism with an optical path folding function. For simplicity in illustration, FIG. 10 does not show the deflection effect caused by the reflective element E6 on the optical path. However, the reflective element E6 can have various configurations depending on actual design requirements, thereby causing different deflection effects on the optical path. Moreover, the reflective element E6 of this embodiment can have a configuration similar to, for example, one of the configurations shown in FIG. 57 to FIG. 63, which can be referred to foregoing descriptions corresponding to FIG. 57 to FIG. 63, and the details in this regard will not be provided again. Furthermore, the reflective element E6 of this embodiment can have a configuration similar to, for example, the configuration shown in FIG. 54, deflecting the optical path five times, which can be referred to foregoing descriptions corresponding to FIG. 54, and the details in this regard will not be provided again.

The filter E7 is made of glass material and located between the reflective element E6 and the image surface IMG, and will not affect the focal length of the imaging optical lens system. The image sensor IS is disposed on or near the image surface IMG of the imaging optical lens system.

The detailed optical data of the 4th embodiment are shown in Table 4A and Table 4B, and the aspheric surface data are shown in Table 4C below.

TABLE 4B

Values of Optical And Physical Parameters/Definitions

| First State (Infinite Object Distance) | | Second State (Finite Object Distance) | |
| --- | --- | --- | --- |
| fL [mm] | 15.16 | fS [mm] | 14.84 |
| FnoL | 2.80 | FnoS | 3.13 |
| HFOVL [deg.] | 10.4 | HFOVS [deg.] | 9.3 |
| Object Distance [mm] | ∞ | Object Distance [mm] | 150.030 |
| D0 [mm] | ∞ | D0 [mm] | 150.577 |
| D1 [mm] | 0.481 | D1 [mm] | 1.991 |

It should be understood that, in this embodiment, only two moving focus states (i.e., the first state and the second state) are disclosed, but the present disclosure is not limited thereto. Besides the first state and the second state, the imaging optical lens system in this embodiment can also have other moving focus states with different focal lengths between the first state and the second state to accommodate focusing conditions for other object distances.

In Table 4B, the imaging optical lens system undergoes the focus adjustment process according to the change of object distance, and the movable lens group Gm is moved toward the object side along the optical axis relative to the last lens group Gn when the imaging optical lens system transitions from the first state to the second state in the focus adjustment process. Specifically, when the object distance changes from infinite to 150.030 mm, the imaging optical lens system transitions from the first state to the second state, the axial distance D1 between the movable lens group Gm and the last lens group Gn increases from 0.481 mm in the first state to 1.991 mm in the second state, and the reflective element E6 is immovable relative to the last lens group Gn during the focus adjustment process. In other words, when

TABLE 4A

4th Embodiment

| Surface # | | Curvature Radius | | Thickness | Material | Index | Abbe # | Focal Length |
| --- | --- | --- | --- | --- | --- | --- | --- | --- |
| 0 | Object | Plano | | D0 | | | | |
| 1 | Stop | Plano | | −0.547 | | | | |
| 2 | Lens 1 | 6.8181 | (SPH) | 1.227 | Glass | 1.593 | 68.3 | 11.44 |
| 3 | | −1115.5369 | (SPH) | 0.050 | | | | |
| 4 | Lens 2 | 4.8575 | (ASP) | 0.400 | Plastic | 1.669 | 19.5 | −42.25 |
| 5 | | 4.0083 | (ASP) | D1 | | | | |
| 6 | Lens 3 | 3.0696 | (ASP) | 0.574 | Plastic | 1.545 | 56.1 | 27.37 |
| 7 | | 3.6102 | (ASP) | 0.035 | | | | |
| 8 | Lens 4 | 3.2565 | (ASP) | 0.400 | Plastic | 1.639 | 23.5 | −18.57 |
| 9 | | 2.4325 | (ASP) | 1.039 | | | | |
| 10 | Lens 5 | −6.7434 | (ASP) | 0.444 | Plastic | 1.614 | 25.6 | −345.94 |
| 11 | | −7.1390 | (ASP) | −0.100 | | | | |
| 12 | Stop | Plano | | 0.730 | | | | |
| 13 | Prism | Plano | | 11.771 | Glass | 1.516 | 64.1 | — |
| 14 | | Plano | | 0.510 | | | | |
| 15 | Filter | Plano | | 0.210 | Glass | 1.516 | 64.1 | — |
| 16 | | Plano | | 0.406 | | | | |
| 17 | Image | Plano | | — | | | | |

Note:
Reference wavelength is 587.6 nm (d-line).
An effective radius of the stop S1 (Surface 1) is 2.707 mm.
An effective radius of the stop S2 (Surface 12) is 1.724 mm.
The imaging optical lens system can further include an aperture stop ST, and the position of the aperture stop ST can be adjusted depending on the object distance.
In this embodiment, the position of the aperture stop ST is at Surface 1 as the imaging optical lens system is in the first state (corresponding to infinite object distance).
In this embodiment, the position of the aperture stop ST is at Surface 1 as the imaging optical lens system is in the second state (corresponding to finite object distance).

The definitions of these parameters shown in Table 4B are the same as those stated in the 1st embodiment with corresponding values for the 4th embodiment, so an explanation in this regard will not be provided again.

the object distance decreases, the movable lens group Gm is moved toward the object side along the optical axis relative to the last lens group Gn during the focus adjustment process.

TABLE 4C

| Aspheric Coefficients | | | | |
| --- | --- | --- | --- | --- |
| Surface # | 4 | 5 | 6 | 7 |
| k= | 0.0000000E+00 | 0.0000000E+00 | 0.0000000E+00 | 0.0000000E+00 |
| A4= | −4.9739577E−04 | −4.5918337E−04 | −2.1189592E−02 | 2.6203929E−02 |
| A6= | 1.4726087E−03 | 1.7668984E−03 | 3.1394771E−03 | −1.4377967E−01 |
| A8= | −1.8915999E−03 | −2.5381033E−03 | 5.6482201E−03 | 2.3124901E−01 |
| A10= | 1.0463367E−03 | 1.4855778E−03 | −4.0815034E−03 | −2.0869049E−01 |
| A12= | −3.5358676E−04 | −5.0897804E−04 | 1.5913708E−03 | 1.2526050E−01 |
| A14= | 7.9541596E−05 | 1.1018832E−04 | −5.5330417E−04 | −5.2898278E−02 |
| A16= | −1.2262976E−05 | −1.5509070E−05 | 1.9744427E−04 | 1.5871396E−02 |
| A18= | 1.2773614E−06 | 1.4469760E−06 | −5.4610086E−05 | −3.2980053E−03 |
| A20= | −8.2214981E−08 | −8.8639725E−08 | 9.3677279E−06 | 4.4597321E−04 |
| A22= | 2.4664413E−09 | 2.8823696E−09 | −8.6851028E−07 | −3.4750473E−05 |
| A24= | — | — | 3.3194439E−08 | 1.1602736E−06 |

| Surface # | 8 | 9 | 10 | 11 |
| --- | --- | --- | --- | --- |
| k= | −6.4599500E−02 | 0.0000000E+00 | 0.0000000E+00 | 0.0000000E+00 |
| A4= | 1.0121976E−01 | 8.0459804E−02 | 3.0090101E−02 | 1.6800124E−02 |
| A6= | −1.5941446E−01 | −3.9551536E−02 | −4.1988145E−03 | 3.9150476E−03 |
| A8= | 1.9039739E−01 | −1.2844202E−02 | −1.5400879E−02 | −2.4648256E−02 |
| A10= | −1.6243663E−01 | 2.1808591E−02 | 2.4314288E−02 | 3.5519163E−02 |
| A12= | 9.7841932E−02 | −5.7448150E−03 | −1.9848942E−02 | −2.9875396E−02 |
| A14= | −4.2107022E−02 | −5.1523366E−03 | 1.0314812E−02 | 1.6179663E−02 |
| A16= | 1.2821698E−02 | 4.7963132E−03 | −3.5328553E−03 | −5.7118338E−03 |
| A18= | −2.6546495E−03 | −1.7108413E−03 | 7.7539595E−04 | 1.2697575E−03 |
| A20= | 3.4577985E−04 | 2.9525005E−04 | −9.9388839E−05 | −1.6153599E−04 |
| A22= | −2.4409624E−05 | −2.0356635E−05 | 5.6606174E−06 | 8.9713148E−06 |

In the 4th embodiment, the equation of the aspheric surface profiles of the aforementioned lens elements is the same as the equation of the 1st embodiment. Also, the definitions of these parameters shown in Table 4D below are the same as those stated in the 1st embodiment with corresponding values for the 4th embodiment, so an explanation in this regard will not be provided again.

Moreover, these parameters can be calculated from Table 4A and Table 4C as the following values and satisfy the following conditions:

TABLE 4D

| Values of Optical And Physical Parameters/Definitions | | | |
| --- | --- | --- | --- |
| fL [mm] | 15.16 | fL/f12 | 1.05 |
| FnoL | 2.80 | \|f1/f2\| | 0.27 |
| HFOVL [deg.] | 10.4 | f4/f3 | −0.68 |
| FOVL [deg.] | 20.8 | fL/R7 + fL/R8 | 10.89 |
| fS [mm] | 14.84 | (R2 + R7)/(R2 − R7) | 0.99 |
| FnoS | 3.13 | (R3 − R6)/(R3 + R6) | 0.15 |
| HFOVS [deg.] | 9.3 | CT1/CT2 | 3.07 |
| FOVS [deg.] | 18.6 | CT1/Dr5r8L | 1.22 |
| FnoL/FnoS | 0.89 | 10 × T34L/CT4 | 0.88 |
| TLS/TLL | 1.08 | 10 × T34L/T45L | 0.34 |
| BLS/BLL | 1.00 | T45L/CT4 | 2.60 |
| 10 × \|TDS − TDL\|/TDL | 3.25 | T45L/CT5 | 2.34 |
| TLL/ImgH | 6.44 | V2 + V4 + V5 | 68.6 |
| BLL/ImgH | 4.79 | Sag3R1L/CT3 | 1.42 |
| TDL/BLL | 0.34 | Y1R1L/Y5R2L | 1.56 |
| fL/f1 | 1.33 | (T23L + Sag3R1L − Sag2R2L)/Y2R2L | 0.28 |
| \|fL/f3\| | 0.55 | — | — |

5th Embodiment

Figure 13:
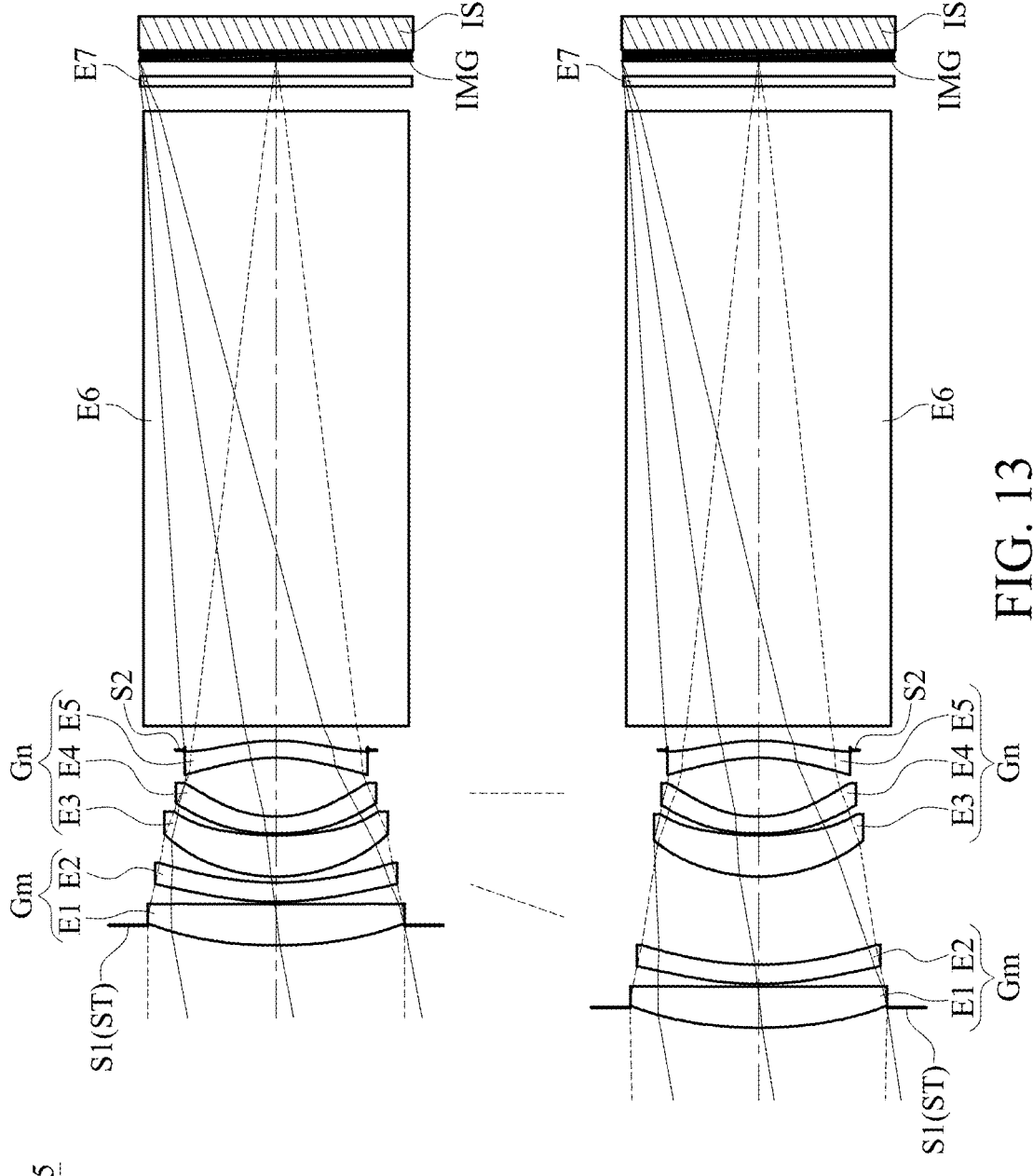
FIG. 13 shows schematic views of an image capturing unit respectively in a first state and a second state according to the 5th embodiment of the present disclosure.
Figure 14:
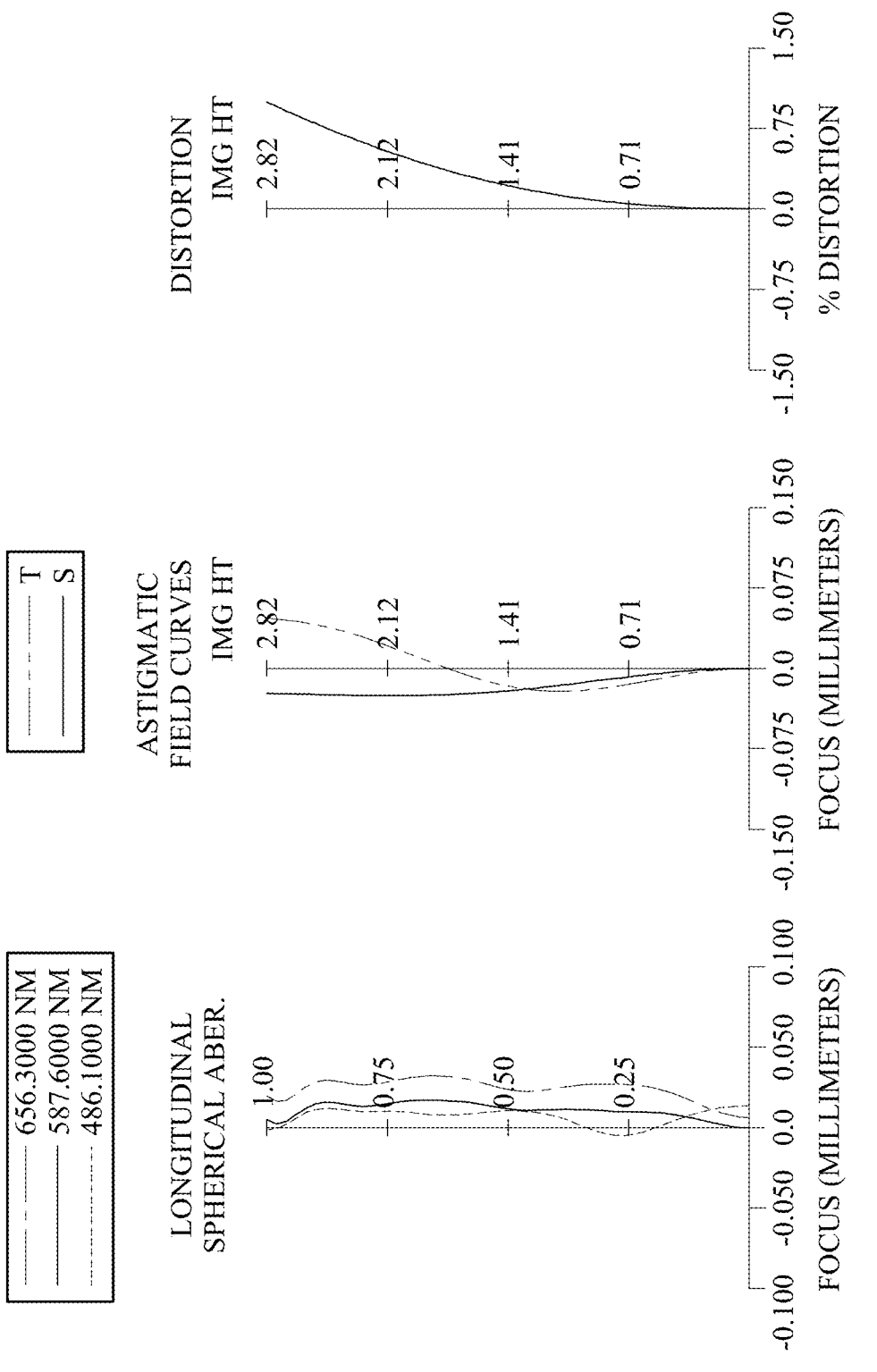
FIG. 14 shows spherical aberration curves, astigmatic field curves and a distortion curve of the image capturing unit in the first state according to the 5th embodiment.
Figure 15:
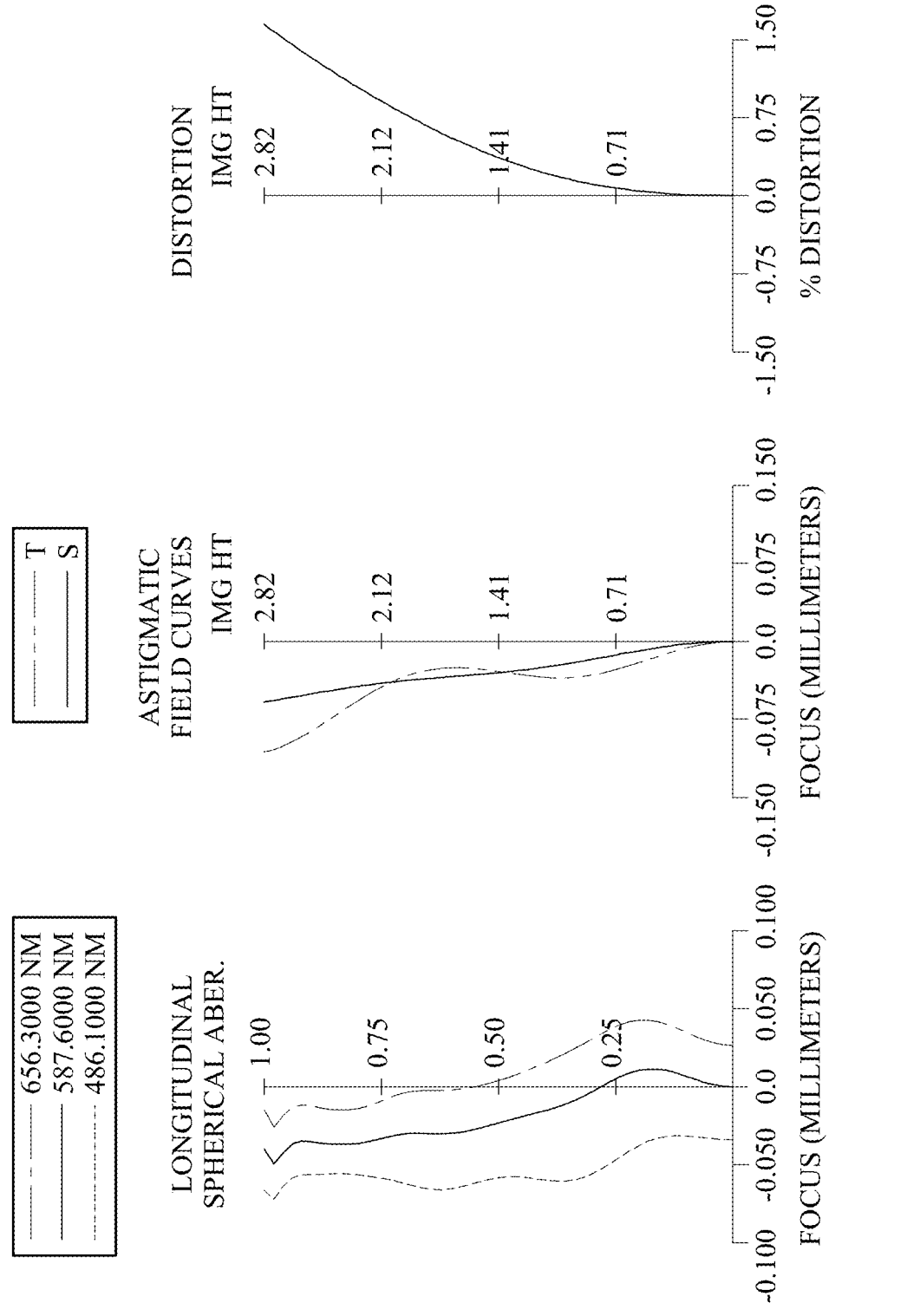
FIG. 15 shows spherical aberration curves, astigmatic field curves and a distortion curve of the image capturing unit in the second state according to the 5th embodiment.

FIG. 13 shows schematic views of an image capturing unit respectively in a first state and a second state according to the 5th embodiment of the present disclosure. FIG. 14 shows, in order from left to right, spherical aberration curves, astigmatic field curves and a distortion curve of the image capturing unit in the first state according to the 5th embodiment. FIG. 15 shows, in order from left to right, spherical aberration curves, astigmatic field curves and a distortion curve of the image capturing unit in the second state according to the 5th embodiment. Moreover, the upper part of FIG. 13 shows the schematic view of the imaging optical lens system in the first state, and the lower part of FIG. 13 shows the schematic view of the imaging optical lens system in the second state. In FIG. 13, the image capturing unit 5 includes the imaging optical lens system (its reference numeral is omitted) of the present disclosure and an image sensor IS. The imaging optical lens system includes, in order from an object side to an image side along an optical axis, a stop S1, a first lens element E1, a second lens element E2, a third lens element E3, a fourth lens element E4, a fifth lens element E5, a stop S2, a reflective element E6, a filter E7 and an image surface IMG. Furthermore, the imaging optical lens system includes, in order from the object side to the image side along a travelling direction of an optical path, a movable lens group Gm and a last lens group Gn, where the movable lens group Gm includes the first lens element E1 and the second lens element E2, and the last lens group Gn includes the third lens element E3, the fourth lens element E4 and the fifth lens element E5. The imaging optical lens system includes five lens elements (E1, E2, E3, E4 and E5) with no additional lens element disposed between each of the adjacent five lens elements. In addition, there is no additional lens element located between the last lens group Gn and the reflective element E6 along the optical axis.

A focal length of the imaging optical lens system is variable by change of an axial distance between the two lens groups (Gm and Gn) in a focus adjustment process. In FIG. 13, the movable lens group Gm is moved along the optical axis relative to the last lens group Gn in the focus adjustment process. Furthermore, the imaging optical lens system can undergo the focus adjustment process to transition to the first state, as shown in the upper part of FIG. 13 or to the second state, as shown in the lower part of FIG. 13. The imaging optical lens system being in the first state refers to a state where an imaged object is at an infinite object distance and an entrance pupil diameter of the imaging optical lens system is at its maximum; the imaging optical lens system being in the second state refers to a state where an imaged object is at a finite object distance. Moreover, the movable lens group Gm is moved toward the object side along the optical axis relative to the last lens group Gn when the imaging optical lens system transitions from the first state to the second state in the focus adjustment process. It is noted that all lens elements in the movable lens group Gm are immovable relative to one another during the focus adjustment process, and all lens elements in the last lens group Gn are immovable relative to one another during the focus adjustment process. In addition, during the focus adjustment process, the reflective element E6 is immovable relative to the last lens group Gn.

The first lens element E1 with positive refractive power has an object-side surface being convex in a paraxial region thereof and an image-side surface being concave in a paraxial region thereof. The first lens element E1 is made of glass material and has the object-side surface and the image-side surface being both aspheric. The image-side surface of the first lens element E1 has four inflection points. The image-side surface of the first lens element E1 has one convex critical point and one concave critical point in an off-axis region thereof.

The second lens element E2 with positive refractive power has an object-side surface being convex in a paraxial region thereof and an image-side surface being concave in a paraxial region thereof. The second lens element E2 is made of plastic material and has the object-side surface and the image-side surface being both aspheric. The object-side surface of the second lens element E2 has two inflection points.

The third lens element E3 with positive refractive power has an object-side surface being convex in a paraxial region thereof and an image-side surface being concave in a paraxial region thereof. The third lens element E3 is made of plastic material and has the object-side surface and the image-side surface being both aspheric. The object-side surface of the third lens element E3 has one inflection point. The image-side surface of the third lens element E3 has one inflection point.

The fourth lens element E4 with negative refractive power has an object-side surface being convex in a paraxial region thereof and an image-side surface being concave in a paraxial region thereof. The fourth lens element E4 is made of plastic material and has the object-side surface and the image-side surface being both aspheric. The object-side surface of the fourth lens element E4 has one inflection point. The image-side surface of the fourth lens element E4 has two inflection points.

The fifth lens element E5 with negative refractive power has an object-side surface being concave in a paraxial region thereof and an image-side surface being convex in a paraxial region thereof. The fifth lens element E5 is made of plastic material and has the object-side surface and the image-side surface being both aspheric. The object-side surface of the fifth lens element E5 has one inflection point. The image-side surface of the fifth lens element E5 has one inflection point. The image-side surface of the fifth lens element E5 has one concave critical point in an off-axis region thereof.

The reflective element E6 is made of plastic material and located between the fifth lens element E5 and the image surface IMG along the optical axis, and will not affect the focal length of the imaging optical lens system. The reflective element E6 is a prism with an optical path folding function. For simplicity in illustration, FIG. 13 does not show the deflection effect caused by the reflective element E6 on the optical path. However, the reflective element E6 can have various configurations depending on actual design requirements, thereby causing different deflection effects on the optical path. Moreover, the reflective element E6 of this embodiment can have a configuration similar to, for example, one of the configurations shown in FIG. 57 to FIG. 63, which can be referred to foregoing descriptions corresponding to FIG. 57 to FIG. 63, and the details in this regard will not be provided again. Furthermore, the reflective element E6 of this embodiment can have a configuration similar to, for example, the configuration shown in FIG. 54, deflecting the optical path five times, which can be referred to foregoing descriptions corresponding to FIG. 54, and the details in this regard will not be provided again.

The filter E7 is made of glass material and located between the reflective element E6 and the image surface IMG, and will not affect the focal length of the imaging optical lens system. The image sensor IS is disposed on or near the image surface IMG of the imaging optical lens system.

The detailed optical data of the 5th embodiment are shown in Table 5A and Table 5B, and the aspheric surface data are shown in Table 5C below.

TABLE 5A

| 5th Embodiment | | | | | | | |
|---|---|---|---|---|---|---|---|
| Surface # | | Curvature Radius | Thickness | Material | Index | Abbe # | Focal Length |
| 0 | Object | Plano | D0 | | | | |
| 1 | Stop | Plano | −0.417 | | | | |
| 2 | Lens 1 | 9.4478 (ASP) | 0.850 | Glass | 1.589 | 61.3 | 17.72 |
| 3 | | 96.2824 (ASP) | 0.050 | | | | |
| 4 | Lens 2 | 6.0793 (ASP) | 0.400 | Plastic | 1.614 | 25.6 | 136.08 |
| 5 | | 6.3926 (ASP) | D1 | | | | |
| 6 | Lens 3 | 3.3687 (ASP) | 0.855 | Plastic | 1.545 | 56.1 | 10.19 |
| 7 | | 7.8032 (ASP) | 0.035 | | | | |
| 8 | Lens 4 | 5.5487 (ASP) | 0.354 | Plastic | 1.614 | 25.6 | −10.32 |
| 9 | | 2.8851 (ASP) | 1.212 | | | | |
| 10 | Lens 5 | −3.2828 (ASP) | 0.350 | Plastic | 1.639 | 23.5 | −36.26 |
| 11 | | −3.9840 (ASP) | −0.194 | | | | |
| 12 | Stop | Plano | 0.500 | | | | |
| 13 | Prism | Plano | 12.700 | Plastic | 1.534 | 56.0 | — |
| 14 | | Plano | 0.510 | | | | |
| 15 | Filter | Plano | 0.210 | Glass | 1.516 | 64.1 | — |

TABLE 5A-continued

| | | 5th Embodiment | | | | | |
|---|---|---|---|---|---|---|---|
| Surface # | | Curvature Radius | Thickness | Material | Index | Abbe # | Focal Length |
| 16 | | Plano | 0.308 | | | | |
| 17 | Image | Plano | — | | | | |

Note:
Reference wavelength is 587.6 nm (d-line).
An effective radius of the stop S1 (Surface 1) is 2.653 mm.
An effective radius of the stop S2 (Surface 12) is 1.890 mm.
The imaging optical lens system can further include an aperture stop ST, and the position of the aperture stop ST can be adjusted depending on the object distance.
In this embodiment, the position of the aperture stop ST is at Surface 1 as the imaging optical lens system is in the first state (corresponding to infinite object distance).
In this embodiment, the position of the aperture stop ST is at Surface 1 as the imaging optical lens system is in the second state (corresponding to finite object distance).

The definitions of these parameters shown in Table 5B are the same as those stated in the 1st embodiment with corresponding values for the 5th embodiment, so an explanation in this regard will not be provided again.

TABLE 5B

| Values of Optical And Physical Parameters/Definitions | | | |
|---|---|---|---|
| First State (Infinite Object Distance) | | Second State (Finite Object Distance) | |
| fL [mm] | 14.85 | fS [mm] | 14.63 |
| FnoL | 2.80 | FnoS | 3.14 |
| HFOVL [deg.] | 10.6 | HFOVS [deg.] | 9.5 |
| Object Distance [mm] | ∞ | Object Distance [mm] | 150.100 |
| D0 [mm] | ∞ | D0 [mm] | 150.517 |
| D1 [mm] | 0.120 | D1 [mm] | 1.820 |

It should be understood that, in this embodiment, only two moving focus states (i.e., the first state and the second state) are disclosed, but the present disclosure is not limited thereto. Besides the first state and the second state, the imaging optical lens system in this embodiment can also have other moving focus states with different focal lengths between the first state and the second state to accommodate focusing conditions for other object distances.

In Table 5B, the imaging optical lens system undergoes the focus adjustment process according to the change of object distance, and the movable lens group Gm is moved toward the object side along the optical axis relative to the last lens group Gn when the imaging optical lens system transitions from the first state to the second state in the focus adjustment process. Specifically, when the object distance changes from infinite to 150.100 mm, the imaging optical lens system transitions from the first state to the second state, the axial distance D1 between the movable lens group Gm and the last lens group Gn increases from 0.120 mm in the first state to 1.820 mm in the second state, and the reflective element E6 is immovable relative to the last lens group Gn during the focus adjustment process. In other words, when the object distance decreases, the movable lens group Gm is moved toward the object side along the optical axis relative to the last lens group Gn during the focus adjustment process.

TABLE 5C

| | Aspheric Coefficients | | | |
|---|---|---|---|---|
| Surface # | 2 | 3 | 4 | 5 |
| k= | 5.6926900E+00 | −9.9000000E+01 | −2.0708400E+00 | 1.8843400E+00 |
| A4= | −6.2149730E−05 | −1.0255168E−02 | −9.8648174E−03 | −6.8314522E−04 |
| A6= | 1.8831559E−03 | 1.3123719E−02 | 6.9271558E−03 | −5.1171320E−03 |
| A8= | −1.2840412E−03 | −1.0024663E−02 | −5.1921356E−03 | 4.3803116E−03 |
| A10= | 3.9086913E−04 | 4.8316293E−03 | 2.4414214E−03 | −2.4500059E−03 |
| A12= | −4.5161442E−05 | −1.4651545E−03 | −4.8885772E−04 | 1.1222819E−03 |
| A14= | −4.7051658E−06 | 2.7542202E−04 | −4.9958491E−05 | −4.0358111E−04 |
| A16= | 1.9600270E−06 | −3.0990217E−05 | 4.4356713E−05 | 9.8437627E−05 |
| A18= | −2.0847880E−07 | 1.9067147E−06 | −8.8006575E−06 | −1.4650586E−05 |
| A20= | 7.7446597E−09 | −4.9213374E−08 | 7.7997750E−07 | 1.1898366E−06 |
| A22= | — | — | −2.6724404E−08 | −4.0336200E−08 |

| Surface # | 6 | 7 | 8 | 9 |
|---|---|---|---|---|
| k= | −2.3954300E−01 | 1.8195200E−01 | 1.3847900E+00 | −4.6704200E−01 |
| A4= | −3.8627385E−03 | 6.6773204E−02 | 9.5379998E−02 | 4.1553303E−02 |
| A6= | −6.5946375E−03 | −1.2581698E−01 | −1.0255575E−01 | 5.4759313E−03 |
| A8= | 1.0824335E−02 | 1.1584442E−01 | 4.9066180E−02 | −5.4258558E−02 |
| A10= | −1.0290120E−02 | −5.7933458E−02 | 1.3465767E−02 | 6.2889398E−02 |
| A12= | 7.0324768E−03 | 1.6817476E−02 | −3.2561598E−02 | −4.2445740E−02 |
| A14= | −3.2957218E−03 | −3.0361815E−03 | 2.0297199E−02 | 1.8315815E−02 |
| A16= | 1.0324587E−03 | 5.3104415E−04 | −7.0040643E−03 | −4.9905792E−03 |
| A18= | −2.1185068E−04 | −1.4669712E−04 | 1.4908023E−03 | 8.1663693E−04 |

TABLE 5C-continued

| | | Aspheric Coefficients | | |
|---|---|---|---|
| A20= | 2.7299351E−05 | 3.3052410E−05 | −1.9695008E−04 | −7.2206172E−05 |
| A22= | −2.0023893E−06 | −3.9091113E−06 | 1.5034482E−05 | 2.6115575E−06 |
| A24= | 6.3692327E−08 | 1.8238219E−07 | −5.1421613E−07 | — |

| Surface # | 10 | 11 | — | — |
|---|---|---|---|---|
| k= | 6.1886600E−04 | −1.0819300E+00 | — | — |
| A4= | 2.7831723E−02 | 1.8817057E−02 | — | — |
| A6= | 9.8589686E−03 | 1.2359857E−02 | — | — |
| A8= | −2.4456875E−02 | −2.6256038E−02 | — | — |
| A10= | 2.3039285E−02 | 2.7198211E−02 | — | — |
| A12= | −1.4079988E−02 | −1.8595607E−02 | — | — |
| A14= | 5.9900390E−03 | 8.7676461E−03 | — | — |
| A16= | −1.7218213E−03 | −2.7743802E−03 | — | — |
| A18= | 3.1178523E−04 | 5.5598377E−04 | — | — |
| A20= | −3.1795482E−05 | −6.3341306E−05 | — | — |
| A22= | 1.3943130E−06 | 3.1166709E−06 | — | — |

In the 5th embodiment, the equation of the aspheric surface profiles of the aforementioned lens elements is the same as the equation of the 1st embodiment. Also, the definitions of these parameters shown in Table 5D below are the same as those stated in the 1st embodiment with corresponding values for the 5th embodiment, so an explanation in this regard will not be provided again.

Moreover, these parameters can be calculated from Table 5A and Table 5C as the following values and satisfy the following conditions:

TABLE 5D

| Values of Optical And Physical Parameters/Definitions | | | |
|---|---|---|---|
| fL [mm] | 14.85 | fL/f12 | 0.96 |
| FnoL | 2.80 | |f1/f2| | 0.13 |
| HFOVL [deg.] | 10.6 | f4/f3 | −1.01 |
| FOVL [deg.] | 21.2 | fL/R7 + fL/R8 | 7.82 |
| fS [mm] | 14.63 | (R2 + R7)/(R2 − R7) | 1.12 |
| FnoS | 3.14 | (R3 − R6)/(R3 + R6) | −0.12 |
| HFOVS [deg.] | 9.5 | CT1/CT2 | 2.13 |
| FOVS [deg.] | 19.0 | CT1/Dr5r8L | 0.68 |
| FnoL/FnoS | 0.89 | 10 × T34L/CT4 | 0.99 |
| TLS/TLL | 1.09 | 10 × T34L/T45L | 0.29 |
| BLS/BLL | 1.00 | T45L/CT4 | 3.42 |
| 10 × |TDS − TDL|/TDL | 4.02 | T45L/CT5 | 3.46 |
| TLL/ImgH | 6.47 | V2 + V4 + V5 | 74.7 |
| BLL/ImgH | 4.97 | Sag3R1L/CT3 | 1.10 |
| TDL/BLL | 0.30 | Y1R1L/Y5R2L | 1.40 |
| fL/f1 | 0.84 | (T23L + Sag3R1L − Sag2R2L)/Y2R2L | 0.26 |
| |fL/f3| | 1.46 | — | — |

6th Embodiment

Figure 16:
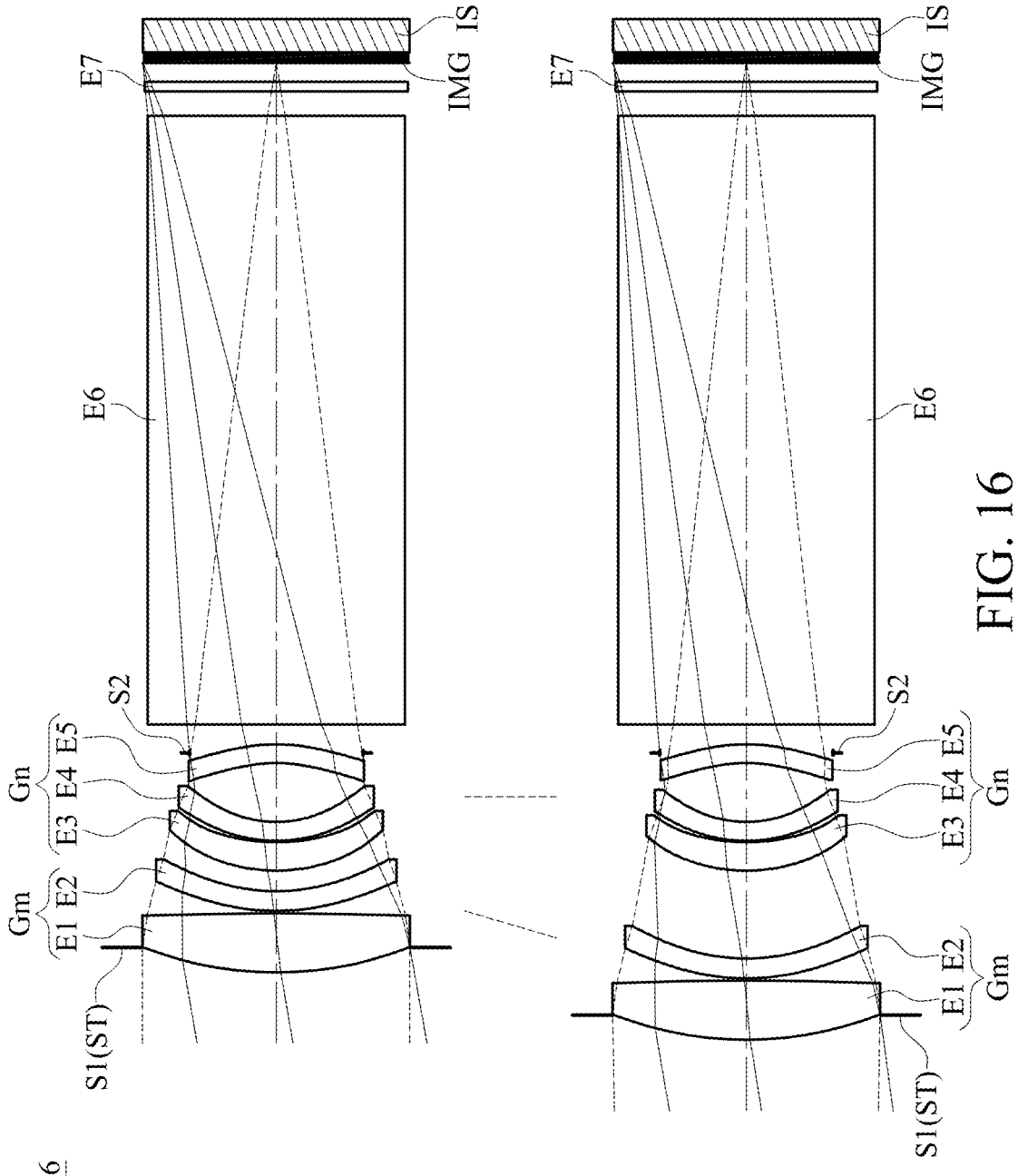
FIG. 16 shows schematic views of an image capturing unit respectively in a first state and a second state according to the 6th embodiment of the present disclosure.
Figure 17:
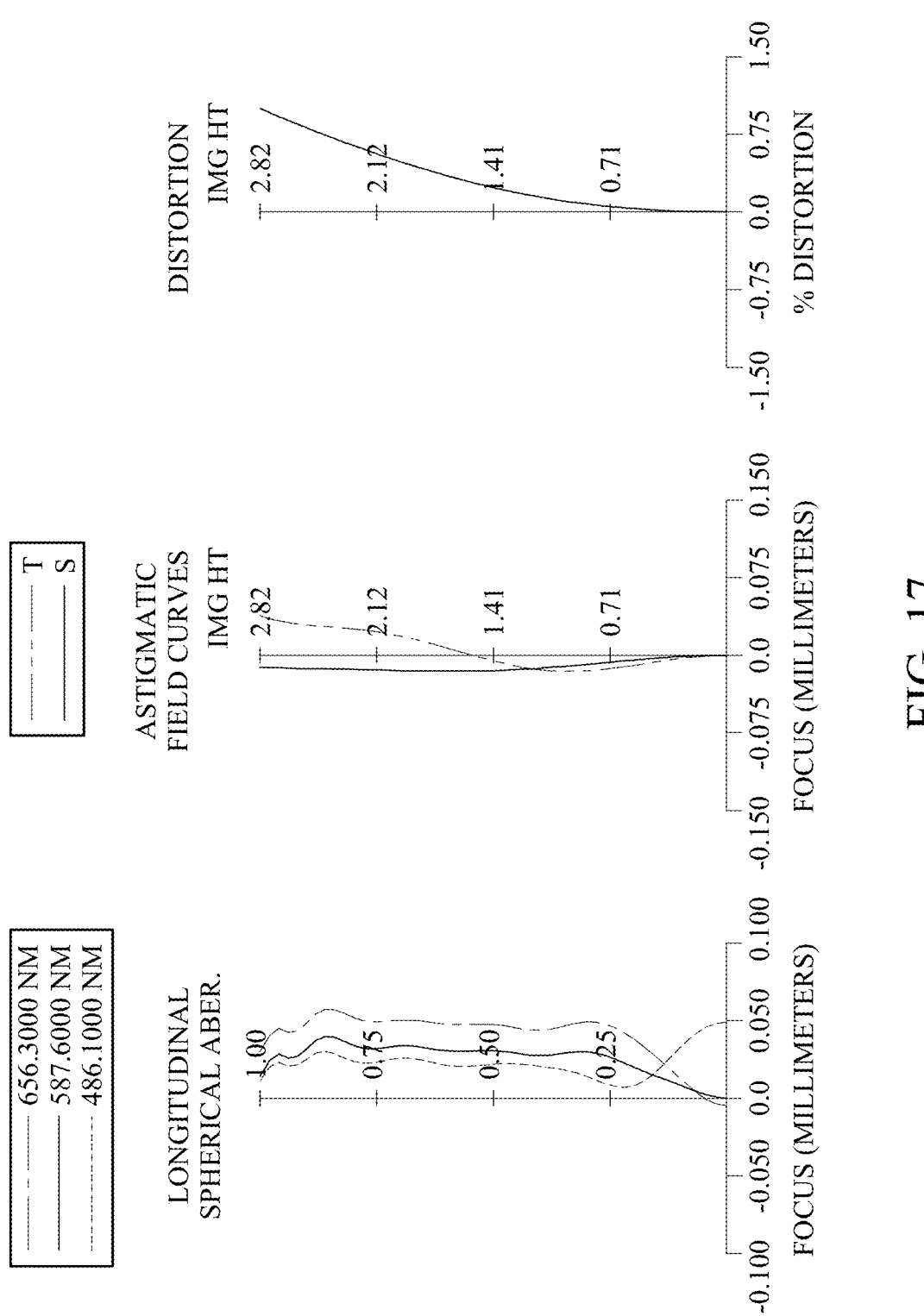
FIG. 17 shows spherical aberration curves, astigmatic field curves and a distortion curve of the image capturing unit in the first state according to the 6th embodiment.
Figure 18:
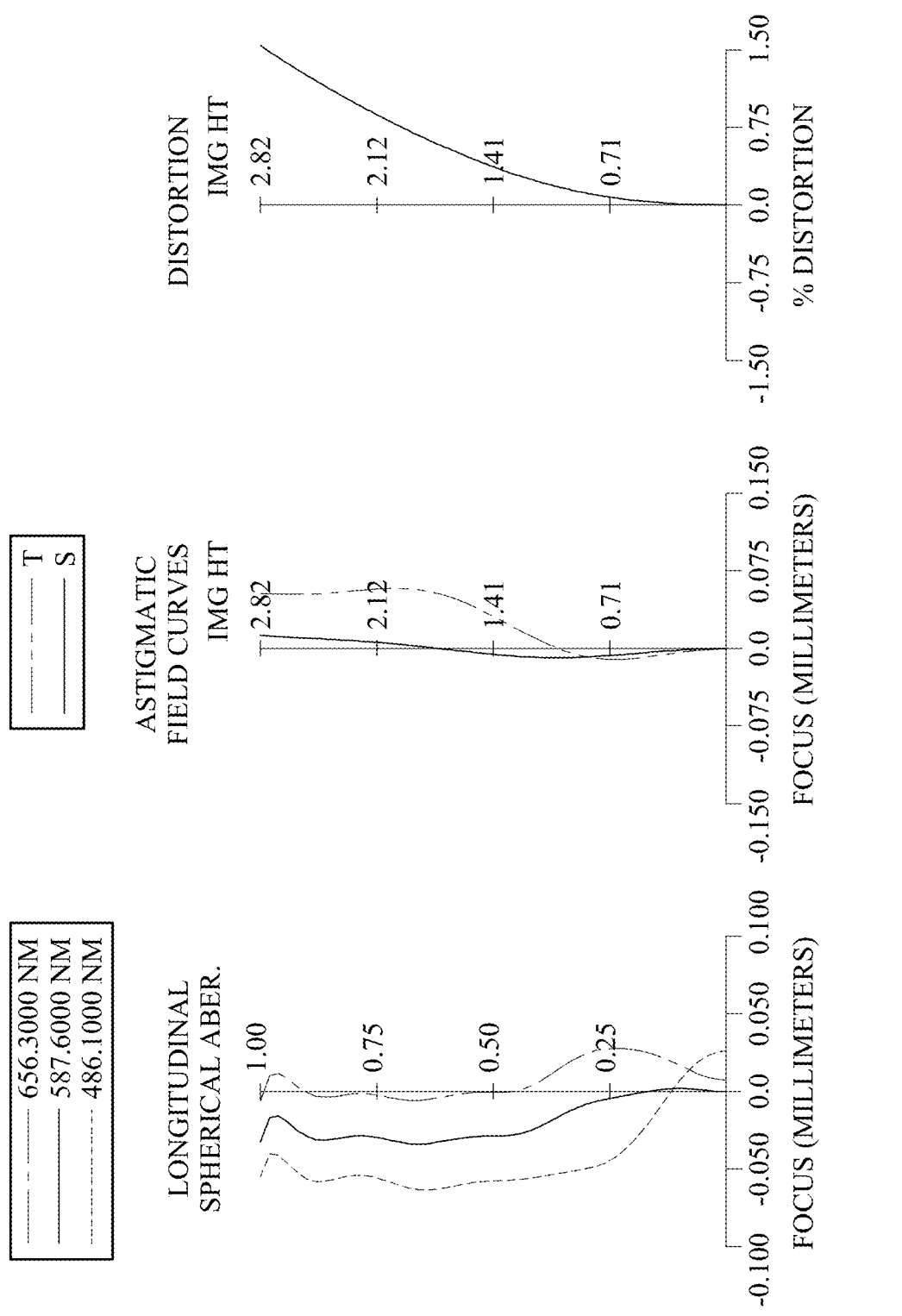
FIG. 18 shows spherical aberration curves, astigmatic field curves and a distortion curve of the image capturing unit in the second state according to the 6th embodiment.

FIG. 16 shows schematic views of an image capturing unit respectively in a first state and a second state according to the 6th embodiment of the present disclosure. FIG. 17 shows, in order from left to right, spherical aberration curves, astigmatic field curves and a distortion curve of the image capturing unit in the first state according to the 6th embodiment. FIG. 18 shows, in order from left to right, spherical aberration curves, astigmatic field curves and a distortion curve of the image capturing unit in the second state according to the 6th embodiment. Moreover, the upper part of FIG. 16 shows the schematic view of the imaging optical lens system in the first state, and the lower part of FIG. 16 shows the schematic view of the imaging optical lens system in the second state. In FIG. 16, the image capturing unit 6 includes the imaging optical lens system (its reference numeral is omitted) of the present disclosure and an image sensor IS. The imaging optical lens system includes, in order from an object side to an image side along an optical axis, a stop S1, a first lens element E1, a second lens element E2, a third lens element E3, a fourth lens element E4, a fifth lens element E5, a stop S2, a reflective element E6, a filter E7 and an image surface IMG. Furthermore, the imaging optical lens system includes, in order from the object side to the image side along a travelling direction of an optical path, a movable lens group Gm and a last lens group Gn, where the movable lens group Gm includes the first lens element E1 and the second lens element E2, and the last lens group Gn includes the third lens element E3, the fourth lens element E4 and the fifth lens element E5. The imaging optical lens system includes five lens elements (E1, E2, E3, E4 and E5) with no additional lens element disposed between each of the adjacent five lens elements. In addition, there is no additional lens element located between the last lens group Gn and the reflective element E6 along the optical axis.

A focal length of the imaging optical lens system is variable by change of an axial distance between the two lens groups (Gm and Gn) in a focus adjustment process. In FIG. 16, the movable lens group Gm is moved along the optical axis relative to the last lens group Gn in the focus adjustment process. Furthermore, the imaging optical lens system can undergo the focus adjustment process to transition to the first state, as shown in the upper part of FIG. 16 or to the second state, as shown in the lower part of FIG. 16. The imaging optical lens system being in the first state refers to a state where an imaged object is at an infinite object distance and an entrance pupil diameter of the imaging optical lens system is at its maximum; the imaging optical lens system being in the second state refers to a state where an imaged object is at a finite object distance. Moreover, the movable lens group Gm is moved toward the object side along the optical axis relative to the last lens group Gn when the imaging optical lens system transitions from the first state to the second state in the focus adjustment process. It is noted that all lens elements in the movable lens group Gm are immovable relative to one another during the focus adjustment process, and all lens elements in the last lens group Gn are immovable relative to one another during the focus adjustment process. In addition, during the focus adjustment process, the reflective element E6 is immovable relative to the last lens group Gn.

The first lens element E1 with positive refractive power has an object-side surface being convex in a paraxial region thereof and an image-side surface being convex in a paraxial region thereof. The first lens element E1 is made of glass material and has the object-side surface and the image-side surface being both spherical.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric.

The third lens element E3 with positive refractive power has an object-side surface being convex in a paraxial region thereof and an image-side surface being concave in a paraxial region thereof. The third lens element E3 is made of plastic material and has the object-side surface and the image-side surface being both aspheric. The object-side surface of the third lens element E3 has one inflection point. The image-side surface of the third lens element E3 has one inflection point.

The fourth lens element E4 with negative refractive power has an object-side surface being convex in a paraxial region thereof and an image-side surface being concave in a paraxial region thereof. The fourth lens element E4 is made of plastic material and has the object-side surface and the image-side surface being both aspheric.

The fifth lens element E5 with negative refractive power has an object-side surface being concave in a paraxial region The reflective element E6 is made of glass material and located between the fifth lens element E5 and the image surface IMG along the optical axis, and will not affect the focal length of the imaging optical lens system. The reflective element E6 is a prism with an optical path folding function. For simplicity in illustration, FIG. 16 does not show the deflection effect caused by the reflective element E6 on the optical path. However, the reflective element E6 can have various configurations depending on actual design requirements, thereby causing different deflection effects on the optical path. Moreover, the reflective element E6 of this embodiment can have a configuration similar to, for example, one of the configurations shown in FIG. 57 to FIG. 63, which can be referred to foregoing descriptions corresponding to FIG. 57 to FIG. 63, and the details in this regard will not be provided again. Furthermore, the reflective element E6 of this embodiment can have a configuration similar to, for example, the configuration shown in FIG. 54, deflecting the optical path five times, which can be referred to foregoing descriptions corresponding to FIG. 54, and the details in this regard will not be provided again.

The filter E7 is made of glass material and located between the reflective element E6 and the image surface IMG, and will not affect the focal length of the imaging optical lens system. The image sensor IS is disposed on or near the image surface IMG of the imaging optical lens system.

The detailed optical data of the 6th embodiment are shown in Table 6A and Table 6B, and the aspheric surface data are shown in Table 6C below.

TABLE 6A

| | | | | | | | |
|---|---|---|---|---|---|---|---|
| | | | 6th Embodiment | | | | |
| Surface # | | Curvature Radius | Thickness | Material | Index | Abbe # | Focal Length |
| 0 | Object | Plano | D0 | | | | |
| 1 | Stop | Plano | −0.528 | | | | |
| 2 | Lens 1 | 7.6934 (SPH) | 1.257 | Glass | 1.593 | 68.3 | 11.79 |
| 3 | | −71.6869 (SPH) | 0.050 | | | | |
| 4 | Lens 2 | 4.8441 (ASP) | 0.419 | Plastic | 1.669 | 19.5 | −52.89 |
| 5 | | 4.1131 (ASP) | D1 | | | | |
| 6 | Lens 3 | 3.3875 (ASP) | 0.604 | Plastic | 1.545 | 56.1 | 19.26 |
| 7 | | 4.6872 (ASP) | 0.035 | | | | |
| 8 | Lens 4 | 4.3303 (ASP) | 0.400 | Plastic | 1.614 | 25.6 | −15.73 |
| 9 | | 2.8844 (ASP) | 1.243 | | | | |
| 10 | Lens 5 | −3.2317 (ASP) | 0.400 | Plastic | 1.669 | 19.5 | −66.81 |
| 11 | | −3.6564 (ASP) | −0.180 | | | | |
| 12 | Stop | Plano | 0.600 | | | | |
| 13 | Prism | Plano | 12.912 | Glass | 1.516 | 64.1 | — |
| 14 | | Plano | 0.510 | | | | |
| 15 | Filter | Plano | 0.210 | Glass | 1.516 | 64.1 | — |
| 16 | | Plano | 0.399 | | | | |
| 17 | Image | Plano | — | | | | |

Note:
Reference wavelength is 587.6 nm (d-line).
An effective radius of the stop S1 (Surface 1) is 2.835 mm.
An effective radius of the stop S2 (Surface 12) is 1.835 mm.
The imaging optical lens system can further include an aperture stop ST, and the position of the aperture stop ST can be adjusted depending on the object distance.
In this embodiment, the position of the aperture stop ST is at Surface 1 as the imaging optical lens system is in the first state (corresponding to infinite object distance).
In this embodiment, the position of the aperture stop ST is at Surface 1 as the imaging optical lens system is in the second state (corresponding to finite object distance).

thereof and an image-side surface being convex in a paraxial region thereof. The fifth lens element E5 is made of plastic material and has the object-side surface and the image-side surface being both aspheric.

The definitions of these parameters shown in Table 6B are the same as those stated in the 1st embodiment with corresponding values for the 6th embodiment, so an explanation in this regard will not be provided again.

TABLE 6B

| Values of Optical And Physical Parameters/Definitions | | | |
|---|---|---|---|
| First State (Infinite Object Distance) | | Second State (Finite Object Distance) | |
| fL [mm] | 15.87 | fS [mm] | 15.42 |
| FnoL | 2.80 | FnoS | 3.12 |
| HFOVL [deg.] | 10.0 | HFOVS [deg.] | 9.0 |
| Object Distance [mm] | ∞ | Object Distance [mm] | 150.029 |
| D0 [mm] | ∞ | D0 [mm] | 150.557 |
| D1 [mm] | 0.433 | D1 [mm] | 1.863 |

It should be understood that, in this embodiment, only two moving focus states (i.e., the first state and the second state) are disclosed, but the present disclosure is not limited thereto. Besides the first state and the second state, the imaging optical lens system in this embodiment can also have other moving focus states with different focal lengths between the first state and the second state to accommodate focusing conditions for other object distances.

In Table 6B, the imaging optical lens system undergoes the focus adjustment process according to the change of object distance, and the movable lens group Gm is moved toward the object side along the optical axis relative to the last lens group Gn when the imaging optical lens system transitions from the first state to the second state in the focus adjustment process. Specifically, when the object distance changes from infinite to 150.029 mm, the imaging optical lens system transitions from the first state to the second state, the axial distance D1 between the movable lens group Gm and the last lens group Gn increases from 0.433 mm in the first state to 1.863 mm in the second state, and the reflective element E6 is immovable relative to the last lens group Gn during the focus adjustment process. In other words, when the object distance decreases, the movable lens group Gm is moved toward the object side along the optical axis relative to the last lens group Gn during the focus adjustment process.

In the 6th embodiment, the equation of the aspheric surface profiles of the aforementioned lens elements is the same as the equation of the 1st embodiment. Also, the definitions of these parameters shown in Table 6D below are the same as those stated in the 1st embodiment with corresponding values for the 6th embodiment, so an explanation in this regard will not be provided again.

Moreover, these parameters can be calculated from Table 6A and Table 6C as the following values and satisfy the following conditions:

TABLE 6D

| Values of Optical And Physical Parameters/Definitions | | | |
|---|---|---|---|
| fL [mm] | 15.87 | fL/f12 | 1.12 |
| FnoL | 2.80 | \|f1/f2\| | 0.22 |
| HFOVL [deg.] | 10.0 | f4/f3 | −0.82 |
| FOVL [deg.] | 20.0 | fL/R7 + fL/R8 | 9.17 |
| fS [mm] | 15.42 | (R2 + R7)/(R2 − R7) | 0.89 |
| FnoS | 3.12 | (R3 − R6)/(R3 + R6) | 0.02 |
| HFOVS [deg.] | 9.0 | CT1/CT2 | 3.00 |
| FOVS [deg.] | 18.0 | CT1/Dr5r8L | 1.21 |
| FnoL/FnoS | 0.90 | 10 × T34L/CT4 | 0.88 |
| TLS/TLL | 1.07 | 10 × T34L/T45L | 0.28 |
| BLS/BLL | 1.00 | T45L/CT4 | 3.11 |
| 10 × \|TDS − TDL\|/TDL | 2.95 | T45L/CT5 | 3.11 |
| TLL/ImgH | 6.84 | V2 + V4 + V5 | 64.6 |
| BLL/ImgH | 5.12 | Sag3R1L/CT3 | 1.44 |
| TDL/BLL | 0.33 | Y1R1L/Y5R2L | 1.52 |
| fL/f1 | 1.35 | (T23L + Sag3R1L − Sag2R2L)/Y2R2L | 0.26 |
| \|fL/f3\| | 0.82 | — | — |

7th Embodiment

Figure 19:
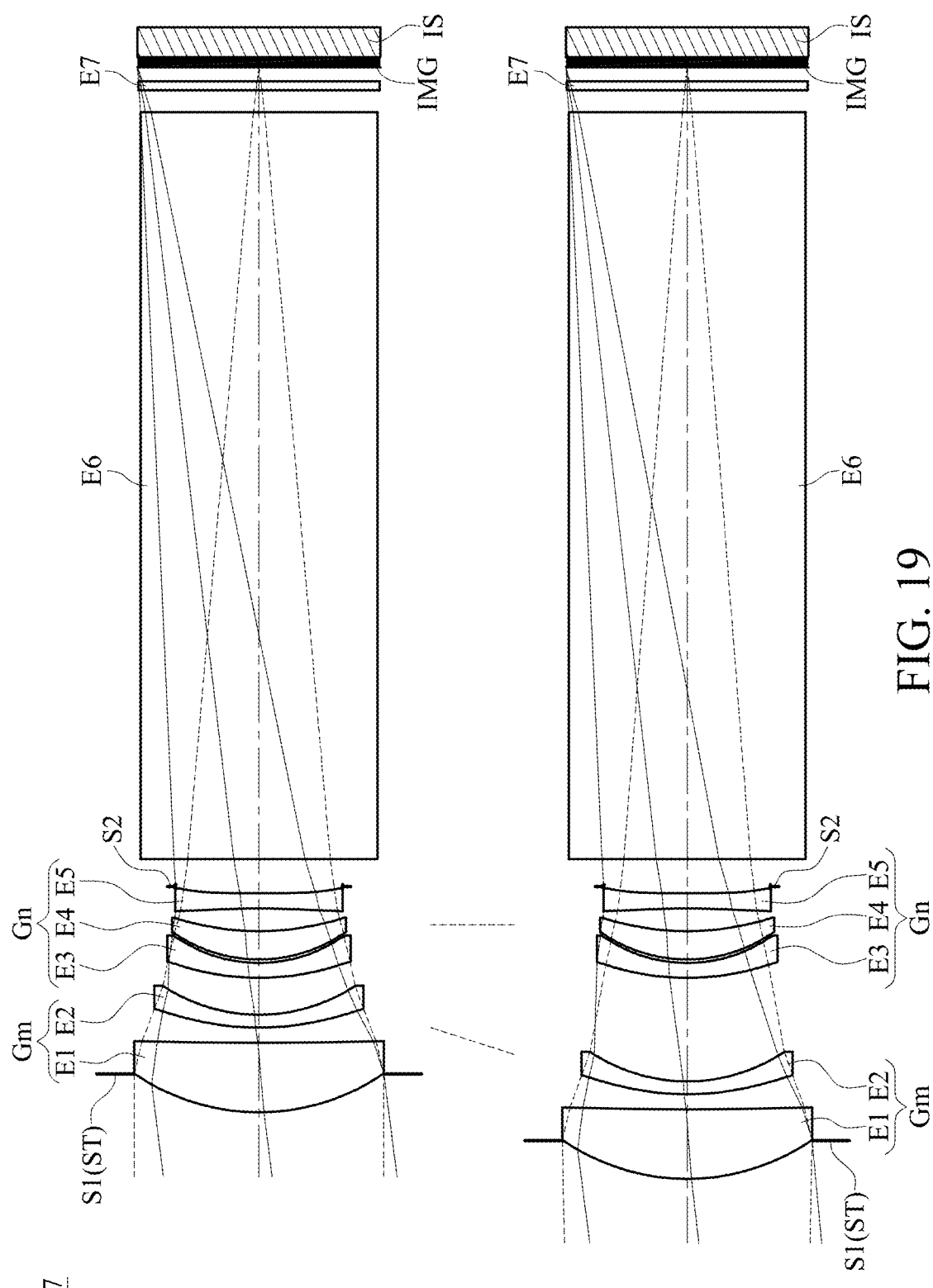
FIG. 19 shows schematic views of an image capturing unit respectively in a first state and a second state according to the 7th embodiment of the present disclosure.
Figure 20:
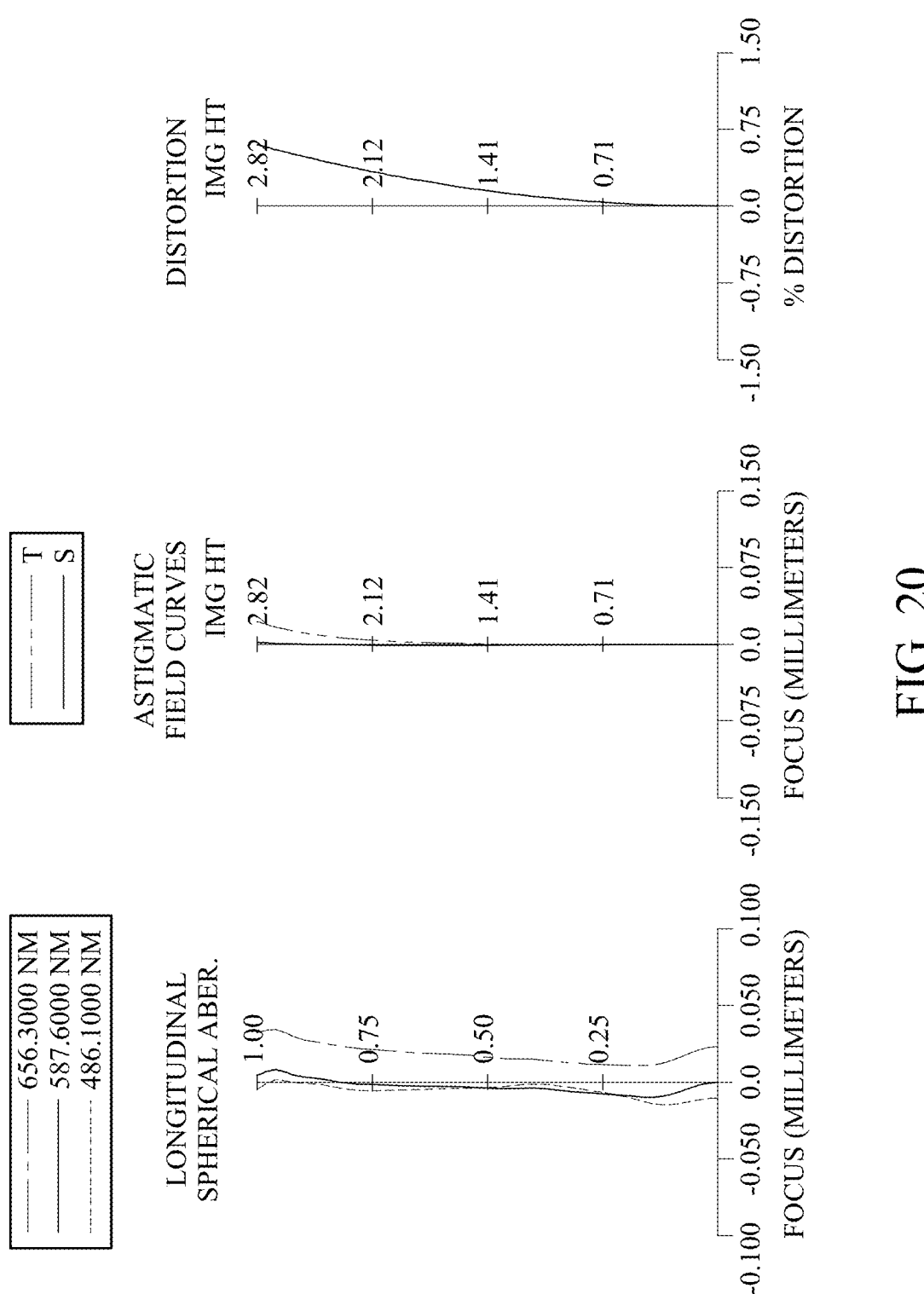
FIG. 20 shows spherical aberration curves, astigmatic field curves and a distortion curve of the image capturing unit in the first state according to the 7th embodiment.

FIG. 19 shows schematic views of an image capturing unit respectively in a first state and a second state according to the 7th embodiment of the present disclosure. FIG. 20 shows, in order from left to right, spherical aberration curves, astigmatic field curves and a distortion curve of the

TABLE 6C

| Aspheric Coefficients | | | | |
|---|---|---|---|---|
| Surface # | 4 | 5 | 6 | 7 |
| k= | 0.0000000E+00 | 0.0000000E+00 | 0.0000000E+00 | 0.0000000E+00 |
| A4= | −2.1331571E−03 | −2.8422566E−03 | −1.0705592E−02 | 1.0673033E−01 |
| A6= | 1.6493192E−03 | 2.4378173E−03 | −3.1107574E−03 | −2.8916898E−01 |
| A8= | −2.0256040E−03 | −3.2871894E−03 | 1.3108987E−02 | 4.0079096E−01 |
| A10= | 1.2334813E−03 | 2.2761144E−03 | −1.2525745E−02 | −3.3730727E−01 |
| A12= | −4.6430936E−04 | −9.7933437E−04 | 7.5112823E−03 | 1.8911137E−01 |
| A14= | 1.1447166E−04 | 2.7574407E−04 | −3.2020651E−03 | −7.3685548E−02 |
| A16= | −1.8614679E−05 | −5.1051816E−05 | 9.8278539E−04 | 2.0237880E−02 |
| A18= | 1.9304362E−06 | 6.0033030E−06 | −2.0989483E−04 | −3.8707533E−03 |
| A20= | −1.1589739E−07 | −4.0694729E−07 | 2.9258329E−05 | 4.9261905E−04 |
| A22= | 3.0665487E−09 | 1.2110445E−08 | −2.3740141E−06 | −3.7553292E−05 |
| A24= | — | — | 8.4584302E−08 | 1.2969746E−06 |

Figure 21:
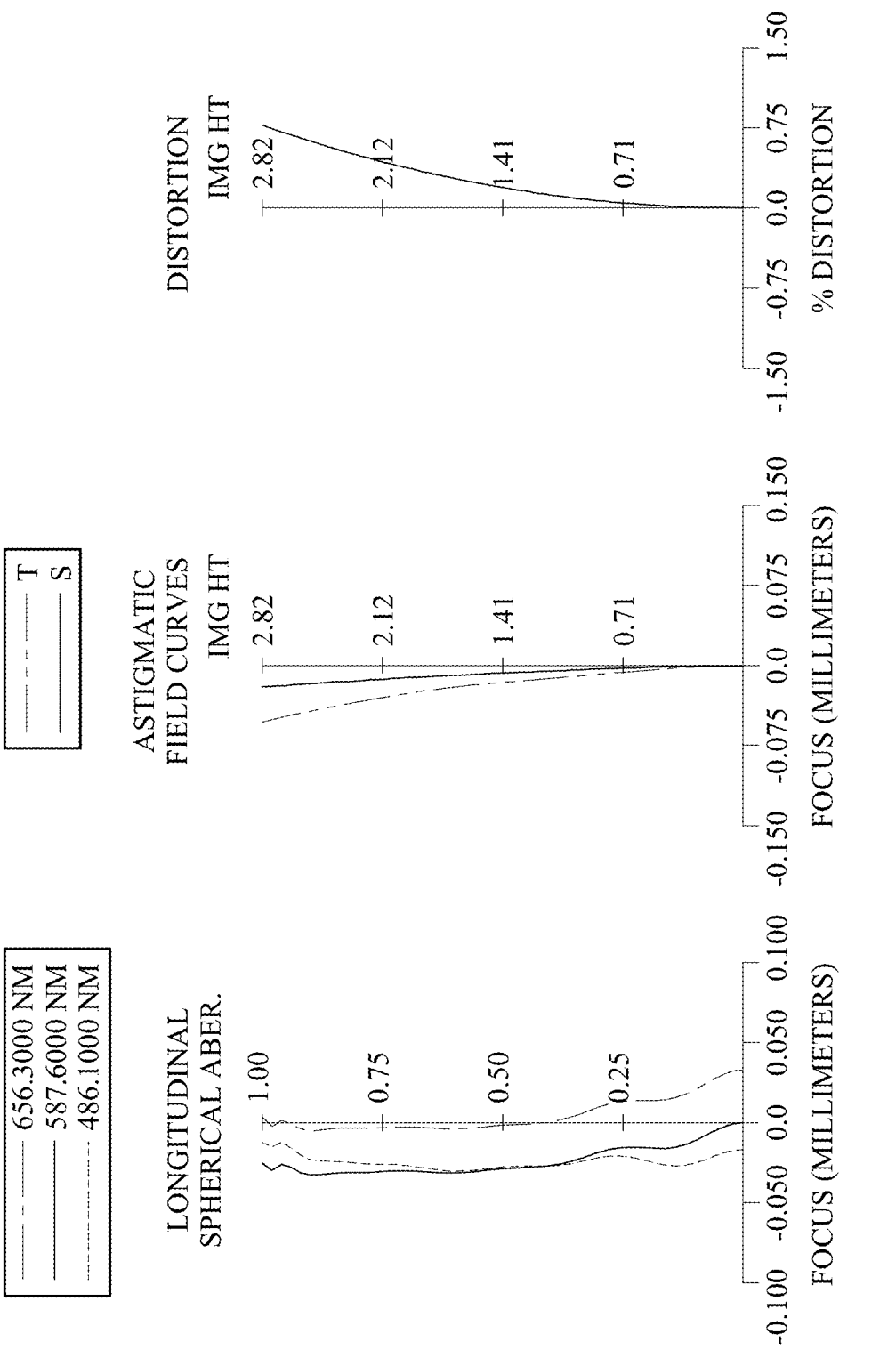
FIG. 21 shows spherical aberration curves, astigmatic field curves and a distortion curve of the image capturing unit in the second state according to the 7th embodiment.

| Surface # | 8 | 9 | 10 | 11 |
|---|---|---|---|---|
| k= | −4.4555000E−02 | 0.0000000E+00 | 0.0000000E+00 | 0.0000000E+00 |
| A4= | 1.4914463E−01 | 5.7372202E−02 | 2.8336789E−02 | 1.8465439E−02 |
| A6= | −2.8301089E−01 | −3.5524307E−02 | 3.7636374E−04 | 6.2103021E−03 |
| A8= | 3.3621416E−01 | −2.0795889E−02 | −2.8618258E−02 | −2.8247306E−02 |
| A10= | −2.5917240E−01 | 5.9012247E−02 | 4.8292131E−02 | 4.0406938E−02 |
| A12= | 1.3522104E−01 | −5.4039292E−02 | −4.2710374E−02 | −3.2810854E−02 |
| A14= | −4.9235500E−02 | 2.8027117E−02 | 2.3211085E−02 | 1.6704058E−02 |
| A16= | 1.2656162E−02 | −8.9234488E−03 | −7.9971575E−03 | −5.4271359E−03 |
| A18= | −2.2663178E−03 | 1.7292451E−03 | 1.7052748E−03 | 1.0926036E−03 |
| A20= | 2.6922624E−04 | −1.8813860E−04 | −2.0587842E−04 | −1.2424659E−04 |
| A22= | −1.8976952E−05 | 8.8812193E−06 | 1.0789914E−05 | 6.1050921E−06 | image capturing unit in the first state according to the 7th embodiment. FIG. 21 shows, in order from left to right, spherical aberration curves, astigmatic field curves and a distortion curve of the image capturing unit in the second state according to the 7th embodiment. Moreover, the upper part of FIG. 19 shows the schematic view of the imaging optical lens system in the first state, and the lower part of FIG. 19 shows the schematic view of the imaging optical lens system in the second state. In FIG. 19, the image capturing unit 7 includes the imaging optical lens system (its reference numeral is omitted) of the present disclosure and an image sensor IS. The imaging optical lens system includes, in order from an object side to an image side along an optical axis, a stop S1, a first lens element E1, a second lens element E2, a third lens element E3, a fourth lens element E4, a fifth lens element E5, a stop S2, a reflective element E6, a filter E7 and an image surface IMG. Furthermore, the imaging optical lens system includes, in order from the object side to the image side along a travelling direction of an optical path, a movable lens group Gm and a last lens group Gn, where the movable lens group Gm includes the first lens element E1 and the second lens element E2, and the last lens group Gn includes the third lens element E3, the fourth lens element E4 and the fifth lens element E5. The imaging optical lens system includes five lens elements (E1, E2, E3, E4 and E5) with no additional lens element disposed between each of the adjacent five lens elements. In addition, there is no additional lens element located between the last lens group Gn and the reflective element E6 along the optical axis.

A focal length of the imaging optical lens system is variable by change of an axial distance between the two lens groups (Gm and Gn) in a focus adjustment process. In FIG. 19, the movable lens group Gm is moved along the optical axis relative to the last lens group Gn in the focus adjustment process. Furthermore, the imaging optical lens system can undergo the focus adjustment process to transition to the first state, as shown in the upper part of FIG. 19 or to the second state, as shown in the lower part of FIG. 19. The imaging optical lens system being in the first state refers to a state where an imaged object is at an infinite object distance and an entrance pupil diameter of the imaging optical lens system is at its maximum; the imaging optical lens system being in the second state refers to a state where an imaged object is at a finite object distance. Moreover, the movable lens group Gm is moved toward the object side along the optical axis relative to the last lens group Gn when the imaging optical lens system transitions from the first state to the second state in the focus adjustment process. It is noted that all lens elements in the movable lens group Gm are immovable relative to one another during the focus adjustment process, and all lens elements in the last lens group Gn are immovable relative to one another during the focus adjustment process. In addition, during the focus adjustment process, the reflective element E6 is immovable relative to the last lens group Gn.

The first lens element E1 with positive refractive power has an object-side surface being convex in a paraxial region thereof and an image-side surface being concave in a paraxial region thereof. The first lens element E1 is made of glass material and has the object-side surface and the image-side surface being both spherical.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric.

The third lens element E3 with negative refractive power has an object-side surface being convex in a paraxial region thereof and an image-side surface being concave in a paraxial region thereof. The third lens element E3 is made of plastic material and has the object-side surface and the image-side surface being both aspheric. The object-side surface of the third lens element E3 has two inflection points. The image-side surface of the third lens element E3 has one inflection point.

The fourth lens element E4 with positive refractive power has an object-side surface being convex in a paraxial region thereof and an image-side surface being concave in a paraxial region thereof. The fourth lens element E4 is made of plastic material and has the object-side surface and the image-side surface being both aspheric. The object-side surface of the fourth lens element E4 has one inflection point. The image-side surface of the fourth lens element E4 has one inflection point.

The fifth lens element E5 with negative refractive power has an object-side surface being concave in a paraxial region thereof and an image-side surface being convex in a paraxial region thereof. The fifth lens element E5 is made of plastic material and has the object-side surface and the image-side surface being both aspheric. The object-side surface of the fifth lens element E5 has two inflection points. The image-side surface of the fifth lens element E5 has two inflection points. The image-side surface of the fifth lens element E5 has one concave critical point in an off-axis region thereof.

Figure 64:
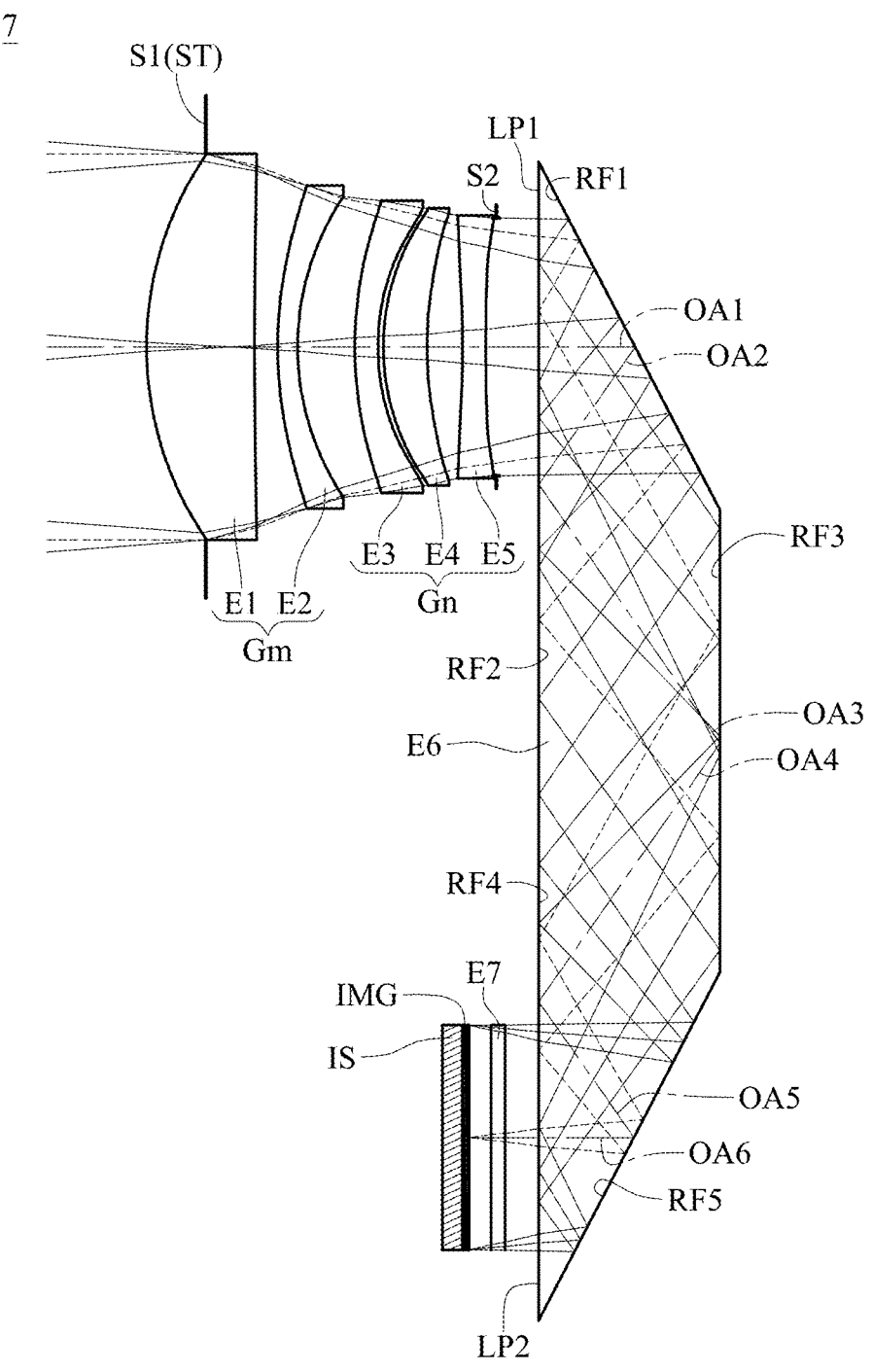
FIG. 64 shows a schematic view of a configuration of another reflective element and its associated light path deflection in the image capturing unit according to the 7th embodiment.

The reflective element E6 is made of glass material and located between the fifth lens element E5 and the image surface IMG along the optical axis, and will not affect the focal length of the imaging optical lens system. The reflective element E6 is a prism with an optical path folding function. For simplicity in illustration, FIG. 19 does not show the deflection effect caused by the reflective element E6 on the optical path. However, the reflective element E6 can have various configurations depending on actual design requirements, thereby causing different deflection effects on the optical path. For example, please refer to FIG. 64, which shows a schematic view of a configuration of another reflective element and its associated light path deflection in the image capturing unit according to the 7th embodiment. In FIG. 64, the reflective element E6 has, in sequence along a travelling direction of light on the optical path, a first light permeable surface LP1, a first reflective surface RF1, a second reflective surface RF2, a third reflective surface RF3, a fourth reflective surface RF4, a fifth reflective surface RF5 and a second light permeable surface LP2. The first reflective surface RF1 deflects the optical path from a first optical axis OA1 to a second optical axis OA2, the second reflective surface RF2 deflects the optical path from the second optical axis OA2 to a third optical axis OA3, the third reflective surface RF3 deflects the optical path from the third optical axis OA3 to a fourth optical axis OA4, the fourth reflective surface RF4 deflects the optical path from the fourth optical axis OA4 to a fifth optical axis OA5, the fifth reflective surface RF5 deflects the optical path from the fifth optical axis OA5 to a sixth optical axis OA6, and the optical path arrives at the image surface IMG along the sixth optical axis OA6. In FIG. 64, the reflective element E6 deflects the optical path five times, where an angle between a vector of the optical axis at the object side (e.g., the first optical axis OA1) and a vector of the optical axis at the image side (e.g., the sixth optical axis OA6) can be 180 degrees. Moreover, the reflective element E6 of this embodiment can have a configuration similar to, for example, one of the configurations shown in FIG. 57 to FIG. 63, which can be referred to foregoing descriptions corresponding to FIG. 57 to FIG. 63, and the details in this regard will not be provided again.

The filter E7 is made of glass material and located between the reflective element E6 and the image surface IMG, and will not affect the focal length of the imaging optical lens system. The image sensor IS is disposed on or near the image surface IMG of the imaging optical lens system.

The detailed optical data of the 7th embodiment are shown in Table 7A and Table 7B, and the aspheric surface data are shown in Table 7C below.

TABLE 7A

| 7th Embodiment | | | | | | | |
|---|---|---|---|---|---|---|---|
| Surface # | | Curvature Radius | Thickness | Material | Index | Abbe # | Focal Length |
| 0 | Object | Plano | D0 | | | | |
| 1 | Stop | Plano | −0.889 | | | | |
| 2 | Lens 1 | 5.1317 (SPH) | 1.620 | Glass | 1.593 | 68.3 | 9.07 |
| 3 | | 98.8907 (SPH) | 0.352 | | | | |
| 4 | Lens 2 | 6.2861 (ASP) | 0.300 | Plastic | 1.614 | 25.6 | −19.10 |
| 5 | | 4.0176 (ASP) | D1 | | | | |
| 6 | Lens 3 | 5.3901 (ASP) | 0.350 | Plastic | 1.660 | 20.4 | −20.50 |
| 7 | | 3.7548 (ASP) | 0.084 | | | | |
| 8 | Lens 4 | 4.6591 (ASP) | 0.653 | Plastic | 1.669 | 19.5 | 16.32 |
| 9 | | 7.6693 (ASP) | 0.533 | | | | |
| 10 | Lens 5 | −9.8143 (ASP) | 0.350 | Plastic | 1.567 | 37.4 | −17.93 |
| 11 | | −293.4736 (ASP) | 0.155 | | | | |
| 12 | Stop | Plano | 0.642 | | | | |
| 13 | Prism | Plano | 17.400 | Glass | 1.516 | 64.1 | — |
| 14 | | Plano | 0.510 | | | | |
| 15 | Filter | Plano | 0.210 | Glass | 1.516 | 64.1 | — |
| 16 | | Plano | 0.331 | | | | |
| 17 | Image | Plano | — | | | | |

Note:
Reference wavelength is 587.6 nm (d-line).
An effective radius of the stop S1 (Surface 1) is 2.906 mm.
An effective radius of the stop S2 (Surface 12) is 1.940 mm.
The imaging optical lens system can further include an aperture stop ST, and the position of the aperture stop ST can be adjusted depending on the object distance.
In this embodiment, the position of the aperture stop ST is at Surface 1 as the imaging optical lens system is in the first state (corresponding to infinite object distance).
In this embodiment, the position of the aperture stop ST is at Surface 1 as the imaging optical lens system is in the second state (corresponding to finite object distance).

The definitions of these parameters shown in Table 7B are the same as those stated in the 1st embodiment with corresponding values for the 7th embodiment, so an explanation in this regard will not be provided again.

TABLE 7B

| Values of Optical And Physical Parameters/Definitions | | | |
|---|---|---|---|
| First State (Infinite Object Distance) | | Second State (Finite Object Distance) | |
| fL [mm] | 21.89 | fS [mm] | 19.89 |
| FnoL | 3.77 | FnoS | 4.25 |
| HFOVL [deg.] | 7.3 | HFOVS [deg.] | 6.5 |
| Object Distance [mm] | ∞ | Object Distance [mm] | 149.628 |
| D0 [mm] | ∞ | D0 [mm] | 150.517 |
| D1 [mm] | 0.860 | D1 [mm] | 2.411 |

It should be understood that, in this embodiment, only two moving focus states (i.e., the first state and the second state) are disclosed, but the present disclosure is not limited thereto. Besides the first state and the second state, the imaging optical lens system in this embodiment can also have other moving focus states with different focal lengths between the first state and the second state to accommodate focusing conditions for other object distances.

In Table 7B, the imaging optical lens system undergoes the focus adjustment process according to the change of object distance, and the movable lens group Gm is moved toward the object side along the optical axis relative to the last lens group Gn when the imaging optical lens system transitions from the first state to the second state in the focus adjustment process. Specifically, when the object distance changes from infinite to 149.628 mm, the imaging optical lens system transitions from the first state to the second state, the axial distance D1 between the movable lens group Gm and the last lens group Gn increases from 0.860 mm in the first state to 2.411 mm in the second state, and the reflective element E6 is immovable relative to the last lens group Gn during the focus adjustment process. In other words, when the object distance decreases, the movable lens group Gm is moved toward the object side along the optical axis relative to the last lens group Gn during the focus adjustment process.

TABLE 7C

| Aspheric Coefficients | | | | |
|---|---|---|---|---|
| Surface # | 4 | 5 | 6 | 7 |
| k= | 9.6382900E−01 | 4.2186800E−01 | −7.5318000E−01 | −9.6521000E−01 |
| A4= | −5.2353638E−04 | −1.4695008E−04 | −2.3441965E−02 | 1.1235763E−02 |
| A6= | 4.8036847E−04 | 1.7104208E−03 | 2.8726311E−02 | 5.0994313E−02 |

TABLE 7C-continued

| | | Aspheric Coefficients | | |
|---|---|---|---|---|
| A8= | −2.4020246E−03 | −5.4513668E−03 | −2.4359582E−02 | −1.4289945E−01 |
| A10= | 2.5094945E−03 | 6.1648626E−03 | 1.8484949E−02 | 1.8857578E−01 |
| A12= | −1.4916397E−03 | −4.1406344E−03 | −1.2740101E−02 | −1.5542218E−01 |
| A14= | 5.7303051E−04 | 1.8168428E−03 | 7.1002557E−03 | 8.7600634E−02 |
| A16= | −1.4680435E−04 | −5.3357452E−04 | −2.9174556E−03 | −3.4875100E−02 |
| A18= | 2.4915324E−05 | 1.0397907E−04 | 8.4167967E−04 | 9.8303579E−03 |
| A20= | −2.6895179E−06 | −1.2901042E−05 | −1.6451215E−04 | −1.9213422E−03 |
| A22= | 1.6715898E−07 | 9.2239404E−07 | 2.0699968E−05 | 2.4759672E−04 |
| A24= | −4.5525475E−09 | −2.8920800E−08 | −1.5123756E−06 | −1.8902371E−05 |
| A26= | — | — | 4.8770646E−08 | 6.4678203E−07 |

| Surface # | 8 | 9 | 10 | 11 |
|---|---|---|---|---|
| k= | −1.9652900E−01 | −3.0319300E+00 | 8.5827100E+00 | 9.9000000E+01 |
| A4= | 6.9487027E−02 | 5.9525656E−02 | 5.7533797E−02 | 3.2400974E−02 |
| A6= | −1.4966961E−02 | −5.5958369E−02 | −6.5011300E−02 | −3.2753126E−02 |
| A8= | −9.9619471E−02 | −1.4357280E−02 | 9.8802653E−03 | 2.2938365E−03 |
| A10= | 1.5929665E−01 | 7.1892153E−02 | 6.6380906E−02 | 4.7192829E−02 |
| A12= | −1.2873214E−01 | −6.7456075E−02 | −8.5310264E−02 | −6.4145730E−02 |
| A14= | 6.6867304E−02 | 3.3554076E−02 | 5.3492440E−02 | 4.3972417E−02 |
| A16= | −2.4060011E−02 | −9.8989583E−03 | −2.0096820E−02 | −1.8345854E−02 |
| A18= | 6.1560699E−03 | 1.7150413E−03 | 4.7056311E−03 | 4.8430635E−03 |
| A20= | −1.1133800E−03 | −1.5579895E−04 | −6.7017911E−04 | −7.9150116E−04 |
| A22= | 1.3620618E−04 | 4.6537474E−06 | 5.2802243E−05 | 7.3158323E−05 |
| A24= | −1.0110999E−05 | 1.3767876E−07 | −1.7477049E−06 | −2.9244215E−06 |
| A26= | 3.4219712E−07 | — | — | — |

In the 7th embodiment, the equation of the aspheric surface profiles of the aforementioned lens elements is the same as the equation of the 1st embodiment. Also, the definitions of these parameters shown in Table 7D below are the same as those stated in the 1st embodiment with corresponding values for the 7th embodiment, so an explanation in this regard will not be provided again.

Moreover, these parameters can be calculated from Table 7A and Table 7C as the following values and satisfy the following conditions:

TABLE 7D

| Values of Optical And Physical Parameters/Definitions | | | |
|---|---|---|---|
| fL [mm] | 21.89 | fL/f12 | 1.51 |
| FnoL | 3.77 | \|f1/f2\| | 0.48 |
| HFOVL [deg.] | 7.3 | f4/f3 | −0.80 |
| FOVL [deg.] | 14.6 | fL/R7 + fL/R8 | 7.55 |
| fS [mm] | 19.89 | (R2 + R7)/(R2 − R7) | 1.10 |
| FnoS | 4.25 | (R3 − R6)/(R3 + R6) | 0.25 |
| HFOVS [deg.] | 6.5 | CT1/CT2 | 5.40 |
| FOVS [deg.] | 13.0 | CT1/Dr5r8L | 1.49 |
| FnoL/FnoS | 0.89 | 10 × T34L/CT4 | 1.29 |
| TLS/TLL | 1.07 | 10 × T34L/T45L | 1.58 |
| BLS/BLL | 1.00 | T45L/CT4 | 0.82 |
| 10 × \|TDS − TDL\|/TDL | 3.04 | T45L/CT5 | 1.52 |
| TLL/ImgH | 8.63 | V2 + V4 + V5 | 82.5 |
| BLL/ImgH | 6.82 | Sag3R1L/CT3 | 1.17 |
| TDL/BLL | 0.27 | Y1R1L/Y5R2L | 1.50 |
| fL/f1 | 2.41 | (T23L + Sag3R1L − Sag2R2L)/Y2R2L | 0.24 |
| \|fL/f3\| | 1.07 | — | — |

8th Embodiment

Figure 22:
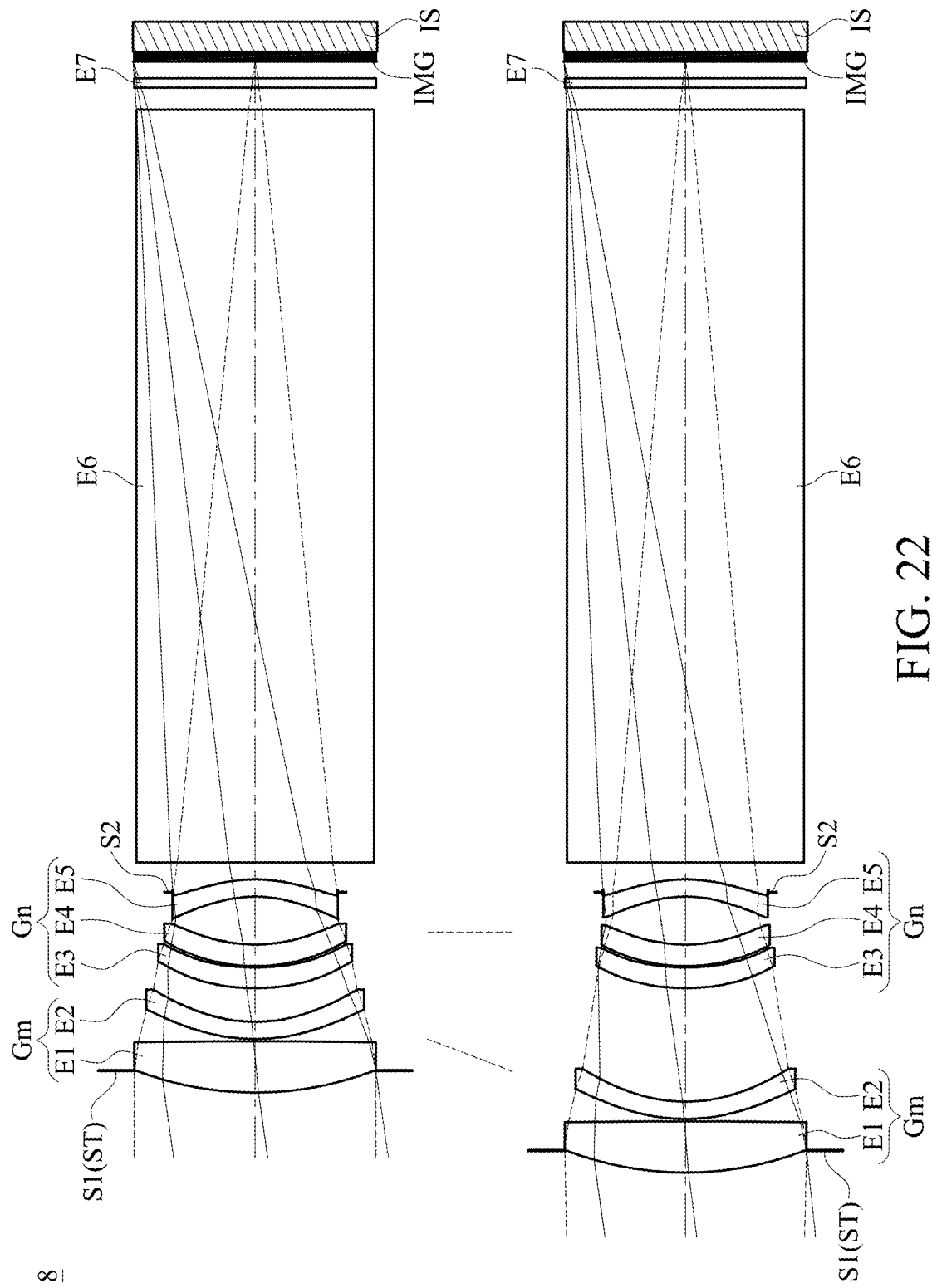
FIG. 22 shows schematic views of an image capturing unit respectively in a first state and a second state according to the 8th embodiment of the present disclosure.
Figure 23:
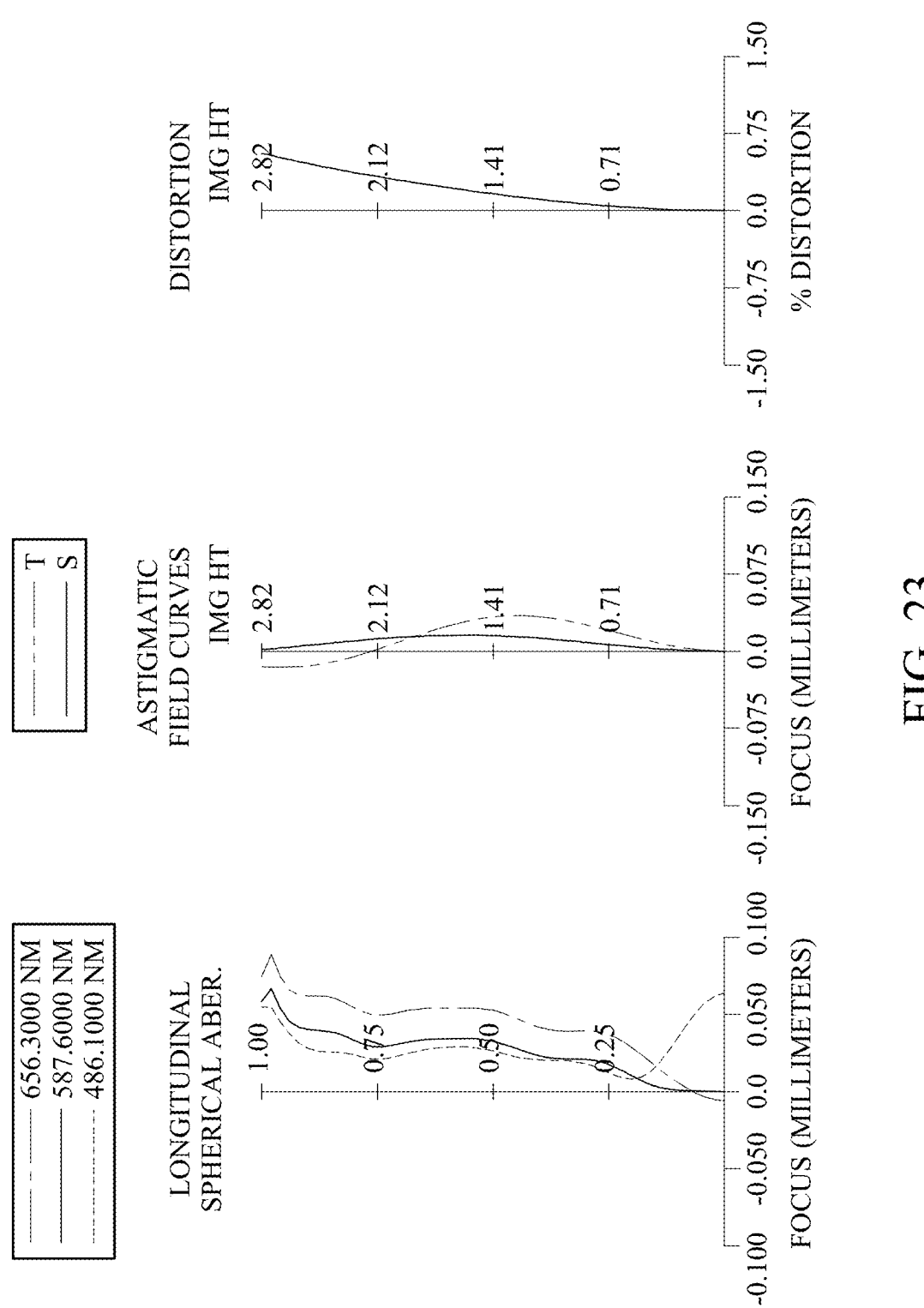
FIG. 23 shows spherical aberration curves, astigmatic field curves and a distortion curve of the image capturing unit in the first state according to the 8th embodiment.
Figure 24:
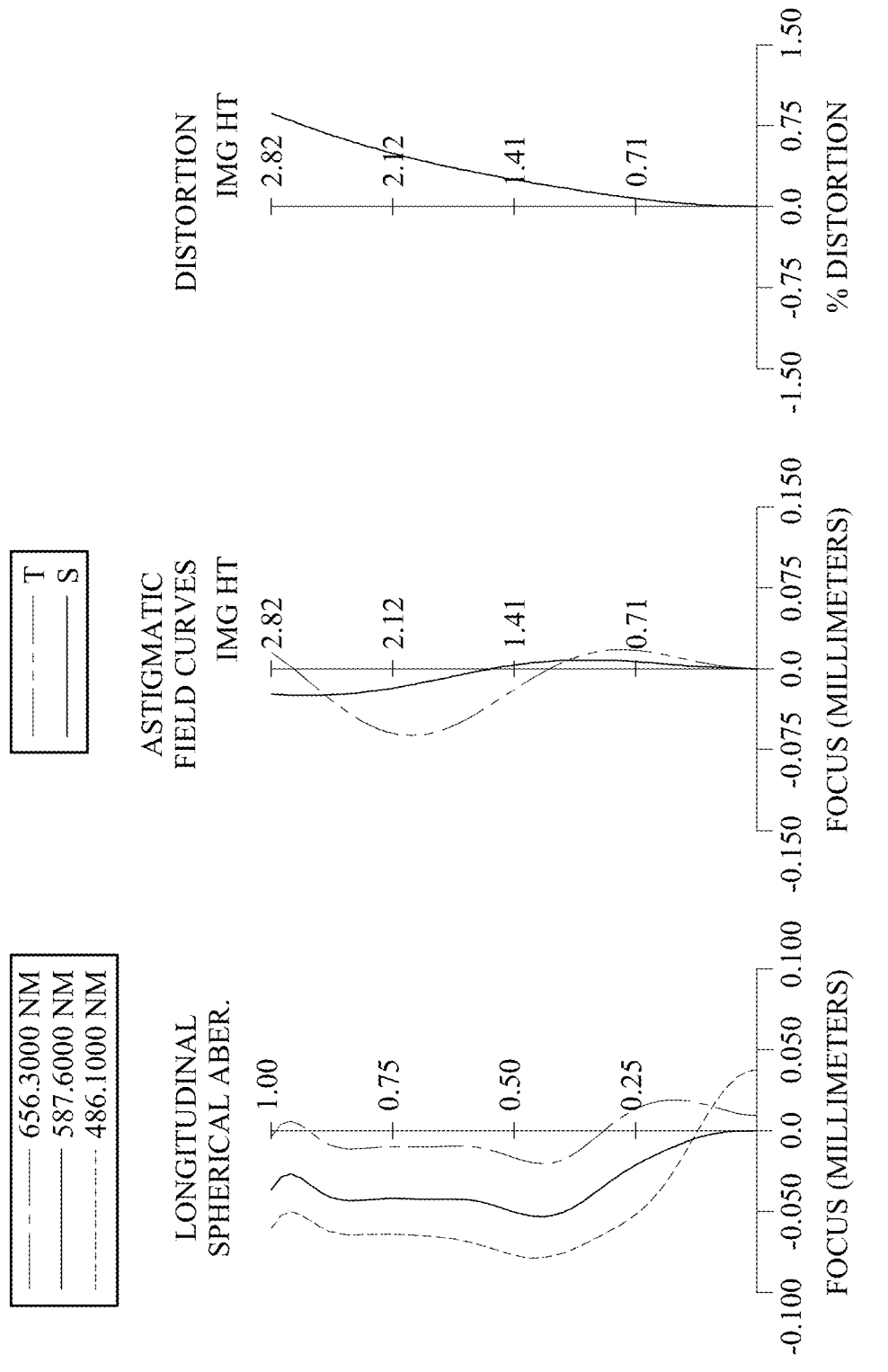
FIG. 24 shows spherical aberration curves, astigmatic field curves and a distortion curve of the image capturing unit in the second state according to the 8th embodiment.

FIG. 22 shows schematic views of an image capturing unit respectively in a first state and a second state according to the 8th embodiment of the present disclosure. FIG. 23 shows, in order from left to right, spherical aberration curves, astigmatic field curves and a distortion curve of the image capturing unit in the first state according to the 8th embodiment. FIG. 24 shows, in order from left to right, spherical aberration curves, astigmatic field curves and a distortion curve of the image capturing unit in the second state according to the 8th embodiment. Moreover, the upper part of FIG. 22 shows the schematic view of the imaging optical lens system in the first state, and the lower part of FIG. 22 shows the schematic view of the imaging optical lens system in the second state. In FIG. 22, the image capturing unit 8 includes the imaging optical lens system (its reference numeral is omitted) of the present disclosure and an image sensor IS. The imaging optical lens system includes, in order from an object side to an image side along an optical axis, a stop S1, a first lens element E1, a second lens element E2, a third lens element E3, a fourth lens element E4, a fifth lens element E5, a stop S2, a reflective element E6, a filter E7 and an image surface IMG. Furthermore, the imaging optical lens system includes, in order from the object side to the image side along a travelling direction of an optical path, a movable lens group Gm and a last lens group Gn, where the movable lens group Gm includes the first lens element E1 and the second lens element E2, and the last lens group Gn includes the third lens element E3, the fourth lens element E4 and the fifth lens element E5. The imaging optical lens system includes five lens elements (E1, E2, E3, E4 and E5) with no additional lens element disposed between each of the adjacent five lens elements. In addition, there is no additional lens element located between the last lens group Gn and the reflective element E6 along the optical axis.

A focal length of the imaging optical lens system is variable by change of an axial distance between the two lens groups (Gm and Gn) in a focus adjustment process. In FIG. 22, the movable lens group Gm is moved along the optical axis relative to the last lens group Gn in the focus adjustment process. Furthermore, the imaging optical lens system can undergo the focus adjustment process to transition to the first state, as shown in the upper part of FIG. 22 or to the second state, as shown in the lower part of FIG. 22. The imaging optical lens system being in the first state refers to a state where an imaged object is at an infinite object distance and an entrance pupil diameter of the imaging optical lens system is at its maximum; the imaging optical lens system being in the second state refers to a state where an imaged object is at a finite object distance. Moreover, the movable lens group Gm is moved toward the object side along the optical axis relative to the last lens group Gn when the imaging optical lens system transitions from the first state to the second state in the focus adjustment process. It is noted that all lens elements in the movable lens group Gm are immovable relative to one another during the focus adjustment process, and all lens elements in the last lens group Gn are immovable relative to one another during the focus adjustment process. In addition, during the focus adjustment process, the reflective element E6 is immovable relative to the last lens group Gn.

The first lens element E1 with positive refractive power has an object-side surface being convex in a paraxial region thereof and an image-side surface being convex in a paraxial region thereof. The first lens element E1 is made of glass material and has the object-side surface and the image-side surface being both spherical.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric.

The third lens element E3 with positive refractive power has an object-side surface being convex in a paraxial region thereof and an image-side surface being concave in a paraxial region thereof. The third lens element E3 is made of plastic material and has the object-side surface and the image-side surface being both aspheric. The object-side surface of the third lens element E3 has two inflection points. The image-side surface of the third lens element E3 has two inflection points.

The fourth lens element E4 with negative refractive power has an object-side surface being convex in a paraxial region thereof and an image-side surface being concave in a paraxial region thereof. The fourth lens element E4 is made of plastic material and has the object-side surface and the image-side surface being both aspheric.

The fifth lens element E5 with negative refractive power has an object-side surface being concave in a paraxial region thereof and an image-side surface being convex in a paraxial region thereof. The fifth lens element E5 is made of plastic material and has the object-side surface and the image-side surface being both aspheric. The object-side surface of the fifth lens element E5 has one inflection point. The image-side surface of the fifth lens element E5 has one inflection point.

The reflective element E6 is made of glass material and located between the fifth lens element E5 and the image surface IMG along the optical axis, and will not affect the focal length of the imaging optical lens system. The reflective element E6 is a prism with an optical path folding function. For simplicity in illustration, FIG. 22 does not show the deflection effect caused by the reflective element E6 on the optical path. However, the reflective element E6 can have various configurations depending on actual design requirements, thereby causing different deflection effects on the optical path. Moreover, the reflective element E6 of this embodiment can have a configuration similar to, for example, one of the configurations shown in FIG. 57 to FIG. 64, which can be referred to foregoing descriptions corresponding to FIG. 57 to FIG. 64, and the details in this regard will not be provided again.

The filter E7 is made of glass material and located between the reflective element E6 and the image surface IMG, and will not affect the focal length of the imaging optical lens system. The image sensor IS is disposed on or near the image surface IMG of the imaging optical lens system.

The detailed optical data of the 8th embodiment are shown in Table 8A and Table 8B, and the aspheric surface data are shown in Table 8C below.

TABLE 8A

| | | | 8th Embodiment | | | | |
|---|---|---|---|---|---|---|---|
| Surface # | | Curvature Radius | Thickness | Material | Index | Abbe # | Focal Length |
| 0 | Object | Plano | D0 | | | | |
| 1 | Stop | Plano | −0.514 | | | | |
| 2 | Lens 1 | 7.6819 (SPH) | 1.194 | Glass | 1.593 | 68.3 | 12.35 |
| 3 | | −145.8871 (SPH) | 0.050 | | | | |
| 4 | Lens 2 | 4.2556 (ASP) | 0.400 | Plastic | 1.669 | 19.5 | −42.91 |
| 5 | | 3.5666 (ASP) | D1 | | | | |
| 6 | Lens 3 | 4.5440 (ASP) | 0.480 | Plastic | 1.545 | 56.1 | 35.69 |
| 7 | | 5.7085 (ASP) | 0.035 | | | | |
| 8 | Lens 4 | 4.8349 (ASP) | 0.499 | Plastic | 1.639 | 23.5 | −34.84 |
| 9 | | 3.8120 (ASP) | 1.108 | | | | |
| 10 | Lens 5 | −2.9701 (ASP) | 0.400 | Plastic | 1.614 | 25.6 | −40.35 |
| 11 | | −3.5477 (ASP) | −0.300 | | | | |
| 12 | Stop | Plano | 0.690 | | | | |
| 13 | Prism | Plano | 17.453 | Glass | 1.516 | 64.1 | — |
| 14 | | Plano | 0.510 | | | | |
| 15 | Filter | Plano | 0.210 | Glass | 1.516 | 64.1 | — |
| 16 | | Plano | 0.391 | | | | |
| 17 | Image | Plano | — | | | | |

Note:
Reference wavelength is 587.6 nm (d-line).
An effective radius of the stop S1 (Surface 1) is 2.796 mm.
An effective radius of the stop S2 (Surface 12) is 1.908 mm.
The imaging optical lens system can further include an aperture stop ST, and the position of the aperture stop ST can be adjusted depending on the object distance.
In this embodiment, the position of the aperture stop ST is at Surface 1 as the imaging optical lens system is in the first state (corresponding to infinite object distance).
In this embodiment, the position of the aperture stop ST is at Surface 1 as the imaging optical lens system is in the second state (corresponding to finite object distance).

The definitions of these parameters shown in Table 8B are the same as those stated in the 1st embodiment with corresponding values for the 8th embodiment, so an explanation in this regard will not be provided again.

TABLE 8B

| Values of Optical And Physical Parameters/Definitions | | | |
|---|---|---|---|
| First State (Infinite Object Distance) | | Second State (Finite Object Distance) | |
| fL [mm] | 19.56 | fS [mm] | 18.68 |
| FnoL | 3.50 | FnoS | 3.96 |
| HFOVL [deg.] | 8.2 | HFOVS [deg.] | 7.2 |
| Object Distance [mm] | ∞ | Object Distance [mm] | 150.003 |
| D0 [mm] | ∞ | D0 [mm] | 150.517 |
| D1 [mm] | 0.779 | D1 [mm] | 2.631 |

It should be understood that, in this embodiment, only two moving focus states (i.e., the first state and the second state) are disclosed, but the present disclosure is not limited thereto. Besides the first state and the second state, the imaging optical lens system in this embodiment can also have other moving focus states with different focal lengths between the first state and the second state to accommodate focusing conditions for other object distances.

In Table 8B, the imaging optical lens system undergoes the focus adjustment process according to the change of object distance, and the movable lens group Gm is moved toward the object side along the optical axis relative to the last lens group Gn when the imaging optical lens system transitions from the first state to the second state in the focus adjustment process. Specifically, when the object distance changes from infinite to 150.003 mm, the imaging optical lens system transitions from the first state to the second state, the axial distance D1 between the movable lens group Gm and the last lens group Gn increases from 0.779 mm in the first state to 2.631 mm in the second state, and the reflective element E6 is immovable relative to the last lens group Gn during the focus adjustment process. In other words, when the object distance decreases, the movable lens group Gm is moved toward the object side along the optical axis relative to the last lens group Gn during the focus adjustment process.

TABLE 8C

| Aspheric Coefficients | | | | |
|---|---|---|---|---|
| Surface # | 4 | 5 | 6 | 7 |
| k= | 0.0000000E+00 | 0.0000000E+00 | 0.0000000E+00 | 0.0000000E+00 |
| A4= | 1.3203926E−04 | 9.7276612E−05 | −8.0726028E−03 | 6.9577685E−02 |
| A6= | −4.3351355E−03 | −6.4836963E−03 | 6.4298048E−03 | −2.0679652E−01 |
| A8= | 3.4957948E−03 | 5.9607089E−03 | 2.8031121E−03 | 3.4544212E−01 |
| A10= | −1.9868181E−03 | −3.8060075E−03 | −8.4994008E−03 | −3.4754139E−01 |
| A12= | 7.7583129E−04 | 1.6605672E−03 | 7.7539945E−03 | 2.2641292E−01 |
| A14= | −2.0367948E−04 | −4.8729765E−04 | −4.1545243E−03 | −9.8802303E−02 |
| A16= | 3.5034913E−05 | 9.3837862E−05 | 1.4448962E−03 | 2.9170749E−02 |
| A18= | −3.7705149E−06 | −1.1322813E−05 | −3.2976906E−04 | −5.7552842E−03 |
| A20= | 2.2979943E−07 | 7.7461001E−07 | 4.7604831E−05 | 7.2725275E−04 |
| A22= | −6.0460912E−09 | −2.2896388E−08 | −3.9365872E−06 | −5.3263440E−05 |
| A24= | — | — | 1.4190372E−07 | 1.7215295E−06 |

| Surface # | 8 | 9 | 10 | 11 |
|---|---|---|---|---|
| k= | 1.6805000E−01 | 0.0000000E+00 | 0.0000000E+00 | 0.0000000E+00 |
| A4= | 8.3752236E−02 | 1.9222111E−02 | 1.6808383E−02 | 1.4628299E−02 |
| A6= | −2.2519783E−01 | −5.9038853E−02 | −2.8315237E−02 | −1.9481846E−02 |
| A8= | 3.4872974E−01 | 8.9136995E−02 | 6.0061219E−02 | 3.8813290E−02 |
| A10= | −3.3478610E−01 | −8.2658926E−02 | −6.1825364E−02 | −3.7748235E−02 |
| A12= | 2.1013872E−01 | 5.0682283E−02 | 3.8019288E−02 | 2.1754120E−02 |
| A14= | −8.8358405E−02 | −2.1018461E−02 | −1.5032168E−02 | −7.9238610E−03 |
| A16= | 2.4945998E−02 | 5.7449907E−03 | 3.8724626E−03 | 1.8449761E−03 |
| A18= | −4.6383119E−03 | −9.6275858E−04 | −6.2896066E−04 | −2.6577823E−04 |
| A20= | 5.4041443E−04 | 8.3035469E−05 | 5.8253957E−05 | 2.1483835E−05 |
| A22= | −3.5375717E−05 | −1.5476266E−06 | −2.3213556E−06 | −7.3834013E−07 |
| A24= | 9.7707382E−07 | −1.6001157E−07 | — | — |

In the 8th embodiment, the equation of the aspheric surface profiles of the aforementioned lens elements is the same as the equation of the 1st embodiment. Also, the definitions of these parameters shown in Table 8D below are the same as those stated in the 1st embodiment with corresponding values for the 8th embodiment, so an explanation in this regard will not be provided again.

Moreover, these parameters can be calculated from Table 8A and Table 8C as the following values and satisfy the following conditions:

TABLE 8D

| Values of Optical And Physical Parameters/Definitions | | | |
|---|---|---|---|
| fL [mm] | 19.56 | fL/f12 | 1.23 |
| FnoL | 3.50 | \|fL/f2\| | 0.29 |
| HFOVL [deg.] | 8.2 | f4/f3 | −0.98 |
| FOVL [deg.] | 16.4 | fL/R7 + fL/R8 | 9.18 |
| fS [mm] | 18.68 | (R2 + R7)/(R2 − R7) | 0.94 |
| FnoS | 3.96 | (R3 − R6)/(R3 + R6) | −0.15 |
| HFOVS [deg.] | 7.2 | CT1/CT2 | 2.99 |
| FOVS [deg.] | 14.4 | CT1/Dr5r8L | 1.18 |
| FnoL/FnoS | 0.88 | 10 × T34L/CT4 | 0.70 |
| TLS/TLL | 1.08 | 10 × T34L/T45L | 0.32 |
| BLS/BLL | 1.00 | T45L/CT4 | 2.22 |
| 10 × \|TDS − TDL\|/TDL | 3.75 | T45L/CT5 | 2.77 |
| TLL/ImgH | 8.47 | V2 + V4 + V5 | 68.6 |
| BLL/ImgH | 6.72 | Sag3R1L/CT3 | 1.30 |
| TDL/BLL | 0.26 | Y1R1L/Y5R2L | 1.46 |
| fL/f1 | 1.58 | (T23L + Sag3R1L − Sag2R2L)/Y2R2L | 0.28 |
| \|fL/f3\| | 0.55 | — | — |

9th Embodiment

Figure 26:
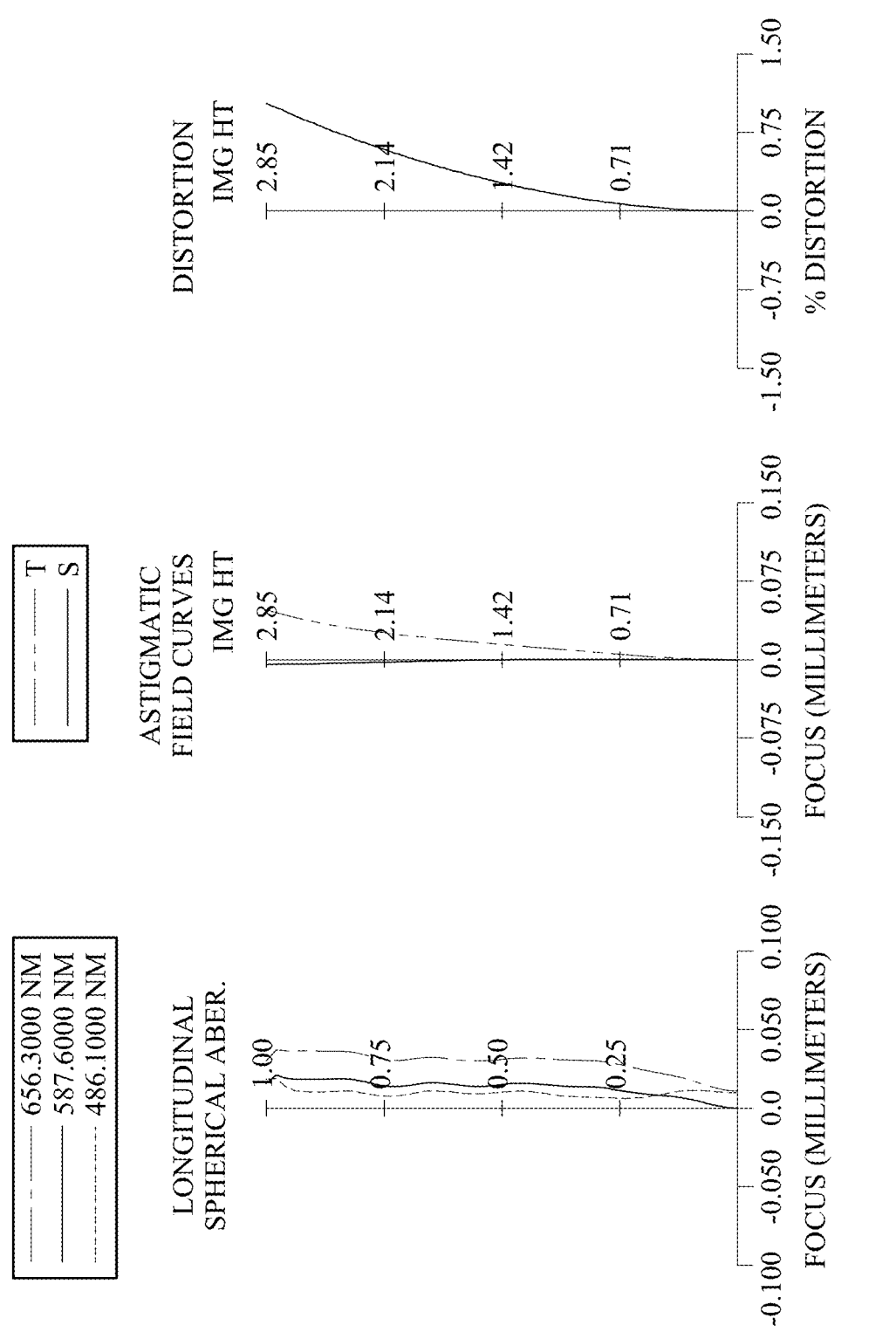
FIG. 26 shows spherical aberration curves, astigmatic field curves and a distortion curve of the image capturing unit in the first state according to the 9th embodiment.
Figure 27:
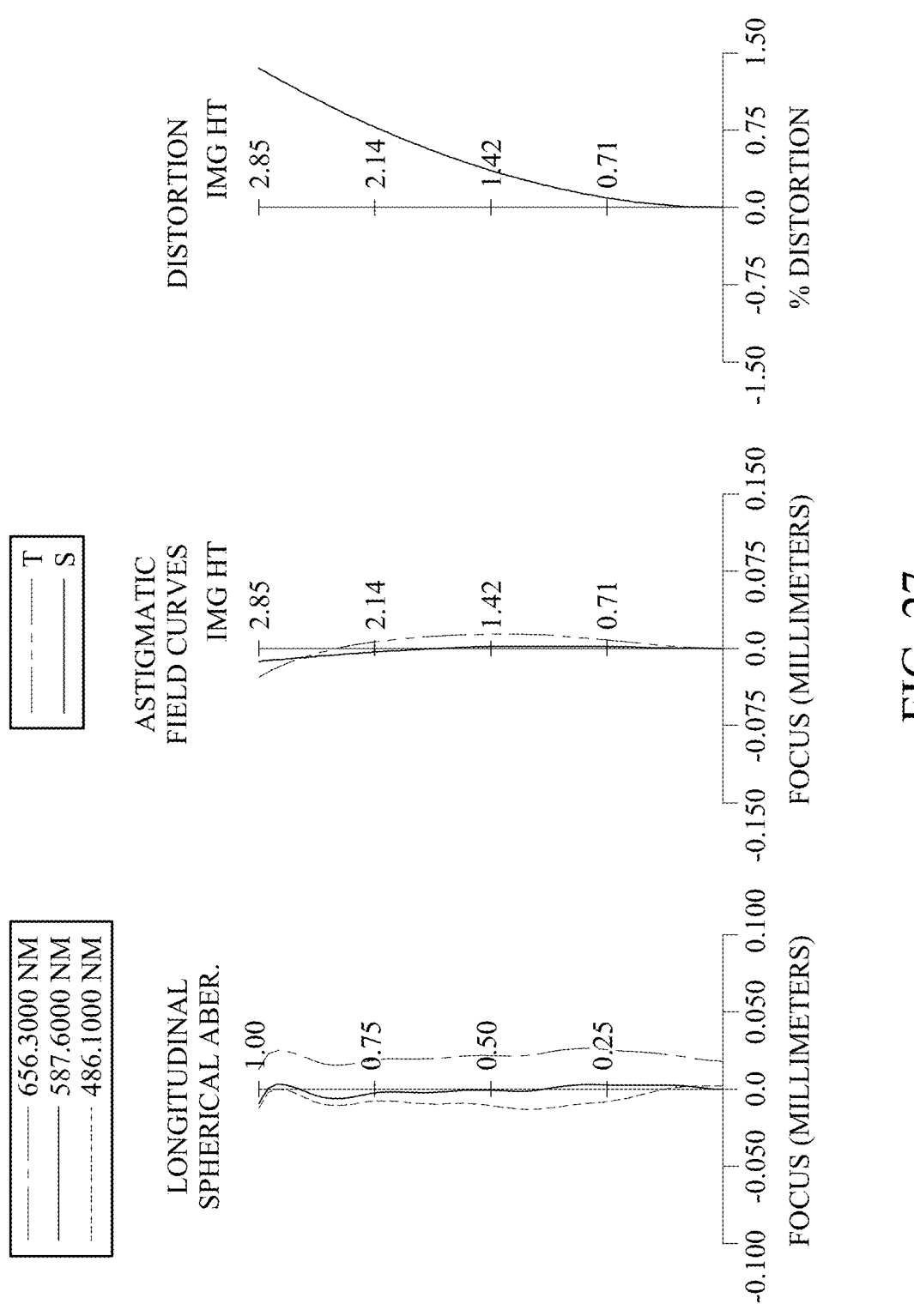
FIG. 27 shows spherical aberration curves, astigmatic field curves and a distortion curve of the image capturing unit in the second state according to the 9th embodiment.
Figure 28:
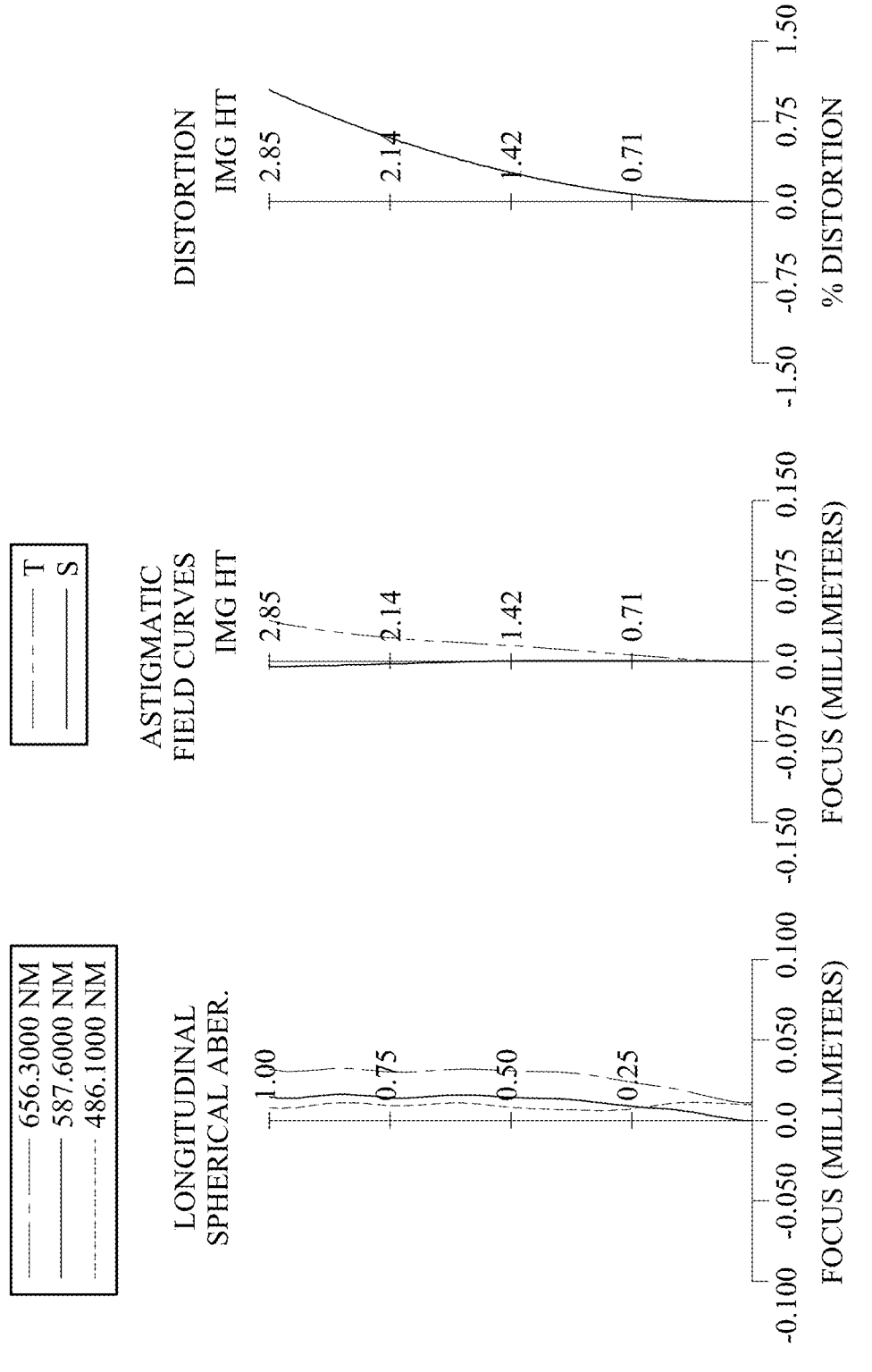
FIG. 28 shows spherical aberration curves, astigmatic field curves and a distortion curve of the image capturing unit in the third state according to the 9th embodiment.

FIG. 25 shows schematic views of an image capturing unit respectively in a first state, a second state and a third state according to the 9th embodiment of the present disclosure. FIG. 26 shows, in order from left to right, spherical aberration curves, astigmatic field curves and a distortion curve of the image capturing unit in the first state according to the 9th embodiment. FIG. 27 shows, in order from left to right, spherical aberration curves, astigmatic field curves and a distortion curve of the image capturing unit in the second state according to the 9th embodiment. FIG. 28 shows, in order from left to right, spherical aberration curves, astigmatic field curves and a distortion curve of the image capturing unit in the third state according to the 9th embodiment. Moreover, the upper part of FIG. 25 shows the schematic view of the imaging optical lens system in the first state, the middle part of FIG. 25 shows the schematic view of the imaging optical lens system in the second state, and the lower part of FIG. 25 shows the schematic view of the imaging optical lens system in the third state. In FIG. 25, the image capturing unit 9 includes the imaging optical lens system (its reference numeral is omitted) of the present disclosure and an image sensor IS. The imaging optical lens system includes, in order from an object side to an image side along an optical axis, a stop S1, a first lens element E1, a second lens element E2, a third lens element E3, a fourth lens element E4, a fifth lens element E5, a stop S2, a reflective element E6, a filter E7 and an image surface IMG. Furthermore, the imaging optical lens system includes, in order from the object side to the image side along a travelling direction of an optical path, a movable lens group Gm and a last lens group Gn, where the movable lens group Gm includes the first lens element E1 and the second lens element E2, and the last lens group Gn includes the third lens element E3, the fourth lens element E4 and the fifth lens element E5. The imaging optical lens system includes five lens elements (E1, E2, E3, E4 and E5) with no additional lens element disposed between each of the adjacent five lens elements. In addition, there is no additional lens element located between the last lens group Gn and the reflective element E6 along the optical axis.

A focal length of the imaging optical lens system is variable by change of an axial distance between the two lens groups (Gm and Gn) in a focus adjustment process. In FIG. 25, the movable lens group Gm is moved along the optical axis relative to the last lens group Gn in the focus adjustment process. Furthermore, the imaging optical lens system can undergo the focus adjustment process to transition to the first state, as shown in the upper part of FIG. 25, to the second state, as shown in the middle part of FIG. 25, or to the third state, as shown in the lower part of FIG. 25. The imaging optical lens system being in the first state refers to a state where an imaged object is at an infinite object distance and an entrance pupil diameter of the imaging optical lens system is at its maximum; the imaging optical lens system being in the second state refers to a state where an imaged object is at a finite object distance; the imaging optical lens system being in the third state refers to a state where an imaged object is at an infinite object distance and the entrance pupil diameter of the imaging optical lens system is at its minimum. Moreover, the movable lens group Gm is moved toward the object side along the optical axis relative to the last lens group Gn when the imaging optical lens system transitions from the first state to the second state in the focus adjustment process. Additionally, the position of the stop S1 in the first state of the imaging optical lens system is closer to the image side in the direction of the optical axis compared to the position of the stop S1 in the third state of the imaging optical lens system, and the entrance pupil diameter is relatively larger. It is noted that all lens elements in the movable lens group Gm are immovable relative to one another during the focus adjustment process, and all lens elements in the last lens group Gn are immovable relative to one another during the focus adjustment process. In addition, during the focus adjustment process, the reflective element E6 is immovable relative to the last lens group Gn.

The first lens element E1 with positive refractive power has an object-side surface being convex in a paraxial region thereof and an image-side surface being convex in a paraxial region thereof. The first lens element E1 is made of glass material and has the object-side surface and the image-side surface being both spherical.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric.

The third lens element E3 with positive refractive power has an object-side surface being convex in a paraxial region thereof and an image-side surface being concave in a paraxial region thereof. The third lens element E3 is made of plastic material and has the object-side surface and the image-side surface being both aspheric. The image-side surface of the third lens element E3 has one inflection point.

The fourth lens element E4 with negative refractive power has an object-side surface being convex in a paraxial region thereof and an image-side surface being concave in a paraxial region thereof. The fourth lens element E4 is made of plastic material and has the object-side surface and the image-side surface being both aspheric. The object-side surface of the fourth lens element E4 has three inflection points. The image-side surface of the fourth lens element E4 has two inflection points.

The fifth lens element E5 with negative refractive power has an object-side surface being concave in a paraxial region optical lens system. The image sensor IS is disposed on or near the image surface IMG of the imaging optical lens system.

The detailed optical data of the 9th embodiment are shown in Table 9A and Table 9B, and the aspheric surface data are shown in Table 9C below.

TABLE 9A

| 9th Embodiment | | | | | | | |
|---|---|---|---|---|---|---|---|
| Surface # | | Curvature Radius | | Thickness | Material | Index | Abbe # | Focal Length |
| 0 | Object | Plano | | D0 | | | | |
| 1 | Stop | Plano | | D1 | | | | |
| 2 | Lens 1 | 5.4244 | (SPH) | 2.200 | Glass | 1.593 | 68.3 | 9.12 |
| 3 | | −1531.7589 | (SPH) | 0.050 | | | | |
| 4 | Lens 2 | 6.0253 | (ASP) | 0.400 | Plastic | 1.587 | 28.3 | −17.69 |
| 5 | | 3.7198 | (ASP) | D2 | | | | |
| 6 | Lens 3 | 5.5868 | (ASP) | 0.500 | Plastic | 1.642 | 22.5 | 14.46 |
| 7 | | 13.5526 | (ASP) | 0.035 | | | | |
| 8 | Lens 4 | 5.0333 | (ASP) | 0.446 | Plastic | 1.660 | 20.4 | −12.10 |
| 9 | | 2.9788 | (ASP) | 0.798 | | | | |
| 10 | Lens 5 | −6.2198 | (ASP) | 0.400 | Plastic | 1.680 | 18.2 | −81.48 |
| 11 | | −7.1886 | (ASP) | −0.024 | | | | |
| 12 | Stop | Plano | | 0.500 | | | | |
| 13 | Prism | Plano | | 12.912 | Glass | 1.516 | 64.1 | — |
| 14 | | Plano | | 0.300 | | | | |
| 15 | Filter | Plano | | 0.210 | Glass | 1.516 | 64.1 | — |
| 16 | | Plano | | 0.381 | | | | |
| 17 | Image | Plano | | — | | | | |

Note:
Reference wavelength is 587.6 nm (d-line).
An effective radius of the stop S1 (Surface 1) is 3.147 mm as the imaging optical lens system is in the first state.
The effective radius of the stop S1 (Surface 1) is 3.147 mm as the imaging optical lens system is in the second state.
The effective radius of the stop S1 (Surface 1) is 2.390 mm as the imaging optical lens system is in the third state.
An effective radius of the stop S2 (Surface 12) is 1.910 mm.
The imaging optical lens system can further include an aperture stop ST, and the position of the aperture stop ST can be adjusted depending on the object distance.
In this embodiment, the position of the aperture stop ST is at Surface 1 as the imaging optical lens system is in the first state (corresponding to infinite object distance).
In this embodiment, the position of the aperture stop ST is at Surface 1 as the imaging optical lens system is in the second state (corresponding to finite object distance).
In this embodiment, the position of the aperture stop ST is at Surface 1 as the imaging optical lens system is in the third state (corresponding to infinite object distance).

thereof and an image-side surface being convex in a paraxial region thereof. The fifth lens element E5 is made of plastic material and has the object-side surface and the image-side surface being both aspheric. The object-side surface of the fifth lens element E5 has one inflection point. The image-side surface of the fifth lens element E5 has two inflection points. The object-side surface of the fifth lens element E5 has one convex critical point in an off-axis region thereof. The image-side surface of the fifth lens element E5 has one concave critical point in an off-axis region thereof.

The reflective element E6 is made of glass material and located between the fifth lens element E5 and the image surface IMG along the optical axis, and will not affect the focal length of the imaging optical lens system. The reflective element E6 is a prism with an optical path folding function. For simplicity in illustration, FIG. 25 does not show the deflection effect caused by the reflective element E6 on the optical path. However, the reflective element E6 can have various configurations depending on actual design requirements, thereby causing different deflection effects on the optical path. Moreover, the reflective element E6 of this embodiment can have a configuration similar to, for example, one of the configurations shown in FIG. 57 to FIG. 64, which can be referred to foregoing descriptions corresponding to FIG. 57 to FIG. 64, and the details in this regard will not be provided again.

The filter E7 is made of glass material and located between the reflective element E6 and the image surface IMG, and will not affect the focal length of the imaging In this embodiment, a focal length of the imaging optical lens system in the third state is fV, an f-number of the imaging optical lens system in the third state is FnoV, half of a maximum field of view of the imaging optical lens system in the third state is HFOVV, an axial distance between an imaged object and the object-side surface of the one lens element nearest to the object side within the imaging optical lens system is referred to as an object distance, an axial distance between the imaged object and the stop S1 is D0, a displacement in parallel with the optical axis from the stop S1 to the object-side surface of the one lens element nearest to the object side within the imaging optical lens system is D1, and an axial distance between a surface of the movable lens group Gm nearest to the image side and a surface of the last lens group Gn nearest to the object side is D2. In this embodiment, the object distance is referred to as an axial distance between the imaged object and the object-side surface of the first lens element E1, D1 is referred to as a displacement in parallel with the optical axis from the stop S1 to the object-side surface of the first lens element E1, and D2 is referred to as an axial distance between the image-side surface of the second lens element E2 and the object-side surface of the third lens element E3. Values of the object distance, D0, D1 and D2 may change as the imaging optical lens system undergoes the focus adjustment process to transition among the first state, the second state and the third state (e.g., referring to Table 9B below). Other than the definitions of the parameters as described above in this paragraph, the definitions of the other parameters in Table 9B below are the same as those stated in the 1st embodiment with corresponding values for the 9th embodiment. Moreover, when the direction in parallel with the optical axis from the stop S1 to the object-side surface of the first lens element E1 is facing towards the image side of the imaging optical lens system, the value of displacement D1 is positive; when the direction in parallel with the optical axis from the stop S1 to the object-side surface of the first lens element E1 is facing towards the object side of the imaging optical lens system, the value of displacement D1 is negative.

TABLE 9B

| Values of Optical And Physical Parameters/Definitions | | | | | |
|---|---|---|---|---|---|
| First State (Infinite Object Distance) | | Second State (Finite Object Distance) | | Third State (Infinite Object Distance) | |
| fL [mm] | 16.75 | fS [mm] | 16.22 | fV [mm] | 16.75 |
| FnoL | 2.66 | FnoS | 3.02 | FnoV | 3.50 |
| HFOVL [deg.] | 9.5 | HFOVS [deg.] | 8.4 | HFOVV [deg.] | 9.5 |
| Object Distance [mm] | ∞ | Object Distance [mm] | 149.523 | Object Distance [mm] | ∞ |
| D0 [mm] | ∞ | D0 [mm] | 150.517 | D0 [mm] | ∞ |
| D1 [mm] | −0.994 | D1 [mm] | −0.994 | D1 [mm] | 0.000 |
| D2 [mm] | 0.719 | D2 [mm] | 2.419 | D2 [mm] | 0.719 |

It should be understood that, in this embodiment, only three moving focus states (i.e., the first state, the second state and the third state) are disclosed, but the present disclosure is not limited thereto. Besides the first state, the second state and the third state, the imaging optical lens system in this embodiment can also have other moving focus states with different focal lengths among the first state, the second state and the third state to accommodate focusing conditions for other object distances.

In Table 9B, the imaging optical lens system undergoes the focus adjustment process according to the change of object distance, and the movable lens group Gm is moved toward the object side along the optical axis relative to the last lens group Gn when the imaging optical lens system transitions from the first state (or the third state) to the second state in the focus adjustment process. Specifically, when the object distance changes from infinite to 149.523 mm, the imaging optical lens system transitions from the first state (or the third state) to the second state, the axial distance D2 between the movable lens group Gm and the last lens group Gn increases from 0.719 mm in the first state (or the third state) to 2.419 mm in the second state, and the reflective element E6 is immovable relative to the last lens group Gn during the focus adjustment process. In other words, when the object distance decreases, the movable lens group Gm is moved toward the object side along the optical axis relative to the last lens group Gn during the focus adjustment process.

TABLE 9C

| Aspheric Coefficients | | | | |
|---|---|---|---|---|
| Surface # | 4 | 5 | 6 | 7 |
| k= | −7.9286200E−02 | 5.3146600E−02 | 9.4040900E−01 | 1.1186200E+01 |
| A4= | −3.9946396E−03 | −4.4284115E−03 | −2.4631092E−02 | 2.3646115E−02 |
| A6= | 1.4982553E−03 | 2.3520296E−03 | 2.0309916E−02 | −8.9820737E−02 |
| A8= | −1.4942109E−03 | −2.7267306E−03 | −1.5616665E−02 | 1.4427408E−01 |
| A10= | 8.2599253E−04 | 1.7139538E−03 | 1.5530383E−02 | −1.2162245E−01 |
| A12= | −2.7463391E−04 | −6.5030814E−04 | −1.0986755E−02 | 6.6575106E−02 |
| A14= | 5.8184729E−05 | 1.5771911E−04 | 4.9046548E−03 | −2.5808885E−02 |
| A16= | −7.9589941E−06 | −2.4818739E−05 | −1.3978554E−03 | 7.3158816E−03 |
| A18= | 6.8361435E−07 | 2.4715845E−06 | 2.5459858E−04 | −1.4965556E−03 |
| A20= | −3.3672354E−08 | −1.4280987E−07 | −2.8632624E−05 | 2.0826557E−04 |
| A22= | 7.2871150E−10 | 3.6836430E−09 | 1.8039624E−06 | −1.7449541E−05 |
| A24= | — | — | −4.8399509E−08 | 6.5672422E−07 |

| Surface # | 8 | 9 | 10 | 11 |
|---|---|---|---|---|
| k= | −2.8828900E+00 | −2.5000700E−01 | −8.4219700E+00 | −2.8112700E+00 |
| A4= | 1.0664838E−01 | 8.6962675E−02 | 4.9853055E−02 | 3.0765718E−02 |
| A6= | −1.7113324E−01 | −8.4576193E−02 | −3.0880390E−02 | −1.6711493E−02 |
| A8= | 1.9614800E−01 | 4.2853557E−02 | 2.2247063E−02 | 1.0615686E−02 |
| A10= | −1.5235645E−01 | −7.6896330E−03 | −1.4323175E−02 | −6.2288888E−03 |
| A12= | 8.1301851E−02 | −6.0443881E−03 | 7.9349967E−03 | 3.4731527E−03 |
| A14= | −3.0731136E−02 | 5.4473434E−03 | −3.3533631E−03 | −1.6020829E−03 |
| A16= | 8.3484592E−03 | −2.1048430E−03 | 9.9540936E−04 | 5.3294853E−04 |
| A18= | −1.6130176E−03 | 4.5276952E−04 | −1.9335123E−04 | −1.1531691E−04 |
| A20= | 2.1145207E−04 | −5.2494551E−05 | 2.1736034E−05 | 1.4220904E−05 |

TABLE 9C-continued

| Aspheric Coefficients | | | | |
| --- | --- | --- | --- | --- |
| A22= | −1.6823000E−05 | 2.5649543E−06 | −1.0556273E−06 | −7.4933475E−07 |
| A24= | 6.0901899E−07 | — | — | — |

In the 9th embodiment, the equation of the aspheric surface profiles of the aforementioned lens elements is the same as the equation of the 1st embodiment. Also, other than the definition of the parameter FnoV as described above in this embodiment, the definitions of the other parameters shown in Table 9D below are the same as those stated in the 1st embodiment with corresponding values for the 9th embodiment, so an explanation in this regard will not be provided again.

Moreover, these parameters can be calculated from Table 9A and Table 9C as the following values and satisfy the following conditions:

TABLE 9D

| Values of Optical And Physical Parameters/Definitions | | | |
| --- | --- | --- | --- |
| fL [mm] | 16.75 | \|fL/f3\| | 1.16 |
| FnoL | 2.66 | fL/f12 | 1.11 |
| HFOVL [deg.] | 9.5 | \|f1/f2\| | 0.52 |
| FOVL [deg.] | 19.0 | f4/f3 | −0.84 |
| fS [mm] | 16.22 | fL/R7 + fL/R8 | 8.95 |
| FnoS | 3.02 | (R2 + R7)/(R2 − R7) | 0.99 |
| HFOVS [deg.] | 8.4 | (R3 − R6)/(R3 + R6) | −0.38 |
| FOVS [deg.] | 16.8 | CT1/CT2 | 5.50 |
| FnoL/FnoS | 0.88 | CT1/Dr5r8L | 2.24 |
| TLS/TLL | 1.09 | 10 × T34L/CT4 | 0.78 |
| BLS/BLL | 1.00 | 10 × T34L/T45L | 0.44 |
| 10 × \|TDS − TDL\|/TDL | 3.06 | T45L/CT4 | 1.79 |
| FnoV−FnoL | 0.84 | T45L/CT5 | 2.00 |
| TLL/ImgH | 6.96 | V2 + V4 + V5 | 66.9 |
| BLL/ImgH | 5.01 | Sag3R1L/CT3 | 1.21 |
| TDL/BLL | 0.39 | Y1R1L/Y5R2L | 1.64 |
| fL/f1 | 1.84 | (T23L + Sag3R1L − Sag2R2L)/Y2R2L | 0.23 |

10th Embodiment

Figure 29:
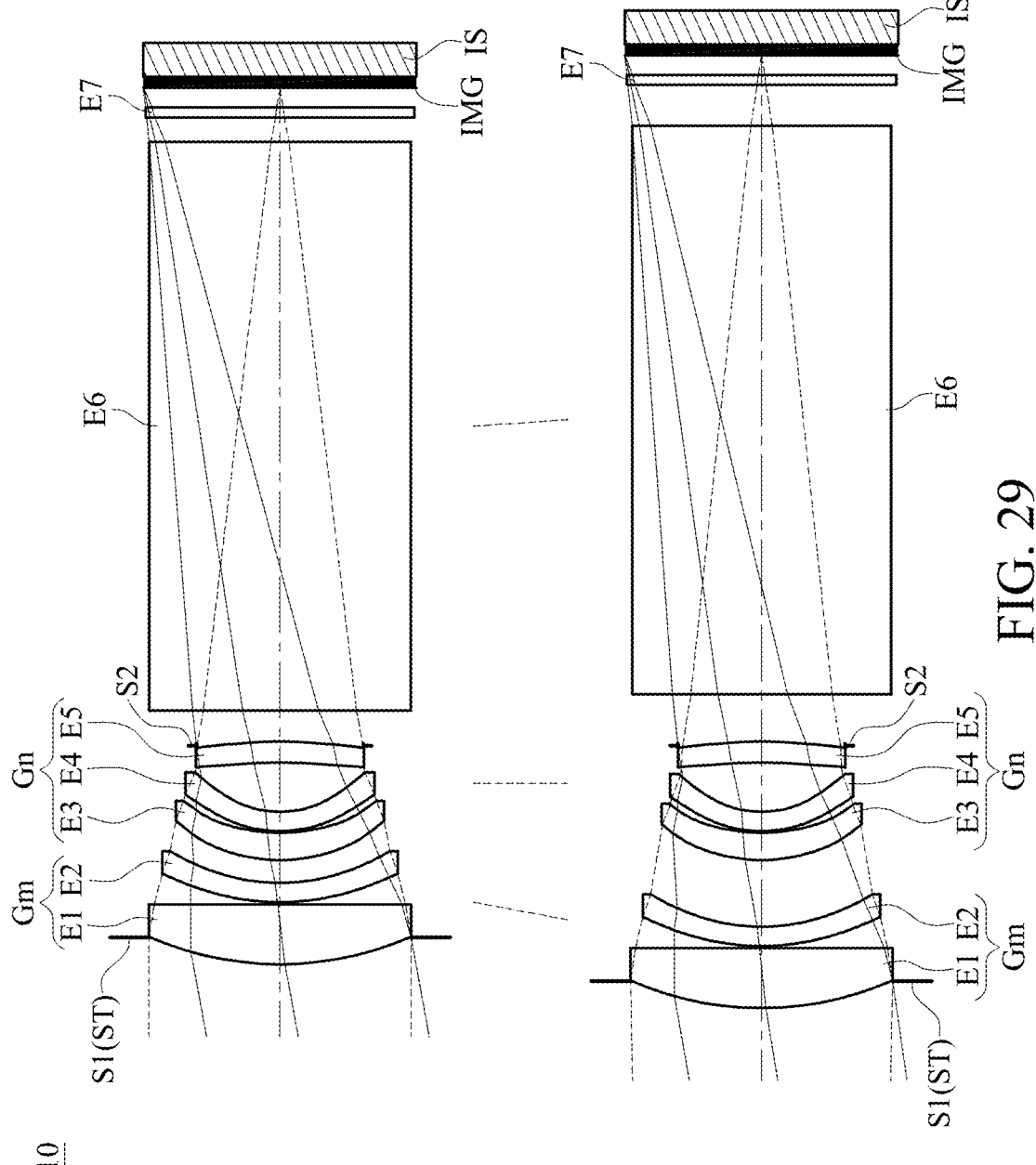
FIG. 29 shows schematic views of an image capturing unit respectively in a first state and a second state according to the 10th embodiment of the present disclosure.
Figure 30:
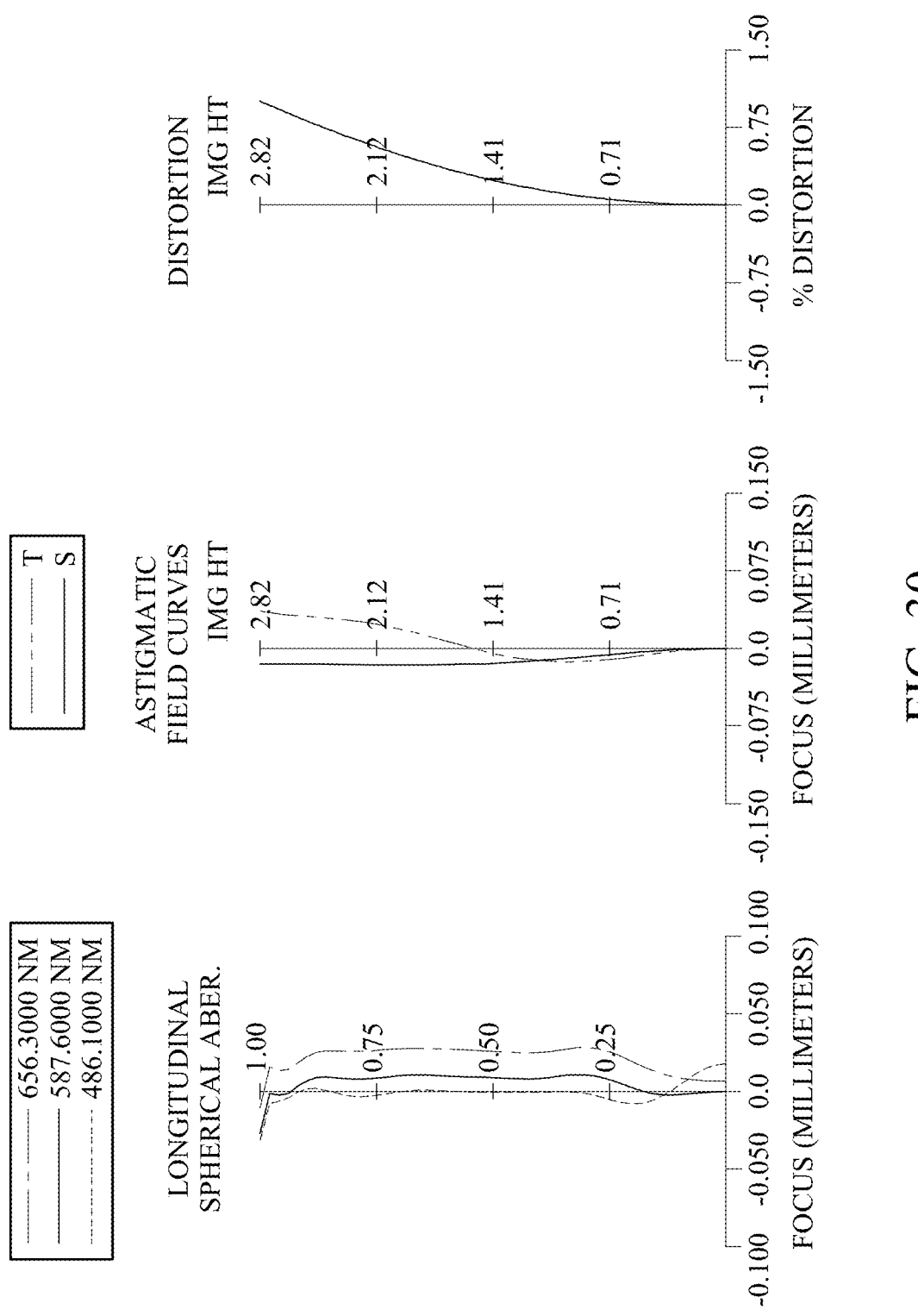
FIG. 30 shows spherical aberration curves, astigmatic field curves and a distortion curve of the image capturing unit in the first state according to the 10th embodiment.
Figure 31:
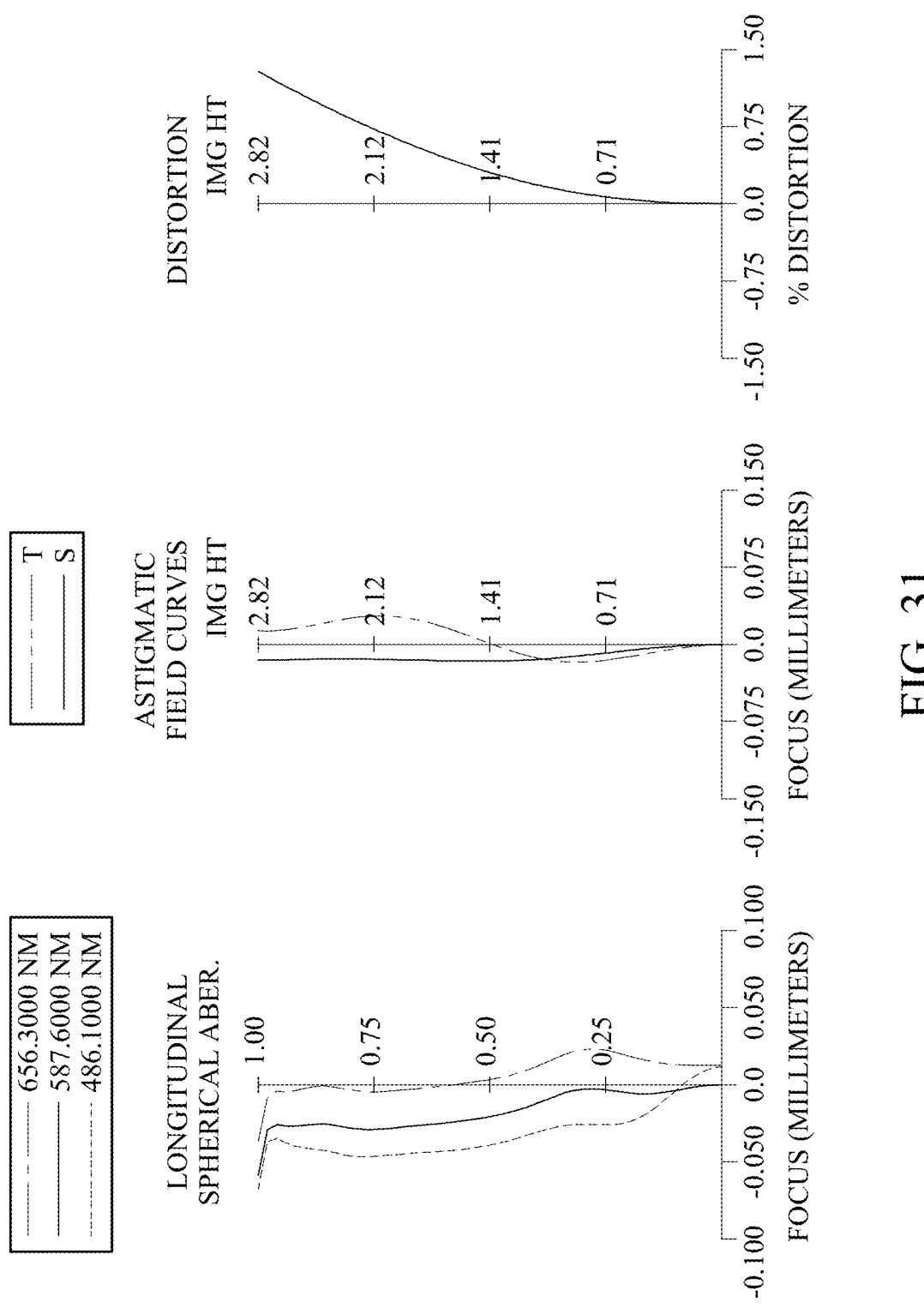
FIG. 31 shows spherical aberration curves, astigmatic field curves and a distortion curve of the image capturing unit in the second state according to the 10th embodiment.

FIG. 29 shows schematic views of an image capturing unit respectively in a first state and a second state according to the 10th embodiment of the present disclosure. FIG. 30 shows, in order from left to right, spherical aberration curves, astigmatic field curves and a distortion curve of the image capturing unit in the first state according to the 10th embodiment. FIG. 31 shows, in order from left to right, spherical aberration curves, astigmatic field curves and a distortion curve of the image capturing unit in the second state according to the 10th embodiment. Moreover, the upper part of FIG. 29 shows the schematic view of the imaging optical lens system in the first state, and the lower part of FIG. 29 shows the schematic view of the imaging optical lens system in the second state. In FIG. 29, the image capturing unit 10 includes the imaging optical lens system (its reference numeral is omitted) of the present disclosure and an image sensor IS. The imaging optical lens system includes, in order from an object side to an image side along an optical axis, a stop S1, a first lens element E1, a second lens element E2, a third lens element E3, a fourth lens element E4, a fifth lens element E5, a stop S2, a reflective element E6, a filter E7 and an image surface IMG. Furthermore, the imaging optical lens system includes, in order from the object side to the image side along a travelling direction of an optical path, a movable lens group Gm and a last lens group Gn, where the movable lens group Gm includes the first lens element E1 and the second lens element E2, and the last lens group Gn includes the third lens element E3, the fourth lens element E4 and the fifth lens element E5. The imaging optical lens system includes five lens elements (E1, E2, E3, E4 and E5) with no additional lens element disposed between each of the adjacent five lens elements. In addition, there is no additional lens element located between the last lens group Gn and the reflective element E6 along the optical axis.

A focal length of the imaging optical lens system is variable by changes of axial distances among the movable lens group Gm, the last lens group Gn, the reflective element E6 and the filter E7 in a focus adjustment process. In FIG. 29, the movable lens group Gm is moved along the optical axis relative to the last lens group Gn in the focus adjustment process, and the reflective element E6 is moved along the optical axis relative to the last lens group Gn in the focus adjustment process. Furthermore, the imaging optical lens system can undergo the focus adjustment process to transition to the first state, as shown in the upper part of FIG. 29 or to the second state, as shown in the lower part of FIG. 29. The imaging optical lens system being in the first state refers to a state where an imaged object is at an infinite object distance and an entrance pupil diameter of the imaging optical lens system is at its maximum; the imaging optical lens system being in the second state refers to a state where an imaged object is at a finite object distance. Moreover, the movable lens group Gm is moved toward the object side along the optical axis relative to the last lens group Gn when the imaging optical lens system transitions from the first state to the second state in the focus adjustment process. It is noted that all lens elements in the movable lens group Gm are immovable relative to one another during the focus adjustment process, and all lens elements in the last lens group Gn are immovable relative to one another during the focus adjustment process.

The first lens element E1 with positive refractive power has an object-side surface being convex in a paraxial region thereof and an image-side surface being concave in a paraxial region thereof. The first lens element E1 is made of glass material and has the object-side surface and the image-side surface being both spherical.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric.

The third lens element E3 with positive refractive power has an object-side surface being convex in a paraxial region thereof and an image-side surface being concave in a paraxial region thereof. The third lens element E3 is made of plastic material and has the object-side surface and the image-side surface being both aspheric. The object-side surface of the third lens element E3 has one inflection point. The image-side surface of the third lens element E3 has one inflection point.

The fourth lens element E4 with negative refractive power has an object-side surface being convex in a paraxial region thereof and an image-side surface being concave in a paraxial region thereof. The fourth lens element E4 is made IMG, and will not affect the focal length of the imaging optical lens system. The image sensor IS is disposed on or near the image surface IMG of the imaging optical lens system.

The detailed optical data of the 10th embodiment are shown in Table 10A and Table 10B, and the aspheric surface data are shown in Table 10C below.

TABLE 10A

| 10th Embodiment | | | | | | | |
|---|---|---|---|---|---|---|---|
| Surface # | | Curvature Radius | Thickness | Material | Index | Abbe # | Focal Length |
| 0 | Object | Plano | D0 | | | | |
| 1 | Stop | Plano | −0.558 | | | | |
| 2 | Lens 1 | 6.7048 (SPH) | 1.236 | Glass | 1.593 | 68.3 | 11.37 |
| 3 | | 1142.4659 (SPH) | 0.050 | | | | |
| 4 | Lens 2 | 4.9984 (ASP) | 0.400 | Plastic | 1.669 | 19.5 | −40.48 |
| 5 | | 4.0842 (ASP) | D1 | | | | |
| 6 | Lens 3 | 3.1353 (ASP) | 0.568 | Plastic | 1.545 | 56.1 | 28.62 |
| 7 | | 3.6733 (ASP) | 0.035 | | | | |
| 8 | Lens 4 | 3.0997 (ASP) | 0.400 | Plastic | 1.639 | 23.5 | −19.55 |
| 9 | | 2.3582 (ASP) | 1.019 | | | | |
| 10 | Lens 5 | −7.1790 (ASP) | 0.433 | Plastic | 1.614 | 25.6 | −301.28 |
| 11 | | −7.6403 (ASP) | −0.085 | | | | |
| 12 | Stop | Plano | D2 | | | | |
| 13 | Prism | Plano | 11.771 | Glass | 1.516 | 64.1 | — |
| 14 | | Plano | D3 | | | | |
| 15 | Filter | Plano | 0.210 | Glass | 1.516 | 64.1 | — |
| 16 | | Plano | 0.403 | | | | |
| 17 | Image | Plano | — | | | | |

Note:
Reference wavelength is 587.6 nm (d-line).
An effective radius of the stop S1 (Surface 1) is 2.709 mm.
An effective radius of the stop S2 (Surface 12) is 1.725 mm.
The imaging optical lens system can further include an aperture stop ST, and the position of the aperture stop ST can be adjusted depending on the object distance.
In this embodiment, the position of the aperture stop ST is at Surface 1 as the imaging optical lens system is in the first state (corresponding to infinite object distance).
In this embodiment, the position of the aperture stop ST is at Surface 1 as the imaging optical lens system is in the second state (corresponding to finite object distance).

of plastic material and has the object-side surface and the image-side surface being both aspheric. The object-side surface of the fourth lens element E4 has one inflection point.

The fifth lens element E5 with negative refractive power has an object-side surface being concave in a paraxial region thereof and an image-side surface being convex in a paraxial region thereof. The fifth lens element E5 is made of plastic material and has the object-side surface and the image-side surface being both aspheric. The object-side surface of the fifth lens element E5 has two inflection points.

The reflective element E6 is made of glass material and located between the fifth lens element E5 and the image surface IMG along the optical axis, and will not affect the focal length of the imaging optical lens system. The reflective element E6 is a prism with an optical path folding function. For simplicity in illustration, FIG. 29 does not show the deflection effect caused by the reflective element E6 on the optical path. However, the reflective element E6 can have various configurations depending on actual design requirements, thereby causing different deflection effects on the optical path. Moreover, the reflective element E6 of this embodiment can have a configuration similar to, for example, one of the configurations shown in FIG. 57 to FIG. 64, which can be referred to foregoing descriptions corresponding to FIG. 57 to FIG. 64, and the details in this regard will not be provided again.

The filter E7 is made of glass material and located between the reflective element E6 and the image surface In this embodiment, an axial distance between the last lens group Gn and the reflective element E6 is D2, and an axial distance between the reflective element E6 and the filter E7 is D3. Values of D2 and D3 may change as the imaging optical lens system undergoes the focus adjustment process to transition between the first state and the second state (e.g., referring to Table 10B below). Other than the definitions of the parameters as described above in this paragraph, the definitions of the other parameters in Table 10B below are the same as those stated in the 1st embodiment with corresponding values for the 10th embodiment.

TABLE 10B

| Values of Optical And Physical Parameters/Definitions | | | |
|---|---|---|---|
| First State (Infinite Object Distance) | | Second State (Finite Object Distance) | |
| fL [mm] | 15.18 | fS [mm] | 14.99 |
| FnoL | 2.80 | FnoS | 3.17 |
| HFOVL [deg.] | 10.4 | HFOVS [deg.] | 9.3 |
| Object Distance [mm] | ∞ | Object Distance [mm] | 150.019 |
| D0 [mm] | ∞ | D0 [mm] | 150.577 |
| D1 [mm] | 0.471 | D1 [mm] | 1.378 |
| D2 [mm] | 0.730 | D2 [mm] | 1.066 |
| D3 [mm] | 0.510 | D3 [mm] | 0.846 |

It should be understood that, in this embodiment, only two moving focus states (i.e., the first state and the second state) are disclosed, but the present disclosure is not limited thereto. Besides the first state and the second state, the imaging optical lens system in this embodiment can also have other moving focus states with different focal lengths between the first state and the second state to accommodate focusing conditions for other object distances.

Figure 66:
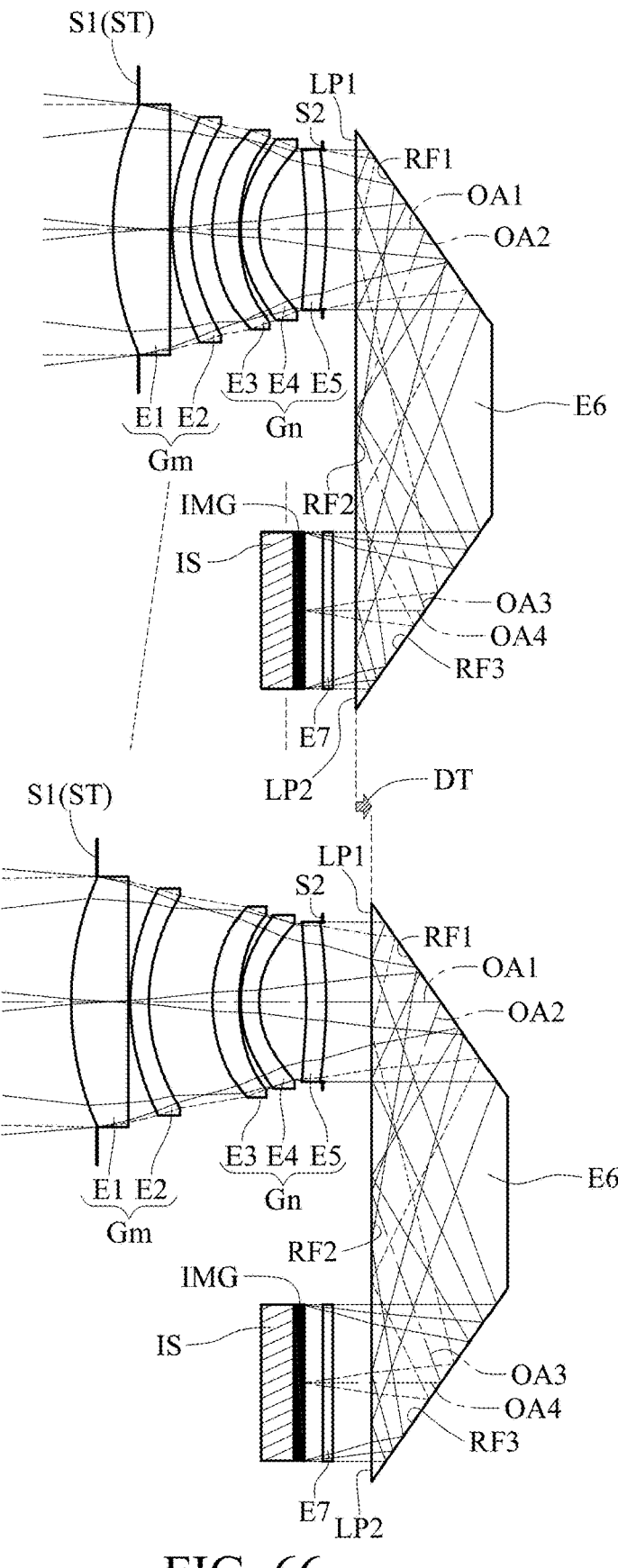
FIG. 66 shows schematic views of a configuration of a reflective element and its associated light path deflection in the image capturing unit respectively in the first state and the second state according to the 10th embodiment.

In Table 10B, the imaging optical lens system undergoes the focus adjustment process according to the change of object distance, the movable lens group Gm is moved toward the object side along the optical axis relative to the last lens group Gn when the imaging optical lens system transitions from the first state to the second state in the focus adjustment process, and the reflective element E6 is moved in the second state. In FIG. 66, when the imaging optical lens system transitions from the first state to the second state during the focus adjustment process, the reflective element E6 is moved a distance DT along the optical axis, away from both the last lens group Gn and the filter E7, where the value of DT represents the difference between the distance D2 in the second state and the distance D2 in the first state, or the difference between the distance D3 in the second state and the distance D3 in the first state (i.e., DT=0.336 mm).

TABLE 10C

| Aspheric Coefficients | | | | |
|---|---|---|---|---|
| Surface # | 4 | 5 | 6 | 7 |
| k= | 7.3462900E−02 | 3.2846100E−02 | 7.4656000E−02 | 2.1094900E−01 |
| A4= | −3.0807554E−04 | −1.8521477E−04 | −1.8294766E−02 | 2.9350199E−02 |
| A6= | 1.1925192E−03 | 1.3609278E−03 | −8.1911041E−04 | −1.6012900E−01 |
| A8= | −1.8613527E−03 | −2.4185489E−03 | 1.3616563E−02 | 2.8576962E−01 |
| A10= | 1.2190124E−03 | 1.7102507E−03 | −1.2674730E−02 | −2.8866211E−01 |
| A12= | −5.0040285E−04 | −7.5201563E−04 | 7.0271477E−03 | 1.9183362E−01 |
| A14= | 1.3917915E−04 | 2.2569708E−04 | −2.7387389E−03 | −8.8040752E−02 |
| A16= | −2.6338933E−05 | −4.6907886E−05 | 7.7514021E−04 | 2.8212611E−02 |
| A18= | 3.2453838E−06 | 6.4789730E−06 | −1.5509100E−04 | −6.2075083E−03 |
| A20= | −2.3362197E−07 | −5.3160209E−07 | 2.0492939E−05 | 8.9280668E−04 |
| A22= | 7.4110846E−09 | 1.9421872E−08 | −1.5848596E−06 | −7.5446623E−05 |
| A24= | — | — | 5.3802760E−08 | 2.8347688E−06 |
| Surface # | 8 | 9 | 10 | 11 |
| k= | −2.6169200E−01 | −1.9051700E−01 | 1.4101300E+00 | 1.5867200E−02 |
| A4= | 9.5239950E−02 | 7.3443952E−02 | 3.1566758E−02 | 1.8039754E−02 |
| A6= | −1.6449561E−01 | −3.2324172E−02 | −1.0065380E−02 | 2.0280046E−04 |
| A8= | 2.1777892E−01 | −3.5194965E−02 | −1.5975339E−03 | −1.8021245E−02 |
| A10= | −2.0185374E−01 | 6.7334599E−02 | 1.4635349E−03 | 2.7292031E−02 |
| A12= | 1.2789034E−01 | −5.8458862E−02 | 6.2805009E−03 | −2.2620272E−02 |
| A14= | −5.6080407E−02 | 3.2037301E−02 | −1.0093451E−02 | 1.1705843E−02 |
| A16= | 1.7085843E−02 | −1.1464632E−02 | 7.2751682E−03 | −3.8239424E−03 |
| A18= | −3.5555135E−03 | 2.5704558E−03 | −3.0353486E−03 | 7.4149151E−04 |
| A20= | 4.8096807E−04 | −3.1956541E−04 | 7.5538314E−04 | −6.9364994E−05 |
| A22= | −3.7885304E−05 | 1.4563534E−05 | −1.0456953E−04 | 1.2659961E−07 |
| A24= | 1.3055982E−06 | 4.3663622E−07 | 6.2203800E−06 | 3.4060009E−07 | along the optical axis relative to the last lens group Gn when the imaging optical lens system transitions from the first state to the second state in the focus adjustment process. Specifically, when the object distance changes from infinite to 150.019 mm, the imaging optical lens system transitions from the first state to the second state, the axial distance D1 between the movable lens group Gm and the last lens group Gn increases from 0.471 mm in the first state to 1.378 mm in the second state, the axial distance D2 between the reflective element E6 and the last lens group Gn increases from 0.730 mm in the first state to 1.066 mm in the second state, and the axial distance D3 between the reflective element E6 and the filter E7 increases from 0.510 mm in the first state to 0.846 mm in the second state. That is, when the object distance decreases, the movable lens group Gm is moved toward the object side along the optical axis relative to the last lens group Gn in the focus adjustment process, and the axial distances from the reflective element E6 to both the last lens group Gn and the filter E7 increase during the focus adjustment process. Please refer to FIG. 66, which shows schematic views of a configuration of a reflective element and its associated light path deflection in the image capturing unit respectively in the first state and the second state according to the 10th embodiment, where the upper part of FIG. 66 shows the schematic view of the imaging optical lens system in the first state, and the lower part of FIG. 66 shows the schematic view of the imaging optical lens system In the 10th embodiment, the equation of the aspheric surface profiles of the aforementioned lens elements is the same as the equation of the 1st embodiment. Also, the definitions of these parameters shown in Table 10D below are the same as those stated in the 1st embodiment with corresponding values for the 10th embodiment, so an explanation in this regard will not be provided again.

Moreover, these parameters can be calculated from Table 10A and Table 10C as the following values and satisfy the following conditions:

TABLE 10D

| Values of Optical And Physical Parameters/Definitions | | | |
|---|---|---|---|
| fL [mm] | 15.18 | fL/f12 | 1.04 |
| FnoL | 2.80 | \|f1/f2\| | 0.28 |
| HFOVL [deg.] | 10.4 | f4/f3 | −0.68 |
| FOVL [deg.] | 20.8 | fL/R7 + fL/R8 | 11.33 |
| fS [mm] | 14.99 | (R2 + R7)/(R2 − R7) | 1.01 |
| FnoS | 3.17 | (R3 − R6)/(R3 + R6) | 0.15 |
| HFOVS [deg.] | 9.3 | CT1/CT2 | 3.09 |
| FOVS [deg.] | 18.6 | CT1/Dr5r8L | 1.23 |
| FnoL/FnoS | 0.88 | 10 × T34L/CT4 | 0.88 |
| TLS/TLL | 1.09 | 10 × T34L/T45L | 0.34 |
| BLS/BLL | 1.05 | T45L/CT4 | 2.55 |
| 10 × \|TDS − TDL\|/TDL | 1.97 | T45L/CT5 | 2.35 |
| TLL/ImgH | 6.43 | V2 + V4 + V5 | 68.6 |
| BLL/ImgH | 4.80 | Sag3R1L/CT3 | 1.45 |

TABLE 10D-continued

| Values of Optical And Physical Parameters/Definitions | | | |
|---|---|---|---|
| TDL/BLL | 0.34 | Y1R1L/Y5R2L | 1.56 |
| fL/f1 | 1.33 | (T23L + Sag3R1L − Sag2R2L)/Y2R2L | 0.28 |
| |fL/f3| | 0.53 | — | — |

11th Embodiment

Figure 32:
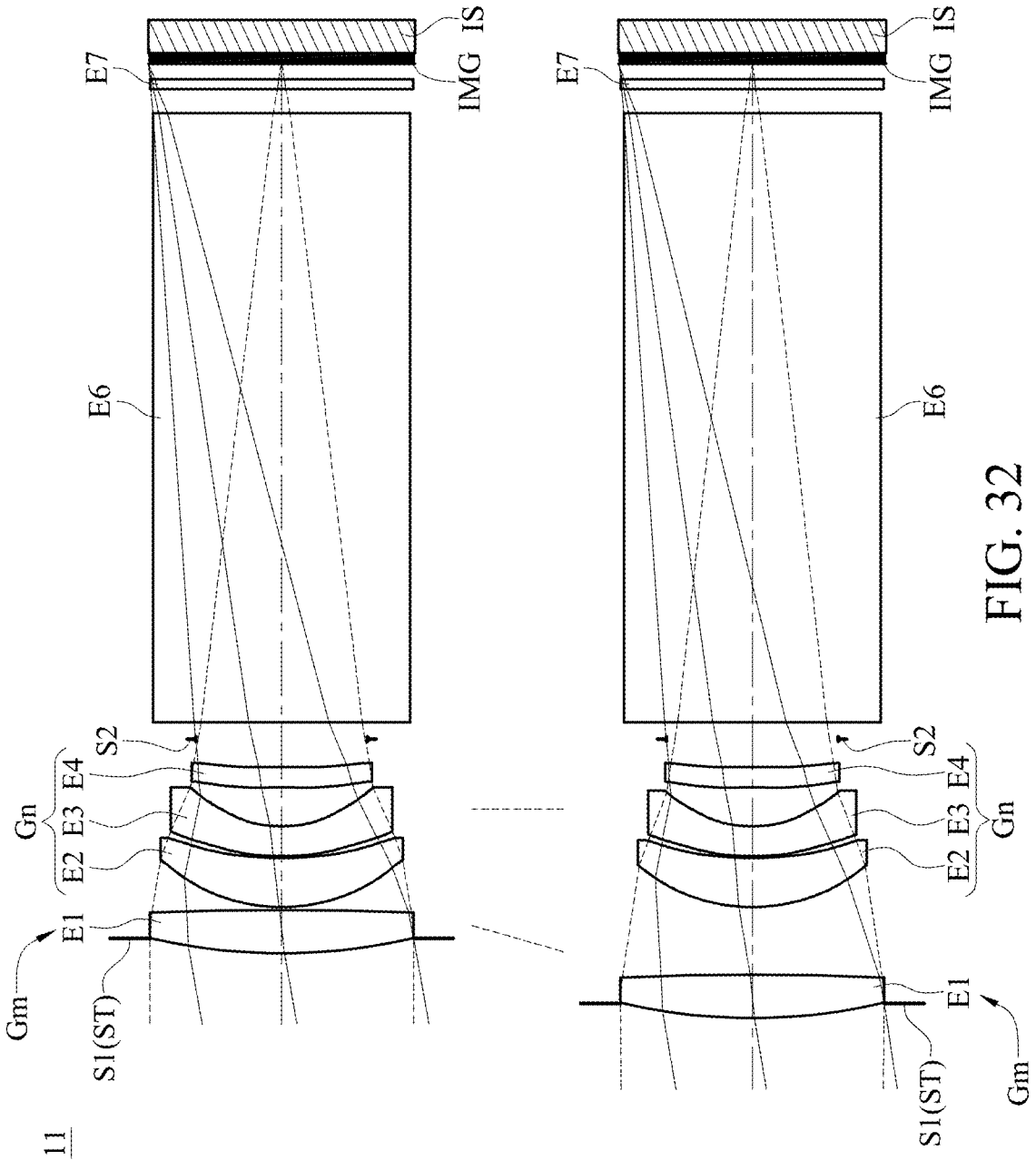
FIG. 32 shows schematic views of an image capturing unit respectively in a first state and a second state according to the 11th embodiment of the present disclosure.
Figure 33:
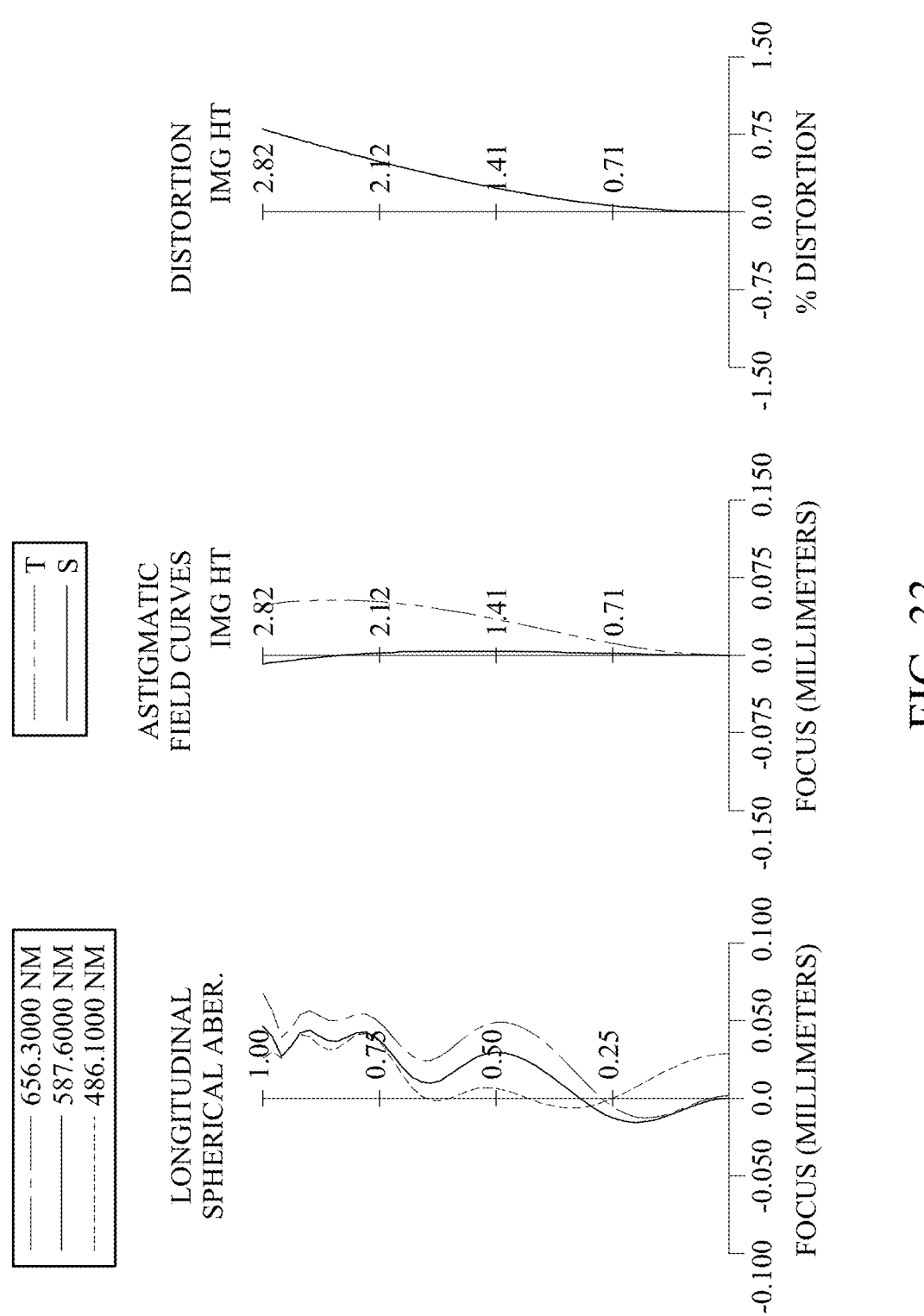
FIG. 33 shows spherical aberration curves, astigmatic field curves and a distortion curve of the image capturing unit in the first state according to the 11th embodiment.
Figure 34:
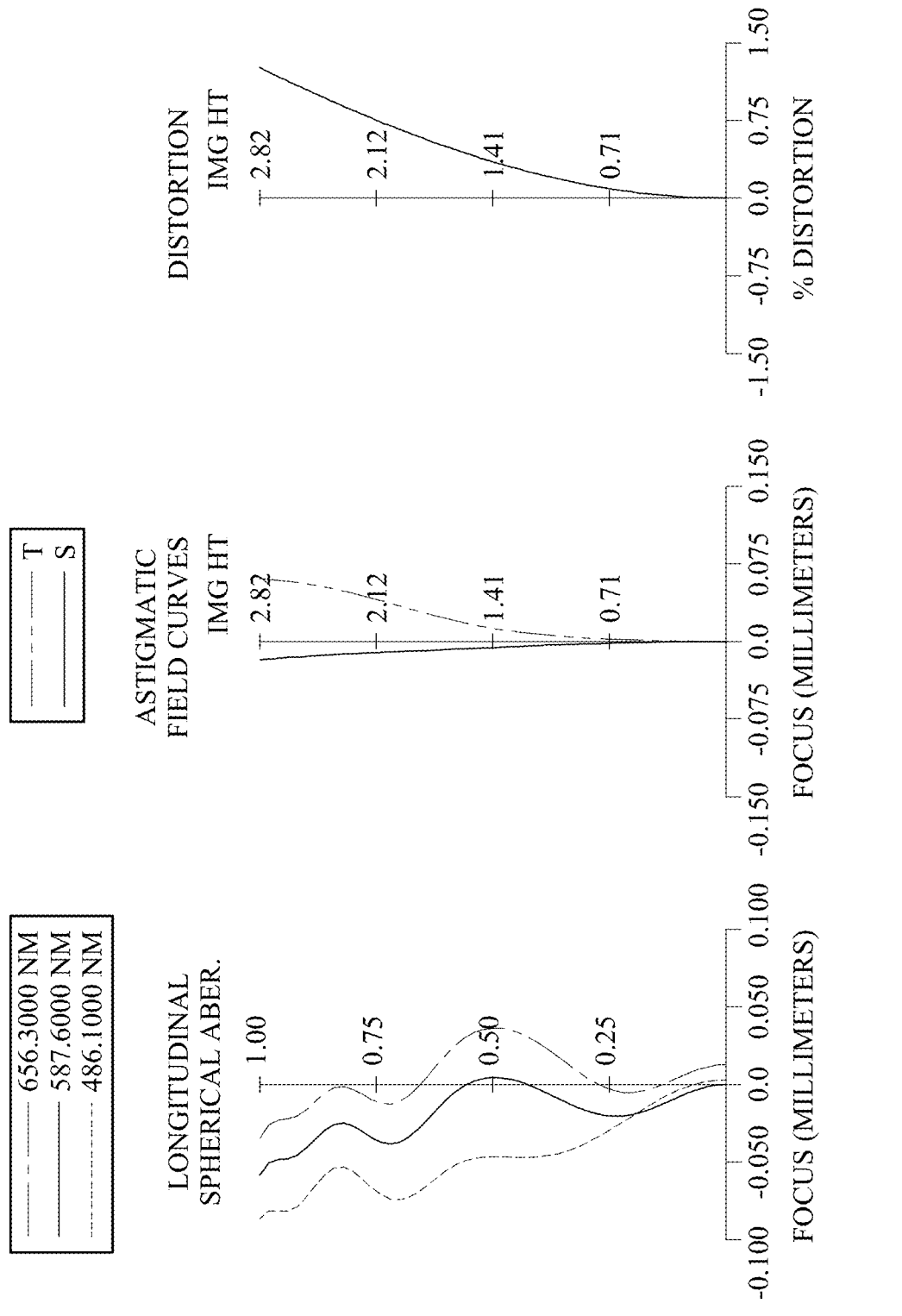
FIG. 34 shows spherical aberration curves, astigmatic field curves and a distortion curve of the image capturing unit in the second state according to the 11th embodiment.

FIG. 32 shows schematic views of an image capturing unit respectively in a first state and a second state according to the 11th embodiment of the present disclosure. FIG. 33 shows, in order from left to right, spherical aberration curves, astigmatic field curves and a distortion curve of the image capturing unit in the first state according to the 11th embodiment. FIG. 34 shows, in order from left to right, spherical aberration curves, astigmatic field curves and a distortion curve of the image capturing unit in the second state according to the 11th embodiment. Moreover, the upper part of FIG. 32 shows the schematic view of the imaging optical lens system in the first state, and the lower part of FIG. 32 shows the schematic view of the imaging optical lens system in the second state. In FIG. 32, the image capturing unit 11 includes the imaging optical lens system (its reference numeral is omitted) of the present disclosure and an image sensor IS. The imaging optical lens system includes, in order from an object side to an image side along an optical axis, a stop S1, a first lens element E1, a second lens element E2, a third lens element E3, a fourth lens element E4, a stop S2, a reflective element E6, a filter E7 and an image surface IMG. Furthermore, the imaging optical lens system includes, in order from the object side to the image side along a travelling direction of an optical path, a movable lens group Gm and a last lens group Gn, where the movable lens group Gm includes the first lens element E1, and the last lens group Gn includes the second lens element E2, the third lens element E3 and the fourth lens element E4. The imaging optical lens system includes four lens elements (E1, E2, E3 and E4) with no additional lens element disposed between each of the adjacent five lens elements. In addition, there is no additional lens element located between the last lens group Gn and the reflective element E6 along the optical axis.

A focal length of the imaging optical lens system is variable by change of an axial distance between the two lens groups (Gm and Gn) in a focus adjustment process. In FIG. 32, the movable lens group Gm is moved along the optical axis relative to the last lens group Gn in the focus adjustment process. Furthermore, the imaging optical lens system can undergo the focus adjustment process to transition to the first state, as shown in the upper part of FIG. 32 or to the second state, as shown in the lower part of FIG. 32. The imaging optical lens system being in the first state refers to a state where an imaged object is at an infinite object distance and an entrance pupil diameter of the imaging optical lens system is at its maximum; the imaging optical lens system being in the second state refers to a state where an imaged object is at a finite object distance. Moreover, the movable lens group Gm is moved toward the object side along the optical axis relative to the last lens group Gn when the imaging optical lens system transitions from the first state to the second state in the focus adjustment process. It is noted that all lens elements in the movable lens group Gm are immovable relative to one another during the focus adjustment process, and all lens elements in the last lens group Gn are immovable relative to one another during the focus adjustment process. In addition, during the focus adjustment process, the reflective element E6 is immovable relative to the last lens group Gn.

The first lens element E1 with positive refractive power has an object-side surface being convex in a paraxial region thereof and an image-side surface being convex in a paraxial region thereof. The first lens element E1 is made of glass material and has the object-side surface and the image-side surface being both spherical.

The second lens element E2 with positive refractive power has an object-side surface being convex in a paraxial region thereof and an image-side surface being concave in a paraxial region thereof. The second lens element E2 is made of plastic material and has the object-side surface and the image-side surface being both aspheric. The object-side surface of the second lens element E2 has one inflection point. The image-side surface of the second lens element E2 has one inflection point.

The third lens element E3 with negative refractive power has an object-side surface being convex in a paraxial region thereof and an image-side surface being concave in a paraxial region thereof. The third lens element E3 is made of plastic material and has the object-side surface and the image-side surface being both aspheric.

The fourth lens element E4 with negative refractive power has an object-side surface being concave in a paraxial region thereof and an image-side surface being convex in a paraxial region thereof. The fourth lens element E4 is made of plastic material and has the object-side surface and the image-side surface being both aspheric. The object-side surface of the fourth lens element E4 has two inflection points. The image-side surface of the fourth lens element E4 has two inflection points. The object-side surface of the fourth lens element E4 has one convex critical point and one concave critical point in an off-axis region thereof. The image-side surface of the fourth lens element E4 has one concave critical point in an off-axis region thereof.

The reflective element E6 is made of glass material and located between the fourth lens element E4 and the image surface IMG along the optical axis, and will not affect the focal length of the imaging optical lens system. The reflective element E6 is a prism with an optical path folding function. For simplicity in illustration, FIG. 32 does not show the deflection effect caused by the reflective element E6 on the optical path. However, the reflective element E6 can have various configurations depending on actual design requirements, thereby causing different deflection effects on the optical path. Moreover, the reflective element E6 of this embodiment can have a configuration similar to, for example, one of the configurations shown in FIG. 57 to FIG. 64, which can be referred to foregoing descriptions corresponding to FIG. 57 to FIG. 64, and the details in this regard will not be provided again.

The filter E7 is made of glass material and located between the reflective element E6 and the image surface IMG, and will not affect the focal length of the imaging optical lens system. The image sensor IS is disposed on or near the image surface IMG of the imaging optical lens system.

The detailed optical data of the 11th embodiment are shown in Table 11A and Table 11B, and the aspheric surface data are shown in Table 11C below.

TABLE 11A

| | | 11th Embodiment | | | | | |
|---|---|---|---|---|---|---|---|
| Surface # | | Curvature Radius | Thickness | Material | Index | Abbe # | Focal Length |
| 0 | Object | Plano | D0 | | | | |
| 1 | Stop | Plano | −0.312 | | | | |
| 2 | Lens 1 | 12.1891 (SPH) | 0.919 | Glass | 1.589 | 61.3 | 17.54 |
| 3 | | −65.9724 (SPH) | D1 | | | | |
| 4 | Lens 2 | 3.5054 (ASP) | 1.041 | Plastic | 1.545 | 56.1 | 12.98 |
| 5 | | 6.2231 (ASP) | 0.040 | | | | |
| 6 | Lens 3 | 6.8997 (ASP) | 0.636 | Plastic | 1.614 | 25.6 | −12.75 |
| 7 | | 3.5381 (ASP) | 0.820 | | | | |
| 8 | Lens 4 | −11.1343 (ASP) | 0.435 | Plastic | 1.669 | 19.5 | −45.14 |
| 9 | | −17.9129 (ASP) | 0.590 | | | | |
| 10 | Stop | Plano | 0.352 | | | | |
| 11 | Prism | Plano | 12.912 | Glass | 1.516 | 64.1 | — |
| 12 | | Plano | 0.510 | | | | |
| 13 | Filter | Plano | 0.210 | Glass | 1.516 | 64.1 | |
| 14 | | Plano | 0.328 | | | | |
| 15 | Image | Plano | — | | | | |

Note:
Reference wavelength is 587.6 nm (d-line).
An effective radius of the stop S1 (Surface 1) is 2.794 mm.
An effective radius of the stop S2 (Surface 10) is 1.820 mm.
The imaging optical lens system can further include an aperture stop ST, and the position of the aperture stop ST can be adjusted depending on the object distance.
In this embodiment, the position of the aperture stop ST is at Surface 1 as the imaging optical lens system is in the first state (corresponding to infinite object distance).
In this embodiment, the position of the aperture stop ST is at Surface 1 as the imaging optical lens system is in the second state (corresponding to finite object distance).

The definitions of these parameters shown in Table 11B are the same as those stated in the 1st embodiment with corresponding values for the 11th embodiment, so an explanation in this regard will not be provided again.

TABLE 11B

| Values of Optical And Physical Parameters/Definitions | | | |
|---|---|---|---|
| First State (Infinite Object Distance) | | Second State (Finite Object Distance) | |
| fL [mm] | 15.64 | fS [mm] | 15.53 |
| FnoL | 2.80 | FnoS | 3.03 |
| HFOVL [deg.] | 10.1 | HFOVS [deg.] | 9.4 |
| Object Distance [mm] | ∞ | Object Distance [mm] | 230.138 |
| D0 [mm] | ∞ | D0 [mm] | 230.450 |
| D1 [mm] | 0.060 | D1 [mm] | 1.434 |

It should be understood that, in this embodiment, only two moving focus states (i.e., the first state and the second state) are disclosed, but the present disclosure is not limited thereto. Besides the first state and the second state, the imaging optical lens system in this embodiment can also have other moving focus states with different focal lengths between the first state and the second state to accommodate focusing conditions for other object distances.

In Table 11B, the imaging optical lens system undergoes the focus adjustment process according to the change of object distance, and the movable lens group Gm is moved toward the object side along the optical axis relative to the last lens group Gn when the imaging optical lens system transitions from the first state to the second state in the focus adjustment process. Specifically, when the object distance changes from infinite to 230.138 mm, the imaging optical lens system transitions from the first state to the second state, the axial distance D1 between the movable lens group Gm and the last lens group Gn increases from 0.060 mm in the first state to 1.434 mm in the second state, and the reflective element E6 is immovable relative to the last lens group Gn during the focus adjustment process. In other words, when the object distance decreases, the movable lens group Gm is moved toward the object side along the optical axis relative to the last lens group Gn during the focus adjustment process.

TABLE 11C

| | Aspheric Coefficients | | | |
|---|---|---|---|---|
| Surface # | 4 | 5 | 6 | 7 |
| k= | −1.9878700E−02 | 0.0000000E+00 | 4.2670800E−01 | 0.0000000E+00 |
| A4= | −1.1227223E−02 | −4.1995538E−02 | 3.6828807E−02 | 1.1872693E−01 |
| A6= | 4.4033001E−03 | 6.4367681E−02 | 1.0425105E−02 | −5.8530497E−02 |
| A8= | −1.9531586E−03 | −6.6552655E−02 | −3.6991133E−02 | 1.3890729E−02 |
| A10= | 1.1957850E−03 | 4.6616481E−02 | 2.5866084E−02 | −2.1938474E−02 |
| A12= | −4.7047605E−04 | −2.1235663E−02 | −9.0841936E−03 | 2.6035850E−02 |
| A14= | 1.0595455E−04 | 6.2559001E−03 | 1.4316303E−03 | −1.4996024E−02 |
| A16= | −1.3747290E−05 | −1.1819706E−03 | 1.0375017E−04 | 4.9103621E−03 |
| A18= | 9.6472277E−07 | 1.3826530E−04 | −9.1021144E−05 | −9.4165240E−04 |

TABLE 11C-continued

| Aspheric Coefficients | | | |
|---|---|---|---|
| A20= | −2.8670806E−08 | −9.1198134E−06 | 1.7216210E−05 | 9.8475693E−05 |
| A22= | — | 2.5942804E−07 | −1.5015565E−06 | −4.3265068E−06 |
| A24= | — | — | 5.2005211E−08 | — |

| Surface # | 8 | 9 | — | — |
|---|---|---|---|---|
| k= | 0.0000000E+00 | 0.0000000E+00 | — | — |
| A4= | 1.0524863E−01 | 6.4883956E−02 | — | — |
| A6= | −7.0024325E−02 | −3.7650723E−02 | — | — |
| A8= | 4.7830634E−02 | 1.9373368E−02 | — | — |
| A10= | −3.7391696E−02 | −1.3847445E−02 | — | — |
| A12= | 2.1890667E−02 | 8.7708689E−03 | — | — |
| A14= | −8.1276121E−03 | −3.5298122E−03 | — | — |
| A16= | 1.8363636E−03 | 8.4525663E−04 | — | — |
| A18= | −2.3281280E−04 | −1.1223117E−04 | — | — |
| A20= | 1.2707061E−05 | 6.4153562E−06 | — | — |

In the 11th embodiment, the equation of the aspheric surface profiles of the aforementioned lens elements is the same as the equation of the 1st embodiment. Also, in the imaging optical lens system of the image capturing unit 11 according to the 11th embodiment, the first lens element E1 is referred to as one lens element nearest to the object side within the imaging optical lens system, and the fourth lens element E4 is referred to as another lens element nearest to the image side within the imaging optical lens system. Other than the another lens element nearest to the image side being referred to as the fourth lens element E4 as defined above in this paragraph, which differs from the 1st embodiment, the definitions of the other parameters shown in Table 11D below are the same as those stated in the 1st embodiment with corresponding values for the 11th embodiment, so an explanation in this regard will not be provided again. It should be noted that in this embodiment, since the another lens element nearest to the image side is referred to as the fourth lens element E4, in Table 11D below, BLL is referred to as an axial distance between the image-side surface of the fourth lens element E4 and the image surface IMG as the imaging optical lens system is in the first state, BLS is referred to as an axial distance between the image-side surface of the fourth lens element E4 and the image surface IMG as the imaging optical lens system is in the second state, TDL is referred to as an axial distance between the object-side surface of the first lens element E1 and the image-side surface of the fourth lens element E4 as the imaging optical lens system is in the first state, and TDS is referred to as an axial distance between the object-side surface of the first lens element E1 and the image-side surface of the fourth lens element E4 as the imaging optical lens system is in the second state.

TABLE 11D

| Values of Optical And Physical Parameters/Definitions | | | |
|---|---|---|---|
| fL [mm] | 15.64 | TDL/BLL | 0.27 |
| FnoL | 2.80 | fL/f1 | 0.89 |
| HFOVL [deg.] | 10.1 | |fL/f3| | 1.23 |
| FOVL [deg.] | 20.2 | fL/f12 | 2.11 |
| fS [mm] | 15.53 | |f1/f2| | 1.35 |
| FnoS | 3.03 | f4/f3 | 3.54 |
| HFOVS [deg.] | 9.4 | fL/R7 + fL/R8 | −2.28 |
| FOVS [deg.] | 18.8 | (R2 + R7)/(R2 − R7) | 1.41 |
| FnoL/FnoS | 0.92 | (R3 − R6)/(R3 + R6) | −0.005 |
| TLS/TLL | 1.07 | CT1/CT2 | 0.88 |
| BLS/BLL | 1.00 | CT1/Dr5r8L | 0.49 |

TABLE 11D-continued

| Values of Optical And Physical Parameters/Definitions | | | |
|---|---|---|---|
| 10 × |TDS − TDL|/TDL | 3.48 | 10 × T34L/CT4 | 18.85 |
| TLL/ImgH | 6.68 | Sag3R1L/CT3 | 0.85 |
| BLL/ImgH | 5.28 | (T23L + Sag3R1L − Sag2R2L)/Y2R2L | 0.06 |

12th Embodiment

Figure 35:
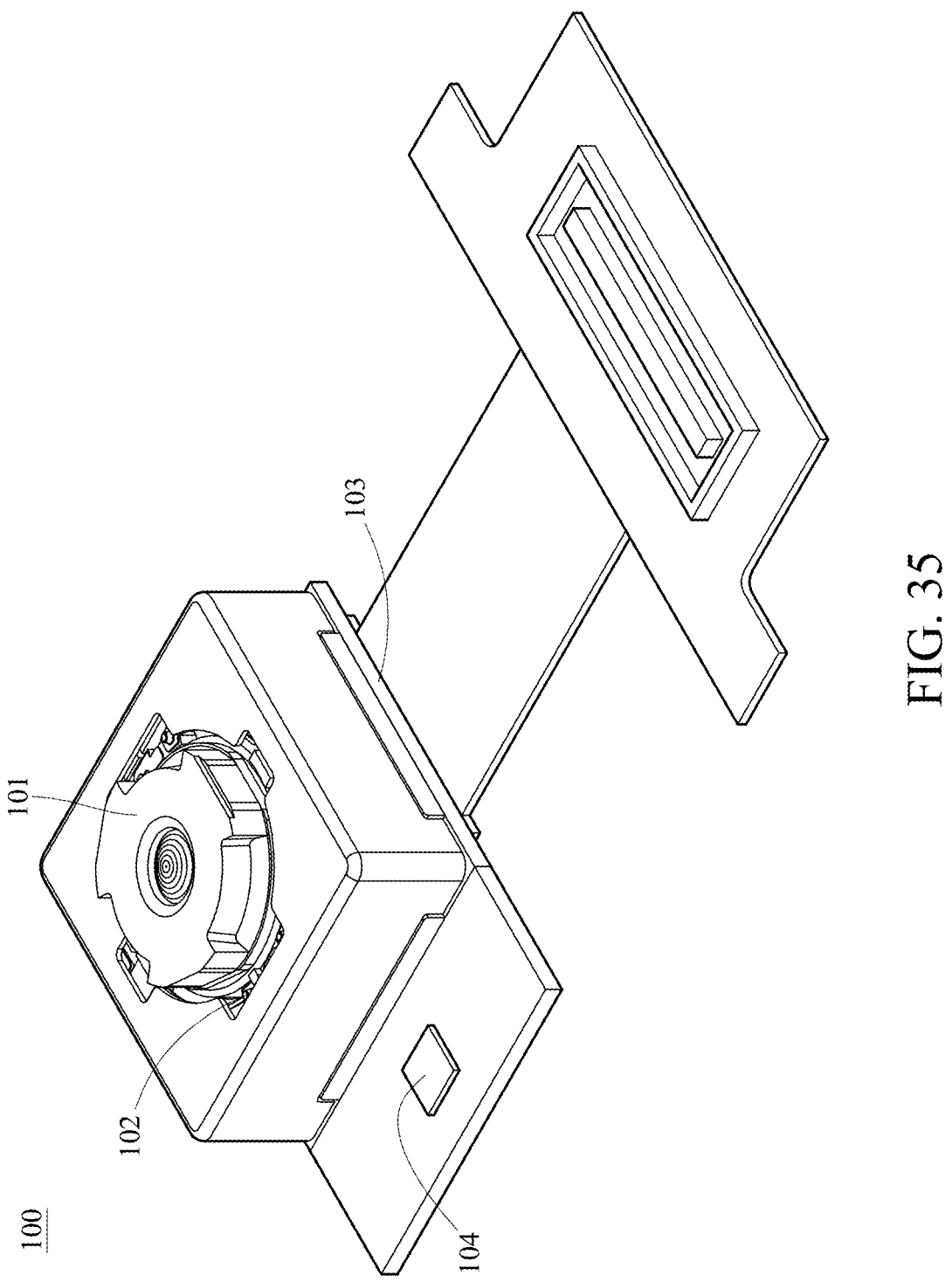
FIG. 35 is a perspective view of an image capturing unit according to the 12th embodiment of the present disclosure.

FIG. 35 is a perspective view of an image capturing unit according to the 12th embodiment of the present disclosure. In this embodiment, an image capturing unit 100 is a camera module including a lens unit 101, a driving device 102, an image sensor 103 and an image stabilizer 104. The lens unit 101 includes the imaging optical lens system as disclosed in the 1st embodiment, a barrel and a holder member (their reference numerals are omitted) for holding the imaging optical lens system. However, the lens unit 101 may alternatively be provided with the imaging optical lens system as disclosed in other embodiments of the present disclosure, and the present disclosure is not limited thereto. The imaging light converges in the lens unit 101 of the image capturing unit 100 to generate an image with the driving device 102 utilized for image focusing on the image sensor 103, and the generated image is then digitally transmitted to other electronic component for further processing.

The driving device 102 can have auto focusing functionality, and different driving configurations can be obtained through the usages of voice coil motors (VCM), micro electro-mechanical systems (MEMS), piezoelectric systems or shape memory alloy materials. The driving device 102 can include a guiding component, and the guiding component can include a ball type structure or a rod type structure. The guiding component is favorable for reducing the resistance encountered by the movable lens group during the focus adjustment process as the movable lens group moves. The driving device 102 is favorable for obtaining a better imaging position of the lens unit 101, so that a clear image of the imaged object can be captured by the lens unit 101 with different object distances. The image sensor 103 (for example, CMOS or CCD), which can feature high photosensitivity and low noise, is disposed on the image surface of the imaging optical lens system to provide higher image quality. The image sensor 103 can also be moved in three-dimensional directions relative to a base, achieving the purpose of focusing by moving the image sensor 103.

The image stabilizer 104, such as an accelerometer, a gyro sensor and a Hall Effect sensor, is configured to work with the driving device 102 to provide optical image stabilization (OIS). The driving device 102 working with the image stabilizer 104 is favorable for compensating for pan and tilt of the lens unit 101 to reduce blurring associated with motion during exposure. In some cases, the compensation can be provided by electronic image stabilization (EIS) with image processing software. Thereby improving image quality while in motion or low-light conditions.

13th Embodiment

Figure 36:
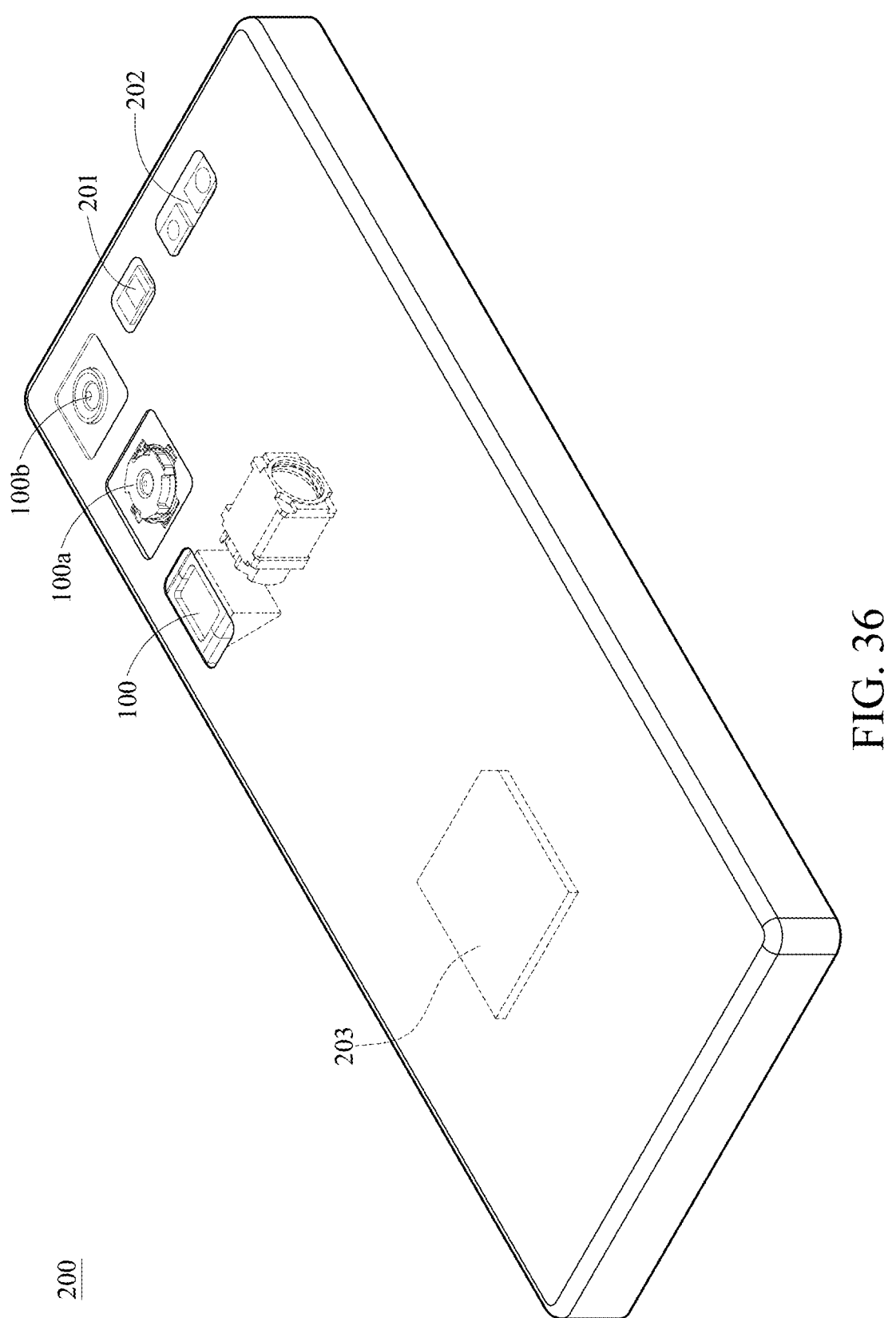
FIG. 36 is one perspective view of an electronic device according to the 13th embodiment of the present disclosure.
Figure 37:
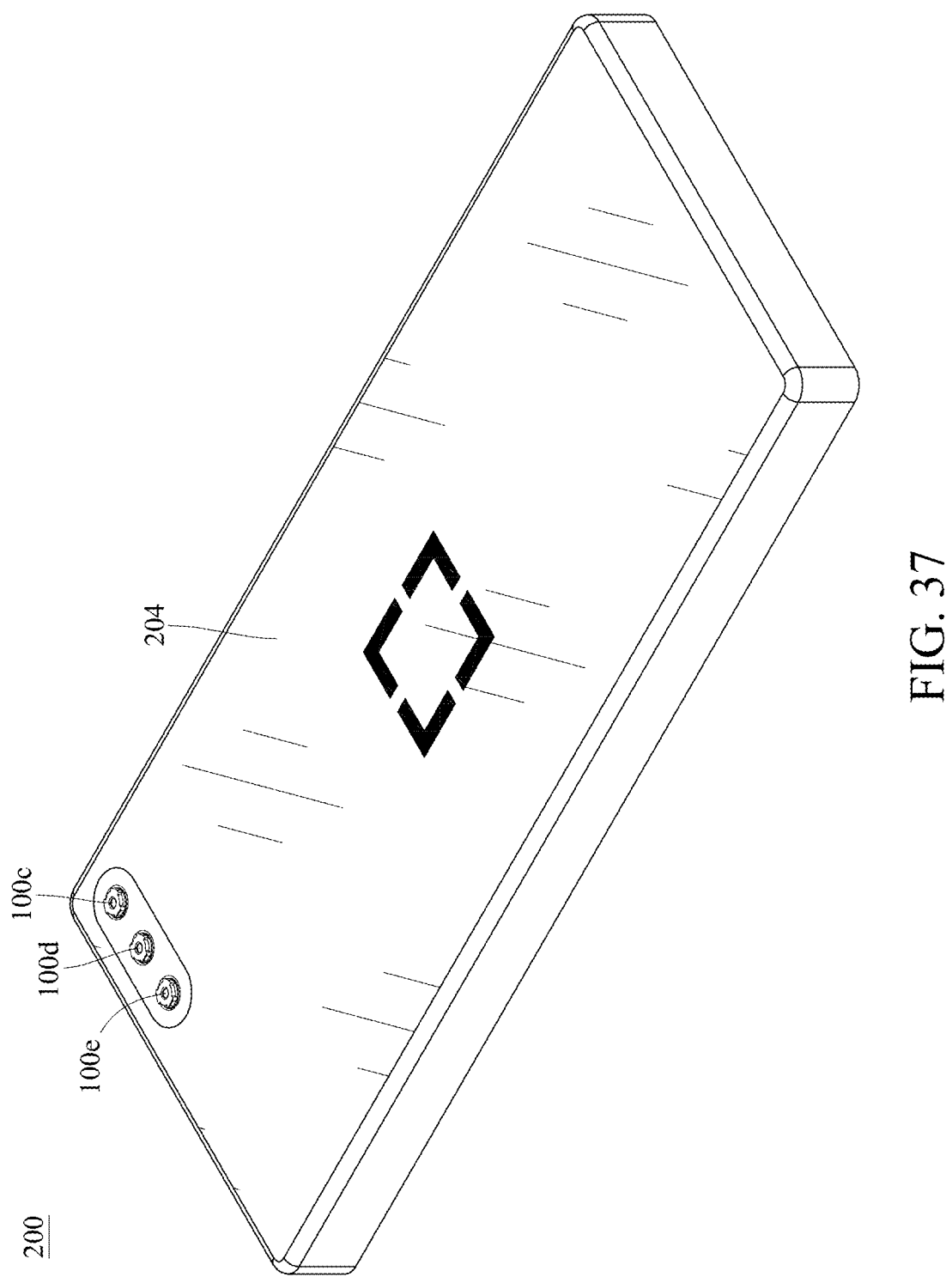
FIG. 37 is another perspective view of the electronic device in FIG. 36.
Figure 38:
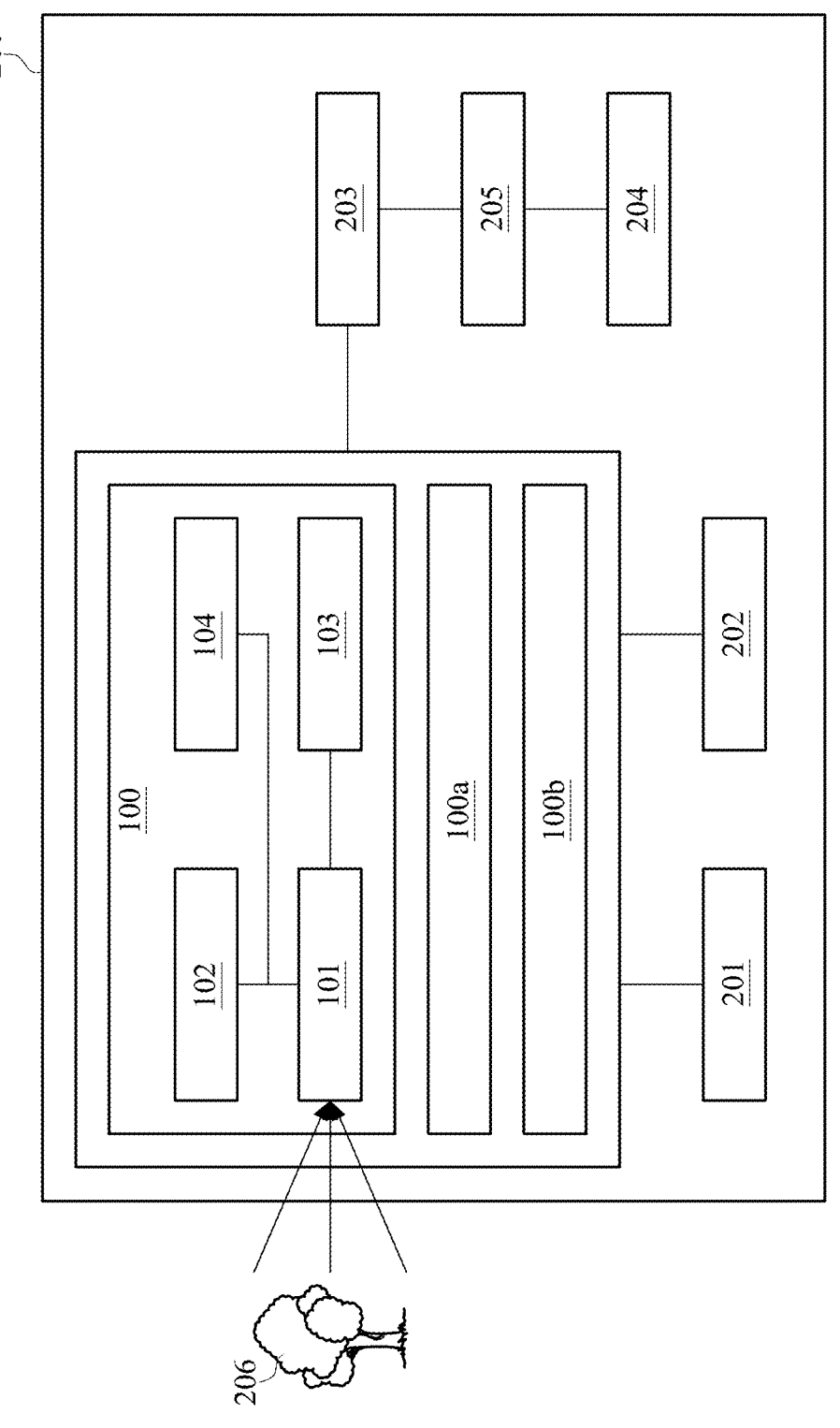
FIG. 38 is a block diagram of the electronic device in FIG. 36.

FIG. 36 is one perspective view of an electronic device according to the 13th embodiment of the present disclosure, FIG. 37 is another perspective view of the electronic device in FIG. 36, and FIG. 38 is a block diagram of the electronic device in FIG. 36.

In this embodiment, an electronic device 200 is a smartphone including the image capturing unit 100 as disclosed in the 12th embodiment, an image capturing unit 100*a*, an image capturing unit 100*b*, an image capturing unit 100*c*, an image capturing unit 100*d*, an image capturing unit 100*e*, a flash module 201, a focus assist module 202, an image signal processor 203, a display module 204 and an image software processor 205. The image capturing unit 100, the image capturing unit 100*a* and the image capturing unit 100*b* are disposed on the same side of the electronic device 200 and each of the image capturing units 100, 100*a* and 100*b* has a single focal point. The focus assist module 202 can be a laser rangefinder or a ToF (time of flight) module, but the present disclosure is not limited thereto. The image capturing unit 100*c*, the image capturing unit 100*d*, the image capturing unit 100*e* and the display module 204 are disposed on the opposite side of the electronic device 200, and the display module 204 can be a user interface, such that the image capturing units 100*c*, 100*d* and 100*e* can be front-facing cameras of the electronic device 200 for taking selfies, but the present disclosure is not limited thereto. Furthermore, each of the image capturing units 100*a*, 100*b*, 100*c*, 100*d* and 100*e* can include the imaging optical lens system of the present disclosure and can have a configuration similar to that of the image capturing unit 100. In detail, each of the image capturing units 100*a*, 100*b*, 100*c*, 100*d* and 100*e* can include a lens unit, a driving device, an image sensor and an image stabilizer, and can also include a reflective element for folding optical path. In addition, each lens unit of the image capturing units 100*a*, 100*b*, 100*c*, 100*d* and 100*e* can include the imaging optical lens system of the present disclosure, a barrel and a holder member for holding the imaging optical lens system.

The image capturing unit 100 is a telephoto image capturing unit with optical path folding function, the image capturing unit 100*a* is a wide-angle image capturing unit, the image capturing unit 100*b* is an ultra-wide-angle image capturing unit, the image capturing unit 100*c* is a wide-angle image capturing unit, the image capturing unit 100*d* is an ultra-wide-angle image capturing unit, and the image capturing unit 100*e* is a ToF image capturing unit. In this embodiment, the image capturing units 100, 100*a* and 100*b* have different fields of view, such that the electronic device 200 can have various magnification ratios so as to meet the requirement of optical zoom functionality. In addition, the image capturing unit 100*e* can determine depth information of the imaged object. Moreover, the light-folding configuration of the image capturing unit 100 can be similar to, for example, one of the configurations as shown in FIG. 46 to FIG. 56, which can be referred to foregoing descriptions corresponding to FIG. 46 to FIG. 56, and the details in this regard will not be provided again. In this embodiment, the electronic device 200 includes multiple image capturing units 100, 100*a*, 100*b*, 100*c*, 100*d* and 100*e*, but the present disclosure is not limited to the number and arrangement of image capturing units.

When a user captures images of an object 206, the light rays converge in the image capturing unit 100, the image capturing unit 100*a* or the image capturing unit 100*b* to generate images, and the flash module 201 is activated for light supplement. The focus assist module 202 detects the object distance of the imaged object 206 to achieve fast auto focusing. The image signal processor 203 is configured to optimize the captured image to improve image quality. The light beam emitted from the focus assist module 202 can be either conventional infrared or laser. In addition, the light rays may converge in the image capturing unit 100*c*, 100*d* or 100*e* to generate images. The display module 204 can include a touch screen, and the user is able to interact with the display module 204 and the image software processor 205 having multiple functions to capture images and complete image processing. Alternatively, the user may capture images via a physical button. The image processed by the image software processor 205 can be displayed on the display module 204.

14th Embodiment

Figure 39:
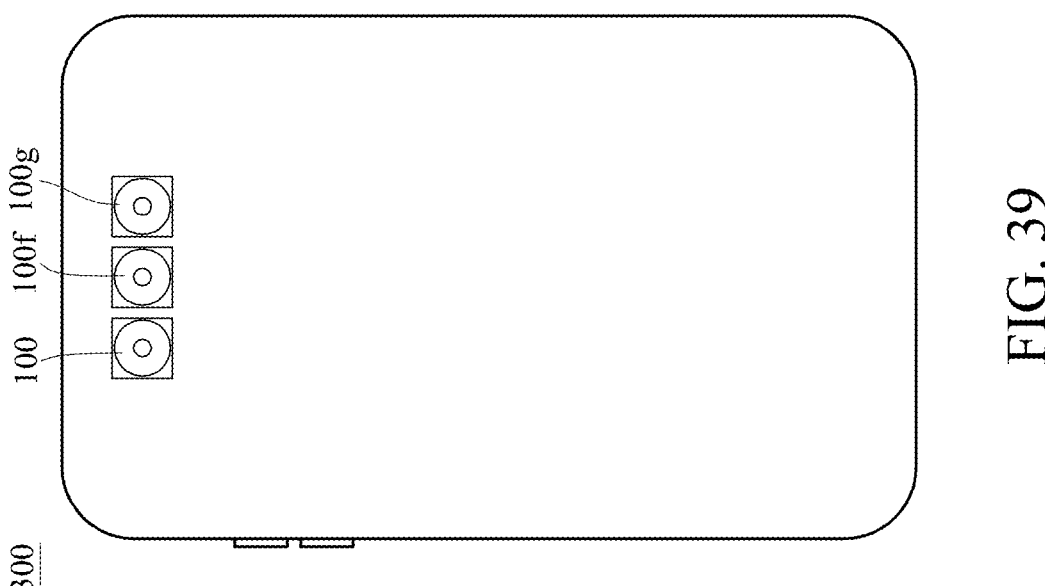
FIG. 39 is one perspective view of an electronic device according to the 14th embodiment of the present disclosure.
Figure 40:
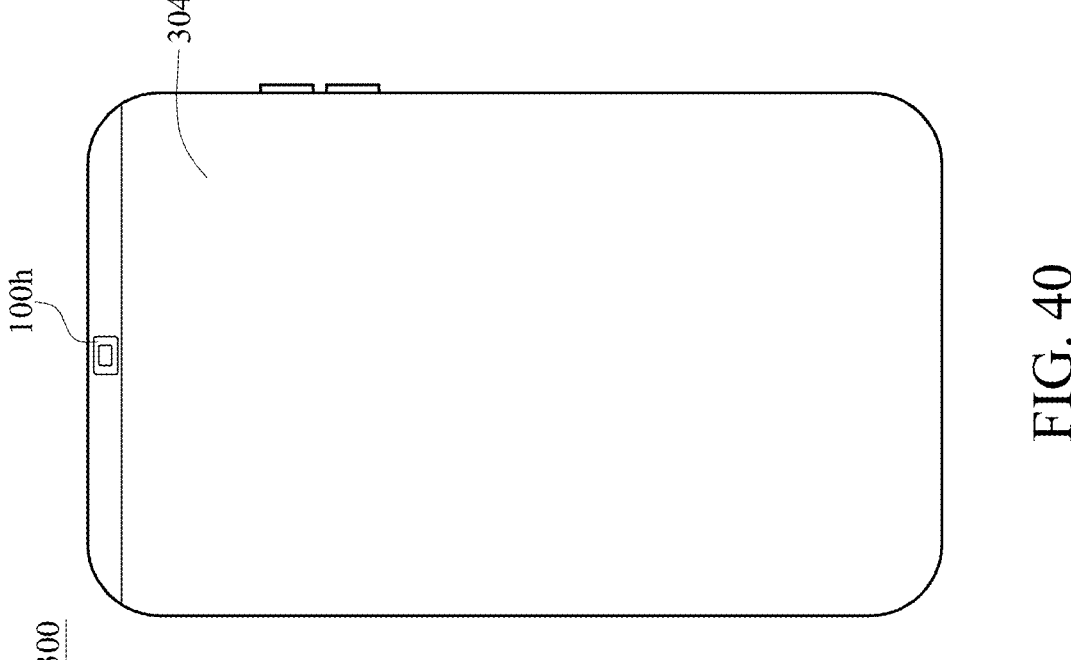
FIG. 40 is another perspective view of the electronic device in FIG. 39.

FIG. 39 is one perspective view of an electronic device according to the 14th embodiment of the present disclosure, and FIG. 40 is another perspective view of the electronic device in FIG. 39.

In this embodiment, an electronic device 300 is a smartphone including the image capturing unit 100 as disclosed in the 12th embodiment, an image capturing unit 100*f*, an image capturing unit 100*g*, an image capturing unit 100*h* and a display module 304. As shown in FIG. 39, the image capturing unit 100, the image capturing unit 100*f* and the image capturing unit 100*g* are disposed on the same side of the electronic device 300 and each of the image capturing units 100, 100*f* and 100*g* has a single focal point. As shown in FIG. 40, the image capturing unit 100*h* and the display module 304 are disposed on the opposite side of the electronic device 300, such that the image capturing unit 100*h* can be a front-facing camera of the electronic device 300 for taking selfies, but the present disclosure is not limited thereto. Furthermore, each of the image capturing units 100*f*, 100*g* and 100*h* can include the imaging optical lens system of the present disclosure and can have a configuration similar to that of the image capturing unit 100. In detail, each of the image capturing units 100*f*, 100*g* and 100*h* can include a lens unit, a driving device, an image sensor and an image stabilizer. In addition, each lens unit of the image capturing units 100*f*, 100*g* and 100*h* can include the imaging optical lens system of the present disclosure, a barrel and a holder member for holding the imaging optical lens system.

The image capturing unit 100 is a telephoto image capturing unit, the image capturing unit 100*f* is a wide-angle image capturing unit, the image capturing unit 100*g* is an ultra-wide-angle image capturing unit, and the image capturing unit 100*h* is a wide-angle image capturing unit. In this embodiment, the image capturing units 100, 100*f* and 100*g* have different fields of view, such that the electronic device 300 can have various magnification ratios so as to meet the requirement of optical zoom functionality. Moreover, as shown in FIG. 40, the image capturing unit 100*h* can have a non-circular opening, and the barrel or lens elements in the image capturing unit 100*h* can have trimmed edges at their outermost positions so as to coordinate with the shape of the non-circular opening. Therefore, the length of the major axis and/or the minor axis of the image capturing unit 100*h* can be further reduced, which is favorable for reducing the size of the image capturing unit 100*h* so as to increase the ratio of the area of the display module 304 relative to that of the electronic device 300, and reduce the thickness of the electronic device 300, thereby achieving compactness. In this embodiment, the electronic device 300 includes multiple image capturing units 100, 100*f*, 100*g* and 100*h*, but the present disclosure is not limited to the number and arrangement of image capturing units.

15th Embodiment

Figure 41:
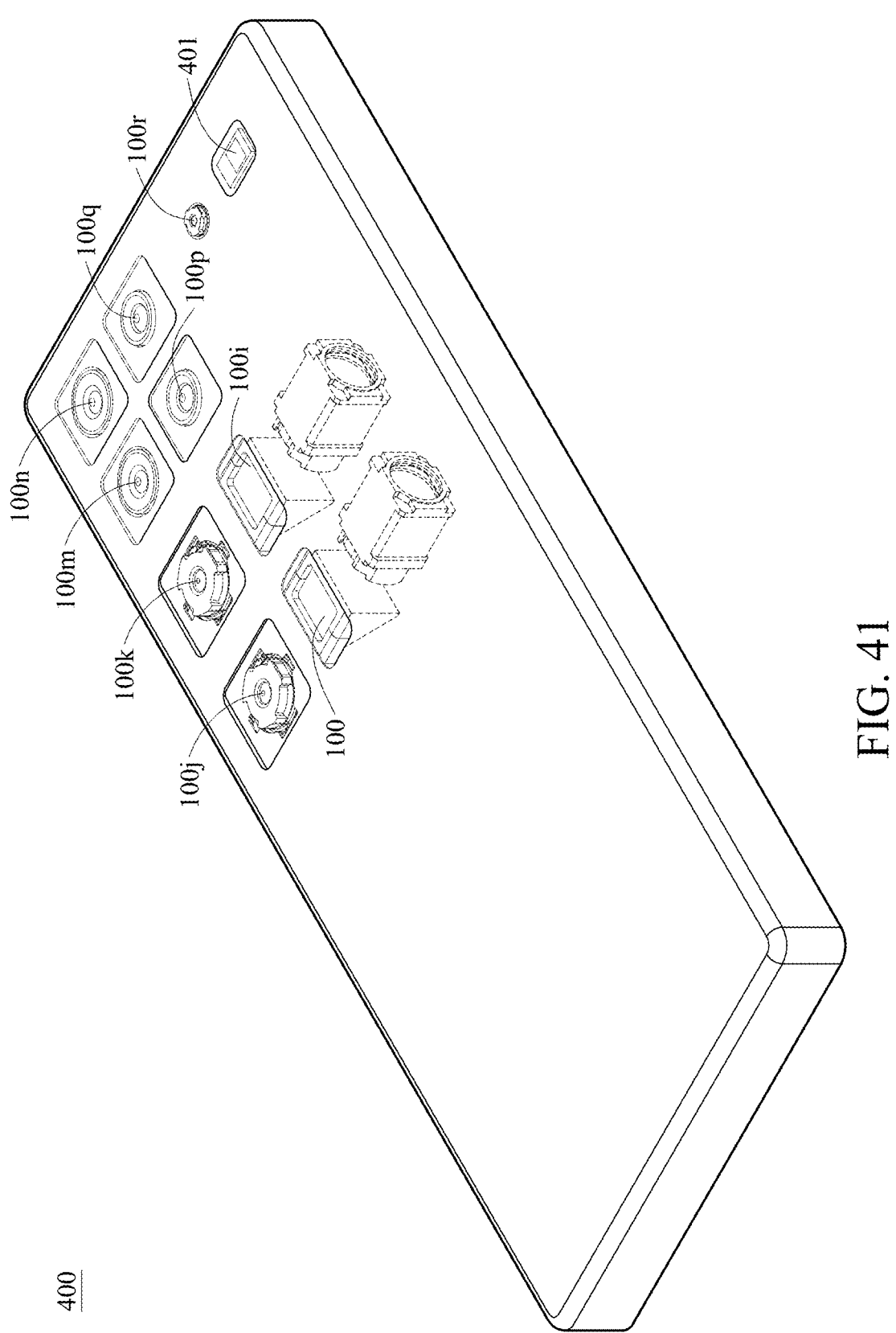
FIG. 41 is one perspective view of an electronic device according to the 15th embodiment of the present disclosure.

FIG. 41 is one perspective view of an electronic device according to the 15th embodiment of the present disclosure In this embodiment, an electronic device 400 is a smartphone including the image capturing unit 100 as disclosed in the 12th embodiment, an image capturing unit 100*i*, an image capturing unit 100*j*, an image capturing unit 100*k*, an image capturing unit 100*m*, an image capturing unit 100*n*, an image capturing unit 100*p*, an image capturing unit 100*q*, an image capturing unit 100*r*, a flash module 401, a focus assist module, an image signal processor, a display module and an image software processor (not shown in the figures). The image capturing units 100, 100*i*, 100*j*, 100*k*, 100*m*, 100*n*, 100*p*, 100*q* and 100*r* are disposed on the same side of the electronic device 400, while the display module is disposed on the opposite side of the electronic device 400. Furthermore, each of the image capturing units 100*i*, 100*j*, 100*k*, 100*m*, 100*n*, 100*p*, 100*q* and 100*r* can include the imaging optical lens system of the present disclosure and can have a configuration similar to that of the image capturing unit 100, and the details in this regard will not be provided again.

The image capturing unit 100 is a telephoto image capturing unit with optical path folding function, the image capturing unit 100*i* is a telephoto image capturing unit with optical path folding function, the image capturing unit 100*j* is a wide-angle image capturing unit, the image capturing unit 100*k* is a wide-angle image capturing unit, the image capturing unit 100*m* is an ultra-wide-angle image capturing unit, the image capturing unit 100*n* is an ultra-wide-angle telephoto image capturing unit, the image capturing unit 100*p* is a telephoto image capturing unit, the image capturing unit 100*q* is a telephoto image capturing unit, and the image capturing unit 100*r* is a ToF image capturing unit. In this embodiment, the image capturing units 100, 100*i*, 100*j*, 100*k*, 100*m*, 100*n*, 100*p*, and 100*q* have different fields of view, such that the electronic device 400 can have various magnification ratios so as to meet the requirement of optical zoom functionality. In addition, the image capturing unit 100*r* can determine depth information of the imaged object. Moreover, the light-folding configuration of the image capturing units 100 and 100*i* can be similar to, for example, one of the structures shown in FIG. 46 to FIG. 56, which can be referred to foregoing descriptions corresponding to FIG. 46 to FIG. 56, and the details in this regard will not be provided again. In this embodiment, the electronic device 400 includes multiple image capturing units 100, 100*i*, 100*j*, 100*k*, 100*m*, 100*n*, 100*p*, 100*q* and 100*r*, but the present disclosure is not limited to the number and arrangement of image capturing units. When a user captures images of an object, the light rays converge in the image capturing unit 100, 100*i*, 100*j*, 100*k*, 100*m*, 100*n*, 100*p*, 100*q* or 100*r* to generate images, and the flash module 401 is activated for light supplement. Further, the subsequent processes are performed in a manner similar to the abovementioned embodiments, and the details in this regard will not be provided again.

The smartphone in this embodiment is only exemplary for showing the image capturing unit of the present disclosure installed in an electronic device, and the present disclosure is not limited thereto. The image capturing unit can be optionally applied to optical systems with a movable focus. Furthermore, the imaging optical lens system of the image capturing unit features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, aerial cameras, wearable devices, portable video recorders and other electronic imaging devices.

The foregoing description, for the purpose of explanation, has been described with reference to specific embodiments. It is to be noted that TABLES 1A-11D show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging optical lens system comprising five lens elements, the five lens elements being, in order from an object side to an image side along an optical path, a first lens element, a second lens element, a third lens element, a fourth lens element and a fifth lens element, and each of the five lens elements having an object-side surface facing toward the object side and an image-side surface facing toward the image side;

wherein the first lens element has positive refractive power, the image-side surface of the second lens element is concave in a paraxial region thereof, the object-side surface of the third lens element is convex in a paraxial region thereof, the image-side surface of the third lens element is concave in a paraxial region thereof, the object-side surface of the fourth lens element is convex in a paraxial region thereof, the image-side surface of the fourth lens element is concave in a paraxial region thereof, and the imaging optical lens system is in a first state when an imaged object is at an infinite object distance and an entrance pupil diameter of the imaging optical lens system is at its maximum;

wherein an axial distance between the object-side surface of one lens element nearest to the object side and the image-side surface of another lens element nearest to the image side within the imaging optical lens system as the imaging optical lens system is in the first state is TDL, an axial distance between the image-side surface of the another lens element nearest to the image side and an image surface within the imaging optical lens system as the imaging optical lens system is in the first state is BLL, a focal length of the imaging optical lens system in the first state is fL, a curvature radius of the image-side surface of the first lens element is R2, a curvature radius of the object-side surface of the fourth lens element is R7, a curvature radius of the image-side surface of the fourth lens element is R8, an axial distance between the third lens element and the fourth lens element as the imaging optical lens system is in the first state is T34L, a central thickness of the fourth lens element is CT4, and the following conditions are satisfied:

$$0.10 < TDL/BLL < 0.60;$$

$$5.00 < fL/R7 + fL/R8 < 20.00;$$

$$0.55 < (R2 + R7)/(R2 - R7) < 1.60;$$

and $$0.10 < 10 \times T34L/CT4 < 5.00.$$

2. The imaging optical lens system of claim 1, wherein the second lens element has negative refractive power;

wherein the axial distance between the third lens element and the fourth lens element as the imaging optical lens system is in the first state is T34L, the central thickness of the fourth lens element is CT4, and the following condition is satisfied:

$$0.50 < 10 \times T34L/CT4 < 2.00.$$

3. The imaging optical lens system of claim 1, wherein the focal length of the imaging optical lens system in the first state is fL, a composite focal length of the first lens element and the second lens element is f12, and the following condition is satisfied:

$$0.50 < fL/f12 < 2.00.$$

4. The imaging optical lens system of claim 1, wherein a focal length of the third lens element is f3, a focal length of the fourth lens element is f4, and the following condition is satisfied:

$$-2.00 < f4/f3 < 0.10.$$

5. The imaging optical lens system of claim 1, wherein a central thickness of the first lens element is CT1, a central thickness of the second lens element is CT2, and the following condition is satisfied:

$$1.80 < CT1/CT2 < 8.00.$$

6. The imaging optical lens system of claim 1, wherein an axial distance between the object-side surface of the one lens element nearest to the object side and the image surface as the imaging optical lens system is in the first state is TLL, a maximum image height of the imaging optical lens system is ImgH, and the following condition is satisfied:

$$5.50 < TLL/ImgH < 10.00.$$

7. The imaging optical lens system of claim 1, wherein an Abbe number of the second lens element is V2, an Abbe number of the fourth lens element is V4, an Abbe number of the fifth lens element is V5, and the following condition is satisfied:

$$30.0 < V2 + V4 + V5 < 93.0.$$

8. The imaging optical lens system of claim 1, wherein the focal length of the imaging optical lens system in the first state is fL, a focal length of the first lens element is f1, and the following condition is satisfied:

$$0.65 < fL/f1 < 2.00.$$

9. The imaging optical lens system of claim 1, wherein a displacement in parallel with an optical axis from an axial vertex of the object-side surface of the third lens element to a maximum effective radius position of the object-side surface of the third lens element as the imaging optical lens system is in the first state is Sag3R1L, a central thickness of the third lens element is CT3, a maximum effective radius of the object-side surface of the first lens element as the imaging optical lens system is in the first state is Y1R1L, a maximum effective radius of the image-side surface of the fifth lens element as the imaging optical lens system is in the first state is Y5R2L, and the following conditions are satisfied:

$$0.80 < Sag3R1L/CT3 < 2.00;$$

and $$1.00 < Y1R1L/Y5R2L < 2.00.$$

10. The imaging optical lens system of claim 1, wherein an axial distance between the second lens element and the third lens element as the imaging optical lens system is in the first state is T23L, a displacement in parallel with an optical axis from an axial vertex of the image-side surface of the second lens element to a maximum effective radius position of the image-side surface of the second lens element as the imaging optical lens system is in the first state is Sag2R2L, a displacement in parallel with the optical axis from an axial vertex of the object-side surface of the third lens element to a maximum effective radius position of the object-side surface of the third lens element as the imaging optical lens system is in the first state is Sag3R1L, a maximum effective radius of the image-side surface of the second lens element as the imaging optical lens system is in the first state is Y2R2L, and the following condition is satisfied:

$$0.05 < (T23L + Sag3R1L - Sag2R2L)/Y2R2L < 0.50.$$

11. The imaging optical lens system of claim 1, further comprising a reflective element, wherein the reflective element is located between the fifth lens element and the image surface along a travelling direction of the optical path.

12. An image capturing unit comprising:

the imaging optical lens system of claim 1; and an image sensor disposed on the image surface of the imaging optical lens system.

13. An electronic device comprising:

the image capturing unit of claim 12.

14. An imaging optical lens system comprising five lens elements, the five lens elements being, in order from an object side to an image side along an optical path, a first lens element, a second lens element, a third lens element, a fourth lens element and a fifth lens element, and each of the five lens elements having an object-side surface facing toward the object side and an image-side surface facing toward the image side;

wherein the first lens element has positive refractive power, the image-side surface of the second lens element is concave in a paraxial region thereof, the object-side surface of the third lens element is convex in a paraxial region thereof, the object-side surface of the fourth lens element is convex in a paraxial region thereof, the image-side surface of the fourth lens element is concave in a paraxial region thereof, and the imaging optical lens system is in a first state when an imaged object is at an infinite object distance and an entrance pupil diameter of the imaging optical lens system is at its maximum;

wherein an axial distance between the object-side surface of one lens element nearest to the object side and the image-side surface of another lens element nearest to the image side within the imaging optical lens system as the imaging optical lens system is in the first state is TDL, an axial distance between the image-side surface of the another lens element nearest to the image side and an image surface within the imaging optical lens system as the imaging optical lens system is in the first state is BLL, a focal length of the imaging optical lens system in the first state is fL, a focal length of the first lens element is f1, a focal length of the second lens element is f2, a curvature radius of the object-side surface of the second lens element is R3, a curvature radius of the image-side surface of the third lens element is R6, a curvature radius of the object-side surface of the fourth lens element is R7, a curvature radius of the image-side surface of the fourth lens element is R8, and the following conditions are satisfied:

$$0.10 < TDL/BLL < 0.60;$$

$$5.00 < fL/R7 + fL/R8 < 20.00;$$

$$-1.50 < (R3 - R6)/(R3 + R6) < 1.40;$$

and $$|f1/f2| < 0.82.$$

15. The imaging optical lens system of claim 14, wherein the axial distance between the object-side surface of the one lens element nearest to the object side and the image-side surface of the another lens element nearest to the image side within the imaging optical lens system as the imaging optical lens system is in the first state is TDL, the axial distance between the image-side surface of the another lens element nearest to the image side and the image surface within the imaging optical lens system as the imaging optical lens system is in the first state is BLL, and the following condition is satisfied:

$$0.20 < TDL/BLL < 0.45.$$

16. The imaging optical lens system of claim 14, wherein the object-side surface of the fifth lens element is concave in a paraxial region thereof, the image-side surface of the fifth lens element is convex in a paraxial region thereof, and at least one surface of at least one lens element in the imaging optical lens system has at least one inflection point.

17. The imaging optical lens system of claim 14, wherein an axial distance between the fourth lens element and the fifth lens element as the imaging optical lens system is in the first state is T45L, a central thickness of the fifth lens element is CT5, and the following condition is satisfied:

$$1.00 < T45L/CT5 < 6.00.$$

18. The imaging optical lens system of claim 14, wherein a central thickness of the first lens element is CT1, an axial distance between the object-side surface of the third lens element and the image-side surface of the fourth lens element as the imaging optical lens system is in the first state is Dr5r8L, and the following condition is satisfied:

$$0.80 < CT1/Dr5r8L < 3.50.$$

19. The imaging optical lens system of claim 14, wherein an axial distance between the third lens element and the fourth lens element as the imaging optical lens system is in the first state is T34L, an axial distance between the fourth lens element and the fifth lens element as the imaging optical lens system is in the first state is T45L, and the following condition is satisfied:

$$0.01 < 10 \times T34L/T45L < 3.00.$$

20. The imaging optical lens system of claim 14, wherein the axial distance between the image-side surface of the another lens element nearest to the image side and the image surface within the imaging optical lens system as the imaging optical lens system is in the first state is BLL, a maximum image height of the imaging optical lens system is ImgH, the focal length of the imaging optical lens system in the first state is fL, a focal length of the third lens element is f3, and the following conditions are satisfied:

$$4.20 < BLL/ImgH < 7.20;$$

and $$|fL/f3| < 1.80.$$

21. The imaging optical lens system of claim 14, wherein the axial distance between the object-side surface of the one lens element nearest to the object side and the image-side surface of the another lens element nearest to the image side within the imaging optical lens system as the imaging optical lens system is in the first state is TDL, the axial distance between the image-side surface of the another lens element nearest to the image side and the image surface within the imaging optical lens system as the imaging optical lens system is in the first state is BLL, the focal length of the imaging optical lens system in the first state is fL, the focal length of the first lens element is f1, the focal length of the second lens element is f2, a curvature radius of the image-side surface of the first lens element is R2, the curvature radius of the object-side surface of the second lens element is R3, the curvature radius of the image-side surface of the third lens element is R6, the curvature radius of the object-side surface of the fourth lens element is R7, the curvature radius of the image-side surface of the fourth lens element is R8, an axial distance between the third lens element and the fourth lens element as the imaging optical lens system is in the first state is T34L, a central thickness of the fourth lens element is CT4, and the following conditions are satisfied:

$$0.26 \le TDL/BLL \le 0.39;$$

$$7.55 \le fL/R7 + fL/R8 \le 14.04;$$

$$0.64 \le (R2 + R7)/(R2 - R7) \le 1.12;$$

$$0.70 \le 10 \times T34L/CT4 \le 1.29;$$

$$0.38 \le (R3 - R6)/(R3 + R6) \le 1.06;$$

and $$0.13 \le |f1/f2| \le 0.72.$$

22. An imaging optical lens system comprising, in order from an object side to an image side along a travelling direction of an optical path, a movable lens group and a last lens group, a total number of lens elements in the imaging optical lens system being at least four, the movable lens group comprising at least one lens element, the last lens group comprising at least one lens element, and each lens element in the imaging optical lens system having an object-side surface facing toward the object side and an image-side surface facing toward the image side;

wherein the imaging optical lens system is in a first state when an imaged object is at an infinite object distance and an entrance pupil diameter of the imaging optical lens system is at its maximum, the imaging optical lens system is in a second state when an imaged object is at a finite object distance, the imaging optical lens system undergoes a focus adjustment process to transition from the first state to the second state when an imaged object moves from an infinite object distance to a finite object distance, and the movable lens group is moved toward the object side along an optical axis relative to the last lens group when the imaging optical lens system transitions from the first state to the second state in the focus adjustment process;

wherein one lens element nearest to the object side within the movable lens group has positive refractive power, and the object-side surface of the one lens element nearest to the object side is convex in a paraxial region thereof;

wherein the imaging optical lens system further comprises a reflective element, and the reflective element is located between an imaged object and an image surface along the travelling direction of the optical path;

wherein an axial distance between the object-side surface of one lens element nearest to the object side and the image-side surface of another lens element nearest to the image side within the imaging optical lens system as the imaging optical lens system is in the first state is TDL, an axial distance between the object-side surface of the one lens element nearest to the object side and the image-side surface of the another lens element nearest to the image side within the imaging optical lens system as the imaging optical lens system is in the second state is TDS, an axial distance between the image-side surface of the another lens element nearest to the image side and the image surface within the imaging optical lens system as the imaging optical lens system is in the first state is BLL, an axial distance between the image-side surface of the another lens element nearest to the image side and the image surface within the imaging optical lens system as the imaging optical lens system is in the second state is BLS, and the following conditions are satisfied:

$$0.10 < TDL/BLL < 0.60;$$

$$1.00 < 10 \times |TDS - TDL|/TDL < 10.00;$$

and $$0.80 < BLS/BLL < 1.30.$$

23. The imaging optical lens system of claim 22, wherein the axial distance between the object-side surface of the one lens element nearest to the object side and the image-side surface of the another lens element nearest to the image side within the imaging optical lens system as the imaging optical lens system is in the first state is TDL, the axial distance between the object-side surface of the one lens element nearest to the object side and the image-side surface of the another lens element nearest to the image side within the imaging optical lens system as the imaging optical lens system is in the second state is TDS, the axial distance between the image-side surface of the another lens element nearest to the image side and the image surface within the imaging optical lens system as the imaging optical lens system is in the first state is BLL, the axial distance between the image-side surface of the another lens element nearest to the image side and the image surface within the imaging optical lens system as the imaging optical lens system is in the second state is BLS, and the following conditions are satisfied:

$$1.80 < 10 \times |TDS - TDL|/TDL < 5.00;$$

and $$0.90 < BLS/BLL < 1.10.$$

24. The imaging optical lens system of claim 22, wherein the imaging optical lens system comprises five lens elements, the five lens elements are, in order from the object side to the image side along the optical path, a first lens element, a second lens element, a third lens element, a fourth lens element and a fifth lens element, the movable lens group comprises the first lens element and the second lens element, the last lens group comprises the third lens element, the fourth lens element and the fifth lens element, all lens elements in the movable lens group are immovable relative to one another during the focus adjustment process, and all lens elements in the last lens group are immovable relative to one another during the focus adjustment process.

25. The imaging optical lens system of claim 24, wherein an axial distance between the object-side surface of the one lens element nearest to the object side and the image surface as the imaging optical lens system is in the first state is TLL, an axial distance between the object-side surface of the one lens element nearest to the object side and the image surface as the imaging optical lens system is in the second state is TLS, and the following condition is satisfied:

$$1.03 < TLS/TLL < 1.20.$$

26. The imaging optical lens system of claim 24, wherein the object-side surface of the fourth lens element is convex in a paraxial region thereof, and the image-side surface of the fourth lens element is concave in a paraxial region thereof.

27. The imaging optical lens system of claim 24, wherein the reflective element has at least two reflective surfaces; wherein an f-number of the imaging optical lens system in the first state is FnoL, an f-number of the imaging optical lens system in the second state is FnoS, and the following condition is satisfied:

$$0.80 < FnoL/FnoS < 0.90.$$

28. The imaging optical lens system of claim 24, wherein an axial distance between the fourth lens element and the fifth lens element as the imaging optical lens system is in the first state is T45L, a central thickness of the fourth lens element is CT4, and the following condition is satisfied:

$$0.50 < T45L/CT4 < 6.00.$$

29. The imaging optical lens system of claim 22, wherein the imaging optical lens system is in a third state when an imaged object is at an infinite object distance and the entrance pupil diameter of the imaging optical lens system is at its minimum; wherein an f-number of the imaging optical lens system in the first state is FnoL, an f-number of the imaging optical lens system in the third state is FnoV, and the following condition is satisfied:

$$0.50 < FnoV - FnoL < 1.20.$$

30. The imaging optical lens system of claim 22, wherein the axial distance between the object-side surface of the one lens element nearest to the object side and the image-side surface of the another lens element nearest to the image side within the imaging optical lens system as the imaging optical lens system is in the first state is TDL, the axial distance between the object-side surface of the one lens element nearest to the object side and the image-side surface of the another lens element nearest to the image side within the imaging optical lens system as the imaging optical lens system is in the second state is TDS, the axial distance between the image-side surface of the another lens element nearest to the image side and the image surface within the imaging optical lens system as the imaging optical lens system is in the first state is BLL, the axial distance between the image-side surface of the another lens element nearest to the image side and the image surface within the imaging optical lens system as the imaging optical lens system is in the second state is BLS, and the following conditions are satisfied:

$$0.26 \leq TDL/BLL \leq 0.39;$$

$$1.97 \leq 10 \times |TDS - TDL| / TDL \leq 4.02;$$

and $$1.00 \leq BLS/BLL \leq 1.05.$$

31. An imaging optical lens system comprising, in order from an object side to an image side along a travelling direction of an optical path, a movable lens group, a last lens group and a prism, the movable lens group comprising at least one lens element, the last lens group comprising at least one lens element, and each lens element in the imaging optical lens system having an object-side surface facing toward the object side and an image-side surface facing toward the image side;

wherein the imaging optical lens system is in a first state when an imaged object is at an infinite object distance and an entrance pupil diameter of the imaging optical lens system is at its maximum, the imaging optical lens system is in a second state when an imaged object is at a finite object distance, the imaging optical lens system undergoes a focus adjustment process to transition from the first state to the second state when an imaged object moves from an infinite object distance to a finite object distance, and the movable lens group is moved along an optical axis relative to the last lens group when the imaging optical lens system transitions from the first state to the second state in the focus adjustment process;

wherein the object-side surface of one lens element nearest to the object side within the imaging optical lens system is convex in a paraxial region thereof;

wherein no lens element is located between the last lens group and the prism along the optical axis;

wherein the prism has at least three reflective surfaces.

32. The imaging optical lens system of claim 31, wherein an axial distance between the object-side surface of the one lens element nearest to the object side and the image-side surface of another lens element nearest to the image side within the imaging optical lens system as the imaging optical lens system is in the first state is TDL, an axial distance between the object-side surface of the one lens element nearest to the object side and the image-side surface of the another lens element nearest to the image side within the imaging optical lens system as the imaging optical lens system is in the second state is TDS, and the following condition is satisfied:

$$1.20 < 10 \times |TDS - TDL|/TDL < 8.00.$$

33. The imaging optical lens system of claim 31, wherein the prism is immovable relative to the last lens group during the focus adjustment process.

34. The imaging optical lens system of claim 31, wherein the prism further has a first light permeable surface, the at least three reflective surfaces of the prism comprise, in order from the object side to the image side along the travelling direction of the optical path, a first reflective surface, a second reflective surface and a third reflective surface, and the first light permeable surface and the second reflective surface are coplanar.

35. The imaging optical lens system of claim 31, wherein the imaging optical lens system comprises five lens elements, the five lens elements are, in order from the object side to the image side along the optical path, a first lens element, a second lens element, a third lens element, a fourth lens element and a fifth lens element, the movable lens group comprises the first lens element and the second lens element, the last lens group comprises the third lens element, the fourth lens element and the fifth lens element, all lens elements in the movable lens group are immovable relative to one another during the focus adjustment process, and all lens elements in the last lens group are immovable relative to one another during the focus adjustment process.

36. The imaging optical lens system of claim 35, wherein the object-side surface of the fourth lens element is convex in a paraxial region thereof, and the image-side surface of the fourth lens element is concave in a paraxial region thereof.

* * * * *